(12) United States Patent
Saito et al.

(10) Patent No.: US 6,437,048 B1
(45) Date of Patent: *Aug. 20, 2002

(54) MOLDED RESIN ARTICLES

(75) Inventors: Jun Saito, Chiba; Hideo Nobuhara, Kumamoto; Shingo Kikukawa, Chiba; Hitoshi Sato, Chiba; Akira Yamauchi, Chiba; Kazuhiro Kimura, Kanagawa; Tadashi Tanaka, Chiba; Yoichi Kugimiya, Chiba; Yoshitaka Morimoto, Chiba; Hiroaki Ito, Chiba; Tooru Fukazawa, Chiba; Hiroyuki Maehara, Chiba; Yasuhiro Shiraishi, Chiba; Yuichi Yamanaka, Chiba; Masataka Sugimoto, Chiba; Hirohisa Ishii, Chiba; Masahiko Taniguchi, Chiba; Toshiki Yamamoto, Chiba; Yasuhiko Nakagawa, Kumamoto; Junichiro Yokota; Shouji Kawano, both of Chiba, all of (JP)

(73) Assignee: Chisso Corporation, Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/029,484
(22) PCT Filed: Dec. 2, 1996
(86) PCT No.: PCT/JP96/03529
  § 371 (c)(1),
  (2), (4) Date: Jul. 7, 1998
(87) PCT Pub. No.: WO97/20869
  PCT Pub. Date: Jun. 12, 1997

(30) Foreign Application Priority Data

| Dec. 1, 1995 | (JP) | 7-338168 |
| Feb. 6, 1996 | (JP) | 8-45432 |
| Mar. 4, 1996 | (JP) | 8-75165 |
| May 23, 1996 | (JP) | 8-153227 |
| May 23, 1996 | (JP) | 8-153228 |
| May 23, 1996 | (JP) | 8-153229 |
| May 16, 1996 | (JP) | 8-148381 |

(51) Int. Cl.[7] .............................. B29D 22/00
(52) U.S. Cl. .................. 525/240; 428/35.7; 525/320
(58) Field of Search .................. 428/35.7, 36.4, 428/36.1, 36.5, 218, 36.9, 36.91, 337, 339, 338; 525/98, 95, 93, 191, 232, 240, 525, 524; 524/425, 449, 451, 494, 413

(56) References Cited

U.S. PATENT DOCUMENTS 3,808,206 A    4/1974  Fleming et al. ......... 260/246 B (List continued on next page.)

FOREIGN PATENT DOCUMENTS

JP    53-91954    8/1978

(List continued on next page.)

*Primary Examiner*—Harold Pyon
*Assistant Examiner*—Sow-Fun Hon

(57) ABSTRACT

A plastic molded product of olefin (co)polymer composition comprises 0.01–5.0 weight parts high molecular weight polyethylene with an intrinsic viscosity $\eta_E$ in the range of 15–100 dl/g measured in 135° C. tetralin and preferably 100 weight parts polypropylene. The high molecular weight polyethylene has an average particle size in the range of 1–5000 nm and is finely dispersed as fine granules in the polypropylene, so that high melt strength and high crystallization temperature are attained, enabling various molding methods to be performed with high speed productivity. Using the polymer composition, plastics such as a resin foam, a film, a sheet, a layered plastic article with a coated substrate surface, a hollow plastic article, an injection molded plastic article, a fiber, a nonwoven web or a continuous tube-shaped plastic are provided. The olefin (co)polymer composition is obtained by preparing high molecular weight polyethylene granules using e.g. a titanium transition metal compound catalyst, and adding these, e.g. as a polymerization catalyst of propylene, singly or together with a polyolefin preparing catalyst.

43 Claims, 12 Drawing Sheets

U.S. PATENT DOCUMENTS

| | | | |
|---|---|---|---|
| 4,510,031 A | * 4/1985 | Matsumura et al. | 204/159.2 |
| 4,678,834 A | 7/1987 | Boivin et al. | 525/74 |
| 4,770,925 A | * 9/1988 | Uchikawa et al. | 428/219 |
| 4,820,772 A | * 4/1989 | Goto et al. | 524/83 |
| 5,047,485 A | 9/1991 | DeNicola, Jr. | 525/387 |
| 5,266,392 A | * 11/1993 | Land et al. | 428/224 |
| 5,331,047 A | * 7/1994 | Giacobbe et al. | 528/88 |
| 5,539,067 A | 7/1996 | Parodi et al. | 526/125.3 |
| 5,629,371 A | * 5/1997 | Kitagawa et al. | 524/505 |
| 5,658,628 A | * 8/1997 | Ishii et al. | 428/36.92 |
| 5,693,285 A | * 12/1997 | Ishii et al. | 264/515 |

FOREIGN PATENT DOCUMENTS

| | | |
|---|---|---|
| JP | 55-123637 | 9/1980 |
| JP | 56-110707 | 9/1981 |
| JP | 57-31945 | 2/1982 |
| JP | 57-63310 | 4/1982 |
| JP | 57-63311 | 4/1982 |
| JP | 58-17104 | 2/1983 |
| JP | 58-83006 | 5/1983 |
| JP | 58-138712 | 8/1983 |
| JP | 59-93711 | 5/1984 |
| JP | 61-130310 | 6/1986 |
| JP | 61-152754 | 7/1986 |
| JP | 62-25106 | 2/1987 |
| JP | 62-104810 | 5/1987 |
| JP | 62-104811 | 5/1987 |
| JP | 62-104812 | 5/1987 |
| JP | 2-298536 | 12/1990 |
| JP | 4-55410 | 2/1992 |
| JP | 4-275351 | 9/1992 |
| JP | 5-202132 | 8/1993 |
| JP | 5-202248 | 8/1993 |
| JP | 5-222122 | 8/1993 |
| JP | 5-239232 | 9/1993 |
| JP | 05245911 A * | 9/1993 |
| JP | 6-207058 | 7/1994 |
| JP | 6-228211 | 8/1994 |
| JP | 7-173329 | 7/1995 |
| JP | 7-206928 | 8/1995 |
| JP | 8-217816 | 8/1996 |

* cited by examiner

.02μm

MOLDED RESIN ARTICLES

FIELD OF THE INVENTION

The present invention relates to a plastic molded product using a resin composition with polypropylene as the main component. More precisely, the present invention relates to a plastic molded product using a resin composition with polypropylene as the main component having a high melt strength and a high crystallization temperature.

BACKGROUND OF THE INVENTION

Polypropylene is widely used in all molding fields, because its superior mechanical qualities and resistance against chemicals are conveniently combined with high economic efficiency. However, its melt strength and its crystallization temperature are low, so that not only is it of inferior moldability in molding fields such as blow molding, expansion molding and extrusion molding, but also there are limits to the production rate with respect to most other molding methods as well.

To raise the melt strength and the crystallization temperature of polypropylene, methods have been disclosed wherein molten polypropylene reacts with an organic peroxide and a crosslinking agent (see for example Publication of Unexamined Patent Application (Tokkai) No. Sho 59-93711 and Tokkai No. Sho 61-152754), and a method has been disclosed wherein half-crystalline polypropylene reacts in the absence of oxygen with a peroxide having a low dissolution temperature, so that a polypropylene having a free end long chain branching and not comprising gel is produced (Tokkai No. Hei 2-298536).

As another method to improve the dissolving viscoelastic properties such as the melt strength, a composition combining a polyethylene and a polypropylene with differing intrinsic viscosity and molecular weight, and a method for producing such a composition by multistep polymerization, have been proposed.

For example, in Published Examined Patent Application (Tokko) No. Sho 61-28694, a method has been disclosed wherein 2–30 weight parts of ultrahigh molecular weight polypropylene are added to 100 weight parts of regular polypropylene and extrusion molding is performed in a temperature range above the melting point and below 210° C. In Tokko No. Hei 1-12770, an extruded sheet with two polypropylene components of different molecular weights and an intrinsic viscosity ratio of at least 2, which is obtained by a multistep polymerization method, has been disclosed. In Tokko No. Sho 62-61057, a method for melt kneading and a method for multistep polymerization of a polyethylene composition consisting of three kinds of polyethylenes with differing viscosity and average molecular weight, comprising 1–10 wt % of a high viscosity, average molecular weight polyethylene have been disclosed. Tokko No. Hei 5-79683 discloses a polymerization method for polyethylene, wherein between 0.05 and 1 wt % of an ultrahigh molecular weight polyethylene having in intrinsic viscosity of not less than 20 dl/g is polymerized by multistep polymerization using a high activity titanium vanadium solid catalyst component. Tokko No. Hei 7-8890 discloses a polymerization method for polyethylene, wherein 0.1–5 wt % of an ultrahigh molecular weight polyethylene having an intrinsic viscosity of not less than 15 dl/g is polymerized by multistep polymerization in specially arranged curing units using a high activity titanium catalyst component preliminarily polymerized with 1-butene and 4-methyl-1-pentene.

In Tokkai No. Hei 5-222122, a method is disclosed for producing polypropylene having high melt strength, by polymerization of propylene using a preliminary polymerization catalyst that results from the preliminary polymerization of ethylene and a polyene compound with a support type solid catalyst comprising titanium and an organic aluminium compound catalyst. Tokkai No. Hei 4-55410 discloses a method for producing ethylene α-olefin copolymer having high melt strength by us ing a preliminary polymerization catalyst comprising ethylene and a polyethylene with an intrinsic viscosity of not less than 20 dl/g, wherein preliminary polymerization is performed exclusively in the ethylene by using the same catalyst as in Tokkai No. Hei 5-222122.

Although it has to be acknowledged that in the various components proposed in the prior art as described above and in the production processes belonging thereto the melt strength has been somewhat increased, many aspects such as a residual odor caused by the crosslinking agent, the crystallization temperature and the heat stability have to be improved.

Moreover, in a multistep polymerization that incorporates a production process of high molecular weight polyolefin into a main polymerization of a regular polypropylene (co)polymerization process, the precise control of the polypropylene (co)polymerization for formation of a small amount of high molecular weight olefin is difficult, and a low polymerization temperature is necessary for formation of the polypropylene with a sufficiently large molecular weight, which lowers the rate of production for the final polypropylene composition. Thus, improvement of the process is necessary.

In the method for preliminarily polymerizing a polyene compound, it is necessary to prepare the polyene compound separately. In the method for preliminarily polymerizing polyethylene, the dispersibility of the preliminarily polymerized ethylene in a finally obtained polyolefin compound is not uniform, so that from the viewpoint of stability of the polyolefin compound, improvement of the process is required.

As has been pointed out above, the problems of low melt strength and low crystallization temperature of polypropylene, as well as the problems of odor and heat stability are inherent in the prior art, so that an improvement of polypropylene plastic molded products is strongly desired.

SUMMARY OF THE INVENTION

In order to solve the problems of the prior art, it is a first object of the present invention to provide a plastic molded product using a polypropylene resin composition, which has high melt strength and high crystallization temperature, as a main component.

A second object of the present invention is to provide a resin foam having uniformly fine foaming cells (bubbles) and a high expansion ratio using a polypropylene composition.

A third object of the present invention is to provide a sheet or film plastic using a polypropylene composition having high melt strength and excellent moldability in a thermoforming, vacuum forming, pressure forming and the like.

A fourth object of the present invention is to provide a hollow plastic article using a polypropylene composition with high melt strength and high crystallization temperature, which has excellent moldability with regard to hollow plastic molding, the hollow plastic article having high resistance against drawdown at shock, high production, high stiffness and high stiffness against heat.

A fifth object of the present invention is to provide an injection molded plastic product using a polypropylene composition having high melt strength and high crystallization temperature, which has excellent heat resistance and stiffness.

A sixth object of the present invention is to provide a polypropylene fiber and nonwoven fabric with high melt strength and high crystallization temperature, which has excellent heat resistance and stiffness.

A seventh object of the present invention is to provide a tube-shaped continuous plastic, which does not whiten with impact, has a high impact strength at low temperatures and can be produced with high productivity using high melt strength and high crystallization speed.

In order to achieve the above objects, a plastic molded product of an olefin (co)polymer composition according to the present invention is provided, which comprises:

(a) 0.01–5.0 weight parts of high molecular weight polyethylene, which is an ethylene homopolymer or an ethylene-olefin copolymer containing not less than 50 wt % ethylene units and has an intrinsic viscosity $\eta_E$ in the range of 15–1000 dl/g measured in tetralin at 135° C.; and (b) 100 weight parts of an olefin (co)polymer which consists of a propylene homopolymer or propylene-olefin copolymer containing not less than 50 wt % propylene units and has an intrinsic viscosity $\eta_P$ in the range of 0.2–10 dl/g measured in tetralin at 135° C.

In the plastic molded product, it is preferable that the high molecular weight polyethylene exists as finely dispersed particles having a number-average particle size of 1–5000 nm.

In the plastic molded product, it is also preferable that the number-average particle size of the high molecular weight polyethylene is 10–500 nm.

In the plastic molded product, it is also preferable that the intrinsic viscosity $\eta_T$ of the olefin (co)polymer composition measured in tetralin at 135° C. is 0.2–10 dl/g.

It is also preferable that the plastic molded product satisfies the equation $$\log(G'(\omega=10^0))-\log(G'(\omega=10^{-2}))<2,$$

wherein $G'(\omega=10^0)$ is the storage elastic modulus at a frequency of $\omega=10^0$, and $G'(\omega=10^{-2})$ is the storage elastic modulus at a frequency of $\omega=10^{-2}$ of the molten olefin (co)polymer composition at 230° C.

It is also preferable that the plastic molded product satisfies the equation $$\log(N_1)>-\log(MFR)+5,$$

wherein $N_1$ is a first normal stress difference at a shear rate of $4\times10^{-1}(\sec^-)$ of the olefin (co)polymer composition at 190° C., 230° C. and 250° C. and MFR is a melt flow rate.

It is also preferable that the plastic molded product satisfies the equation $$(N_1(190°\text{ C.})-N_1(250°\text{ C.}))/N_1(190°\text{ C.})<0.6,$$

wherein $N_1(190°\text{ C.})$ and $N_1(250°\text{ C.})$ are first normal stress differences at a shear rate of $4\times10^{-1}(\sec^{-1})$ of the olefin (co)polymer composition at 190° C. and 250° C. respectively.

It is also preferable that the plastic molded product satisfies the equation $$(MS(190°\text{ C.})-MS(250°\text{ C.}))/MS(190°\text{ C.})<3.1,$$

wherein $MS(190°\text{ C.})$ and $MS(250°\text{ C.})$ are the melt strengths at a shear rate of $3\times10^{-1}(\sec^{-1})$ of the olefin (co)polymer composition at 190° C. and 250° C. respectively.

In the plastic molded product, it is also preferable that the plastic molded product satisfies the equation $$(G(t=10)-G(t=300))/G(t=10)<1,$$

wherein $G(t=10)$ is a relaxation elastic modulus with t=10sec and $G(t=300)$ is a relaxation elastic modulus with t=300sec of the molten olefin (co)polymer composition at 230° C. under 500% strain.

In the plastic molded product, it is also preferable that the elongational viscosity when the olefin (co)polymer composition is molten and stretched increases in a region where deformation is large, indicating strain hardenability of the olefin (co)polymer composition.

In the plastic molded product, it is also preferable that the high molecular weight polyethylene particles are added before or during olefin (co)polymerization.

It is also preferable that the plastic molded product satisfies the following equation $$\log(MS)>4.24\times\log(\eta_T)-1.20,$$

wherein MS is the melt strength of the olefin (co)polymer composition at 230° C. and $\eta_T$ is the intrinsic viscosity measured in tetralin at 135° C.

It is also preferable that the plastic molded product satisfies the following equation $$\log(MS)>4.24\times\log(\eta_T)-1.05,$$

wherein MS is the melt strength of the olefin (co)polymer composition at 230° C. and $\eta_T$ is the intrinsic viscosity measured in tetralin at 135° C.

It is also preferable that the plastic molded product satisfies the following equation $$4.24\times\log(\eta_T)+0.24>\log(MS)>4.24\times\log(\eta_T)-1.10,$$

wherein MS is the melt strength of the olefin (co)polymer composition at 230° C. and $\eta_T$ is the intrinsic viscosity measured in tetralin at 135° C.

In the plastic molded product, it is also preferable that 0.001–2 weight parts of not less than one stabilizer selected from the group consisting of a phenol antioxidant and a phosphorous antioxidant is added to 100 weight parts of the olefin (co)polymer composition.

It is also preferable that the plastic molded product is not less than one plastic selected from the group consisting of a resin foam, a film, a sheet, a laminate covering a substrate surface, a hollow plastic, an extrusion plastic, a fiber, a nonwoven web and a tube-shaped continuous plastic.

It is also preferable that the plastic molded product is a resin foam, and the resin foam is not less than one selected from the group consisting of a container and a sheet.

It is also preferable that the foam sheet is laminated on a metal plate.

It is also preferable that the expansion ratio of the foam is in the range of 1.1–5.0.

It is also preferable that the plastic molded product is a film or a sheet molded by a T-die method satisfying the equation $$280\geq(PP\text{-}T1)-(CH\text{-}T2)\geq120,$$

wherein (PP-T1) is a temperature of not less than 180° C. but less than 350° C. of the molten propylene polymer composition for molding and (CH-T2) is a surface temperature less than 80° C. of a chillroll of a molding machine.

It is also preferable that the plastic molded product is a film or a sheet having not less than one of the basic lamination structures selected from the group consisting of [A]/[B], [A]/[B]/[A], and [B]/[A]/[B], wherein the polypropylene composition (x) of claim 1 is used for layer [A], and not less than one polypropylene composition (y) selected from the group consisting of crystalline propylene homopolymer and crystalline propylene-olefin copolymer containing not less than 50 wt % propylene units is used for layer [B].

It is also preferable that the ratio of the total thicknesses of layer [A] and layer [B] is at least in the range [A]:[B] =20:1–1:20.

It is also preferable that the plastic molded product is a film or a sheet, wherein the polypropylene composition film according to claim 1 is laminated onto at least one surface of a polypropylene biaxially stretched film.

It is also preferable that the plastic molded product comprises
- {A} 99–90 wt % of the polypropylene composition according to claim 1, which is a propylene polymer or a propylene-olefin copolymer comprising not less than 50 wt % propylene units, has a melt flow rate of 5–100 g/10 min at 230° C. and 21.18N and comprises polypropylene (a) with an intrinsic viscosity $\eta_P$ of 0.2 dl/g–10 dl/g measured in tetralin at 135° C., and 0.01–5 weight parts (for 100 weight parts of polypropylene (a)) of polyolefin (b) with an intrinsic viscosity $\eta_E$ of 15 dl/g–100 dl/g measured in tetralin at 135° C.; and
- {B} 1–10 wt % of crystalline or low crystalline ethylene α-olefin copolymer having a melt flow rate of 1–50 g/10 min at 230° C. and 21.18N.

It is also preferable that the plastic molded product is a coated plastic.

It is also preferable that the plastic molded product is a hollow plastic article using olefin polymer having a melt flow rate of 0.1–20 g/10 min at 230° C. and 21.18N.

It is also preferable that the resin further comprises 5–30 wt % of not less than one substance selected from the group consisting of
- (Y1) an ethylene homopolymer with a density of 0.914–0.930 g/cm$^3$ and a melting point (Tm) of 100–118° C.,
- (Y2) an ethylene-olefin copolymer with a density of 0.920–0.935 g/cm$^3$ and a melting point (Tm) of 115–127° C.,
- (Y3) an ethylene-olefin copolymer with a density of 0.880–0.920 g/cm$^3$ and a melting point (Tm) of 110–115° C.,
- (Y4) a crystalline ethylene polymer with a density of 0.935 –0.968 g/cm$^3$ and a melting point (Tm) of 125–136° C.,
- (Y5) an ethylene-olefin copolymer rubber,
- (Y6) an ethylene-olefin nonconjugated diene copolymer rubber
- (Y7) an ethylene-vinyl acetate copolymer with a density of 0.92–0.95 g/cm$^3$ and a melting point (Tm) of 90–110° C., and
- (Y8) an inorganic filler, which is added to 95–70 wt % of the olefin polymer composition according to claim 1.

It is also preferable that the inorganic filler is at least one of the substances selected from the group consisting of talc, calcium carbonate, potassium titanate whiskers, mica and glass fiber.

It is also preferable that the plastic molded product is a multilayer hollow plastic article comprising
- an inner layer comprising the olefin polymer composition (X) according to claim 1 having a melt flow rate (230° C.; 21.18N) of 0.1–20 g/10 min and consisting of 0.01–5 weight parts of said component (a) and 100 weight parts of said component (b); and
- a surface layer comprising a polypropylene composition (W) consisting of 100 weight parts polypropylene with a crystalline melting point of 135° C.–165° C. and 0.05–1 weight parts nucleating agent.

It is also preferable that the olefin polymer composition according to claim 1 accounts for 95–70 wt % of the inner layer and further comprises 5–30 wt % of not less than one substance selected from the group consisting of
- (Y1) an ethylene homopolymer with a density of 0.914–0.930 g/cm$^3$ and a melting point (Tm) of 100–118° C.,
- (Y2) an ethylene-olefin copolymer with a density of 0.920–0.935 g/cm$^3$ and a melting point (Tm) of 115–127° C.,
- (Y3) an ethylene-olefin copolymer with a density of 0.880–0.920 g/cm$^3$ and a melting point (Tm) of 110–115° C.,
- (Y4) a crystalline ethylene polymer with a density of 0.935–0.968 g/cm$^3$ and a melting point (Tm) of 125–136° C.,
- (Y5) an ethylene-olefin copolymer rubber,
- (Y6) an ethylene-olefin nonconjugated diene copolymer rubber
- (Y7) an ethylene-vinyl acetate copolymer with a density of 0.92–0.95 g/cm$^3$ and a melting point (Tm) of 90–110° C., and
- (Y8) an inorganic filler.

It is also preferable that the plastic molded product is a fiber having the above-mentioned plastic molded product according to claim 1 as one fiber component; and not less than one thermoplastic resin selected from the group consisting of a thermoplastic polyolefin resin and a thermoplastic polyester resin as another component; the fiber is formed as a regular fiber of one of the above components, a conjugated fiber of both components or a mixed fiber made of both components, the polypropylene composition accounts for 100–50 wt %, and the average fiber diameter is preferably 0.1–10 μm.

It is also preferable that the plastic molded product is a fiber and a fiber component according to claim 1 is used as a sheath component and a crystalline polypropylene is used as a core component, and the conjugation ratio (sheath component/core component) is in the range 20/80–60/40 (wt %).

It is also preferable that in the plastic molded product, the fiber is formed into a nonwoven fabric web.

It is also preferable that the fibers constituting a nonwoven fabric web are made only of the polypropylene composition according to claim 1.

It is also preferable that the fibers constituting a nonwoven fabric web are conjugated fibers comprising the polypropylene composition according to claim 1 and not less than one thermoplastic resin selected from the group consisting of polyolefin thermoplastic resin and polyester thermoplastic resin, and the polypropylene composition accounts for not less than 50 wt %.

It is also preferable that the fibers constituting a nonwoven fabric web are mixed fibers comprising the polypropylene composition above-mentioned and regular fibers or conjugated fibers of not less than one thermoplastic resin selected from the group consisting of polyolefin thermoplastic resin and polyester thermoplastic resin, and the polypropylene composition accounts for not less than 50 wt %.

It is also preferable that the plastic molded product further comprises 0.10–10 wt % hydrogenated styrene elastomer for 99.9–90 wt % of the polypropylene composition according to claim 1.

It is also preferable that the hydrogenated styrene elastomer has a melt flow rate (SR-MFR) (230° C.; 21.18N) of 0.5 g/10 min–10 g/min.

It is also preferable that the hydrogenated styrene elastomer has a styrene concentration of not more than 30 wt %.

It is also preferable that the hydrogenated styrene elastomer is a hydrogenated ethylene-butene-styrene elastomer.

It is also preferable that the plastic molded product is a continuous tube-shaped plastic.

It is also preferable that the continuous tube-shaped plastic is obtained by melt extruding a polyolefin resin composition into a metal mold in vacuum condition and molding it into a tube shape.

It is also preferable that the plastic molded product is a continuous tube-shaped plastic obtained by melt extruding a polyolefin resin composition with a melt flow rate (PP-MFR) (230° C.; 21.18N) of 0.1 g/10 min–10 g/10 min into a metal mold in vacuum condition and molding it into a tube shape.

DESCRIPTION OF THE PREFERRED EMBODIMENTS

Figure 1:
FIG. 1 is a magnification ×75000 of a polymer composition according to a first example of the present invention, photographed with a transmission electron microscope (TEM).
Figure 1:
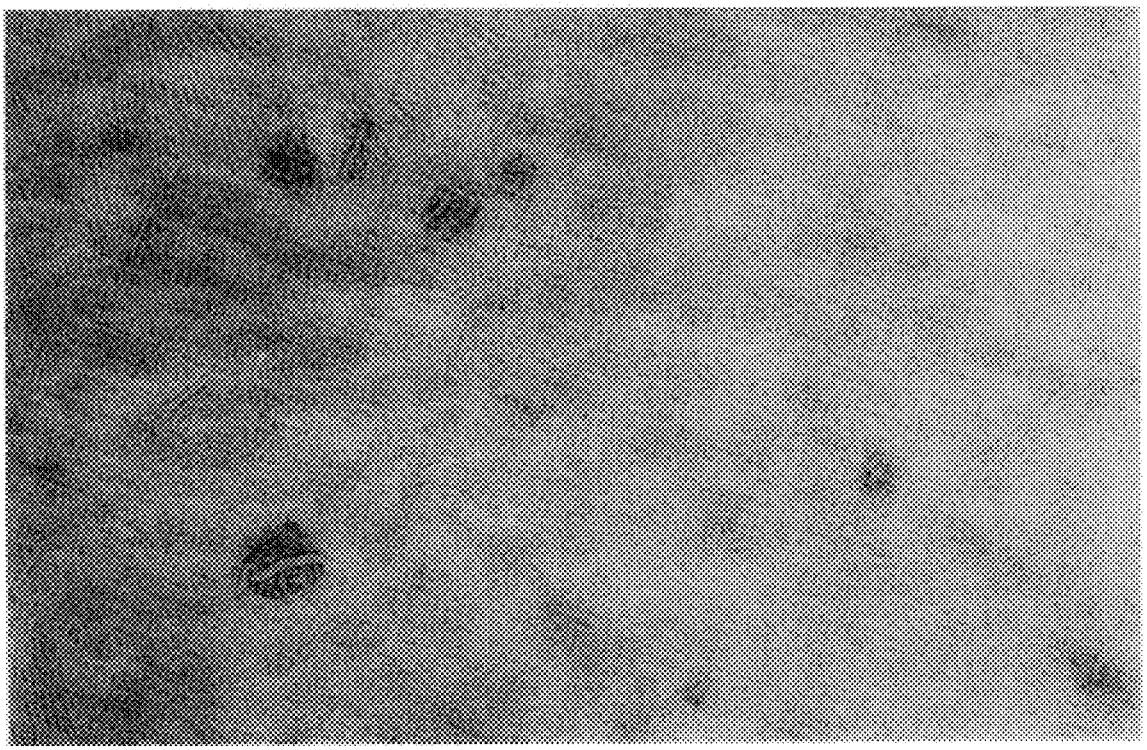

Throughout this specification, the term "olefin (co) polymer" refers to (i) homopolymers of olefin with a carbon number of 2–12 and (ii) olefin random copolymers including not less than 50 wt % of one of these olefin units. The term "polypropylene" refers to (i) propylene homopolymers, (ii) propylene-olefin random copolymers containing not less than 50 wt % propylene units, and (iii) propylene-olefin block copolymers containing not less than 50 wt % propylene units. The term "polyethylene" refers to (i) ethylene homopolymers, (ii) ethylene-olefin random copolymers containing not less than 50 wt % ethylene units, and (iii) ethylene-olefin block copolymers containing not less than 50 wt % ethylene units.

The olefin (co)polymer constituting the component (a) of the polypropylene composition (x) of the first present invention should be an olefin (co)polymer with an intrinsic viscosity $\eta_E$ of 15–100 dl/g when measured at 135° C. in tetralin. It can be an ethylene homopolymer or an ethylene-olefin random copolymer comprising not less than 50 wt % ethylene units. Preferably, it is an ethylene homopolymer or an ethylene-olefin random copolymer comprising not less than 70 wt % ethylene units, more preferably an ethylene homopolymer or an ethylene-olefin random copolymer comprising not less than 90 wt % ethylene units. The (co) polymer constituting the component (a) is not restricted to one of those (co)polymers, but can be a combination of two or more.

When the olefin (co)polymer constituting the component (a) has an intrinsic viscosity $\eta_E$ of less than 15 dl/g, the melt strength and the crystallization temperature of the resulting polypropylene composition are insufficient. The intrinsic viscosity $\eta_E$ has no particular upper limit, but when the difference with respect to the intrinsic viscosity $\eta_P$ of the polypropylene component (b) becomes too large, the dispersibility of the olefin (co)polymer of component (a) in the polypropylene component (b) declines, so that the melt strength cannot be raised. Also from the viewpoint of production efficiency, an upper limit of about 100 dl/g should be set. The olefin (co)polymer constituting the component (a) has an intrinsic viscosity $\eta_E$ (observed in 135° C. tetralin) of 15–100 dl/g, preferably 17–100 dl/g. Since it is necessary to raise the molecular weight of the olefin (co) polymer constituting the component (a) to attain an intrinsic viscosity $\eta_E$ of 15 dl/g measured in 135° C. tetralin, the ethylene polymer units should be 50% or more from the viewpoint of efficiently raising the molecular weight.

There are no specific limitations regarding the olefin constituting the olefin (co)polymer component (a), but an olefin with a carbon number of 2–12 is preferably used. To be specific, ethylene, propylene, 1-butene, 1-pentene, 1-hexene, 1-octene, 1-decene, 4-methyl-1-pentene, and 3-methyl-1-pentene can be given as examples, and not only one olefin, but also a combination of two or more is possible.

There are no specific limitations regarding the density of the olefin (co)polymer of component (a). However, to be specific, a density of 880 g/l–980 g/l is suitable.

The polypropylene component (b), which is the other component constituting the polypropylene composition (x) of the present first invention, is a crystalline polypropylene with an intrinsic viscosity $\eta_P$ of 0.2–10 dl/g when measured at 135° C. in tetralin. It is a propylene homopolymer, a propylene-olefin random copolymer containing not less than 50 wt % propylene units, or a propylene-olefin block copolymer containing not less than 50 wt % propylene units, preferably a propylene homopolymer, a propylene-olefin random copolymer including not less than 90 wt % propylene polymer units, or an ethylene-olefin block copolymer including not less than 70 wt % propylene polymer units. The (co)polymer of the component (b) is not restricted to one (co)polymer, but can be a mixture of two or more.

For the polypropylene component (b), a polypropylene with an intrinsic viscosity $\eta_P$ of 0.2–10 dl/g, preferably 0.5–8 dl/g is used. When the intrinsic viscosity $\eta_P$ of the polypropylene component (b) is less than 0.2 dl/g, then the foaming properties of the resulting polypropylene composition degrade, and when 10 dl/g is surpassed, then the flowability of the resulting polypropylene composition degrades.

There are no specific limitations concerning the olefin (other than propylene) copolymerized with propylene to constitute the polypropylene component (b). However, an olefin with a carbon number of 2–12 is used preferably. To be specific, ethylene, 1-butene, 1-pentene, 1-hexene, 1-octene, 1-decene, 4-methyl-1-pentene, and 3-methyl-1-pentene can be given as examples, and not only the use of one olefin, but the use of two or more is also possible.

Regarding the stereoregularity of the polypropylene component (b), there are no specific restrictions, and any crystalline polypropylene can be used to achieve the purpose of the present invention. To be specific, the isotactic pentad fraction (mmmm) measured with $^{13}$C-NMR (Nuclear Magnetic Resonance) spectroscopy is preferably 0.80–0.99, more preferably 0.85 . 0.99 and even more preferably 0.90–0.99.

The isotactic pentad fraction (mmmm) has been proposed by A. Zambelli et al (Macromolecules 6,925 (1973)) and is measured by $^{13}$C-NMR. It is the isotactic fraction of the pentad units in the polypropylene molecule chains and has been determined here by the assignment determination technique for peaks in the spectroscopic measurement as proposed by A. Zambelli et al (Macromolecules 8,687 (1975)). To be specific, the measurement was performed at 67.20 MHz, 130° C., using a compound solution of o-dichlorobenzene/benzene bromide with a weight ratio of 8:2 and a polymer concentration of 20 wt %. As measuring equipment, e.g. a JEOL-GX270 NMR measuring device (a product of NIHON DENSHI Co.) can be used.

The propylene composition (x) used in the first present invention comprises 0.01–5 weight parts of the above-mentioned olefin (co)polymer component (a), preferably 0.02–2 weight parts, more preferably 0.05–1 weight parts, and 100 weight parts of the polypropylene component (b).

When the amount of the olefin (co)polymer component (a) is less than 0.01 weight parts, the effect of raising the melt strength of the resulting polypropylene composition becomes small, and when the amount exceeds 5 weight parts, the effect is fully saturated and the homogeneity of the resulting polypropylene composition may be damaged, so that these amounts are not preferable.

It is preferable that the relation between the melt strength (MS) at 230° C. of the polypropylene composition (x) used for the first present invention and its intrinsic viscosity $\eta_T$ observed at 135° C. in tetralin are characterized by the equation:

$$\log(MS) > 4.24 \times \log[\eta_T] - 1.05.$$

There is no specific upper restriction concerning the melt strength. However, when the melt strength is too big, the flowability of the composition deteriorates. Therefore, a preferable range for the invention is 4.24×log[$\eta_T$]+0.50>log(MS)>4.24×log[$\eta_T$]−1.05, more preferably 4.24×log[$\eta_T$]+0.24>log(MS)>4.24×log[$\eta_T$]−1.05, and most preferably 4.24×log[$\eta_T$]+0.24>log(MS)>4.24×log[$\eta_T$]−0.93.

Here, the term melt strength (MS) at 230° C. refers to the tension (in cN) of a thready polyolefin measured under the following conditions: polypropylene composition is heated to 230° C. in a MELT TENSION TESTER-2 (product of TOYO SEIKI SEIKAKU-SHO, Ltd.), the melting polypropylene composition is extruded into 23° C. air through a nozzle having a diameter of 2.095 mm at a rate of 20 mm/min to form a strand, and finally the tension of this thread-shaped polypropylene composition is measured while the obtained strand is wound up at a rate of 3.14 m/min.

As long as the melt strength of the polypropylene composition (x) of the first present invention is in the above-mentioned range, any method can be used for producing the composition, e.g. a main (co)polymerization of propylene or propylene and an olefin other than propylene in the presence of a catalyst preactivated with olefin, such as in the method described below.

According to this method, a polypropylene composition is produced by polymerizing or copolymerizing either propylene alone or a combination of propylene and an olefin having 2 to 12 carbons in the presence of a preactivated catalyst comprising (I) a polyolefin producing catalyst, formed by the combination of (i) a transition metal compound catalyst component containing at least a titanium compound, (ii) 0.01 to 1000 mol (per mol of the transition metal atom) of an organic metal compound (AL1) selected from the group of metals belonging to group I, group II, group XII and group XIII of the periodic table published in 1991, and (iii) 0 to 500 mol (per mol of the transition metal atom) of an electron donor (E1), (II) 0.01 to 100 g (per gram of the transition metal compound catalyst component) of a polypropylene (B) for (co)polymerization, which is supported by the polyolefin producing catalyst and has an intrinsic viscosity $\eta_B$ of less than 15 dl/g measured in tetralin at 135° C., and (III) 0.01 to 5000 g (per gram of the transition metal compound catalyst component) of a polyethylene (A) having an intrinsic viscosity $\eta_A$ of 15–100 dl/g measured in tetralin at 135° C.

Throughout this specification, the term "preactivation" refers to an activation for adding molecular weight to a polyolefin-preparing catalyst prior to the (co)polymerization of propylene or propylene and another olefin. The preactivation is performed by preactivation (co) polymerization of olefin in the presence of a polyolefin-preparing catalyst to let the catalyst support the olefin.

The preactivated catalyst used for this method comprises (1) a polyolefin producing catalyst, formed by the combination of (i) a transition metal compound catalyst component containing at least a titanium compound, (ii) 0.01 to 1000 mol of an organic metal compound (AL1) selected from the group of metals belonging to group I, group II, group XII and group XIII of the periodic table published in 1991 with respect to 1 mol of the transition metal atom, and (iii) 0 to 500 mol of an electron donor (E1) with respect to 1 mol of the transition metal atom, (II) 0.01 to 100 g of a polypropylene (B) for 1 g of the transition metal compound catalyst component, the polypropylene (B) for (co) polymerization, which is supported by the polyolefin producing catalyst and has an intrinsic viscosity $\eta_B$ of less than 15 dl/g measured in tetralin at 135° C., and (III) 0.01 to 5000 g of a polyethylene (A) for 1 g of the transition metal compound catalyst component, the polyethylene (A) having an intrinsic viscosity $\eta_A$ of 15–100 dl/g measured in tetralin at 135° C.

In the preactivated catalyst, the transition metal compound catalyst component can be any known polyolefin-preparing catalyst component containing a transition metal compound catalyst component including at least a titanium compound as a main component. A titanium-containing solid catalyst component is preferably used from among the known catalyst components with regard to industrial production.

The titanium-containing solid catalyst component can be a titanium-containing solid catalyst component containing a titanium trichloride composition as the main component (see e.g. Published Examined Patent Application (Tokko) Nos. Sho 56-3356, Sho 59-28573, and Sho 63-66323), or a titanium-containing supported catalyst component including titanium, magnesium, a halogen and an electron donor as essential components, wherein a magnesium compound supports titanium tetrachloride (see e.g. Published Unexamined Patent Application (Tokkai) Nos. Sho 62-104810, Sho 62-104811, Sho 62-104812, Sho 57-63310, Sho 57-63311, Sho 58-83006, and Sho 58-138712).

The organic metal compound (AL1) can be a compound having an organic group of a metal selected from the group consisting of Group I metals, Group II metals, Group XII metals and Group XIII metals in terms of the periodic table issued in 1991. Examples of the compound having an organic group of a metal include organic lithium compounds, organic sodium compounds, organic magnesium compounds, organic zinc compounds and organic aluminum compounds. The organic metal compound can be used in combination with the above-mentioned transition metal compound catalyst components.

From among these examples, it is preferable to use organic aluminum compounds represented by the general formula $AlR^1{}_pR^2{}_qX_{3-(p+q)}$, wherein $R^1$ and $R^2$ each represent a hydrocarbon group such as an alkyl group, a cycloalkyl group or an aryl group, or an alkoxy group, $R^1$ and $R^2$ can be identical or different, X represents a halogen atom, and p and q are positive integers satisfying the formula: $0<p+q \leq 3$.

Specific examples of such organic aluminum compounds include trialkyl aluminums such as trimethyl aluminum, triethyl aluminum, tri-n-propyl aluminum, tri-n-butyl aluminum, tri-i-butyl aluminum, tri-n-hexyl aluminum, tri-i-hexyl aluminum and tri-n-octyl aluminum; dialkyl aluminum monohalides such as diethyl aluminum chloride, di-n-propyl aluminum chloride, di-i-butyl aluminum chloride, diethyl aluminum bromide and diethyl aluminum iodide; dialkyl aluminum hydrides such as diethyl aluminum hydride; alkyl aluminum sesquihalide such as ethyl aluminum sesquichloride; monoalkyl aluminum dihalide such as ethyl aluminum dichloride; and alkoxyalkyl aluminum such as diethoxy monoethyl aluminum, preferably trialkyl aluminum or dialkyl aluminum monohalide. Those organic aluminum compounds can be used either alone or in combination.

In the production of the polypropylene composition (x) according to the present invention, an electron donor is, if required, used to control the preparation rate and/or the stereoregularity of polyolefin.

Examples of the electron donor include (i) organic compounds having any of oxygen, nitrogen, sulfur and phosphorus in the molecule, such as ethers, alcohols, esters, aldehydes, fatty acids, ketones, nitriles, amines, amides, urea or thiourea, isocyanates, azo-compounds, phosphines, phosphites, phosphinates, hydrogen sulfide, thioethers, and neoalcohols, (ii) silanols and (iii) organic silicon compounds containing an Si—O—C bond in the molecule.

Examples of ethers include dimethyl ether, diethyl ether, di-n-propyl ether, di-n-butyl ether, di-i-amyl ether, di-n-pentyl ether, di-n-hexyl ether, di-i-hexyl ether, di-n-octyl ether, di-i-octyl ether, di-n-dodecyl ether, diphenyl ether, ethylene glycol monoethyl ether, diethylene glycol dimethyl ether and tetrahydrofuran. Examples of alcohols include methanol, ethanol, propanol, butanol, pentanol, hexanol, octanol, 2-ethyl hexanol, allyl alcohol, benzyl alcohol, ethylene glycol and glycerin. Examples of phenols include phenol, cresol, xylenol, ethyl phenol and naphthol.

Examples of esters include monocarboxylic acid esters such as methyl methacrylate, methyl formate, methyl acetate, methyl butyrate, ethyl acetate, vinyl acetate, propyl-n-acetate, propyl-i-acetate, butyl formate, amyl acetate, butyl-n-acetate, octyl acetate, phenyl acetate, ethyl propionate, methyl benzoate, ethyl benzoate, propyl benzoate, butyl benzoate, octyl benzoate, 2-ethylhexyl benzoate, toluic acid methyl ester, toluic acid ethyl ester, anisic acid methyl ester, anisic acid ethyl ester, anisic acid propyl ester, anisic acid phenyl ester, ethyl cinnamate, naphthoic acid methyl ester, naphthoic acid ethyl ester, naphthoic acid propyl ester, naphthoic acid butyl ester, 2-ethylhexyl naphthoic acid, or ethyl phenylacetate; aliphatic polycarboxylic acid esters such as diethyl succinate, methylmalonic acid diethyl ester, butylmalonic acid diethyl ester, dibutyl maleate or diethyl butylmaleic acid; and aromatic polycarboxylic acid esters such as monomethyl phthalate, dimethyl phthalate, diethyl phthalate, di-n-propyl phthalate, mono-n-butyl phthalate, di-n-butyl phthalate, di-i-butyl phthalate, di-n-heptyl phthalate, di-2-ethylhexyl phthalate, di-n-octyl phthalate, diethyl isophthalate, dipropyl isophthalate, dibutyl isophthalate, di-2-ethylhexyl isophthalate, diethyl terephthalate, dipropyl terephthalate, dibutyl terephthalate or naphthalenedicarboxylic acid diisobutyl ester.

Examples of aldehydes include acetaldehyde, propionaldehyde and benzaldehyde. Examples of carboxylic acids include monocarboxylic acids such as formic acid, acetic acid, propionic acid, butyric acid, oxalic acid, succinic acid, acrylic acid, maleic acid, valeric acid or benzoic acid; and acid anhydrides such as benzoic anhydride, phthalic anhydride or tetrahydrophthalic anhydride. Examples of ketones include acetone, methylethyl ketone, methylisobutyl ketone and benzophenone.

Examples of nitrogen-containing organic compounds include nitriles such as acetonitrile or benzonitrile; amines such as methyl amine, diethyl amine, tributyl amine, triethanol amine, β-(N,N-dimethylamino)ethanol, pyridine, quinoline, α-picoline, 2,4,6-trimethyl pyridine, 2,2,5,6-tetramethyl piperidine, 2,2,5,5-tetramethyl pyrrolidine, N,N,N',N'-tetramethyl ethylenediamine, aniline or dimethyl aniline; amides such as formamide, hexamethyl phosphoric acid triamide, N,N,N',N',N"-pentamethyl-N'-β-dimethylaminomethyl phosphoric acid triamide or octamethyl pyrophosphoryl amide; ureas such as N,N,N',N'-tetramethyl urea; isocyanates such as phenyl isocyanate or toluyl isocyanate; and azo compounds such as azobenzene.

Examples of phosphorus-containing compounds include phosphines such as ethyl phosphine, triethyl phosphine, di-n-octyl phosphine, tri-n-octyl phosphine, triphenyl phosphine or triphenyl phosphine oxide; and phosphites such as dimethyl phosphite, di-n-octyl phosphite, triethyl phosphite, tri-n-butyl phosphite or triphenyl phosphite.

Examples of the sulfur-containing compounds include thioethers such as diethyl thioether, diphenyl thioether or methyl phenyl thioether; and thioalcohols such as ethyl thioalcohol, n-propyl thioalcohol or thiophenol. Examples of the organic silicon compounds include silanols such as trimethyl silanol, triethyl silanol or triphenyl silanol; and organic silicon compounds having an Si—O—C bond, such as trimethyl methoxysilane, dimethyl dimethoxysilane, methylphenyl dimethoxysilane, diphenyl dimethoxysilane, methyltrimethoxysilane, vinyltrimethoxysilane, phenyltrimethoxysilane, trimethyl ethoxysilane, dimethyl diethoxysilane, diisopropyl dimethoxysilane, diisobutyl dimethoxysilane, diphenyl diethoxysilane, methyl triethoxysilane, ethyl triethoxysilane, vinyl triethoxysilane, butyl triethoxysilane, phenyl triethoxysilane, ethyl triisopropoxysilane, vinyl triacetoxysilane, cyclopentyl methyl dimethoxysilane, cyclopentyl trimethoxysilane, dicyclopentyl dimethoxysilane, cyclohexyl methyl dimethoxysilane, cyclohexyl trimethoxysilane, dicyclohexyl dimethoxysilane or 2-norbornyl methyl diethoxysilane. These electron donors can be used either alone or in combination.

In the preactivated catalyst, the polyethylene (A) has an intrinsic viscosity $\eta_A$ in the range of 15 to 100 dl/g, preferably 17 to 50 dl/g, measured in tetralin at 135° C. The polyethylene (A) is an ethylene homopolymer or a copolymer of ethylene and an olefin having 3 to 12 carbon atoms comprising not less than 50 wt % ethylene units, preferably not less than 70 wt % ethylene units, more preferably not less than 90 wt % ethylene units. The polyethylene (A) finally constitutes the polyethylene component (a) of the polypropylene composition (x) of the first present invention. Consequently, the intrinsic viscosity $\eta_E$ of the polyethylene (a) is equal to the intrinsic viscosity $\eta_A$ of the polyethylene (A): $\eta_E = \eta_A$.

The support amount of polyethylene (A) per gram of the transition metal catalyst component compound is 0.01 to 5000 g, preferably 0.05 to 2000 g, further preferably 0.1 to 1000 g. When the support amount is less than 0.01 g per gram of the transition metal compound catalyst component, the melt strength of the polypropylene composition obtained eventually from the main (co)polymerization cannot be raised sufficiently, and more than 5000 g of polyethylene (A) per gram of the catalytic component is not effective and can deteriorate the homogeneity of the finally obtained polypropylene composition. Thus, these amounts are not preferable.

The polypropylene (B) has an intrinsic viscosity $\eta_B$ of less than 15 dl/g, measured in tetralin at 135° C. It has the same constitution as the polypropylene component (b) for main (co)polymerization, and is eventually incorporated into the polypropylene component (b) of the present first invention. The polyolefin (B) provides the polyethylene (A) contained in the resulting polypropylene composition with good dispersion into the composition. Thus, the intrinsic viscosity $\eta_B$ of polyolefin (B) is preferably lower than the intrinsic viscosity $\eta_A$ of the polyethylene (A) and higher than the intrinsic viscosity $\eta_T$ of the finally obtained polypropylene composition.

The support amount of polypropylene (B) per gram of the transition metal compound catalyst component is 0.01 to 1000 g. In other words, the amount is preferably 0.001 to 1 wt % in terms of the finally obtained polypropylene composition (x). A too small support amount of polypropylene (B) prevents polyethylene (A) from dispersing in the finally obtained polypropylene composition. A too large amount of polypropylene (B) makes preparation of the preactivated catalyst less effective, because the dispersion of polyethylene (A) into the polypropylene composition is saturated.

According to the present invention, a preactivated catalyst is prepared by a preactivation treatment as follows: Polypropylene (B) is formed by preliminary (co)polymerization of polypropylene or propylene and another olefin for the main (co)polymerization. This preliminary (co)polymerization is performed in the presence of a polyolefin producing catalyst formed by the combination of the transition metal compound catalyst component comprising a titanium compound, an organic metal compound (AL1) and, if required, an electron donor (E1). Polyethylene (A) is formed by preactivation (co)polymerization of ethylene or ethylene and another olefin. Polyethylene (A) and polypropylene (B) are then supported by a transition metal compound catalyst component.

In this preactivation treatment, the transition metal compound catalyst component comprising a titanium compound is a combination of 0.01 to 1000 molar parts, preferably 0.05 to 500 molar parts (per molar part of transition metal in the catalyst component) of the organic metal compound (AL1) with 0 to 500 molar parts, preferably 0 to 100 molar parts (per molar part of transition metal in the catalyst component) of the electron donor. The transition metal compound catalyst component is used as a polyolefin producing catalyst.

The following method lets the transition metal compound catalyst component support the polypropylene (B) and the polyethylene (A): First, 0.01 to 100 g polyolefin (B) (per gram of a transition metal compound catalyst component) is formed by preliminary (co)polymerization using 0.01 to 500 g of olefin to be polymerized in the presence of 0.001 to 5000mmol, preferably 0.01 to 1000 mmol of the polyolefin-producing catalyst in terms of transition metal atoms in the catalyst component per liter (co)polymerization volume of ethylene or ethylene and another olefin. In this process, no solvent or at most 100 liter solvent per gram of the transition metal compound catalyst component is used. Then, 0.01 to 5000 g polyethylene (A) (per gram of a transition metal compound catalyst component) are formed by preactivation (co)polymerization using 0.01 to 10000 g of ethylene or a combination of ethylene and another olefin.

Throughout this specification, the term "polymerization volume" refers to a volume of the liquid phase in a polymerization container for liquid phase polymerization or a volume of the gas phase in a polymerization container for gas phase polymerization.

It is preferable that the used amount of the transition metal compound catalyst component is in the above indicated range, so as to efficiently support a controlled (co)polymerization reaction rate of the propylene. When too little of the organic metal compound (AL1) is used, the (co)polymerization reaction rate is reduced, and when too much is used, no corresponding improvement of the (co)polymerization reaction rate can be expected, and the residual amount of organic metal compound (AL1) which remains in the finally obtained polypropylene composition becomes too large. When too much of the electron donor (E1) is used, the (co)polymerization reaction rate is reduced. When too much solvent is used, a big reaction container becomes necessary, and it becomes difficult to efficiently support and control the (co)polymerization reaction rate.

The preactivation treatment can be performed in a liquid phase inert solvent, e.g. an aliphatic hydrocarbon such as butane, pentane, hexane, heptane, octane, isooctane, decane or dodecane, an alicyclic hydrocarbon such as cyclopentane, cyclohexane, methylcyclohexane, an aromatic hydrocarbon such as toluene, xylene or ethylbenzene, in inert solvents such as gasoline fraction or hydrogenized diesel oil fraction, in a liquid phase using the olefin itself as a solvent, or in a gas phase without using a solvent.

The preactivation treatment can be performed in the presence of hydrogen. However, it is preferable not to use hydrogen to form a high molecular polyethylene (A) with an intrinsic viscosity $\eta_A$ of 15–100 dl/g.

In the preactivation treatment, the conditions for the preliminary (co)polymerization of propylene or a mixture of propylene and another olefin preceding the main (co)polymerization should ensure that 0.01 g–100 g of the polypropylene (B) is formed per gram of the transition metal compound catalyst component, and generally a temperature of −40° C. to 100° C., a pressure of 0.1–5 MPa and a time frame of 1 min–24 h is suitable. Furthermore, the conditions for the preactivation (co)polymerization of ethylene or a mixture of ethylene and another olefin should ensure that 0.01 g–5000 g, preferably 0.05–2000 g, more preferably 0.1–1000 g polyethylene are formed per gram of the transition metal compound catalyst component, and generally a temperature of −40° C. to 40° C., more preferably −40° C. to 30° C. and most preferably −40° C. to 20° C., a pressure of 0.1–5 MPa, more preferably 0.2–5 MPa, most preferably 0.3–5 MPa, and a time frame of 1 min–24 h, more preferably 5 min–18 h, most preferably 10 min–12 h is suitable.

After the preactivation treatment, in order to control a reduction of the main (co)polymerization activity due to the preactivation treatment, addition polymerization of propylene or a mixture of propylene and another olefin for the main (co)polymerization can be performed with a reaction amount of 0.01–100 g polypropylene (D) per gram of the transition metal compound catalyst component. In this case, the amounts used for the organic metal compound (AL1), the electron donor (E1), the solvent and the propylene or the mixture of propylene with another olefin can be in the same range as in the preactivation polymerization with ethylene or a mixture of ethylene with another olefin. However, it is preferable to perform the main (co)polymerization in the presence of 0.005–10 mol, preferably 0.01–5 mol of the electron donor per mol of transition metal atoms. Concerning the reaction conditions, a temperature of 40 to 100° C. and a pressure of 0.1–5 MPa and a time frame of 1 min–24h is suitable.

For the organic metal compound (AL1), electron donor (E1) and solvents used in the addition polymerization, substances as for the preactivation polymerization with ethylene or a mixture of ethylene and another olefin can be used, and for the propylene or the mixture of propylene with another olefin, a composition as for the main (co) polymerization can be used. The intrinsic viscosity $\eta_d$ of the polypropylene formed by addition polymerization is smaller than the intrinsic viscosity $\eta_A$ of the polyethylene (A), and is eventually incorporated into the propylene component (b) after main (co)polymerization.

The preactivated catalyst can be used as an olefin main (co)polymerization catalyst for the main (co)polymerization of olefin with carbon number 2–12 to obtain the polypropylene composition (x), and can be used in an unaltered form or further comprising an additional organic metal compound (AL2) and electron donor (E2).

The olefin main (co)polymerization catalyst comprises 0.05–3000 mol, preferably 0.1–1000 mol (per mol of transition metal atoms in the preactivated catalyst) of a total (AL1+AL2) of the organic metal compound (AL2) and the organic metal compound (AL1) in the preactivated catalyst, and 0–5000 mol, preferably 0–3000 mol (per mol of transition metal atoms in the preactivated catalyst) of a total (E1+E2) of the electron donor (E2) and the electron donor (E1) in the preactivated catalyst.

When the included amount (AL1+AL2) of the organic metal compound is too small, the (co)polymerization reaction in the main (co)polymerization reaction of propylene or another olefin is too slow. On the other hand, an amount which is excessively large is ineffective, since the (co) polymerization reaction rate does not improve as much as might be expected, and the residual amount of organic metal compounds remaining in the finally obtained polypropylene composition becomes too large. Furthermore, an excessive amount of electron donors (E1+E2) leads to a considerable deterioration of the (co)polymerization reaction rate.

Similar substances to the already mentioned organic metal compound (AL1) and the electron donor (E1) can be used for the organic metal compound (AL2) and the electron donor (E2) to be added, if necessary, to the olefin main (co)polymerization catalyst. Furthermore, it is possible not only to add one substance, but the combined use of two or more substances is also possible. Furthermore, the same substances or different substances as used for the preactivation treatment can be used.

The olefin main (co)polymerization catalyst can be (i) granules or a suspension of these granules with solvent, obtained by filter-separation or decantation of the solvent, the not-yet-reacted olefins, the organic metal compound (AL1) and the electron donor (E1) present in the preactivated catalyst, combined with the additional organic metal compound (AL2) and the facultative electron donor (E2), or (ii) granules or a suspension of these granules with solvent, obtained by distillation under reduced pressure or evaporation by inert gas flow or the like of the solvent and the not-yet-reacted olefins present in the preactivated catalyst, combined with the additional organic metal compound (AL2) and the facultative electron donor (E2).

In this method, the amount of the preactivated catalyst or olefin main (co)polymerization catalyst for use is 0.001 to 1000mmol, preferably 0.005 to 500 mmol per liter of polymerization volume in terms of transition metal atoms in the preactivated catalyst. By employing the above-defined range for the transition metal compound catalyst component, the (co)polymerization reaction rate of propylene or a mixture of propylene and another olefin can be efficiently controlled.

The main (co)polymerization of propylene or a mixture of propylene and another olefin according to the present invention can be performed by a known polymerization process, such as slurry polymerization, bulk polymerization with the olefin itself as a solvent, gas phase polymerization with polymerization of the olefin in a gas phase, liquid polymerization with polymerization of the olefin in a liquid phase, or a combination of at least two thereof. With slurry polymerization, olefin is polymerized in solvents such as aliphatic hydrocarbon including propane, butane, pentane, hexane, heptane, octane, isooctane, decane or dodecane; alicyclic hydrocarbons such as cyclopentane, cyclohexane or methylcyclohexane; aromatic hydrocarbons such as toluene, xylene or ethylbenzene; or inert solvents such as gasoline fraction or hydrogenized diesel oil fraction.

In any of the above processes, the polymerization temperature is in a range of 20 to 120° C., preferably 30 to 100° C., more preferably 40 to 100° C., the polymerization pressure is in a range of 0.1–5 MPa, preferably 0.3–5 MPa, and the polymerization time is between 5 min and 24 hours of continuous, semi-continuous or batch polymerization. Under these conditions, the polypropylene component (b) can be formed efficiently with controlled reaction rate.

Subsequent to the main (co)polymerization, well-known processes such as a catalyst deactivation process, a catalyst residue removal process and a drying process are performed if necessary, so as to obtain the polypropylene composition (x), which has high melt strength.

In a preferred embodiment for the production method of the polypropylene composition (x) according to the present invention, the polymerization conditions for the main (co) polymerization are chosen so as to provide the polypropylene (b) and the finally obtained polypropylene composition (x) having an intrinsic viscosity $\eta_T$ of 0.2–10 dl/g, preferably 0.7–5dl/g, and to adjust the polyethylene (A) derived from the used preactivated catalyst to 0.01–5 wt % of the resulting polypropylene composition. As in known olefin polymerization methods, the molecular weight of the resulting (co)polymer can be adjusted by the use of hydrogen during the polymerization.

In the production method of the polypropylene composition (x) according to the present invention, the necessary amount of preactivated catalyst can be prepared at once, because the high molecular weight polyethylene (A) is formed by the preactivation step and eventually evenly dispersed throughout the polypropylene composition (x). Moreover, this method can be employed with the same productivity as conventional polyolefin production methods, because the main (co)polymerization of propylene or a mixture of propylene and another olefin can be performed as a conventional olefin (co)polymerization using already existing processes.

The following is a detailed description of a method for producing a foam according to the present invention:

A foaming agent used in the present invention is a substance producing vapor due to decomposition or a volatile liquid, and one of the well-known and well-used substances used for plastic and rubber can be used without problem. Specific examples include azod-carbonamide, dinitropentamethylenetetramine, P,P'-oxybisbenzenesulfonylhydrazide, P,P'-oxybisbenzenesulfonylsemicarbazide, N,N'-dimethyl-N,N'-dinitrosoterephthalamide, sodium bicarbonate, dichlorodifluoromethane, but azo-dicarbonamide and dichlorodifluoromethane are preferable because of their superior handling characteristics.

The resin composition according to the present invention comprises 100 weight parts of the polypropylene composition (x) and 0.1–50 weight parts, preferably 0.1–30 weight parts, more preferably 0.3–25 weight parts of a foaming agent, so as to attain a high expansion ratio and a foam with homogeneous foam cells.

If necessary, an antioxidant, a UV-absorbent, an anti-static agent, a nucleating agent, a lubricant, a fire retardant, an anti-blocking agent, a coloring agent, and organic or inorganic filler can be used as additives to the resin composition.

Foaming agent that has not been foamed can remain in the resin composition where it can be dispersed or mixed with the polypropylene composition (x). Specific examples of production methods of the plastic molded product according to the present invention are given below.

According to one method, the resin composition is attained by mixing the polypropylene composition (x) and the foaming agent with a tumbler mixer or a Henschel Mixer.

In another method, a bead-shaped composition is obtained by putting the polypropylene composition (x), the foaming agent and water into a sealed container, heating the container to 100° C.–150° C. while stirring, holding the temperature, opening one side of the container while maintaining a pressure inside the container of about 30 kg/cm$^2$, releasing the substance remaining in the container into the atmosphere, and drying the released substance.

If necessary, an antioxidant, a UV-absorbent, an anti-static agent, a nucleating agent, a lubricant, a fire retardant, an anti-blocking agent, a coloring agent, and organic or inorganic filler can be used as additives to the resin composition obtained according to the present invention, which can be heated and melt kneaded after mixing it with different synthetic resins and cut into pellet-shaped granules to be used for various plastic articles.

The following are specific examples of methods for producing a foam of the polypropylene composition (x) by dispersing the molten polypropylene composition (x) or resin composition (y) in a gas or a volatile liquid.

In one method, the foam of the polypropylene composition (x) is obtained by injecting under pressure a gasified or evaporated volatile liquid into the molten polypropylene composition (x), and releasing the pressure after stirring and dispersion.

In another method, the foam of the polypropylene composition (x) is obtained by mixing the polypropylene composition (x) and a volatile liquid under normal pressure and temperature, heating the mixture to a temperature where the polypropylene composition (x) melts and the volatile liquid volatilizes, stirring under the application of pressure and releasing the pressure.

The volatile liquid used for the present invention can be freon gas, nitrogen, carbon dioxide or the like.

The following are specific examples of methods for producing a foam of the polypropylene composition (x) by melting the resin composition (y) of the present invention and hardening it by cooling.

In one method, the foam is obtained by extruding the resin composition in air at a temperature where the resin composition melts, using an extruding machine.

In another method, the foam is obtained by placing the bead-shaped resin composition into a pressurized container, supplying pressurized air to the container, and applying heat to the container.

An intermediate layer used in the present invention is a sheet-shaped foam of said polypropylene composition (x). There are no specific limitations concerning the thickness of this intermediate layer. However, in view of production time and the desired light weight of the layered article, the thickness should be preferably 0.5–10 mm, more preferably 1–8 mm, and even more preferably 1.2–5 mm.

Furthermore, there are no specific limitations concerning the expansion ratio of the intermediate layer. However, in view of the desired stiffniess and light weight of the layered article, the expansion ratio should be preferably 1.1–5.0, more preferably 1.3–3.0.

Throughout this specification, the term "expansion ratio" refers to the value obtained by dividing the outer volume of a foam by the volume of a non-foam of identical composition and weight.

Well-known prior art methods for obtaining a foam of plastic, rubber or the like are suitable methods for producing an intermediate layer foam.

There are no specific limitations concerning the thickness of a surface layer of a layered article according to the present invention. However, in view of the desired stiffness and light weight of the layered article, the thickness should be preferably 50–1000 μm, more preferably 90–550 μm.

Examples of a metal of the surface layer include aluminum, iron, copper and titanium, alloys of these metals, and metals treated for anti-corrosion, plating etc. Possible shapes of the surface layer metal include a plate and a foil. In view of the desired stiffness, light weight and low cost of the layered article, an aluminum plate or an aluminum alloy plate are preferable.

It is furthermore possible, to apply a coating or anti-corrosion coating to the surface of the surface layer.

In the layered article according to the present invention, a surface layer such as described above can be layered onto both sides of the intermediate layer, and it is also possible to provide the layered article with an adhesion layer between the surface layer and the intermediate layer.

Examples of methods for producing a layered article having an adhesion layer according to the present invention include a method using a regular adhesive for the adhesion layer, and a method using an adhesive olefin polymer for the adhesion layer. These are explained in more detail below:

(1) Method using a regular adhesive: An epoxy compound or an urethane compound (isocyanate) is used for the adhesive. An adhesion layer thickness of about 0.5–50, μm is usually sufficient.

(2) Method using an adhesive olefin polymer: A graft polymer of unsaturated carboxylic acids or acid anhydrides (sometimes called "unsaturated carboxylic acids") is grafted to a polyolefin resin.

Of those two connection methods, the latter method, that is the method using an adhesive olefin polymer is preferable, because of its excellent productivity. The olefin (co)polymer or propylene-olefin copolymer constituting the intermediate layer in the layered article according to the present invention also can be adapted as an adhesive olefin polymer.

Examples of the unsaturated carboxylic acids grafted to an olefin polymer include acrylic acid, methacrylic acid, maleic acid, anhydrous maleic acid, citraconic acid, anhydrous citraconic acid, itaconic acid and anhydrous itaconic acid. Of these, anhydrous maleic acid is preferable. Examples of methods for grafting the unsaturated carboxylic acid to the olefin polymer include a method wherein the olefin polymer, the unsaturated carboxylic acid and an organic peroxide are melt-kneaded in an extrusion molding machine, and a method wherein the unsaturated carboxylic acid and an organic peroxide are added to a solution or suspension with a suitable solvent for the olefin polymer, and then heated and stirred.

The amount of unsaturated carboxylic acid to be included in the adhesive olefin polymer is 0.01–5 wt %, preferably 0.05–3 wt %. The adhesive olefin polymer can be processed in exactly the same manner as regular olefin polymers, for example with an extrusion molding machine having a T-die, into a sheet of 20–100 μm, preferably 30–80 μm thickness. Furthermore, the adhesive olefin polymer can be coated onto the surface of the intermediate layer or the inner surface of the surface layer by such techniques as extrusion coating, extrusion lamination or film lamination.

The following three methods are examples of methods for layering a layered article having an adhesive layer, according to the present invention:

(1) Method 1

The intermediate layer foam is formed with an extrusion molding machine having a T-die or with a heat press, and a metal plate as the surface layer is placed onto both sides of the intermediate layer form with the adhesive olefin polymer in between to be heat-pressed. The layers adhere to each other due to the heat and the pressure. The result is the layered article according to the present invention.

(2) Method 2

The intermediate layer foam is produced continuously with an extrusion molding machine having T-dies, from both sides a sheet-shaped adhesive olefin polymer is attached, then from both sides the surface layer is attached. Then, while these multiple layers are fed continuously to the nip consisting of a pair of opposing revolving laminating rolls, interlamellar fixing of these layers is attained by sandwiching pressure, which is followed by continuous production of a layered article according to the present invention with a retrieving machine having a multistep roll.

An important condition for this Method 2 is that the laminating rolls have sufficient temperature and weigh-down pressure to affix the adhesive olefin polymer layer to the intermediate layer and the surface layer.

(3) Method 3

After one of the following three treatments has been applied to the intermediate layer foam formed with an extrusion machine having a T-die or with a heat press and/or to a metal plate that is a surface layer, the surface layer is laminated onto the intermediate layer, and pressed with a pair of opposing laminating rolls or a press.

(1) About 0.5–50 μm of the adhesive is applied to each side of the foam.

(2) About 0.5–50 μm of the adhesive is applied to those sides of two metal plates that are to be laminated onto both sides of the foam.

(3) About 0.5–50 μm of the adhesive is applied to one side of the foam and to that side of a metal plate that is to be laminated onto the untreated side of the foam.

In the following, a layered film or sheet is explained:

In a preferred embodiment of a method for producing the polypropylene composition (x) forming the layer [A] of the polypropylene layer film according to the present invention, the intrinsic viscosity $\eta_P$ of the polypropylene component (b) formed by the main (co)polymerization and the finally obtained polypropylene composition is in a range of 0.2–10 dl/g, preferably 0.7–5 dl/g. The polymerization conditions are selected such that the polyethylene (a) originating from the preactivated catalyst in the polypropylene composition is in a range of 0.01–5 wt %. As in polymerization methods well known in the art, the molecular weight of the obtained (co)polymer can be adjusted with the polymerization time and the use of hydrogen.

After the main (co)polymerization, well-known processes such as a catalyst deactivation process, a catalyst residue removal process and a drying process are performed if necessary, so as to obtain the polypropylene composition having high melt strength and high crystallization temperature.

The polypropylene composition (y) forming the layer [B] of the polypropylene layer film according to the present invention is a crystalline polypropylene, that is a propylene homopolymer or a propylene-olefin random or block copolymer comprising not less than 50 wt % propylene units, preferably a propylene homopolymer, a propylene-olefin random copolymer containing not less than 90% propylene units or an ethylene-olefin block copolymer containing not less than 70% propylene units. These (co) polymers can be used either alone or in combination.

The main (co)polymerization of propylene or a mixture of propylene and another olefin to produce the polypropylene composition (y) forming the layer [B] of the polypropylene layer film according to the present invention can be performed by a known olefin (co)polymerization process, such as slurry polymerization, bulk polymerization with the olefin itself as a solvent, gas phase polymerization with (co) polymerization of the olefin in a gas phase, liquid polymerization with (co)polymerization of the olefin in a liquid phase, or a combination thereof. With slurry polymerization, olefin is (co)polymerized in solvents such as aliphatic hydrocarbons, e.g. propane, butane, pentane, hexane, heptane, octane, isooctane, decane or dodecane; alicyclic hydrocarbons such as cyclopentane, cyclohexane or methylcyclohexane; aromatic hydrocarbons such as toluene, xylene or ethylbenzene; or inert solvents such as gasoline fraction or hydrogenized diesel oil fraction.

In any of the above processes, the polymerization temperature is in a range of 20–120° C., preferably 30–100° C., more preferably 40–100° C., the polymerization pressure is in a range of 0.1–5 MPa , preferably 0.3–5 MPa , and the polymerization time is between 5 min and 24 hours of continuous, semi-continuous or batch polymerization.

Under these conditions, the polypropylene can be formed efficiently with controlled reaction rate.

The inventors of the present invention succeeded in high-speed processing with a thin film thickness, and have dedicated themselves to a detailed study of methods for producing the polypropylene layer film with high productivity. As a result, a propylene layered film has been produced with a multilayer co-extrusion processing machine, which combines several extrusion machines with a single die and produces a film by flowing a melt-kneaded resin with several extrusion-molding machines into a T-die or a round die and piling up resin layers. A thin film was produced with high speed production, wherein the ratio between the total thickness of the layers [A] formed of the polypropylene composition (x) and the total thickness of the layers [B] formed of the polypropylene composition (y) was in the range of 20–1/20, and it became clear, that a polypropylene layer film could be produced with high productivity, which lead to the present invention.

When the ratio between the total thickness of the layers [A] and the total thickness of the layers [B] is bigger than 20, the melt strength of the polypropylene composition forming the layers [B] is low and a multilayer structure having a homogenous thickness cannot be formed. When the ratio is smaller than 1/20, a multilayer structure having a homogenous thickness can be attained, because the melt strength of the polypropylene resin forming the layers [A] is high, however there is little effect in attaining a high productivity due to high speed production, which is one of the invention's effects.

The layered film of the present invention, is not restricted to a 2-type-2 layer film ([A]/[B]) or a 2-type 3-layer film ([A]/[B]/[A] or [B]/[A]/[B]), but also includes 2-type multilayer film consisting of the two types of polypropylene compositions layers [A] and [B]. Moreover, the order in which the layers [A] and [B] are piled up is arbitrary, and all the polypropylene compositions in which the ratio between the total thickness of the layers [A] and the total thickness of the layers [B] is in the above range are included.

The production speed of the film is not particularly restricted. However, considering the properties of the composition according to the present invention, a production with a process speed of not less than 100 m/min is preferable, which is especially efficient with thin films between $10\mu$ and $15\mu$, where this could not be achieved before. Considering the productivity of films thicker than $15\mu$, a polypropylene layered film can be produced more efficiently than conventional polypropylene compositions.

The polypropylene composition (x) constituting the layers [A] for producing the polypropylene layered film of the present invention has a high melt strength, and directly after it has been discharged from the dies at a temperature below the melt temperature of 120° C., the viscosity of the resin film is high and its extensibility is not homogenous so that it is difficult to produce a film with homogenous thickness. On the other hand, at temperatures above 350° C. the polypropylene starts to disintegrate and the smoke quantity increases, so that the product value decreases due to a considerable decrease of optical transparency caused by the influence of decomposition products accumulated on the chill-roll. Furthermore, at temperatures above 350° C., a film with homogenous thickness can be produced. However, sometimes the width of the product having homogenous thickness becomes small due to a necking effect, so that productivity deteriorates considerably.

Representative cooling techniques for the T-die method are the "dipping method" which involves direct contact with water, and the "chill roll cooling method" wherein a metal surface is cooled by letting water flow in a cylindrical metal tube with double tube structure. At temperatures above 80° C. for cooling and hardening with such methods, the stiffness of a cooled and hardened film made of the composition according to the present invention, which has a high crystallization temperature and a high crystallization speed, is extremely high, and the film is brittle, so that ruptures can easily occur during processing.

The melting temperature and the cooling temperature for the production of a polypropylene layered film according to the present invention are not particularly restricted. However, the following is a preferable relationship between the melting temperature and the cooling temperature as a condition for production of a film with homogenous extendibility and small necking effect using the composition according to the present invention, which has high melt tension, a high crystallization temperature and a high crystallization speed, and as a condition for production of a film with homogenous transparency and thickness without decreasing the productivity of continuous production due to rupture or fracture incurred by extreme stiffness:

$260 \geq$ (melt temperature)–(cooling temperature)$\geq 140$, more preferably $220 \geq$ (melt temperature)–(cooling temperature)$\geq 180$.

Possible methods for mixing the polypropylene composition forming the layers [A] and [B] of the present invention are for example mixing with a regular mixing device such as a ribbon blender or a tumbler mixer or mixing with a blender having a high speed stirring device attached to it, such as a Henschel Mixer (™). In the case that melt-kneading is necessary, a method involving pelletizing and using e.g. a regular uniaxial extrusion machine or a biaxial extrusion machine is possible.

If necessary, additives such as an antioxidant, an inorganic filler, a lubricant, or an anti-blocking agent can be included in the polypropylene composition used in the present invention in an appropriate amount that does not affect the purpose of the present invention.

An appropriate mixing amount is e.g. 0.03–0.3 weight parts per 100 weight parts of the polypropylene composition.

Examples of the inorganic filler include silica, zeolites, clay, talc and calcium carbonate. Examples of the anti-blocking agent include organic anti-blocking agents such as a heat-hardening spherical silicon resin and cross-linked polymethylmethacrylate.

The polypropylene layered film of the present invention is a film that has not yet been stretched. Yet even a unidirectionally stretched film obtained by stretching the resulting not-yet-stretched film in one direction can be produced with high productivity, because the productivity for the not-yet-streched film before stretching can be improved. Furthermore, according to the present invention, other than the films layered by co-extrusion as explained above, layered films are possible, wherein a plurality of films is layered as one side of a layered film or the core of a multilayer film.

Examples of a method for producing a sheet according to the present invention include methods for production by well-known molding methods (such as extrusion molding, calender molding, compression molding and injection molding) using the polypropylene composition (x).

Extrusion molding is preferable, since it has a good productivity in prior art molding methods as well. To be specific, a T-die method using a device (T-die sheet forming machine) comprising an extrusion machine, a T-die, a polishing roll (cooling roll), a guide roll, a receiving roll, a trimming cutter, a masking device, a standard size cutter and a stacker is especially preferable.

Another example of a method for producing a sheet using the polypropylene composition (x) comprises the steps of: using the T-die method for extrusion at a resin temperature of 180–300° C., setting the temperature of the cooling rolls to 5–80° C., providing a relationship between the resin temperature and the cooling roll temperature of (resin temperature)−(cooling roll temperature)≧120, and forming a sheet at a rate of 0.1–100 m/min.

The resin temperature is 180–300° C., because then the outer appearance and moldability of the sheet are excellent. When the resin temperature is above 180° C., the polypropylene composition (x) melts sufficiently, so that the surface has a favorable appearance and is not rough like sharkskin. When the resin temperature is below 300° C., heat deterioration does not occur easily and the melt strength of the sheet is preserved, so that a favorable moldability can be attained.

The cooling roll temperature is set to 5–80° C., because then the outer appearance of the sheet is excellent. When the cooling roll temperature is above 5° C., a favorable appearance without speckles on the sheet surface can be attained, because no condensation is formed on the cooling rolls. When the cooling roll temperature is below 80° C., the sheet can be cooled sufficiently and a favorable appearance can be attained without causing a line-shaped pattern when the roll-shaped sheet is unraveled.

The relationship between the resin temperature and the cooling roll temperature is governed by the equation:

(resin temperature)−(cooling roll temperature)≧120, because then the molecular orientation of the sheet is weak, so that the difference between the longitudinal and transversal heat contraction ratio is small and a sheet with excellent moldability can be attained.

The rate for forming the sheet is 0.1–100 m/min, because then the productivity is excellent. When the rate for forming the sheet is above 0.1 m/min, the hourly produced amount of sheets is large, sheets with homogenous thickness can be attained, and the ratio of defective sheets is small. When the rate for forming the sheet is below 100 m/min, the sheet can be cooled sufficiently, and a favorable appearance can be attained without causing a line-shaped pattern when the roll-shaped sheet is unraveled.

In the following, a hollow plastic article according to the present invention is explained. According to the present invention, an olefin polymer composition (X) that satisfies the above-stated relation between melt strength (MS) at 230° C. and intrinsic viscosity $\eta_T$ measured in tetralin at 135° C. and shows an appropriate melt flow rate MFR (230° C., 21.28N) can be obtained easily by adopting a production method using the preactivated catalyst described above.

In order to enhance the resistance against drawdown and the anti-shock properties of the obtained hollow plastic article, the olefin polymer composition (X) also can be a combination of ethylene homopolymer, ethylene-olefin copolymer, ethylene-olefin copolymer rubber and ethylene-olefin non-conjugated diene copolymer rubber, as is explained in more detail below.

An ethylene homopolymer (Y1) has a density of 0.914–0.930 g/cm$^3$, a melting point of 100–118° C. and preferably a melt flow rate MFR (190° C.; 21.18N) of 0.01–20 g/10 min, more preferably 0.1–10 g/10 min, and even more preferably 0.1–5 g/10 min, and is what is generally called a low density polyethylene. An example of a method for producing the ethylene polymer (Y1) is the polymerization of ethylene with the high pressure method using a peroxide as catalyst.

An ethylene-olefin copolymer (Y2) is an ethylene-α-olefin copolymer having a density of 0.920–0.935 g/cm$^3$, preferably 0.920–0.930 g/cm$^3$, a melting point (Tm) of 115° C.–127° C., and preferably a melt flow rate MFR (190° C.; 21.18N) of 0.01–20 g/10 min, more preferably 0.1–5 g/10 min, and is what is generally called a linear low density polyethylene (referred to as "L-LDPE" in the following).

The L-LDPE has ethylene as its main monomer and can be copolymerized in the presence of a Ziegler-Natta catalyst with at least one of the α-olefins selected from the group consisting of 1-butene, 1-hexene, etc. as a comonomer.

An ethylene-olefin copolymer (Y3) is an ethylene-α-olefin copolymer having a density of 0.880–0.920 g/cm$^3$, preferably 0.890–0.910 g/cm$^3$, a melting point (Tm) of 110° C.–115° C., and preferably a melt flow rate MFR (190° C.; 21.18N) of 0.01–20 g/10 min, more preferably 0.1–20 g/10 min, and even more preferably 0.1– 5 g/10 min, and is what is generally called a very low density polyethylene (referred to as "V-LDPE" in the following).

The V-LDPE has ethylene as its main monomer and can be copolymerized in the presence of a Ziegler-Natta catalyst with at least one of the α-olefins selected from the group consisting of 1-butene, 1-hexene, etc as a comonomer.

An ethylene polymer (Y4) is an ethylene homopolymer or an ethylene-olefin copolymer having a density of 0.935–0.968 g/cm$^3$, preferably 0.945–0.960 g/cm$^3$, a melting point (Tm) of 125° C.–136° C., and preferably a melt flow rate MFR (190° C.; 21.18N) of 0.01–20 g/10 min, more preferably 1–15 g/10 min, and is what is generally called a high density polyethylene. The high density polyethylene can be produced under medium to low pressure using a Ziegler-Natta catalyst or a known reducing or supporting type high activity catalyst.

An ethylene-olefin copolymer rubber (Y5) is an amorphous or low-crystalline ethylene-α-olefin copolymer rubber, which preferably includes 20–50 wt % α-olefin components, more preferably 20–35 wt %, has a Mooney viscosity ML$_{1+4}$(100° C.) of preferably 5–60, more preferably 10–50, and a melt flow rate MFR(230° C.;21.18N) of preferably 0.01–20 g/10 min, more preferably 0.1–8 g/10 min.

The ethylene-olefin copolymer rubber has ethylene as its main monomer, which can be copolymerized with at least one α-olefin selected from the group consisting of 1-butene, 1-hexene, etc as a comonomer in the presence of a vanadium catalyst or eventually a titanium catalyst.

An ethylene-olefin non-conjugated diene copolymer rubber (Y6) is an amorphous or low-crystalline ethylene-olefin nononjugated diene copolymer rubber having a Mooney viscosity ML$_{1+4}$(100° C.) of preferably 5–60, more preferably 10–50, and a melt flow rate MFR(230° C.;21.18N) of preferably 0.01–20 g/10 min, more preferably 0.1–8 g/10 min.

The ethylene olefin non-conjugated diene copolymer rubber can be produced by copolymerization in a solvent or a slurry process in the presence of a Ziegler-Natta catalyst. Examples of the non-conjugated diene composition include 1,4-pentadiene, 1,4-hexadiene, 1,5-hexadiene, dicyclopentadiene, methylenenorbornene, ethylidenenorbornene, cyclooctadiene and methyltetrahydroindene. It is possible to use these substances alone or combine at least two of them. They can be used in a range of up to 30 wt %.

An ethylene-vinylacetate copolymer (Y7) has a density of 0.92–0.95 g/cm$^3$, preferably 0.925–0.94 g/cm$^3$, a melting point (Tm) of 90–110° C., and a melt flow rate MFR(190° C., 21.18N) of preferably 0.1–10 g/10 min, more preferably 0.1–5 g/10 min.

An olefin polymer composition (Z) according to the present invention comprises 95–70 wt % of the olefin polymer composition (X) and 5–30 wt % of at least one substance selected from the group consisting of the above-described (Y1)–(Y7).

When the included amount of the (Y1)–(Y7) is much less than 5 wt %, it is difficult to improve the shock resistance of the hollow plastic article. When the included amount of the (Y1)–(Y7) is much bigger than 30 wt %, then the pinch-off adhesiveness worsens and becomes insufficient for the improvement of the shock resistance.

Stabilizers such as an antioxidant, a neutralizer, a weatherproofing agent, a UV-absorbent or an anti-static agent, and other additives such as pigments, a crystal nucleation agent, an inorganic powder, an ethylene-vinylacetate copolymer, an ethylene-propylene crystalline random copolymer or a high density polyethylene can be mixed with the above-mentioned components of the olefin polymer compositions (X) and (Z) of the present invention in an appropriate amount that does not affect the purpose of the present invention.

The olefin polymer composition (Z) of the present invention can be obtained by mixing the above components. To mix these components, it is possible to use for example a blender having a high speed stirring device attached to it, such as a Henschel Mixer (™) or a Super Mixer (™), or a regular mixing device such as a ribbon blender or a tumbler mixer. In the case that melt-kneading is necessary, use of a regular uniaxial extrusion machine or a biaxial extrusion machine is possible. Generally, a kneading temperature of 200–300° C. is appropriate, preferable is a temperature of 230–270° C.

An example of a method for obtaining a hollow plastic article using the compositions (X) and (Z) of the present invention is a direct blow molding method. This forming method comprises the steps of melting and extruding a parison-shaped composition for use in blow molding using an extrusion machine, which was set to 190–230° C.; performing a pre-blow if necessary; holding a parison in a metal die for blow molding maintained at below 60° C., especially a metal die having a provision for air leakage on the metal surface; inflating the parison by blowing compressed air (0.5–1 MPa) from an air nozzle into the parison and thus establishing a compression contact with the inner wall of the metal die; and applying air pressure until the form is hardened. The hollow plastic article obtained with such a method has an excellent shape stability and a superb appearance, and thus can be used for various sorts of applications, such as for containers for everyday use or for hollow plastic articles for general industrial use.

In the following, a multi-layered hollow plastic article according to the present invention is explained.

It is preferable that the multilayered hollow plastic article according to the present invention contains an inorganic filler. Examples of this inorganic filler include talc, calcium carbonate, potassium titanate whiskers, mica and glass fiber. These can be used alone or in combination. Furthermore, these fillers can be treated with silane to enhance the compatibility with the olefin polymer composition (X) and improve the stiffness and the thermal stiffness.

Talcs that can be used as an inorganic filler include for example talc having a relative surface area of preferably not less than 17000 $cm^2/g$, an average particle size of preferably less than 10 $\mu$m, more preferably less than 5 $\mu$m, most preferably less than 2 $\mu$m, and include preferably less than 5 wt %, more preferably less than 1 wt % particles with a particle size of more than 10 $\mu$m, so as to improve the shock resistance of the obtained polyolefin multi-layered hollow plastic article.

Possible calcium carbonates include for example calcium carbonate having a relative surface area of preferably not less than 8000 $cm^2/g$, an average particle size of preferably less than 3 $\mu$m, and include preferably less than 5 wt % particles with a particle size of more than 10 $\mu$m, so as to improve the shock resistance of the obtained polyolefin multi-layered hollow plastic article.

Possible potassium titanate whiskers include for example whiskers having an average fiber diameter of preferably 0.2–1.5 $\mu$m and a fiber length of preferably 10–50 mm, so as to improve the shock resistance of the obtained polyolefin multi-layered hollow plastic article.

Possible micas include for example micas having an average flake size of preferably 200–40 $\mu$m, and an aspect ratio of preferably 30–70, so as to improve the shock resistance of the obtained polyolefin multi-layered hollow plastic article.

Possible glass fibers include for example glass fibers having an average fiber diameter of preferably 4–10 $\mu$m, and a fiber length of preferably 3–6 mm, so as to improve the shock resistance of the obtained polyolefin multi-layered hollow plastic article.

In order to enhance the resistance against drawdown and the anti-shock properties of the obtained hollow plastic article even further, the olefin polymer composition (W) can contain a combination of ethylene homopolymer, ethylene-α-olefin copolymer, ethylene-olefin copolymer rubber and ethylene-olefin non-conjugated diene copolymer rubber, as is explained in more detail below.

The ethylene homopolymer (Y1) has a density of 0.914–0.930 $g/cm^3$, a melting point of 100–118° C. and preferably a melt flow rate MFR (190° C.; 21.18N) of 0.01–20 g/10 min, more preferably 0.1–10 g/10 min, and even more preferably 0.1–5 g/10 min, and is what is generally called a low density polyethylene. An example of a method for producing the ethylene polymer (Y1) is the polymerization of ethylene with the high pressure method using a peroxide as a catalyst.

The ethylene-olefin copolymer (Y2) is an ethylene-α-olefin copolymer having a density of 0.920–0.935 $g/cm^3$, preferably 0.920–0.930 $g/cm^3$, a melting point (Tm) of 115° C.–127° C., and preferably a melt flow rate MFR (190° C.; 21.18N) of 0.01–20 g/10 min, more preferably 0.1–5 g/10 min, and is what is generally called a linear low density polyethylene (referred to as "LLDPE" in the following).

The L-LDPE has ethylene as its main monomer and can be copolymerized in the presence of a Ziegler-Natta catalyst with at least one of the α-olefins selected from the group consisting of 1-butene, 1-hexene, etc. as a comonomer.

The ethylene-olefin copolymer (Y3) is an ethylene-α-olefin copolymer having a density of 0.880–0.920 $g/cm^3$, preferably 0.890–0.910 $g/cm^3$, a melting point (Tm) of 110° C.–115° C., and preferably a melt flow rate MFR (190° C.; 21.18N) of 0.01–20 g/10 min, more preferably 0.1–20 g/10 min, and even more preferably 0.1–5 g/10 min, and is what is generally called a very low density polyethylene (referred to as "V-LDPE" in the following).

The V-LDPE has ethylene as its main monomer and can be copolymerized in the presence of a Ziegler-Natta catalyst with at least one of the α-olefins selected from the group consisting of 1-butene, 1-hexene, etc as a comonomer.

The ethylene polymer (Y4) is an ethylene homopolymer or an ethylene-olefin copolymer having a density of 0.935–0.968 g/cm³, preferably 0.945–0.960 g/cm³, a melting point (Tm) of 125° C.–136° C., and preferably a melt flow rate MFR (190° C.; 21.18N) of 0.01–20 g/10 min, more preferably 1–15 g/10 min, and is what is generally called a high density polyethylene. The high density polyethylene can be produced under medium to low pressure using a Ziegler-Natta catalyst or a known reducing or supporting type high activity catalyst.

The ethylene-olefin copolymer rubber (Y5) is an amorphous or low-crystalline ethylene-α-olefin copolymer rubber, which preferably includes 20–50 wt % α-olefin components, more preferably 20–35 wt %, has a Mooney viscosity $ML_{1+4}$ (100° C.) of preferably 5–60, more preferably 10–50, and a melt flow rate MFR(230° C.; 21.18N) of preferably 0.01–20 g/10 min, more preferably 0.1–8 g/10 min.

The ethylene-olefin copolymer rubber has ethylene as its main monomer, which can be copolymerized with at least one α-olefin selected from the group consisting of 1-butene, 1-hexene, etc as a comonomer in the presence of a vanadium catalyst or eventually a titanium catalyst.

The ethylene-olefin nononjugated diene copolymer rubber (Y6) is an amorphous or low-crystalline ethylene-α-olefin non-conjugated diene copolymer rubber having a Mooney viscosity $ML_{1+4}$ (100° C.) of preferably 5–60, more preferably 10–50, and a melt flow rate MFR(230° C.; 21.18N) of preferably 0.01–20 g/10 min, more preferably 0.1–8 g/10 min.

The ethylene-olefin non-conjugated diene copolymer rubber can be produced by copolymerization in a solvent or a slurry process in the presence of a Ziegler-Natta catalyst. Examples of the non-conjugated diene composition include 1,4-pentadiene, 1,4-hexadiene, 1,5-hexadiene, dicyclopentadiene, methylenenorbornene, ethylidenenorbornene, cyclooctadiene and methyltetrahydroindene. It is possible to use these substances alone or combine at least two of them. They can be used in a range of up to 30 wt %.

The ethylene-vinylacetate copolymer (Y7) has a density of 0.92–0.95 g/cm³, preferably 0.925–0.94 g/cm³, a melting point (Tm) of 90–110° C., and a melt flow rate MFR(190° C., 21.18N) of preferably 0.1–10 g/10 min, more preferably 0.1–5 g/10 min.

The olefin polymer composition (Z) according to the present invention comprises 95–70 wt % of the olefin polymer composition (X), 5–30 wt % of the inorganic filler used in the present invention, and 5–30 wt % of at least one substance selected from the group consisting of the above-described (Y1)–(Y6).

When much less than 5 wt % of the inorganic filler is included, it is difficult to improve the shock resistance and the thermal stiffness of the hollow plastic article. When much more than 30 wt % is included, then the shock resistance of the hollow plastic article deteriorates.

When the included amount of the (Y1)–(Y7) is much less than 5 wt %, it is difficult to improve the shock resistance of the hollow plastic article. When the included amount of the (Y1)–(Y7) is much bigger than 30 wt %, then the pinch-off adhesiveness worsens and becomes insufficient for the improvement of the shock resistance.

Stabilizers such as an antioxidant, a neutralizer, a weatherproofing agent, a UV-absorbent or an anti-static agent, and other additives such as pigments, a crystal nucleation agent or an inorganic powder can be mixed with the above-mentioned components of the olefin polymer compositions (X) and (Z) of the present invention in an appropriate amount that does not affect the purpose of the present invention.

The olefin polymer composition (Z) of the present invention can be obtained by mixing all of the above components. For the mixing process of those components, it is possible to use for example a blender having a high speed stirring device attached to it, such as a Henschel Mixer(™) or a Super Mixer (™), or a regular mixing device such as a ribbon blender or a tumbler mixer. In the case that melt-kneading is necessary, use of a regular uniaxial extrusion machine or a biaxial extrusion machine is possible. Generally, a kneading temperature of 200–300° C. is appropriate, and a preferable temperature is of 230–270° C.

An example of a method for obtaining a hollow plastic article using the compositions (X) and (Z) of the present invention is a direct blow molding method. This forming method comprises the steps of melting and extruding in parison shape a composition for use in blow molding using an extrusion machine, which was set to 190–230° C.; performing a pre-blow if necessary; holding a parison in a metal die for blow molding maintained at below 60° C., especially a metal die maintained at below 60° C. and having a provision for air leakage on the metal surface; inflating the parison by blowing compressed air (0.5–1 MPa) from an air nozzle into the parison and thus establishing a compression contact with the inner wall of the metal die; and applying air pressure until the form is hardened. The hollow plastic article obtained with such a method has an excellent shape stability and a superb appearance, and thus can be used for various sorts of applications, such as containers for everyday use or hollow plastic articles for general industrial use.

The polypropylene composition (W) used in the present invention comprises 100 weight parts of polypropylene with a crystal melt temperature of 135–165° C., and 0.05–1 weight parts, preferably 0.1–0.8 weight parts, more preferably 0.15–0.4 weight parts of a nucleating agent to ensure excellent appearance (glossiness, reflection) of the obtained olefin multilayered hollow container.

The melting point of this polypropylene is 135–165° C., preferably 140–160° C. The melt flow rate MFR(230° C., 21.18N) of the obtained olefin multilayered hollow plastic article is preferably 0.5–30 g/min, more preferably 1–15 g/min, most preferably 1.5–10 g/min.

When the melting point of the polypropylene is much less than 135° C., then the surface hardness of the multilayer hollow plastic article becomes low, the plastic article easily can be damaged during forming or handling, and its appearance is not excellent.

Examples of a method for producing polypropylene with a melting point of 135–165° C. include polymerization of propylene or propylene and an α-olefin with carbon number 2–8 with one of the well-known polymerization methods.

Examples of the nucleating agent used in the present invention include dibenzylidenesorbitol and its derivatives, 4-tertiary butyl aluminum benzoate, 4-tertiary butyl sodium benzoate, cyclic ester phosphate basic polyvalent metal salt, and organic alkali carbonate metal salt. Of those substances, dibenzylidenesorbitol or its derivatives are preferable, because then the obtained olefin multilayer hollow plastic article has an excellent appearance. The above substances can of course be used alone or in combination.

Examples of dibenzylidenesorbitol and its derivatives include 1,3,2,4-dibenzylidenesorbitol, 1,3-dibenzylidene-2,4-p-methylbenzylidene-sorbitol, 1,3-benzylidene-2,4-p-ethylbenzylidenesorbitol, 1,3-p-methylben-zylidene-2,4-benzylidenesorbitol, 1,3-p-ethylbenzylidene-2,4-benzylidene-sorbitol, 1,3-p-methylbenzylidene-2,4-p-ethylbenzylidenesorbitol, 1,3-p-ethylbenzylidene-2,4-p-methylbenzylidenesorbitol, 1,3,2,4-di(p-methylbenzylidene)sorbitol, 1,3,2,4-di(p-ethylbenzylidene) sorbitol, 1,3,2,4-di(p-n-propylbenzylidene)sorbitol, 1,3,2,4-di(p-i-propylbenzylidene)sorbitol, 1,3,2,4-di(p-n-butylbenzylidene)sorbitol, 1,3,2,4-di(p-s-butylbenzylidene) sorbitol, 1,3,2,4-di(p-t-butylbenzylidene)sorbitol, 1,3,2,4-di(2'-4'-dimethyl-benzylidene)sorbitol, 1,3,2,4-di(p-methoxybenzylidene)sorbitol, 1,3,2,4-di(p-n-ethoxybenzylidene)sorbitol, 1,3-benzylidene-2,4-p-chlorobenzyli-denesorbitol, 1,3-p-chlorobenzylidene-2,4-p-methylbenzylidene-sorbitol, 1,3-p-chlorobenzylidene-2,4-p-ethylbenzylidenesorbitol, 1,3-p-methylbenzylidene-2,4-p-chlorobenzylidenesorbitol, 1,3-p-ethylbenzyli-dene-2,4-p-chlorobenzylidenesorbitol, and 1,3,2,4-di(p-chlorobenzylidene)sorbitol. Of these substances, 1,3,2,4-dibenzylidenesorbitol 1,3,2,4-di(p-ethylbenzylidene) sorbitol and 1,3-p-chlorobenzylidene-2,4-p-methylbenzylidenesorbitol are preferable. The above substances can of course be used alone or in combination.

Examples of the cyclic ester phosphate basic polyvalent metal salt include calcium-2,2'-methylene-bis(4,6-di-t-butylphenol)phosphate, magnesium-2,2'-methylene-bis(4,6-di-t-butylphenol)phosphate, zinc-2,2'-methylene-bis(4,6-di-t-butylphenol)phosphate, aluminum-2,2'-methylene-bis(4,6-di-t-butylphenol)phosphate, calcium-2,2'-methylene-bis(4-methyl-6-t-butylphenol)phosphate, calcium-2,2'-ethylidene-bis(4,6-di-t-butylphenol)phosphate, aluminumhydroxy-2,2'-methylene-bis(4,6-di-t-butylphenol)phosphate, titaniumdihydroxy-2,2'-methylene-bis(4,6-di-t-butylphenol) phosphate, tindihydroxy-2,2'-methylene-bis(4,6-di-t-butylphenol)phosphate, zirconiumoxy-2,2'-methylene-bis (4,6-di-t-butylphenol)phosphate, aluminumhydroxy-2,2'-methylene-bis(4-methyl-6-t-butylphenol)phosphate, and aluminumhydroxy-2,2'-ethylidene-bis(4,6-di-t-butylphenol) phosphate. Preferable substances are calcium-2,2'-methylene-bis(4,6-di-t-butylphenol)phosphate, aluminum-2,2'-methylene-bis(4,6-di-t-butylphenol)phosphate, and aluminumhydroxy-2,2'-methylene-bis(4,6-di-t-butylphenol) phosphate. The above substances can of course be used alone or in combination.

Examples of the organic alkali carbonate metal salt include alkali metal salts of aliphatic monocarboxylic acids such as acetic acid, propionic acid, acrylic acid, lauric acid, myristic acid, palmitic acid, stearic acid and oleic acid; aliphatic polycarboxylic acids such as malonic acid, succinic acid, adipic acid and citric acid; alicyclic carboxylic acids; and aromatic carboxylic acids. Examples of the alkali metals include lithium, potassium and sodium. An example for a possible combination is aluminumhydroxy-2,2'-methylene-bis(4,6-di-t-butylphenol)phosphate+lithium stearate (1:1). The above substances can of course be used alone or in combination.

The polypropylene composition (W) used in the present invention can contain a combination of linear low density polyethylene, low density polyethylene and high density polyethylene in order to enhance the mold releasability from the metal mold when the olefin multilayered hollow plastic article is manufactured and improve the production efficiency.

The polypropylene composition (W) used in the present invention can be obtained by mixing the above components. To mix these components, it is possible to use for example a blender having a high speed stirring device attached to it, such as a Henschel Mixer (™) or a Super Mixer(™), or a regular mixing device such as a ribbon blender or a tumbler mixer. In the case that melt-kneading is necessary, use of a regular uniaxial extrusion machine or a biaxial extrusion machine is possible. Generally, a kneading temperature of 200–300° C. is appropriate, and a preferable temperature is temperature of 230–270° C.

The olefin multilayer hollow plastic article of the present invention uses the polypropylene composition (W) as a surface layer and the olefin polymer composition (X) or (Z) as an inner layer, and thus comprises at least two layers.

Examples of a method for producing the olefin multilayer hollow plastic article of the present invention include a method for multilayer blow molding using several extrusion machines and multilayer dies.

To be specific, such a forming method includes the steps of: filling the polyolefin composition (W) into an extrusion machine for surface layers; filling the olefin polymer composition (X) or (Z) into an extrusion machine for internal layers; extruding a 190–230° C. multilayer molten parison with multilayer dies; performing a pre-blow if necessary; holding a parison in a metal die for blow molding maintained at below 60° C., especially a metal die maintained at below 60° C. and having a provision for air leakage on the metal surface; inflating the parison by blowing compressed air (0.5–1 MPa ) from an air nozzle into the parison and thus establishing a compression contact with the inner wall of the metal die; and applying air pressure until the form is hardened.

In addition to the inner layers using the olefin polymer compositions (X) and (Z), inner layers using other thermoplastic resins can be combined with the olefin multilayer hollow plastic article of the present invention in an appropriate amount that does not affect the purpose of the present invention.

The polypropylene composition mixed into the polypropylene resin composition of the present invention has an intrinsic viscosity in the range of 0.2–10 dl/g and a melt flow rate PP-MFR(230° C., 21.18N) of preferably 0.1–10 g/10 min, more preferably 0.2–5 g/10 min. When the melt flow rate is below 0.1 g/10 min and melt extrusion is performed at a high discharge rate, then the resin pressure in the extrusion machine becomes high, so that the opening portion of the tube-shaped dies is deformed. Thus, a homogenous thickness cannot be attained, and in extreme case the high resin pressure leads to breakdown of the device. When the melt flow rate exceeds 10 g/10 min, the viscosity of the melt-extruded tube-shaped resin becomes small, so that a homogenous tube-shaped shape cannot be maintained.

A hydrogenated styrene elastomer (D) to be mixed with the polyolefin resin composition of the present invention has a melt flow rate SR-MFR (230° C., 21.18N) of 0.5 –10 g/10 min, preferably 1–10 g/10 min. When a polyolefin resin composition mixed with a hydrogenated styrene elastomer having a melt flow rate below 0.1 g/10 min is used for melt extrusion of a tube-shaped plastic, then the effect of suppressing a whitening caused by stress due to impact or bending of the resulting tube-shaped plastic becomes small. When a polyolefin resin composition mixed with a hydrogenated styrene elastomer having a melt flow rate above 10 g/10 min is used, then irregularities in the thickness of the melt-extruded resin are caused by flowability differences, so that a continuous tube-shaped plastic having a homogenous surface shape cannot be obtained.

There are no specific limitations concerning the hydrogenated styrene elastomer (D) mixed with the polyolefin resin composition of the present invention, but it should be a hydrogenated styrene elastomer with a styrene concentration of less than 30 wt %. An elastomer of hydrogenated ethylene-butene-styrene is preferable. When the blending quantity of the hydrogenated styrene elastomer (D) to be mixed with the polyolefin resin composition of the present invention exceeds 10 wt %, then the crystallization speed is low and it cannot be used as a short-time forming diluent, so that the productivity, which is one of the effects of the present invention, is harmed. When the blending quantity is below 0.1 wt %, the effect of suppressing a whitening caused by stress due to impact or bending becomes small, which is not desirable.

The polyolefin composition of the present invention has a high melt strength and a high crystallization temperature, displays a high form-filling speed and a high productivity, and the obtained continuous tube-shaped plastic does not whiten due to shock or bending. However, to generally improve the melt strength of the polypropylene resin, it is possible to add more than 900 g/1 crystalline ethylene composition, in a range that does not cause changes in the outer appearance and the thickness.

Possible methods for mixing the polypropylene composition with the hydrogenated styrene elastomer are for example mixing with a blender having a high speed stirring device attached to it, such as a Henschel Mixer(™), or mixing with a regular mixing device such as a ribbon blender or a tumbler mixer. In the case that melt-kneading is necessary, a pelletizing method using e.g. a regular uniaxial extrusion machine or a biaxial extrusion machine is possible.

If necessary, additives such as an antioxidant, an inorganic filler, a lubricant, or an anti-blocking agent can be included in the polypropylene composition to be mixed with the polyolefin composition used in the present invention in an appropriate amount that does not affect the purpose of the present invention.

In the present invention, the process of filling up the shape of the continuous tube-shaped plastic after melt extrusion is fast and a high productivity can be attained. Furthermore, according to the present invention, a continuous tube-shaped polyolefin plastic, which has a high melt strength, a thick continuous tube-shaped plastic and a large inside diameter can be formed with homogenous thickness. The obtained continuous tube-shaped plastic can be used as a cylindrical pipe such as a gas pipe, a pipe for drinking water, or a flexible pipe for protection of electric wiring. It can further be used broadly instead of vinyl chloride resins for plastic pipes and decomposition-resistant pipes. Furthermore, the polyolefin composition of the present invention also can be colored by dying the cylindrical form for interior decoration, the multi-colored attractiveness of which is not harmed by shock, bending or manufacturing processes.

The present invention relates to a polypropylene composition, wherein the process of filling up the shape of the continuous tube-shaped plastic after melt extrusion is fast and a high productivity can be attained. Furthermore, the present invention relates to a continuous tube-shaped plastic, which has a high melt strength, a thick wall thickness and a large inside diameter that can be attained with homogenous wall thickness. The obtained continuous tube-shaped plastic can be used as a cylindrical pipe such as a gas pipe, a pipe for drinking water, or a flexible pipe for protection of electric wiring. It can further be used broadly instead of vinyl chloride resins for plastic pipes and decomposition-resistant pipes. Furthermore, the polyolefin composition of the present invention also can be colored by dying the cylindrical form for interior decoration, the multi-colored attractiveness of which is not harmed by shock or bending during manufacturing processes.

In the following, the present invention is explained with examples. The present invention is, however, not limited to these examples.

FIRST EXAMPLE OF A RESIN COMPOSITION
(1) Preparation of Transition Metal Compound Catalyst Component 0.3 liter decane, 48 g magnesium chloride anhydride, 170 g n-butyl-orthotitanate and 195 g 2-ethyl-1-hexanol were mixed in a corrosion-resistant reactor vessel having a stirring device attached to it, heated for one hour at 130° C. while stirring, and thus dissolved to obtain a homogenous fluid. This homogenous fluid was kept warm at a temperature of 70° C., 18 g di-i-butyl phthalate was added while stirring, after one hour, 520 g silicon tetrachloride was added over a period of 2.5 h, and solid matter was precipitated and maintained at 70° C. for one more hour. By separating this solid matter from the fluid and washing it with hexane, a solid composition was produced.

All of the solid composition was mixed with 1.5 liter titanium tetrachloride dissolved in 1.5 liter 1,2dichloroethane. Then, 36 g di-i-butyl phthalate was added and reacted for two hours at 100° C. while stirring. After that, the liquid portion was eliminated by decantation at the same temperature. Again, 1.5 liter 1,2dichloroethane and 1.5 liter titanium tetrachloride were added and the mixture maintained at 100° C. while stirring for two hours. Next, the solid matter was separated from the fluid, washed with hexane and dried. Thus, a titanium-containing support type catalyst component (transition metal compound catalyst component) containing 2.8 wt % titanium was obtained.
(2) Preparation of a Preactivated Catalyst After nitrogen gas has been filled into a corrosion-resistant reaction vessel having tilted mixing blades and a volume of 5 liter, 2.8 liter n-hexane, 4 millimol triethylaluminum (organic metal compound (AL1)) and 9.0 g of the titanium-containing support type catalyst component (5.26 millimol in terms of titanium atoms) prepared as described in the previous paragraph were added to the container. Then, 20 g propylene was added and prepolymerization was performed for 10 min at −2° C.

When the polymer formed in another prepolymerization performed under the same conditions was analyzed, it was found that per gram of the titanium-containing support type catalyst component 2 g propylene turned into polypropylene (B), and the intrinsic viscosity $\eta_B$ of the polypropylene (B) measured in tetralin at 135° C. was 2.8 dl/g.

After the reaction time has passed, the propylene which has not yet reacted was taken from the reaction vessel and the gaseous contents of the reaction vessel was filled once with nitrogen. Then, while the reaction container was maintained at a temperature of −1° C., ethylene was fed continuously over a period of two hours to the reaction vessel, so as to maintain a pressure of 0.59 MPa inside the reaction vessel, and thus prepolymerization was performed.

When the polymer formed in another preactivation polymerization performed under the same conditions was analyzed, it was found that per gram of the titanium-containing support type catalyst component 24 g of polymer were present and the intrinsic viscosity $\eta_{T2}$ of the polymer measured in tetralin at 135° C. was 31.4 dl/g.

The amount ($W_2$) of polyethylene (A) per gram of the titanium-containing support type catalyst component formed by preactivation polymerization with ethylene can be determined by calculating the difference between the amount of polymer ($W_{T2}$) formed per gram of titanium-containing support type catalyst component after the preactivation treatment and the amount ($W_1$) of polypropylene (B) formed per gram of titanium-containing support type catalyst component after the prepolymerization:

$W_2 = W_{T2} - W_1$.

The intrinsic viscosity $\eta_A$ of the polyethylene (A) formed by the preactivation polymerization with ethylene can be determined with the following equation via the intrinsic viscosity $\eta_B$ of the polypropylene (B) formed by the prepolymerization and the intrinsic viscosity $\eta_{T2}$ of the polymer formed with the preactivation treatment:

$$\eta_A=(\eta_{T2} \times W_{T2}-\eta_B \times W_1)/(W_{T2}-W_1)=\eta_E$$

According to the equations above, the amount of polyethylene (A) formed by preactivation polymerization with ethylene was 22 g per gram of titanium-containing support type catalyst component, and the intrinsic viscosity $\eta_A$ was 34.0 dl/g.

After the reaction time has passed, the ethylene which has not yet reacted was taken from the reaction vessel and the gaseous contents of the reaction vessel was filled once with nitrogen. Then, 1.6 millimol di-isopropyldimethoxysilane (electron donor (E1)) were given into the reaction vessel, 20 g propylene were added and the temperature was maintained at 1° C. for 10 min, so that addition polymerization was performed after the preactivation treatment.

When the polymer formed in another addition polymerization performed under the same conditions was analyzed, it was found that per gram of the titanium-containing support type catalyst component 26 g polymer were present and the intrinsic viscosity $\partial_{T3}$ of the polymer measured in tetralin at 135° C. was 29.2 dl/g. As could be calculated with the above equations, the amount of polypropylene ($W_B$) formed by addition polymerization was 2 g per gram of titanium-containing support type catalyst component, and the intrinsic viscosity $\eta_C$ was 2.8 dl/g.

After the reaction time has passed, the propylene which has not yet reacted was taken from the reaction vessel and the gaseous contents of the reaction vessel was filled once with nitrogen. The above procedure yielded the preactivated catalyst slurry for the main (co)polymerization.

(3) Production of the Polypropylene Composition (Main (Co) Polymerization of Propylene)

After nitrogen gas has been filled into a corrosion-resistant polymerization container having a stirring device attached to it and a volume of 500 liter, 240 liter n-hexane, 780 millimol triethylaluminum (organic metal compound (AL2)), 78 millimol di-isopropyldimethoxysilane (electron donor (E2)) and half of the preactivation treatment catalyst slurry obtained as described above were filled into the polymerization container at 20° C. Successively, 55 liter hydrogen are introduced into the polymerization container and the temperature was raised to 70° C. Then, at a polymerization temperature of 70° C., propylene was fed continuously for two hours into the polymerization container while the gas pressure inside the polymerization container was maintained at 0.79 MPa , so that the main polymerization of propylene was carried out.

After the polymerization time has passed, 1 liter methanol was introduced into the polymerization container and a catalyst deactivation reaction was executed for 15min at 70° C. Successively, gas that has not reacted was exhausted, the solvent was separated and the polymer was dried, so that 40.1 kg polymer with an intrinsic viscosity $\eta_T$ of 1.97 dl/g were obtained.

The obtained polymer was a polypropylene composition containing 0.25 wt % polyethylene (A) corresponding to the component (a) due to the preactivation polymerization and the polypropylene component (b) with an intrinsic viscosity $\eta_P$ of 1.89 dl/g.

100 weight parts of the obtained polypropylene composition were mixed with 0.1 weight parts 2,6-di-t-butyl-p-cresol and 0.1 weight parts calcium stearate, and the mixture was crushed and pelletized at 230° C. using an extrusion granulation machine with a 40 mm diameter screw. Regarding the physical properties of the resulting pellet that were measured and evaluated, the MFR was 3.5 g/10 min, the crystallization temperature was 122.5° C. and the melt strength MS was 4.9 cN.

This polypropylene composition and other polypropylene compositions obtained with a process that differed from the process described above only in that the added amount of preactivated catalyst, which contained high molecular weight polyethylene and was obtained as described above, was 0.24 wt % and 0.46 wt % respectively were analyzed as described below.

(1) Transmission Electron Microscope (TEM) Examination

An examination with a transmission electron microscope (TEM) was performed as described in the following. First of all, a pellet-shaped sample was heated for 3 min in the residual heat of a heat press that was previously heated to 200° C., then press-molded for 5 min under a pressure of 50 kg/cm², and hardened for 3 min in a cooling press at 50° C. under a pressure of 50 kg/cm² so as to produce a sheet-shaped sample piece with a thickness of 1 mm. After the sample piece was trimmed, electron staining was performed with vapor from a $RuO_4$ aqueous solution to enhance the contrast of the TEM picture. The $RuO_4$ aqueous solution was prepared by dissolving 0.6 g $NaIO_4$ (a product of Wako Pure Chemicals Industries, Ltd. of special quality) and 0.1 g $RuCl_3.nH_2O$ (a product of Wako Pure Chemicals Industries, Ltd.) in 10 ml pure water. The sample was inserted into a container holding the $RuO_4$ aqueous solution, which was then tightly sealed, and left alone for 48 h at room temperature, so that staining was performed. In the present invention, the staining was performed with vapor from an aqueous solution, but to attain the same effect, it is also possible to perform the staining in the $RuO_4$ solution or with gas sublimated from $RuO_4$ crystals. A superthin slice of about 80 nm thickness was obtained by cutting the stained sample with an ultramicrotome (product of Japan Microtome Co.) having a diamond knife at a cutting angle of 45° C. The superthin slice sample was examined at 100 kV acceleration voltage using a JEM-100CX type TEM (product of NIHON DENSHI Co.).

FIG. 1 is a photographed magnification ×75000 as examined with the TEM. As can be seen in FIG. 1, a high molecular weight polyethylene with a numerical average particle size of about 70 nm was finely dispersed in the polymer of the present example. It was also observed, that the high molecular weight polyethylene had a lamellar structure.

Figure 2:
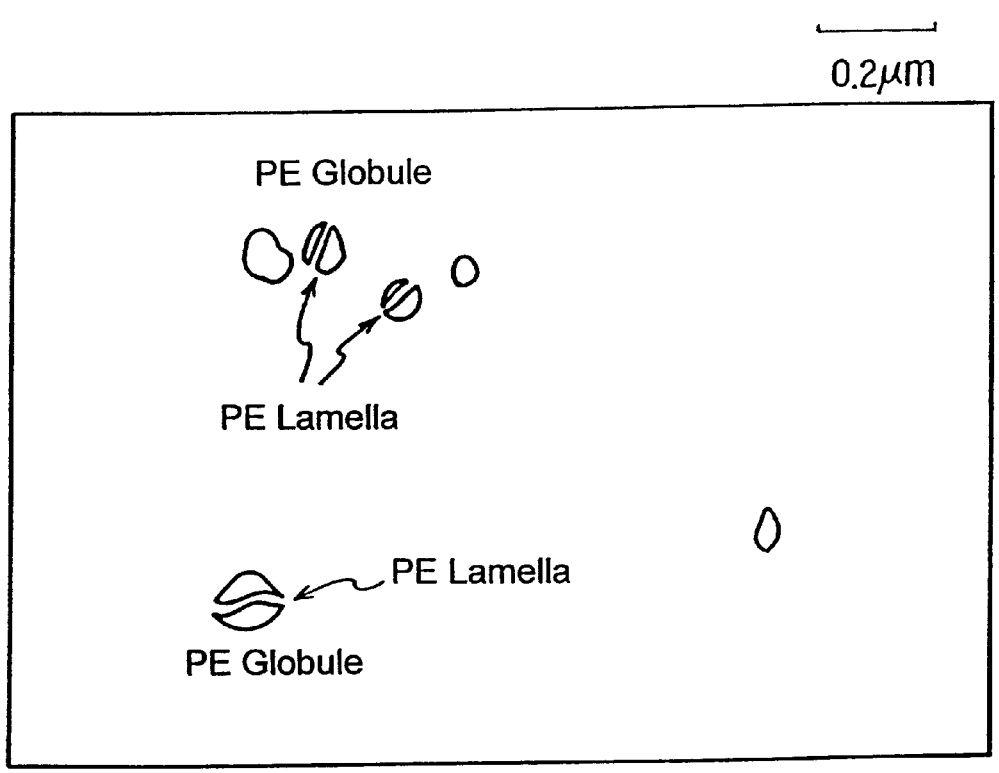
FIG. 2 is a drawing of the photograph in FIG. 1, with explanations added for illustration.

FIG. 2 is a drawing of the photograph in FIG. 1, with added explanations for illustration. In particular, explanations of the globule and lamellar structure of the high molecular weight polyethylene were added.

Figure 3:
FIG. 3 is a TEM-photograph of generally well-known polypropylene.
Figure 3:
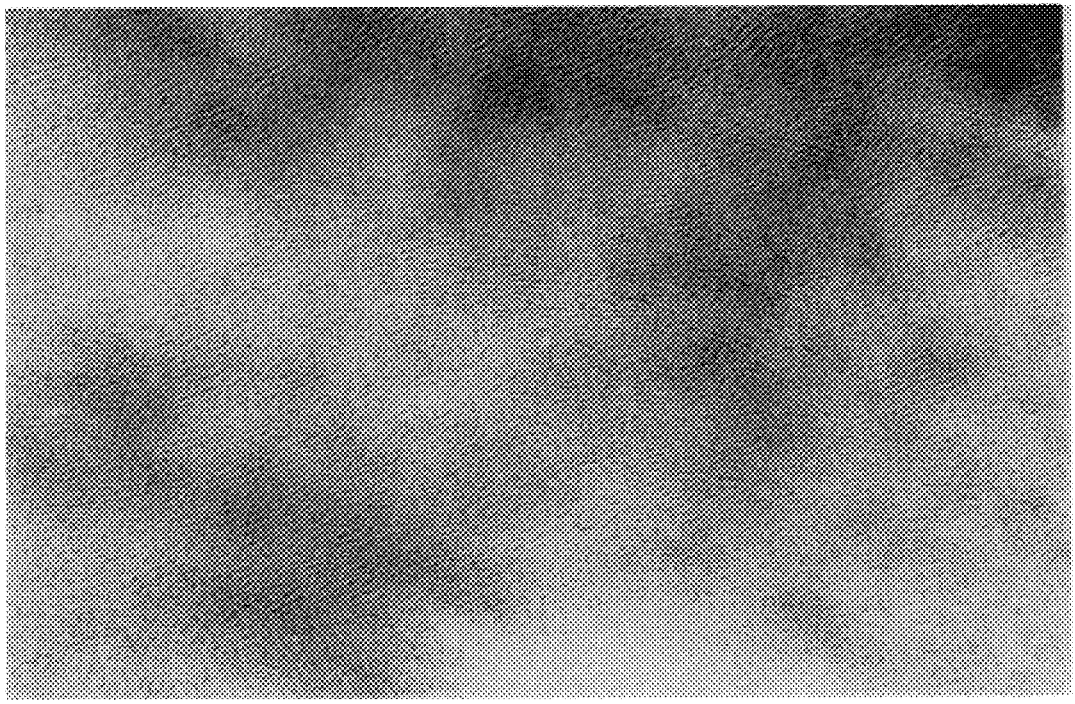

On the other hand, there are no fine grains in conventional, generally well-known polypropylene, as is shown in the TEM photograph in FIG. 3.

(2) Rheology Analysis

1 Sample Preparation for Measurement with a Rheometrics Mechanical Spectrometer (RMS-800)

A pellet for observation with a RMS-800 (obtained by adding and mixing 0.1 wt % 2,6di-t-butyl-p-cresol (BHT) as a heat stabilizer and 0.1 wt % calcium stearate as a lubricant) was pressed at 200° C. to a plate of 25 mm diameter. This plate was set up on the RMS-800 to perform the observation.

2 Measurement of Elongation Viscosity (i) Heat stabilizer (BHT:0.1 wt %, lubricant calcium stearate: 0.1 wt %) was added to powder and blended for 3min in a Henschel Mixer.

(ii) This blend was pelletized at an extrusion temperature of 230° C. with a 40 mm diameter extrusion machine.

(iii) This pellet was formed into a strand of uniform diameter by extrusion at 210° C., 5 mm/min extrusion speed and 5 min preheating time with a melt tension tester of TOYO SEIKI CO., which has an orifice of 3 mm diameter. The rheological behavior is explained below.

1. About G'

The elasticity coefficient G' of the molten material at 230° C. was measured by distortion within a linear range in a frequency range of $10^{-2}$–$10^2$ rad/s using a mechanical spectrometer RMS-800 (product of Rheometrics) equipped with parallel plates of 25 mm diameter. The results of the measurements are shown in FIGS. 4–6.

Figure 4:
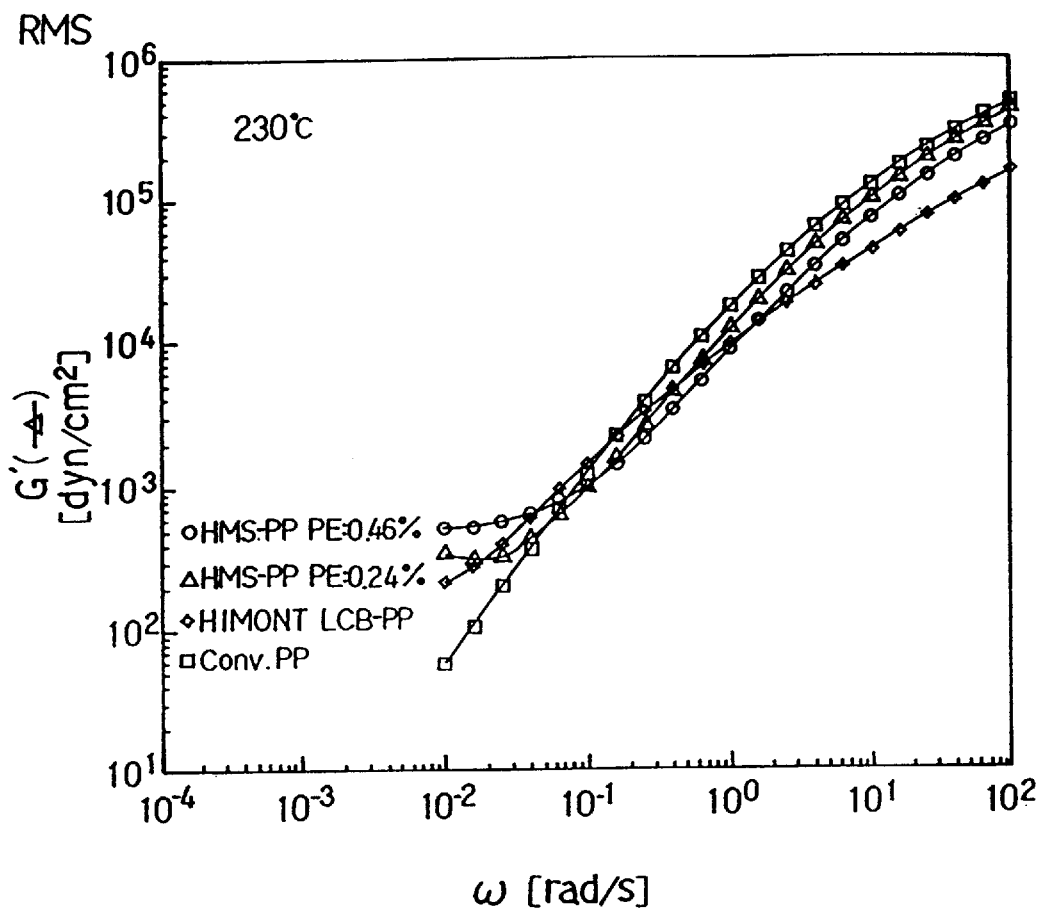
FIGS. 4–6 illustrate the rheological behavior of a polymer composition according to the first example of the present invention and show the elasticity coefficient G' as a function of the frequency ω.
Figure 5:
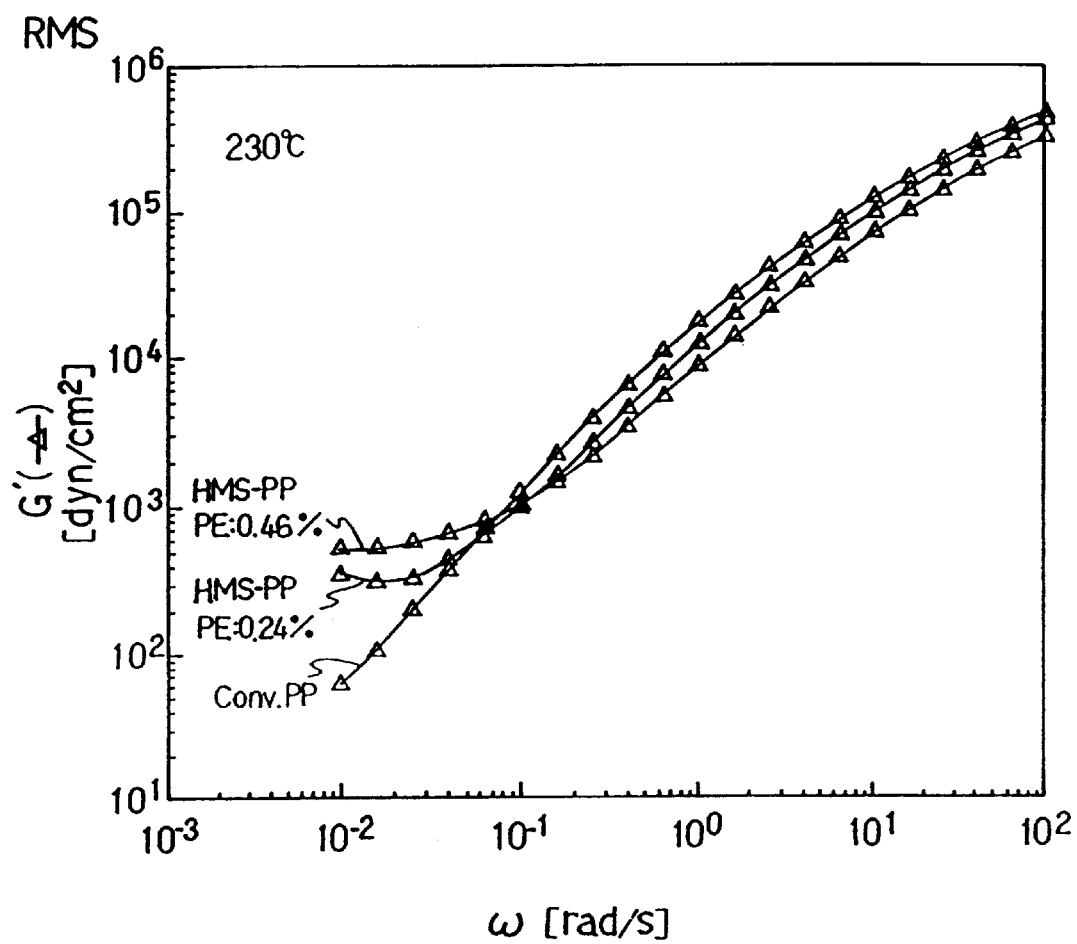
Figure 6:
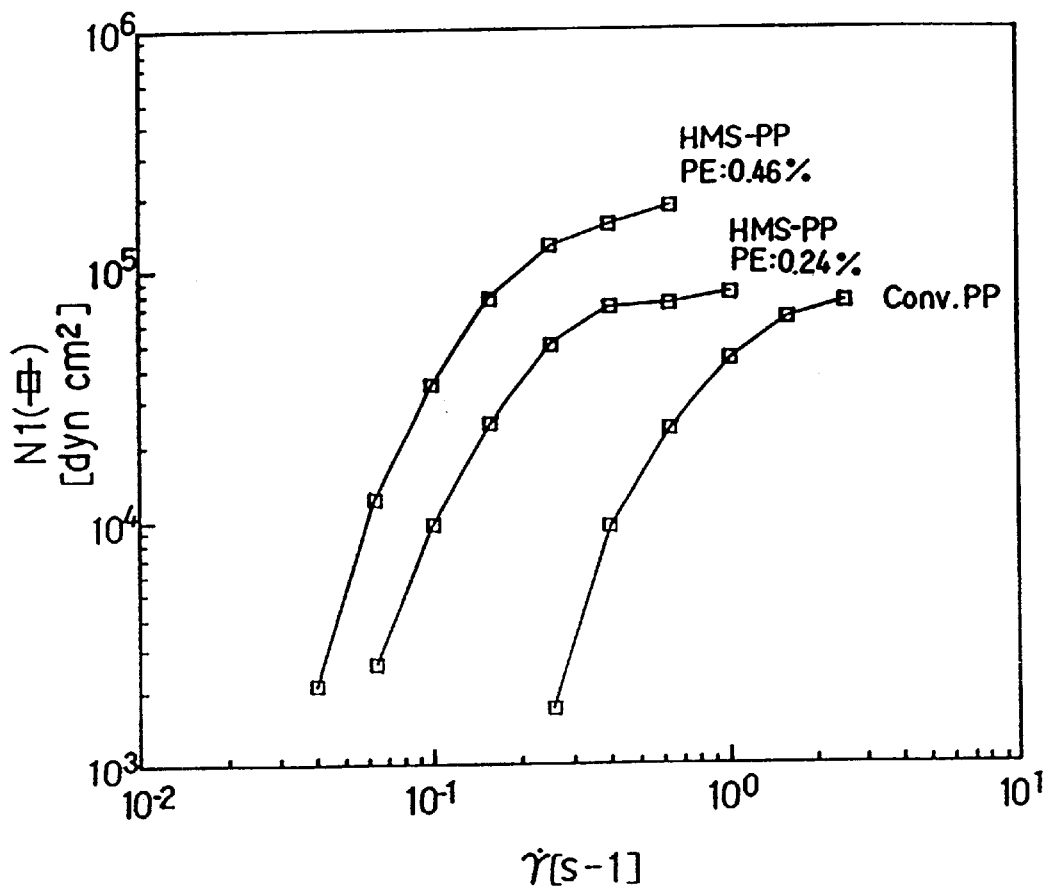

As is shown in FIGS. 4 and 5 (Ordinate: Elasticity Coefficient G', Abscissa: Frequency ω)), the elasticity coefficient G' of the polymer of the present invention (referred to as "HMS-PP" below) exhibits a second flattening region in the low frequency region that cannot be observed in well-known conventional PP and whose height correlates to the pretreatment amount of PE. It is known, that this second flattening region also can be observed in copolymers, polymers with inorganic fillers etc., wherein rubber particles form islands and are dispersed in the plastic phase, so it is assumed that the second flattening region is caused by long-term relaxation mechanisms originated in the dispersed phase structure. It seems plausible that this second flattening region is realized because of the fine dispersion of ultrahigh molecular weight PE particles of sub-micron order throughout the HMS-PP. In FIG. 4, "Himont LCB-PP" marks an electron-beam cross-linked polypropylene prepared by Himont's electron beam irradiation method. It should be noted, that this electron-beam cross-linked polypropylene has no second flattening region either.

2. About N'

The first normal stress difference N' of the molten material was measured at 190, 230 and 250° C. in a shear rate range of $10^{-2}$–10 (sec$^{-1}$) using a mechanical spectrometer RMS-800 product of Rheometrics) equipped with cone plates of 25 mm diameter and a cone angle of 0.1 rad.

The measurements were performed after sample set-up and maintaining the sample at a stable temperature for 30° C. The time until steady flow was determined in an extra measurement.

Extra Measurement

With 150(S) at 0.01 (s$^{-1}$) and 100(S) at 0.05 and 0.1 (s$^{-1}$) respectively, the sample was subjected to steady flow and the minimal time in which a constant viscosity value is reached was determined.

Figure 7:
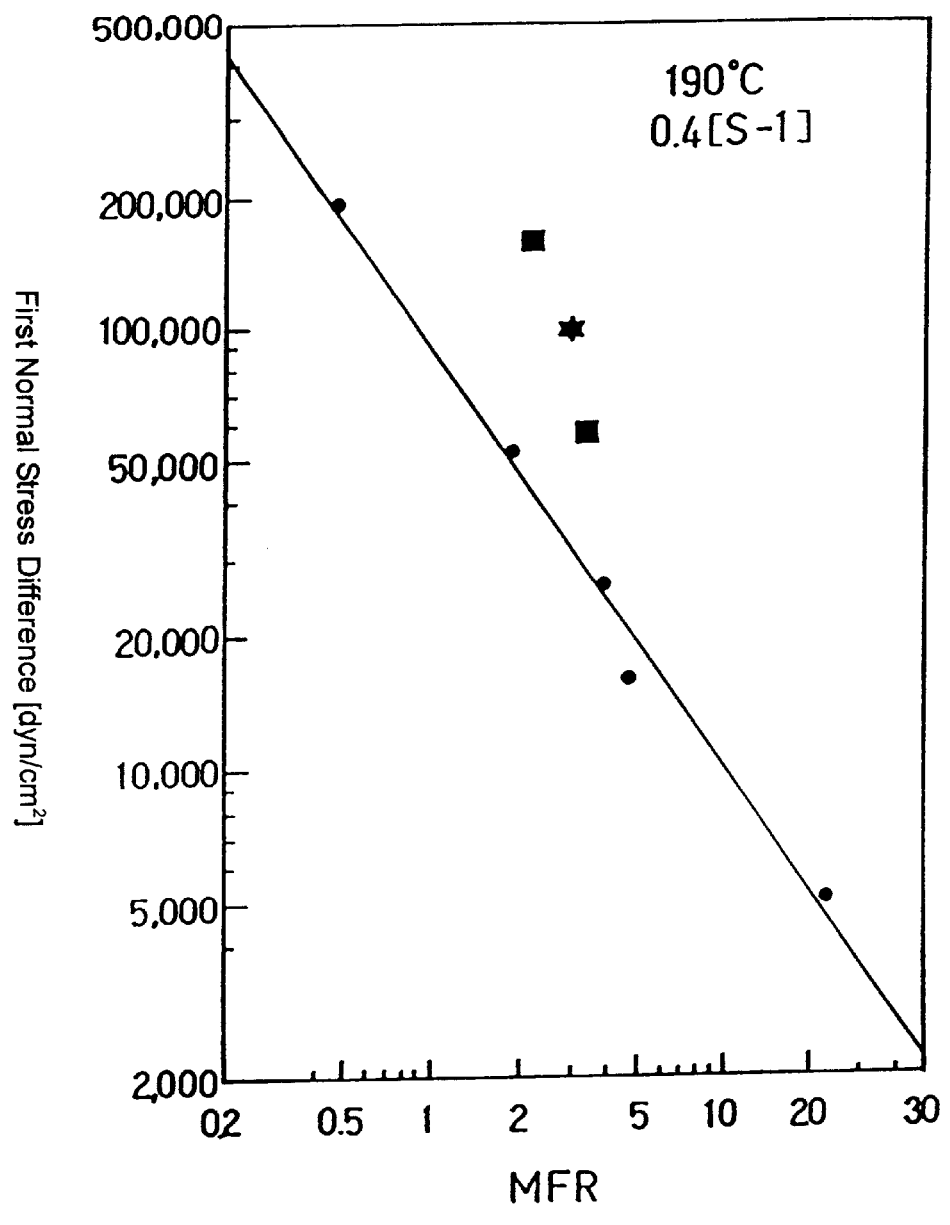
FIGS. 7 and 8 illustrate the rheological behavior of a polymer composition according to the first example of the present invention and show the relation between the first normal stress difference $N_1$ and the shear rate γ.
Figure 8:
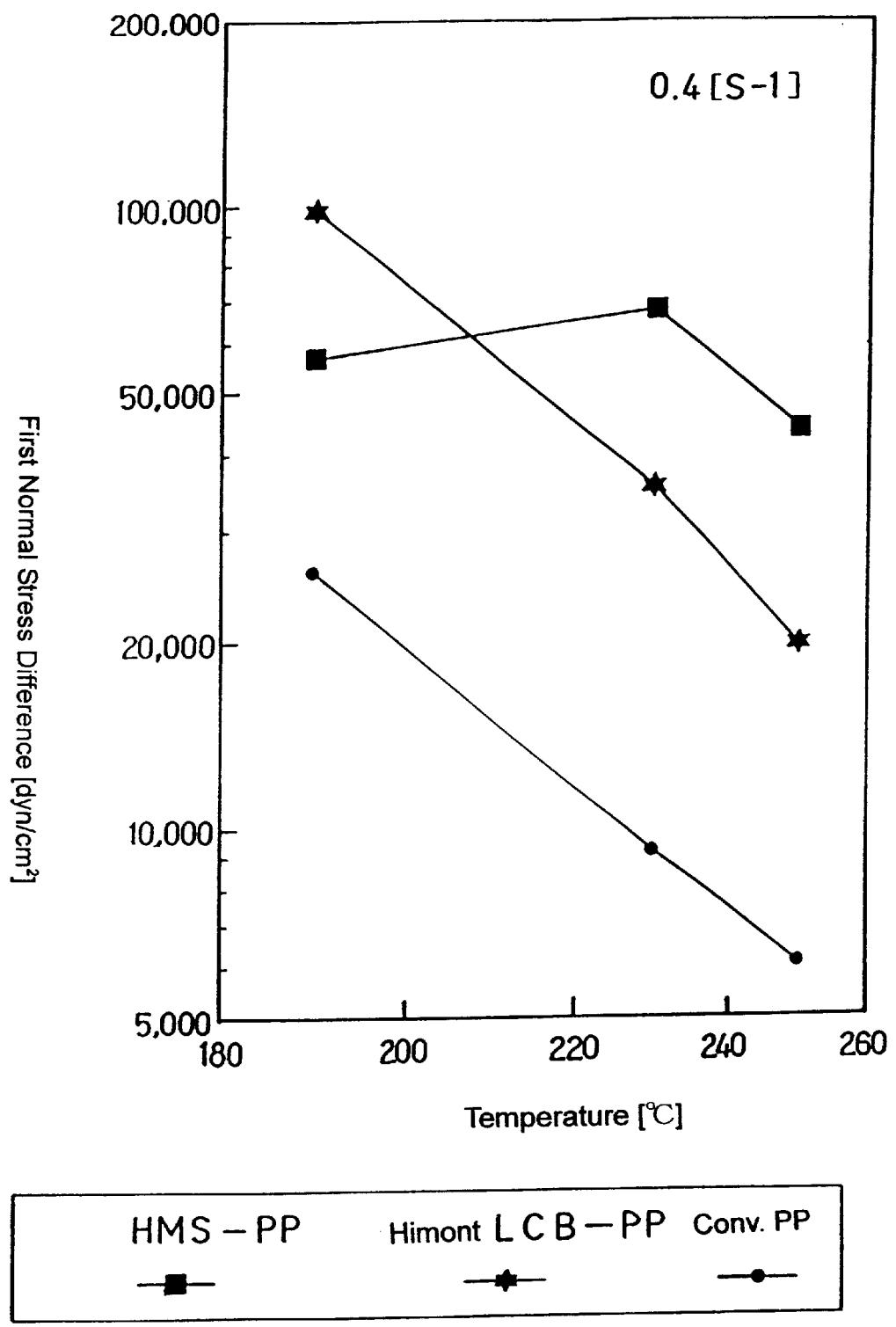

As can be seen in FIG. 7 (Ordinate: first normal stress difference $N_1$; Abscissa: shear rate γ) and FIG. 8 (Ordinate: first normal stress difference $N_1$; Abscissa: MFR), the $N_1$ of the HMS-PP is high compared to conventional PP and correlates to the pretreatment PE amount. The PP produced by Himont using the electron beam irradiation method is a substance with a higher $N_1$ than inconventional PP, but as can be seen in FIG. 8 (Ordinate: first normal stress difference $N_1$; Abscissa: temperature), the $N_1$ conventional PP and electron beam irradiation method PP deteriorates when the temperature becomes high, whereas the temperature dependence of HMS-PP is small.

3. About G(t)

The relaxation modulus G(t) of the molten material at 230° C. was measured on a time scale up to 330 sec under 500% strain using a mechanical spectrometer RMS-800 (product of Rheometrics) equipped with cone plates of 25 mm diameter and a cone angle of 0.1 rad.

Figure 9:
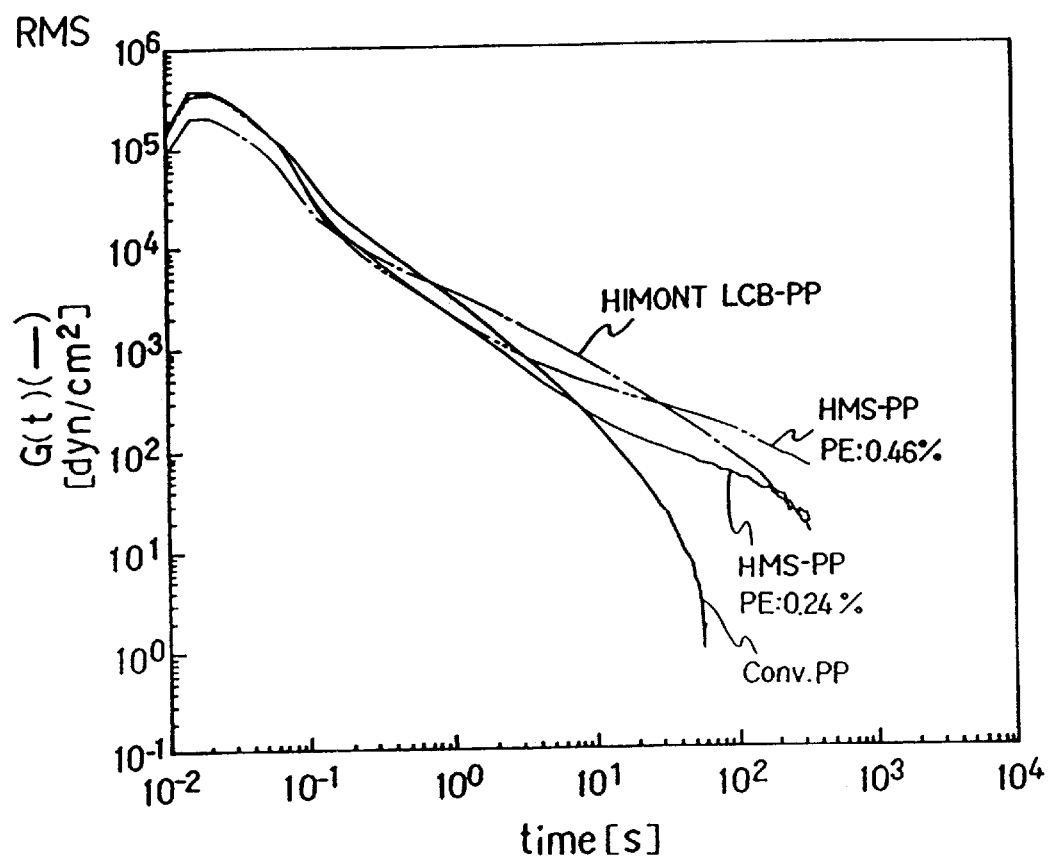
FIGS. 9 and 10 illustrate the rheological behavior of a polymer composition according to the first example of the present invention and show the relaxation modulus G(t) as a function of time.
Figure 10:
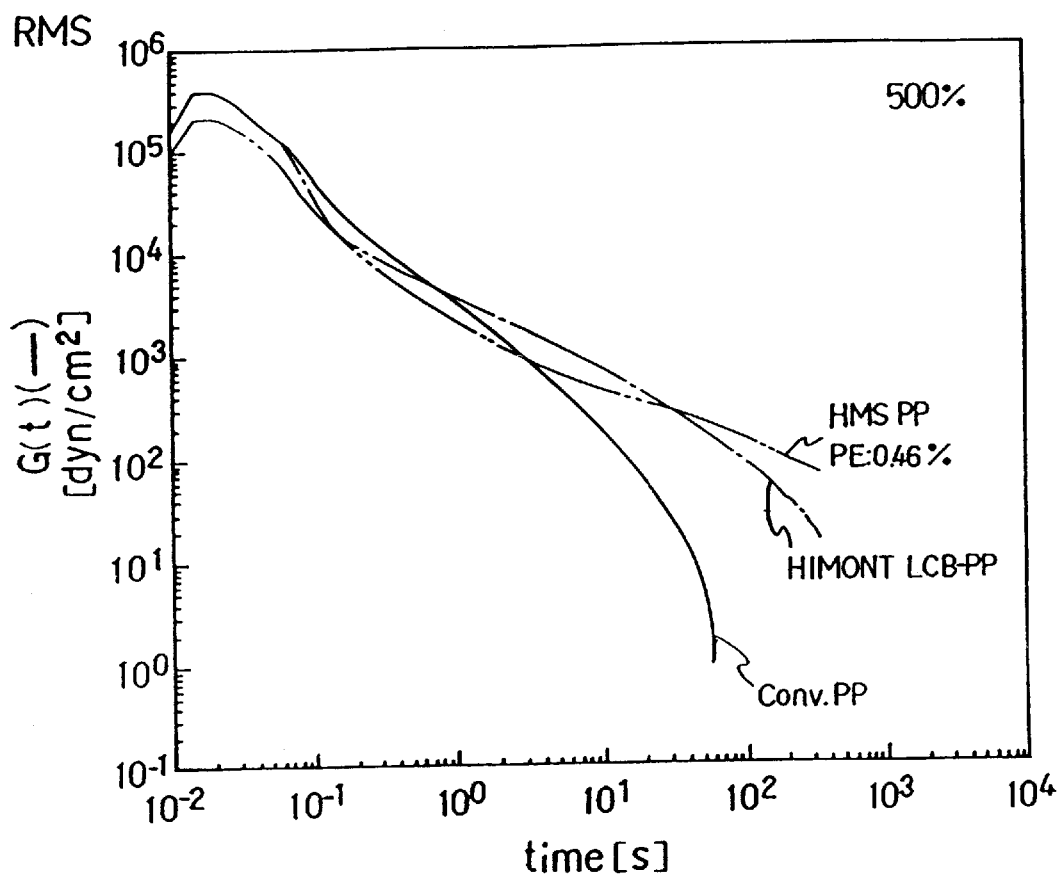

As is shown in FIGS. 9 and 10 (Ordinate: Relaxation Modulus G(t); Abscissa: Time) the G(t) curve of HMS-PP follows almost the same slope as conventional PP on the short-time side, but follows a much gentler slope on the long-time side and displays a long-time side plateau appearance. Moreover, within the time scale of the measurement (below 330 sec), a termination region was not observed, and the beginning of the long-time plateau moves to the short-time side with the increase of the amount of pretreatment PE.

The slope of the G(t) curve of PP prepared with Himont's electron beam irradiation method is gentler than the slopes for conventional PP and HMS-PP, but it shows no long-term plateau, and as with conventional PP, a termination region can be observed.

The long-term plateau of the G(t) curve also can be observed in PP having a double molecular weight distribution.

4. About the Elongation Viscosity

A strand of uniform diameter was preheated for 5 min in a 180° C. silicon oil bath. Then, the strand was elongated at a constant deformation velocity (0.05, 0.10, 0.30) and its elongation viscosity was measured with a Merten Rheometer (TOYO SEIKI CO.). With this elongation viscosity meter, the tension and the strand diameter were observed for a certain period of time. (The strand diameter was observed with a CCD camera.)

Figure 11:
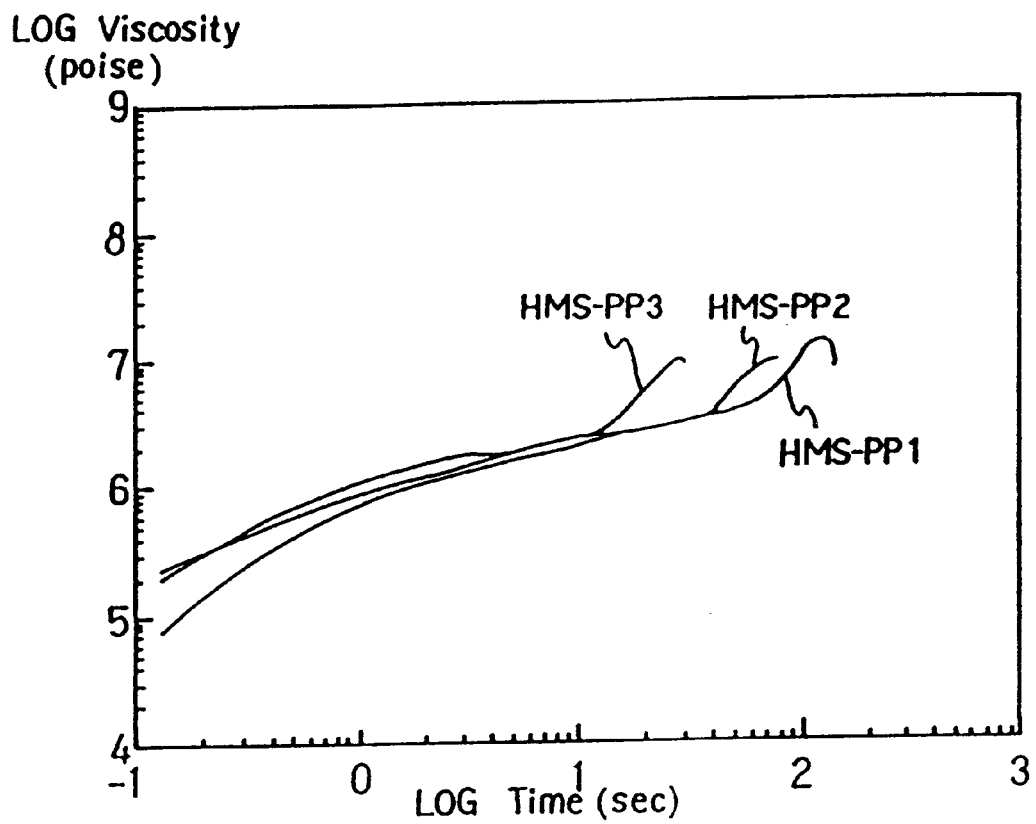
FIGS. 11 and 12 illustrate the rheological behavior of a polymer composition according to the first example of the present invention and show the elongation viscosity as a function of time.

A polypropylene composition was obtained using 0.46 wt % of the preactivated catalyst containing high molecular weight polyethylene and a different amount of hydrogen, but otherwise under the same conditions as in the first example. FIG. 11 (ordinate: elongation viscosity; abscissa: time) shows the elongation viscosity of this polypropylene composition measured for several strain velocities γ. Table A shows the results of this measurement.

TABLE A

| Sample No. | MFR (g/10 min) | Strain Rate (sec$^{-1}$) |
| --- | --- | --- |
| HMS PP-1 | 0.5 | 0.021 |
| HMS PP-2 | 0.5 | 0.037 |
| HMS PP-3 | 0.5 | 0.128 |

Figure 12:
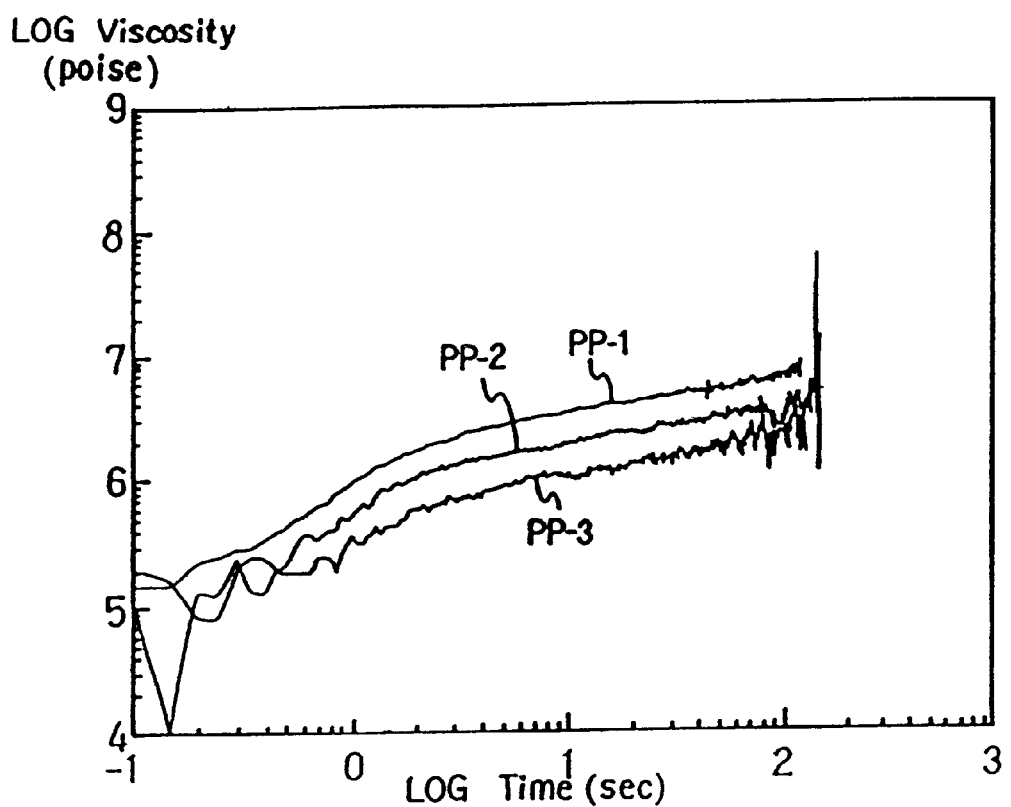

Another polypropylene composition was obtained using a different amount of hydrogen but otherwise under the same conditions as in a comparative example. FIG. 12 (ordinate: elongation viscosity; abscissa: time) shows the elongation viscosity of this polypropylene composition measured for several strain velocities γ. Table B shows the results of this measurement.

TABLE B

| Sample No. | MFR (g/10 min) | Strain Rate (sec$^{-1}$) |
| --- | --- | --- |
| Conv. PP-1 | 0.5 | 0.021 |
| Conv. PP-2 | 1 | 0.020 |
| Conv. PP-3 | 2 | 0.017 |

As can be seen from these results, the elongation viscosity of conventional PP converges towards a constant value, even when it is heavily deformed by elongation (see FIG. 12), whereas the viscosity of HMS-PP increases above a certain deformation amount and the HMS-PP shows strain hardenability (see FIG. 11). This viscosity increase can be advantageous in methods involving heavy deformation such as foaming or blow molding. The strain hardenability also can be observed for example in Himont's electron beam irradiation method PPs and in ionomers. However, it is a phenomenon usually not observed in bulk polypropylene compositions.

It was confirmed, that compared to PPs (homopolymer PPs, random PPs and block PPs alike) to which the preactivated catalyst containing high molecular weight ethylene is not added, in the HMS-PP of the present invention, the above properties clearly can be observed or are conspicuous. It is assumed that these properties are brought about by the molecular interaction between the finely dispersed high molecular weight ethylene molecules and the polypropylene molecules.

It was further confirmed that even when a base PP was blended with a preactivated catalyst powder containing high molecular weight ethylene, the rheological behavior described above does not manifest itself.

Definitions of technical terms and a description of measurement methods used in the examples and the comparative examples follow:

(1) Intrinsic Viscosity η

Intrinsic viscosity (in dl/g) measured with an Ostwald viscometer (product of Mitsui Toatsu Chemicals, Inc.) in tetralin at 135° C.

(2) Melt Strength (MS)

Melt Strength (in cN) measured with a Melt Tension Tester-2 (product of TOYO SEIKI SEISAKUSHO).

(3) Expansion Ratio

Foam density (foam weight/outer volume)

(4) Foam Appearance

The foaming cell appearance was judged by visual inspection of a cross section of the resulting foam according to the following classifications:

(Homogenous, Inhomogenous)

Homogenous: The size of the foaming cells is almost identical.

Inhomogenous: The size of the foaming cells varies.

(Fine, Coarse)

Fine: The foaming cells are independent.

Coarse: The foaming cells are continuous.

(5) Odor 10 g of the obtained foam were sealed in a glass container and the glass container was warmed for one hour in an oven of 50° C. temperature. Then the glass container was opened and the odor was judged by olfactory examination according to the following classifications:

G: An unpleasant smell could not be perceived.

N: An unpleasant smell causing discomfort was perceived.

(6) Outer Appearance

A visual examination was performed from a distance of about 60 cm away from the surface of the layered article at an angle of 45±10° against a light source (two 40 W fluorescent lamps), according to the following classification:

G: Bumps in the surface could not be perceived.

N: Bumps can be seen, the surface is irregular.

(7) Crystallization Temperature (Tc)

After raising the temperature of polypropylene composition from room temperature to 230° C. at a rate of 30° C./min and holding this temperature for 10 min, the temperature was lowered to −20° C. at −20° C./min and held for 10 min, again raised to 230° C. at 20° C./min and held for 10 min, then lowered to 150° C. at −80° C./min, and further lowered from 150° C. at −5° C./min, while measuring the temperature (in °C.) at the biggest peak of absorption heat at crystallization time with a DSC7 type differential scan calorimeter (product of Parkin Elmer).

(8) Melting Point

A 10 mg sample was heated in a nitrogen atmosphere from 20° C. to 230° C. at a rate of 20° C./min. The temperature was maintained at 230° C. for 10 min and then lowered to −20° C. at 5° C./min. After holding the temperature −20° C. for 10 min, the temperature was again raised at a rate of 20° C./min and the temperature at the peak of the heat absorption curve was determined with a DSC7 type differential scan calorimeter (product of Parkin Elmer).

(9) Temperature of the Molten Propylene Polymer Composition (PP-T1)

Value of the temperature (in °C.) of the molten resin extruded with dies at a rotational frequency that is equal to the screw rotational frequency. The temperature is measured directly underneath a die at the time of the production of the film with a T-die, using a W02866 type digital thermometer (product of ANRITSU SEIKI Corp.).

(10) Chillroll Temperature (PP-T2)

Value of the temperature (in °C.) at the surface of the chillroll (cooling roll) at the time of the production of the film with a T-die, measured with a noncontact 505 type infrared thermometer (product of Minolta Co., Ltd.).

(11) Expandability

The thickness of the resulting film is measured using a Dial Gauge (Trademark). Thickness measurements are performed at intervals of 10 cm in the cross direction and at intervals of 1 m over a length of 50 m in the machine direction. The standard deviations for the cross and machine directions are calculated and the quality is judged by evaluating both standard deviations according to the following criteria. The expandability is better the smaller the standard deviations are.

Expandability Criteria

○: The standard deviations for the cross direction and the machine direction are both under 5%.

X: One of the two standard deviations for the cross direction and the machine direction is not less than 5%.

(12) Neck-in Length

Difference (in mm) between the length of a T-die opening and the width (in cross direction) of an obtained film, measured with a metal ruler. The smaller the neck-in length, the smaller is the neck-in and the wider is the product width of a film having a homogenous thickness. In order to discern the effect of the propylene polymer composition, the lip opening of the T-die was set to a constant width (10 mm).

(13) Productivity

A quality ranking was performed according to the following appearance criteria, which include, in addition to the expandability and neck-in length measurements, transparency variations of the produced film (variations of the haze value (ASTM D 1003) of not less than 2%).

(14) Film Appearance Criteria

○: No occurrence of transparency irregularities, wrinkles or fish-eyes (with not less than 0.5 mm diameter)

X: Occurance of at least one of. transparency irregularities, wrinkles, unmelted material and fish-eyes.

| Productivity Rank | Expandability | Neck-in Length (mm) | Appearance |
|---|---|---|---|
| 7 | ○ | Under 40 | ○ |
| 6 | ○ | At least 40 and under 100 | ○ |
| 5 | ○ | At least 100 | ○ |
| 4 | ○ | Under 40 | X |
| 3 | ○ | At least 40 | X |

-continued

| Productivity Rank | Expanda- bility | Neck-in Length (mm) | Appearance |
|---|---|---|---|
| 2 | X | Under 40 | X |
| 1 | X | At least 40 | X |

A high productivity has at least rank 6, preferably rank 7.

(15) Melt Flow Rate (MFR)

Flowability (in g/10 min) of the molten resin according to condition 14 of JIS K7210 Table 7.

(16) Haze

In accordance with ASTM D1003.

(17) Heat Sealability

Sealant surfaces of samples of 60 mm length and 15 mm width were laid on top of another and heat sealing was performed at the sample edges for 0.8 sec with 0.1 MPa pressure using a seal bar that has been heated to a certain temperature so as to heat seal the two films laying on top of one another. The exfoliation force of the heat seal portion of this sample was measured with a tension tester. This procedure was performed for several temperatures of the seal bar.

(18) Hot-Tackiness

A 75 mm wide spring board was bent by hand to form a U-shape so that both ends touch each other, a film of 270 mm length and 75 mm width was wrapped around the spring board with a sealant surface on the inside, and the ends of the film protruding from the spring were laid on top of one another. The film was sealed with 0.1 MPa pressure in 0.8 sec at the spring end using a seal bar, which has been preheated to a certain temperature. With the lifting of the seal bar, the hand is taken from the spring so that the spring force is released and a force is applied to the seal portion. An exfoliation of the seal portion within 3 mm was taken as acceptable hot-tackiness. This procedure was repeated for various seal bar temperatures and spring forces.

(19) Isotactic

Polymer index (I.I) in % after complete dissolution in boiling xylene, refrigeration down to 23° C. and precipitation.

(20) Neck-In

The decrease of the resulting not-yet-stretched film against the slit length of the T-die at production time was calculated with the following formula:

(1−width of the not-yet-stretched film/slit length)×100 (in %)

(21) Vibration

The vibration of the molten resin between the T-die and the casting roll at the time of production of the not-yet-stretched film was visually examined, and classified into:

○: Almost no vibrations;

Δ: Light vibrations;

X: Strong vibrations.

(22) Width Contraction

The reduction ratio of the stretched film width against the not-yet-stretched film width at the production time of the stretched film was calculated according to the following formula:

(1−stretched film width/not-yet-stretched film width)×100 (in %)

(23) Thickness Precision

The thickness of a stretched film (25 cm in the machine direction and 20 cm in the cross direction) was measured at 36 points and a value for the thickness precision calculated according to the following formula:

[(largest thickness−smallest thickness)/average thickness]×100 (in %)

(24) Young's Modulus

In accordance with ASTM D882.

(25) Tensile Strength

In accordance with ASTM D882.

(26) Coefficient of Linear Thermal Contraction

Sample pieces of 100 mm length and 10 mm width are cut with the length in parallel or perpendicular to the film extrusion direction and are then immersed for 10 min in an oil bath that has been preheated to a certain temperature. After retrieving the samples from the oil bath, the length is measured, and the contraction ratio is calculated according to the following formula:

(1−length(mm) after heat treatment/100(mm))×100 (in %)

(27) Fusion Seal Strength

Bags were made at a rate of 80/min using a bag-making machine having a 350° C. fusion seal bar. The fusion seal strength (in N/15 mm) at the seal portion of the resulting bags was measured with n=20 and minimum, maximum and average value were determined. The fusion sealability of a biaxially stretched film is good when the average value is high, the difference between minimum and maximum value is small and no whiskers occur at the time of fusion sealing. The whiskers were examined visually and categorized into:

○: No occurrence of whiskers;

X: Occurrence of whiskers.

EXAMPLE 1

(1) Preparation of Transition Metal Compound Catalyst Component 0.3 liter decane, 48 g magnesium chloride anhydride, 170 g n-butyl-orthotitanate and 195 g 2-ethyl-1-hexanol were mixed in a corrosion-resistant reactor vessel having a stirring device attached to it, heated for one hour at 130° C. while stirring, and thus dissolved to obtain a homogenous solution. This homogenous solution was kept warm at a temperature of 70° C. and 18 g di-i-butyl phtalate was added while stirring. After one hour, 520 g silicon tetrachloride was added over a period of 2.5 h, and solid matter was precipitated and maintained at 70° C. for one more hour. By separating this solid matter from the solution and washing it with hexane, a solid composition was produced.

All of the solid composition was mixed with 1.5 liter titanium tetrachloride dissolved in 1.5 liter 1,2-chloroethane. Then, 36 g di-i-butyl phtalate was added and reacted for two hours at 100° C. while stirring. After that, the liquid portion was eliminated by decantation at the same temperature. Again, 1.5 liter 1,2-dichloroethane and 1.5 liter titanium tetrachloride were added and the mixture maintained at 100° C. while stirring for two hours. Next, the solid matter was separated from the solution, washed with hexane and dried. Thus, a titanium-containing support type catalyst component (transition metal compound catalyst component) containing 2.8 wt % titanium was obtained.

(2) Preparation of Preactivated Catalyst

After nitrogen gas has been filled into a corrosion-resistant reaction vessel having tilted mixing blades and a volume of 5 liter, 2.8 liter n-hexane, 4 millimol triethylaluminum (organic metal compound (AL1)) and 9.0 g of the titanium-containing support type catalyst component (5.26 millimol in terms of titanium atoms) prepared as described in the previous paragraph were added to the reaction vessel. Then, 20 g propylene was added and prepolymerization was performed for 10 min at −2° C.

When the polymer formed in another prepolymerization performed under the same conditions was analyzed, it was found that per gram of the titanium-containing support type catalyst component 2 g propylene turned into polypropylene (B), and the intrinsic viscosity $\eta_B$ of the polypropylene (B) measured in tetralin at 135° C. was 2.8 dl/g.

After the reaction time has passed, the propylene which has not yet reacted was taken from the reaction vessel and the gaseous contents of the reaction vessel was filled once with nitrogen. Then, while the reaction container was kept at a temperature of −1° C., ethylene was fed continuously over a period of two hours to the reaction vessel, so as to maintain a pressure of 0.59 MPa inside the reaction vessel, and thus prepolymerization was performed.

When the polymer formed in another preactivation polymerization performed under the same conditions was analyzed, it was found that per gram of the titaniumontaining support type catalyst component 24 g polymer were present and the intrinsic viscosity $\eta_{T2}$ of the polymer measured in tetralin at 135° C. was 31.4 dl/g.

The amount ($W_2$) of polyethylene (A) per gram of the titanium-containing support type catalyst component formed by preactivation polymerization with ethylene can be determined by calculating the difference between the amount of polymer ($W_{T2}$) formed per gram of titaniumontaining support type catalyst component after the preliminary activation treatment and the amount ($W_1$) of polypropylene (B) formed per gram of titanium-containing support type catalyst component after the prepolymerization:

$$W_2 = W_{T2} - W_1.$$

The intrinsic viscosity $\eta_A$ of the polyethylene (A) formed by the preactivation with ethylene can be determined with the following equation via the intrinsic viscosity $\eta_B$ of the polypropylene (B) formed by the prepolymerization and the intrinsic viscosity $\eta_{T2}$ of the polymer formed with the preliminary activation treatment:

$$\eta_A = (\eta_{T2} \times W_{T2} - \eta_B \times W_1)/(W_{T2} - W_1) = \eta_E$$

According to the equations above, the amount of polyethylene (A) formed by preactivation polymerization with ethylene was 22 g per gram of titanium-containing support type catalyst component, and the intrinsic viscosity $\eta_E$ was 34.0 dl/g.

After the reaction time has passed, the ethylene which has not yet reacted was taken from the reaction vessel and the gaseous contents of the reaction vessel was filled once with nitrogen. Then, 1.6 millimol di-isopropyldimethoxysilane (electron donor (E1)) were added to the reaction vessel, 20 g propylene were added and the temperature was kept at 1° C. for 10 min, so that addition polymerization was performed after the preliminary activation treatment.

When the polymer formed in another addition polymerization performed under the same conditions was analyzed, it was found that per gram of the titaniumontaining support type catalyst component 26 g polymer were present and the intrinsic viscosity $\eta_{T3}$ of the polymer measured in tetralin at 135° C. was 29.2 dl/g. As could be calculated with the above equations, the amount of polypropylene ($W_3$) formed by addition polymerization was 2 g per gram of titanium-containing support type catalyst component, and the intrinsic viscosity $\eta_d$ was 2.8 dl/g.

After the reaction time has passed, the propylene which has not yet reacted was taken from the reaction vessel and the gaseous contents of the reaction vessel was filled once with nitrogen. The above procedure yielded the preactivated catalyst slurry for the main polymerization.

(3) Production of Polypropylene Composition (Main (Co) Polymerization of Propylene)

After nitrogen gas has been filled into a corrosion-resistant polymerization container having a stirring device attached to it and a volume f 500 liter, 240 liter n-hexane, 780 millimol triethylaluminum (organic metal compound (AL2)), 78 millimol di-isopropyldimethoxysilane (electron donor (E2)) and half of the preactivation treatment catalyst slurry obtained as described above were filled into the polymerization container at 20° C. Successively, 55 liter hydrogen are introduced into the polymerization container and the temperature was raised to 70° C. Then, at a polymerization temperature of 70° C., propylene was fed continuously for two hours into the polymerization container while the gas pressure inside the polymerization container was maintained at 0.79 MPa, so that the main polymerization of propylene was carried out.

After the polymerization time has passed, 1 liter methanol was introduced into the polymerization container and a catalyst deactivation reaction was executed for 15 min at 70° C. Successively, gas that has not reacted was exhausted, the solvent was separated and the polymer was dried, so that 40.1 kg polymer with an intrinsic viscosity $\eta_r$ of 1.97 dl/g were obtained.

The obtained polymer was a polypropylene composition containing 0.25 wt % polyethylene (A) corresponding to the component (a) due to the preactivation polymerization and the polypropylene component (b) had an intrinsic viscosity $\eta_P$ of 1.97 dl/g.

The melt strength (MS) of the obtained polypropylene composition was 4.9 cN.

100 weight parts of this polypropylene were mixed with 5 weight parts azo-dicarbonamide as foaming agent, 0.1 weight parts tetrakis[methylene-3-(3'-5'-di-t-butyl-4'-hydroxyphenol)propionate]methane and 0.1 weight parts calcium stearate, so as to obtain a resin composition. A 3 mm thick sheet was extruded while foaming the resin composition that is extruded at 210° C. into air with a T-die extrusion machine having a 40 mm diameter screw, so as to obtain a foam. The results are shown in Table 1.

EXAMPLE 2

A polypropylene composition was produced under the same conditions as Example 1. 100 weight parts of this polypropylene composition (C) were mixed with 0.1 weight parts tetrakis[methylene-3-(3'-5'-di-t-butyl-4'-hydroxyphenol)propionate]methane and 0.1 weight parts calcium stearate, melt kneading was performed at 230° C. using an extrusion granulation machine with 40 mm diameter so as to obtain a pellet-shaped composition.

This composition was fed into the feed opening of a T-die extrusion machine with 40 mm diameter, the cylinder temperature from a reversible portion to a foaming agent injection hole was set to 220° C., and melt kneading of the above pellet-shaped composition was performed under heat and pressure. Then, while injecting 20 weight parts dichlorodifluoromethane as foaming agent from a foaming agent injection hole into the above pellet-shaped composition, melt kneading is performed again, so as to attain a uniform dispersion. A sheet-shaped foam with a thickness of 3.0 mm was obtained by extrusion from a Tie into air at a resin temperature of 180° C. while foaming. The results are shown in Table 1.

EXAMPLE 3

A polypropylene composition was produced under the same conditions as Example 1. 100 weight parts of this polypropylene composition (C) were mixed with 0.1 weight parts tetrakis[methylene-3-(3'-5'-di-t-butyl-4'-hydroxyphenol)propionate]methane and 0.1 weight parts calcium stearate, melt kneading and granulation was performed at 230° C. using an extrusion granulation machine having a 40 mm diameter, so as to obtain a pellet-shaped composition. 100 weight parts of the obtained pellets, 250 weight parts water and 20 weight parts of the dichlorodifluoromethane as foaming agent were added to a sealed container. Then, the container was heated to 100° C.–150° C. while stirring and the temperature kept for 0.5 h. One side of the container was opened while maintaining a pressure inside the container of about 30 kg/cm², releasing a bead-shaped resin composition and water simultaneously into the atmosphere, and drying the bead-shaped resin composition.

The bead-shaped resin composition was left alone for 50 hours at regular pressure and temperature, then put into a pressure vessel, into which pressurized air was fed, and a 3.0 mm thick foam was produced by heat welding. The results are shown in Table 1.

TABLE 1

|  | Ex. 1 | Ex. 2 | Ex. 3 |
|---|---|---|---|
| Prel. Polymerization Polypropylene (B) |  |  |  |
| Int. Viscosity η (dl/g) | 2.8 | 2.8 | 2.8 |
| Formed Amount[1] (g/g) | 2.0 | 2.0 | 2.0 |
| Composition Ratio[2] (wt %) | 0.02 | 0.02 | 0.02 |
| Preactivation Polyethylene (A) |  |  |  |
| Int. Viscosity η (dl/g) | 34.0 | 34.0 | 34.0 |
| Formed Amount[1] (g/g) | 22.0 | 22.0 | 22.0 |
| Composition Ratio[2] (wt %) | 0.25 | 0.25 | 0.25 |
| Addition Polymerization Polypropylene (C) |  |  |  |
| Int. Viscosity η (dl/g) | 2.8 | 2.8 | 2.8 |
| Formed Amount[1] (g/g) | 2.0 | 2.0 | 2.0 |
| Composition Ratio[2] (wt %) | 0.02 | 0.02 | 0.02 |
| Polypropylene Composition |  |  |  |
| Int. Viscosity η (dl/g) | 1.97 | 1.97 | 1.97 |
| Melt Strength (MS) (cN) | 4.9 | 4.9 | 4.9 |
| Crystal. Temp. (Tc) (° C.) | 122.5 | 122.5 | 122.5 |
| MFR (g/10 min) | 3.5 | 3.5 | 3.5 |
| Weight Parts Used[3] |  |  |  |
| Azo-dicarbonamide | 5 |  |  |
| Dichlorodifluoromethane |  | 20 | 20 |
| (see Note[4]) |  |  |  |
| (see Note[5]) | 0.1 | 0.1 | 0.1 |
| Calcium Stearate | 0.1 | 0.1 | 0.1 |
| Foaming Properties |  |  |  |
| Odor | G | G | G |
| Expansion Ratio | 5 | 15 | 100 |
| Foam Appearance | Homog. Fine | Homog. Fine | Homog. Fine |

Notes:
[1]Amount formed per gram of transition metal compound catalyst component
[2]Composition ratio in polypropylene composition (in wt %)
[3]Weight parts with respect to 100 weight parts of the polypropylene composition
[4]2,5-dimethyl(2,5-di-t-buthylperoxy)hexane
[5]Tetrakis[methylene-3-(3'-5'-di-t-butyl-4'-hydroxyphenol)propionate]methane Comparative Example 1

Except for the modification of the polypropylene composition into a polypropylene homopolymer with an intrinsic viscosity η of 1.97 dl/g measured in 135° C. tetralin and a melt strength of 0.9 cN, a foam was obtained under the same conditions as in Example 1. The results are shown in Table 2.

Comparative Example 2

Except for the modification of the polypropylene composition into a polypropylene homopolymer with an intrinsic viscosity η of 1.97 dl/g measured in 135° C. tetralin and a melt strength of 0.9 cN, a foam was obtained under the same conditions as in Example 2. The results are shown in Table 2.

Comparative Example 3

Except for the modification of the polypropylene composition into a polypropylene homopolymer with an intrinsic viscosity η of 1.97 dl/g measured in 135° C. tetralin and a melt strength of 0.9 cN, a foam was obtained under the same conditions as in Example 3. The results are shown in Table 2.

Comparative Example 4

A polypropylene composition was produced under the same conditions as Example 1. 100 weight parts of this polypropylene were mixed with 5 weight parts azo-dicarbonamide as foaming agent, 0.2 weight parts 2,5-dimethyl(2,5-di-t-buthylperoxy)hexane as peroxide, 0.1 weight parts tetrakis[methylene-3-(3'-5'-di-t-butyl-4'-hydroxyphenol)propionate]methane and 0.1 weight parts calcium stearate, so as to obtain a resin composition. A 3 mm thick sheet was extruded while foaming the resin composition that has been extruded at 210° C. into air with a T-die extrusion machine having a 40 mm diameter screw, so as to obtain a foam. The results are shown in Table 2.

TABLE 2

|  | Comp. Ex. 1 | Comp. Ex. 2 | Comp. Ex. 3 | Comp. Ex. 4 |
|---|---|---|---|---|
| Prel. Polymerization Polypropylene (B) |  |  |  |  |
| Int. Viscosity η (dl/g) |  |  |  | 2.8 |
| Formed Amount[1] (g/g) |  |  |  | 2.0 |
| Composition Ratio[2] (wt %) |  |  |  | 0.02 |
| Preactivation Polyethylene (A) |  |  |  |  |
| Int. Viscosity η (dl/g) |  |  |  | 34.0 |
| Formed Amount[1] (g/g) |  |  |  | 22.0 |
| Composition Ratio[2] (wt %) |  |  |  | 0.25 |
| Addition Polymerization Polypropylene (C) |  |  |  |  |
| Int. Viscosity η (dl/g) |  |  |  | 2.8 |
| Formed Amount[1] (g/g) |  |  |  | 2.0 |
| Composition Ratio[2] (wt %) |  |  |  | 0.02 |
| Polypropylene Composition |  |  |  |  |
| Int. Viscosity η (dl/g) | 1.97 | 1.97 | 1.97 | 1.97 |
| Melt Strength (MS) (cN) | 0.9 | 0.9 | 0.9 | 4.9 |
| Crystal. Temp. (Tc) (° C.) | 120.3 | 120.3 | 120.3 | 122.5 |
| MFR (g/10 min) | 3.5 | 3.5 | 3.5 | 3.5 |
| Weight Parts Used[3] |  |  |  |  |
| Azo-dicarbonamide | 5 |  |  | 5 |
| Dichlorodifluoromethane |  | 20 | 20 |  |
| (see Note[4]) |  |  |  | 0.2 |
| (see Note[5]) | 0.1 | 0.1 | 0.1 | 0.1 |
| Calcium Stearate | 0.1 | 0.1 | 0.1 | 0.1 |

TABLE 2-continued

|  | Comp. Ex. 1 | Comp. Ex. 2 | Comp. Ex. 3 | Comp. Ex. 4 |
|---|---|---|---|---|
| Foaming Properties |  |  |  |  |
| Odor | G | G | G | N |
| Expansion Ratio | 1.8 | 3 | 9 | 60 |
| Foam Appearance | Inhom. Coarse | Inhom. Coarse | Inhom. Coarse | Inhom. Coarse |

Notes:
(1)Amount formed per gram of transition metal compound catalyst component
(2)Composition ratio in polypropylene composition (in wt %)
(3)Weight parts with respect to 100 weight parts of the polypropylene composition
(4)2,5-dimethyl(2,5-di-t-buthylperoxy)hexane
(5)Tetrakis[methylene-3-(3'-5'-di-t-buthyl-4'-hydroxyphenol)propionate]methane

Comparative Example 5

Except for a modification of the conditions for preactivation polymerization with ethylene wherein the amount (g/g) of polyethylene (A) formed per gram of transition metal compound catalyst component was changed from 22.0 to 0.005, a polypropylene polymer was prepared under the same conditions as in Example 1, and a foam was obtained therefrom. The results are shown in Table 3.

Comparative Example 6

Except for a modification of the conditions for preactivation polymerization with ethylene wherein the amount (g/g) of polyethylene (A) formed per gram of transition metal compound catalyst component was changed from 22.0 to 0.005, a polypropylene polymer was prepared under the same conditions as in Example 2, and a foam was obtained therefrom. The results are shown in Table 3.

Comparative Example 7

Except for a modification of the conditions for preactivation polymerization with ethylene wherein the amount (g/g) of polyethylene (A) formed per gram of transition metal compound catalyst component was changed from 22.0 to 0.005, a polypropylene polymer was prepared under the same conditions as in Example 3, and a foam was obtained therefrom. The results are shown in Table 3.

TABLE 3

|  | Comp. Ex. 5 | Comp. Ex. 6 | Comp. Ex. 7 |
|---|---|---|---|
| Prel. Polymerization |  |  |  |
| Polypropylene (B) |  |  |  |
| Int. Viscosity η (dl/g) | 2.8 | 2.8 | 2.8 |
| Formed Amount(1) (g/g) | 2.0 | 2.0 | 2.0 |
| Composition Ratio(2) (wt %) | 0.02 | 0.02 | 0.02 |
| Preactivation |  |  |  |
| Polyethylene (A) |  |  |  |
| Int. Viscosity η (dl/g) | 2.8 | 2.8 | 2.8 |
| Formed Amount(1) (g/g) | 0.005 | 0.005 | 0.005 |
| Composition Ratio(2) (wt %) | 0.0001 | 0.0001 | 0.0001 |
| Addition Polymerization |  |  |  |
| Polypropylene (C) |  |  |  |
| Int. Viscosity η (dl/g) | 2.8 | 2.8 | 2.8 |
| Formed Amount(1) (g/g) | 2.0 | 2.0 | 2.0 |
| Composition Ratio(2) (wt %) | 0.02 | 0.02 | 0.02 |
| Polypropylene Composition |  |  |  |
| Int. Viscosity η (dl/g) | 1.89 | 1.89 | 1.89 |
| Melt Strength (MS) (cN) | 1.0 | 1.0 | 1.0 |
| Crystal. Temp. (Tc) (° C.) | 117.0 | 117.0 | 117.0 |
| MFR (g/10 min) | 4.5 | 4.5 | 4.5 |
| Weight Parts Used(3) |  |  |  |
| Azo-dicarbonamide | 5 |  |  |
| Dichlorodifluoromethane |  | 20 | 20 |
| (see Note(4)) |  |  |  |
| (see Note(5)) | 0.1 | 0.1 | 0.1 |
| Calcium Stearate | 0.1 | 0.1 | 0.1 |
| Foaming Properties |  |  |  |
| Odor | G | G | G |
| Expansion Ratio | 2.25 | 4.5 | 12.9 |
| Foam Appearance | Homog. Coarse | Homog. Coarse | Homog. Coarse |

Notes:
(1)Amount formed per gram of transition metal compound catalyst component
(2)Composition ratio in polypropylene composition (in wt %)
(3)Weight parts with respect to 100 weight parts of the polypropylene composition
(4)2,5,-dimethyl(2,5-di-t-buthylperoxy)hexane
(5)Tetrakis[methylene-3-(3'-5'-di-t-buthyl-4'-hydroxyphenol)propionate]methane

EXAMPLE 4

(1) Preparation of Transition Metal Compound Catalyst Component 37.5 liter decane, 7.14 kg magnesium chloride anhydride and 35.1 liter 2-ethyl-1-hexanol were mixed in a corrosion-resistant reactor vessel having a stirring device attached to it, thermally reacted for 4 hours at 140° C. while stirring, and thus dissolved to obtain a homogenous solution. 1.67 kg phthalic anhydride was added to the homogenous solution, which was stirred and mixed for one hour at 130° C. to dissolve the phthalic anhydride.

After cooling the resulting homogenous solution down to room temperature (23° C.), all of the homogenous solution was trickled over a period of 3 hours into 200 liter titanium tetrachloride, which was maintained at −20° C. After the trickling, the solution was heated to 110° C. for 4 hours. When the temperature reached 110° C., 5.03 liter di-i-butyl phthalate were added and the mixture was stirred for 2 hours at 110° C. for reaction. After the 2 hour reaction, the solid portion was collected by heat filtration and resuspended in 275 liter titanium tetrachloride. Again, this was maintained at 110° C. for 2 hours for reaction.

After the reaction, the solid portion was collected again by heat filtration. The solid portion was washed with n-hexane sufficiently, until no more free titanium was detected in the rinsing liquid. Subsequently, the solvent was separated by filtration, and the solid portion was dried under reduced pressure to obtain a support type titanium catalyst component (transition metal compound catalyst component) containing 2.4 wt % titanium.

(2) Preparation of Preactivated Catalyst

After nitrogen gas has been filled into a corrosion-resistant reaction vessel having tilted mixing blades and a volume of 30 liter, 18 liter n-hexane, 60 millimol triethylaluminum (organic metal compound (AL1)) and 150 g of the titanium-containing support type catalyst component (75.16 millimol in terms of titanium atoms) prepared as described in the previous paragraph were added to the container. Then, 210 g propylene was added and prepolymerization was performed for 20 min at −1° C.

When the polymer formed in another prepolymerization performed under the same conditions was analyzed, it was found that per gram of the titanium-containing support type catalyst component 1.2 g propylene turned into polypropylene (B), and the intrinsic viscosity $\eta_B$ of the polypropylene (B) measured in tetralin at 135° C. was 2.7 dl/g.

After the reaction time has passed, the propylene which has not yet reacted was taken from the reaction vessel and the gaseous contents of the reaction vessel was filled once with nitrogen. Then, while the reaction container was kept at a temperature of −1° C., ethylene was fed continuously over a period of 3 hours to the reaction vessel, so as to maintain a pressure of 0.59 MPa inside the reaction vessel, and thus second stage prepolymerization was performed.

When the polymer formed in another preactivation performed under the same conditions was analyzed, it was found that per gram of the titanium- containing support type catalyst component 33.2 g polymer were present and the intrinsic viscosity $\eta_{T2}$ of the polymer measured in tetralin at 135° C. was 29.2 dl/g.

It follows from these results, that the amount of polyethylene (A) newly formed by preactivation polymerization with ethylene was 32 g per gram of titanium-containing support type catalyst component and the intrinsic viscosity $\eta_A$ was 30.2 dl/g.

After the reaction time has passed, the ethylene which has not yet reacted was taken from the reaction vessel and the gaseous contents of the reaction vessel was filled once with nitrogen. Then, 22.5 millimol di-isopropyldimethoxysilane (electron donor (E1)) were added to the reaction vessel, 385 g propylene were added and a temperature of 0° C. was maintained for 20 min, so that addition polymerization was performed after the preliminary activation treatment. After the reaction time has passed, the propylene which has not yet reacted was taken from the reaction vessel and the gaseous contents of the reaction vessel was filled once with nitrogen. The above procedure yielded the preactivated catalyst slurry for the main (co)polymerization.

When the polymer formed in another addition polymerization performed under the same conditions was analyzed, it was found that per gram of the titanium-containing support type catalyst component 35 g polymer were present and the intrinsic viscosity $\eta_{T3}$ of the polymer measured in tetralin at 135° C. was 27.8 dl/g.

It follows from these results, that the amount of polypropylene (B) newly formed by addition polymerization was 2.2 g per gram of titanium-containing support type catalyst component and the intrinsic viscosity $\eta_D$ was 2.8 dl/g.

(3) Production of Polypropylene Composition (Main (Co) Poly-merization of Propylene)

After nitrogen gas has been filled into a continuous horizontal gas phase polymerization container (length/ diameter=3.7) having a stirring device attached to it and a volume of 110 liter, 25 kg polypropylene powder were introduced into the container. Furthermore, 0.61 g/h of the preactivated catalyst slurry as the supported titanium catalyst component and 15 wt % n-hexane solution of triethyl aluminum (organic metal compound (AL2)) and di-isopropyldimethoxysilane (electron donor (E2)) were continuously supplied so that the respective molar ratios became 90 and 15 based on the titanium atoms in the titanium-containing support type catalyst component.

Under a polymerization temperature of 70° C., hydrogen was supplied so as to attain a hydrogen/propylene ratio of 0.006 in the polymerization container. Propylene was supplied so as to maintain a pressure of 2.15 MPa inside the polymerization container to perform gas phase polymerization of the propylene continuously for 150 hours.

During the polymerization period, polymer was obtained from the polymerization container at a rate of 11 kg/h so as to maintain the polymer level in the polymerization container at 60 vol %.

The received polymer was submitted to contact treatment with a nitrogen gas containing 5 vol % of water vapor at 100° C. for 30 minutes to obtain a polymer having an intrinsic viscosity $\eta_T$ of 1.80 dl/g. The ratio of polyethylene (A) generated by the preliminary activating treatment in the polymer was 0.18 wt % and the intrinsic viscosity $\eta_P$ of polypropylene component (b) was 1.80 dl/g.

The melt strength (MS) of the obtained polypropylene composition was 2.5 cN.

100 weight parts of this polypropylene composition were mixed with 2 weight parts vinyl(β-methoxyethoxy)silane as peroxide, 5 weight parts azo-dicarbonamide as foaming agent, 0.1 weight parts tetrakis[methylene-3-(3'-5'-di-t-butyl-4'-hydroxyphenol)propionate]methane and 0.1 weight parts calcium stearate. Using this mixture, a sheet of 3 mm thickness was extruded at a resin temperature of 170° C. using a T-die extrusion machine with a screw diameter of 40 mm. A 3 Mrad electron beam was irradiated onto this sheet by a 4 MeV 200 mA linear electron beam accelerator. Then, the sheet was foamed in an oven at 230° C. to obtain a foam. The results are shown in Table 4.

EXAMPLE 5

A polypropylene composition was produced using the same conditions as in Example 4. 100 weight parts of this polypropylene composition (C) were mixed with 5 weight parts azodicarbonamide as foaming agent, 0.1 weight parts tetrakis[methylene-3-(3'-5'-di-t-butyl-4'-hydroxyphenol) propionate]methane and 0.1 weight parts calcium stearate. While foaming this mixture, a sheet of 3 mm thickness was extruded at a resin temperature of 210° C. into air using a T-die extrusion machine with a screw diameter of 40 mm, so as to obtain a foam. The results are shown in Table 4.

EXAMPLE 6

A polypropylene composition was produced using the same conditions as in Example 4. 100 weight parts of this polypropylene composition (C) were mixed with 0.1 weight parts tetrakis[methylene-3-(3'-5'-di-t-butyl-4'-hydroxyphenol)propionate]methane and 0.1 weight parts calcium stearate. Melt kneading was performed at 230° C. using an extrusion pelletizer with 40 mm diameter to obtain a pellet-shaped composition.

This composition was fed into the feed opening of a T-die extrusion machine with 40 mm diameter, the cylinder temperature from a reversible portion to a foaming agent injection hole was set to 220° C., and melt kneading of the above pellet-shaped composition was performed under heat and pressure. Then, while injecting 20 weight parts dichlorodifluoromethane as foaming agent from a foaming agent injection hole into the above pellet-shaped composition, melt kneading is performed again, so as to attain a uniform dispersion. A sheet-shaped foam with a thickness of 3.0 mm was obtained by extrusion from a T-die into air at a resin temperature of 180° C. while foaming. The results are shown in Table 4.

EXAMPLE 7

A polypropylene composition was produced using the same conditions as in Example 4. 100 weight parts of this polypropylene composition (C) were mixed with 0.1 weight parts tetrakis[methylene-3-(3'-5'-di-t-butyl-4'-hydroxyphenol)propionate]methane and 0.1 weight parts calcium stearate. Melt kneading and granulation was performed at 230° C. using an extrusion pelletizer with 40 mm diameter to obtain a pellet-shaped polypropylene composition. 100 weight parts of the resulting pellets, 250 weight parts water and 20 weight parts of the dichlorodifluoromethane as foaming agent were added to a sealed container. Then, the container was heated to 100° C.–150° C. while stirring and the temperature kept for 0.5 h. One side of the container was opened while maintaining a pressure inside the container of about 30 kg/cm$^2$, releasing a bead-shaped resin composition and water simultaneously into the atmosphere, and the bead-shaped resin composition was dried.

The bead-shaped resin composition was left alone for 50 hours at regular pressure and temperature, then added to a pressure vessel, into which pressurized air was fed, and a 3.0 mm thick foam was produced by heat welding. The results are shown in Table 4.

TABLE 4

|  | Ex. 5 | Ex. 6 | Ex. 7 |
|---|---|---|---|
| Prel. Polymerization Polypropylene (B) | | | |
| Int. Viscosity η (dl/g) | 2.7 | 2.7 | 2.7 |
| Formed Amount[1] (g/g) | 1.2 | 1.2 | 1.2 |
| Composition Ratio[2] (wt %) | 0.01 | 0.01 | 0.01 |
| Preactivation Polyethylene (A) | | | |
| Int. Viscosity η (dl/g) | 30.2 | 30.2 | 30.2 |
| Formed Amount[1] (g/g) | 32.0 | 32.0 | 32.0 |
| Composition Ratio[2] (wt %) | 0.18 | 0.18 | 0.18 |
| Addition Polymerization Polypropylene (C) | | | |
| Int. Viscosity η (dl/g) | 2.8 | 2.8 | 2.8 |
| Formed Amount[1] (g/g) | 2.2 | 2.2 | 2.2 |
| Composition Ratio[2] (wt %) | 0.01 | 0.01 | 0.01 |
| Polypropylene Composition | | | |
| Int. Viscosity η (dl/g) | 1.80 | 1.80 | 1.80 |
| Melt Strength (MS) (cN) | 2.5 | 2.5 | 2.5 |
| Crystal. Temp. (Tc) (° C.) | 122.0 | 122.0 | 122.0 |
| MFR (g/10 min) | 6.0 | 6.0 | 6.0 |
| Weight Parts Used[3] | | | |
| Azo-dicarbonamide | 5 | | |
| Dichlorodifluoromethane | | 20 | 20 |
| (see Note[4]) | | | |
| (see Note[5]) | 0.1 | 0.1 | 0.1 |
| Calcium Stearate | 0.1 | 0.1 | 0.1 |
| Foaming Properties | | | |
| Odor | G | G | G |
| Expansion Ratio | 2.25 | 4.5 | 12.9 |
| Foam Appearance | Homog. Coarse | Homog. Coarse | Homog. Coarse |

Notes:
[1]Amount formed per gram of transition metal compound catalyst component
[2]Composition ratio in polypropylene composition (in wt %)
[3]Weight parts with respect to 100 weight parts of the polypropylene composition
[4]2,5-dimethyl(2,5-di-t-buthylperoxy)hexane
[5]Tetrakis[methylene-3-(3'-5'-di-t-buthyl-4'-hydroxyphenol)propionate] methane

EXAMPLE 8

A polypropylene composition was produced in the same way as in Example 1. The obtained polymer was a polypropylene composition containing 0.25 wt % polyethylene (A) corresponding to the component (a) due to the preactivation polymerization and the polypropylene component (b) with an intrinsic viscosity $\eta_P$ of 1.97 dl/g. The melt strength (MS) of the obtained polypropylene composition was 4.9 cN.

100 weight parts of this polypropylene were mixed with 0.3 weight parts azo-dicarbonamide as foaming agent, 0.1 weight parts tetrakis[methylene-3-(3'-5'-di-t-butyl-4'-hydroxyphenol)propionate]methane as antioxidant and 0.1 weight parts calcium stearate, so as to obtain a resin composition. A 2.6 mm thick sheet was extruded while foaming the resin composition that has been extruded at 210° C. into air with a T-die extrusion machine having a 40 mm diameter screw, so as to obtain a foam. This foam was used as an intermediate layer and both sides of the foam were covered with adhesive olefin polymer films (with 50 μm film thickness). Then it was sandwiched between two aluminum boards (with 200 μm board thickness) as surface metal layers, heat pressed for 3 min at 140° C. and cooled to obtain the layered article of the present invention. The results are shown in Table. 5.

EXAMPLE 9

A layered article was obtained under the same conditions as in Example 8 except that the amount of azo-dicarbonamide added as foaming agent was changed to 1.0 weight parts. The results are shown in Table 5.

Comparative Example 8

Except for the modification of the polypropylene composition into a polypropylene homopolymer with an intrinsic viscosity η of 1.97 dl/g measured in 135° C. tetralin and a melt strength of 0.9 cN, a layered article was obtained under the same conditions as in Example 8. The results are shown in Table 6.

EXAMPLE 10

A polypropylene composition was produced in the same way as in Example 1. The obtained polymer had an intrinsic viscosity $\eta_T$ of 1.80 dl/g and contained 0.18 wt % polyethylene (A) formed by preactivation treatment in the polymer and the polypropylene component (b) had an intrinsic viscosity $\eta_P$ of 1.80 dl/g. The melt strength (MS) of the obtained polypropylene composition was 2.5 cN.

100 weight parts of this polypropylene composition were mixed with 2 weight parts vinyl(β-methoxyethoxy)silane as peroxide, 0.3 weight parts azo-dicarbonamide as foaming agent, 0.1 weight parts tetrakis[methylene-3-(3'-5'-di-t-butyl-4'-hydroxyphenol)propionate]methane as antioxidant and 0.1 weight parts calcium stearate. A 2.6 mm thick sheet was extruded while foaming the resin composition that has been extruded at 210° C. resin temperature into air with a T-die extrusion machine having a 40 mm diameter screw, so as to obtain a foam. This foam was used as an intermediate layer and both sides of the foam were covered with adhesive olefin polymer films (with 50 μm film thickness). Then it was sandwiched between two aluminum boards (with 200 μm board thickness) as surface metal layers, heat pressed for 3 min at 140° C. and cooled to obtain the layered article of the present invention. The results are shown in Table 5.

TABLE 5

|  | Ex. 8 | Ex. 9 | Ex. 10 |
|---|---|---|---|
| Prel. Polymerization Polypropylene (B) | | | |
| Int. Viscosity η (dl/g) | 2.8 | 2.8 | 2.7 |
| Formed Amount[1] (g/g) | 2.0 | 2.0 | 1.2 |
| Composition Ratio[2] (wt %) | 0.02 | 0.02 | 0.01 |
| Preactivation Polyethylene (A) | | | |
| Int. Viscosity η (dl/g) | 34.0 | 34.0 | 30.2 |
| Formed Amount[1] (g/g) | 22.0 | 22.0 | 32.0 |
| Composition Ratio[2] (wt %) | 0.25 | 0.25 | 0.18 |
| Addition Polymerization Polypropylene (C) | | | |
| Int. Viscosity η (dl/g) | 2.8 | 2.8 | 2.8 |
| Formed Amount[1] (g/g) | 2.0 | 2.0 | 2.2 |
| Composition Ratio[2] (wt %) | 0.02 | 0.02 | 0.01 |
| Polypropylene Composition | | | |
| Int. Viscosity η (dl/g) | 1.97 | 1.97 | 1.80 |
| Melt Strength (MS) (cN) | 4.9 | 4.9 | 2.5 |
| Crystal. Temp. (Tc) (° C.) | 122.5 | 122.5 | 122.0 |
| MFR (g/10 min) | 3.5 | 3.5 | 6.0 |
| Weight Parts Used[3] | | | |
| Azo-dicarbonamide (see Note[4]) | 0.3 | 1.0 | 0.3 |
|  | 0.1 | 0.1 | 0.1 |
| Calcium Stearate | 0.1 | 0.1 | 0.1 |
| Foaming Properties | | | |
| Expansion Ratio | 1.5 | 2.5 | 1.35 |
| Foam Appearance | Homog. Fine | Homog. Fine | Homog. Fine |
| Layered Prod. Properties Outer Appearance | G | G | G |

Notes:
[1]Amount formed per gram of transition metal compound catalyst component
[2]Composition ratio in polypropylene composition (in wt %)
[3]Weight parts with respect to 100 weight parts of the polypropylene composition
[4]Tetrakis[methylene-3-(3'-5'-di-t-buthyl-4'-hydroxyphenol)propionate]methane

Comparative Example 9

Except for the modification of the polypropylene composition into a polypropylene homopolymer with an intrinsic viscosity η of 1.97 dl/g measured in 135° C. tetralin and a melt strength of 0.9 cN, a layered article was obtained under the same conditions as in Example 9. The results are shown in Table 6.

Comparative Example 10

Except for a modification of the conditions for preactivation polymerization with ethylene wherein the amount (g/g) of polyethylene (A) formed per gram of transition metal compound catalyst component was changed from 22.0 to 0.005, a polypropylene polymer was prepared under the same conditions as in Example 8, and a layered article was obtained therefrom. The results are shown in Table 6.

Comparative Example 11

Except for a modification of the conditions for preactivation polymerization with ethylene wherein the amount (g/g) of polyethylene (A) formed per gram of transition metal compound catalyst component was changed from 22.0 to 0.005, a polypropylene polymer was prepared under the same conditions as in Example 9, and a layered article was obtained therefrom. The results are shown in Table 6.

TABLE 6

|  | Comp. Ex. 8 | Comp. Ex. 9 | Comp. Ex. 10 | Comp. Ex. 11 |
|---|---|---|---|---|
| Prel. Polymerization Polypropylene (B) | | | | |
| Int. Viscosity η (dl/g) | — | — | 2.8 | 2.8 |
| Formed Amount[1] (g/g) | — | — | 2.0 | 2.0 |
| Composition Ratio[2] (wt %) | — | — | 0.02 | 0.02 |
| Preactivation Polyethylene (A) | | | | |
| Int. Viscosity η (dl/g) | — | — | 2.8 | 2.80 |
| Formed Amount[1] (g/g) | — | — | 0.005 | 0.005 |
| Composition Ratio[2] (wt %) | — | — | 0.0001 | 0.0001 |
| Addition Polymerization Polypropylene (C) | | | | |
| Int. Viscosity η (dl/g) | — | — | 2.8 | 2.8 |
| Formed Amount[1] (g/g) | — | — | 2.0 | 2.0 |
| Composition Ratio[2] (wt %) | — | — | 0.02 | 0.02 |
| Polypropylene Composition | | | | |
| Int. Viscosity η (d/g) | 1.97 | 1.97 | 1.89 | 1.89 |
| Melt Strength (MS) (cN) | 0.9 | 0.9 | 1.0 | 1.0 |
| Crystal. Temp. (Tc) (° C.) | 120.3 | 120.3 | 117.0 | 117.0 |
| MFR (gl/10 min) | 3.5 | 3.5 | 4.5 | 4.5 |
| Weight Parts Used[3] | | | | |
| Azo-dicarbonamide (see Note[4]) | 0.3 | 1.0 | 0.3 | 1.0 |
|  | 0.1 | 0.1 | 0.1 | 0.1 |
| Calcium Stearate | 0.1 | 0.1 | 0.1 | 0.1 |
| Foaming Properties | | | | |
| Expansion Ratio | 1.2 | 1.4 | 1.35 | 1.80 |
| Foam Appearance | Inhom. Coarse | Inhom. Coarse | Inhom. Coarse | Inhom. Coarse |
| Layered Prod. Properties Outer Appearance | N | N | N | N |

Notes:
[1]Amount formed per gram of transition metal compound catalyst component
[2]Composition ratio in polypropylene composition (in wt %)
[3]Weight parts with respect to 100 weight parts of the polypropylene composition
[4]Tetrakis[methylene-3'-5'-di-t-buthyl-4'-hydroxyphenol)propionate]methane

EXAMPLE 11

A polypropylene composition was produced in the same way as in Example 1. The obtained polymer was a polypropylene composition containing 0.25 wt % polyethylene (A) corresponding to the component (a) due to the preactivation polymerization and the polypropylene component (b) had an intrinsic viscosity $\eta_P$ of 1.97 dl/g.

100 weight parts of the obtained polypropylene composition were mixed for 2 min using a Henschel mixer with 0.1 weight parts tetrakis[methylene-3-(3'-5'-di-t-butyl-4'-hydroxyphenol)propionate]methane and 0.1 weight parts calcium stearate, in addition to 0.25 weight parts silica and 0.10 weight parts erucic acid amide having an average particle size of 1.7 μm. The blend was granulated and pelletized at 230° C. using an extrusion pelletizer with a screw diameter of 65 mm to obtain pellets. When various physical properties of the pellets were measured, it was found that the melt flow rate was 3.5 g/10 min, the crystallization temperature was 122.5° C. and the melt strength (MS) was 4.9 cN.

Using the obtained pellets, a non-stretched film of 15 μm target thickness was produced at a retrieval rate of 200 m/min using a single layer T-die device with a 100 mm diameter screw, whose T-die has an opening length of 1 m and a lip opening width of 1.0 mm, at a temperature of the molten propylene polymer composition of 250° C. and a chillroll water temperature of 20° C. The chillroll temperature at the time of film production was 40° C. and the productivity of the obtained film had the rank "7". The results are shown in Table 7.

EXAMPLE 12 AND COMPARATIVE EXAMPLE 12

Except that in Example 12 the preactivation polymerization with ethylene was performed for 25 min, and in Comparative Example 12 it was performed in 0.03 min and the formed amount of ethylene polymer (a) was changed, a propylene polymer composition was produced under the same conditions as in Example 11. The propylene polymer composition was pelletized and samples for the evaluation of Example 12 and Comparative Example 12 were prepared.

The properties of the obtained propylene polymer composition and the productivity of a film produced from the pellets using the same processing conditions as in Example 11 are shown in Table 7.

Comparative Example 13

A propylene polymer composition was produced using the same conditions as in Example 11, except that instead of the preactivation polymerization with ethylene in item (2), a total of 220 g propylene is fed in three portions to the reaction container, 80 g at the beginning of the preactivation polymerization, 80 g about 30 min after the begin and 60 g about one hour after the beginning of the preactivation polymerization. The propylene polymer composition was pelletized and samples were prepared for the evaluation of Comparative Example 13.

The properties of the obtained propylene polymer composition and the productivity of a film produced from the pellets using the same processing conditions as in Example 11 are shown in Table 7.

Comparative Example 14

A propylene polymer composition was produced using the same conditions as in Example 11, except that a preactivation polymerization by the ethylene of a titanium-containing support type catalyst component has not been performed. A sample for the evaluation of Comparative Example 14 was prepared from the resulting propylene polymer composition. The properties of the obtained propylene polymer composition and the productivity of a film produced from the pellets using the same processing conditions as in Example 11 are shown in Table 7.

Comparative Example 15

After nitrogen gas has been filled into a reaction vessel having tilted mixing blades, 10 kg of a propylene homopolymer powder with an intrinsic viscosity η of 1.67 dl/g and an average particle size of 150 μm, which has been obtained by slurry-polymerization of propylene in n-hexane using a catalyst combining a titanium-containing catalyst component comprising a titanium-trichloride composition with diethylaluminumchloride and diethyleneglycoldimethylether as a third component, were filled into the reactor vessel. Successively, the procedure of evacuating the reactor vessel and refilling it with nitrogen gas up to atmospheric pressure was repeated ten times. Then, 0.35 mol di-2-ethylhexylperoxydicarbonate (modifier) in a toluene solution of 70 wt % concentration was added and mixed under the nitrogen gas atmosphere at 25° C. while stirring. Then, the temperature in the reactor vessel was raised to 120° C. and reaction took place at this temperature for 30 min. After the reaction time had passed, the temperature inside the reactor vessel was raised to 135° C. and an after-treatment was performed at this temperature for 30 min. After the after-treatment, the reactor vessel was cooled down to room temperature and opened to retrieve the propylene polymer.

100 weight parts of the obtained propylene polymer were mixed for 2 min using a Henschel mixer with 0.1 weight parts tetrakis[methylene-3-(3'-5'-di-t-butyl-4'-hydroxyphenol)propionate]methane and 0.1 weight parts calcium stearate, in addition to 0.25 weight parts silica and 0.10 weight parts erucic acid amide having an average particle size of 1.7 μm. The blend was granulated and pelletized at 230° C. using an extrusion pelletizer with a screw diameter of 65 mm and samples were prepared for the evaluation of Comparative Example 15.

Using the obtained pellets, a non-stretched film of 15 μm target thickness was produced at a retrieval rate of 200 m/min using a single layer T-die device with a 110 mm diameter screw, whose T-die has an opening length of 1 m and a lip opening width of 1.0 mm, at a temperature of the molten propylene polymer composition of 250° C. and a chillroll water temperature of 20° C. The chillroll temperature at the time of film production was 40° C. and the productivity of the obtained film had the rank "5". The results are shown in Table 7.

TABLE 7

|  |  | Examples | | Comparative Examples | | | |
|---|---|---|---|---|---|---|---|
|  |  | 11 | 12 | 12 | 13 | 14 | 15 |
| Prel. Polymerization Propylene Polymer (B) | | | | | | | |
| Int. Viscosity η | (dl/g) | 2.8 | 2.8 | 2.8 | 2.8 | 2.8 | — |
| Formed Amount[1] | (g/g) | 2.0 | 2.0 | 2.0 | 2.0 | 2.0 | — |
| Composition Ratio[2] | (wt %) | 0.02 | 0.02 | 0.02 | 0.02 | 0.02 | — |
| Preactivation Olefin Polymer (A) | | | | | | | |
| Int. Viscosity η | (dl/g) | 34.0 | 34.4 | 34.0 | 2.8 | — | — |
| Formed Amount[1] | (g/g) | 22.0 | 4.5 | 0.005 | 22.0 | — | — |
| Composition Ratio[2] | (wt %) | 0.25 | 0.05 | 0.0001 | 0.25 | — | — |
| Addition Polymerization Propylene Polymer (C) | | | | | | | |
| Int. Viscosity η | (dl/g) | 2.8 | 2.8 | 2.8 | 2.8 | 2.8 | — |

TABLE 7-continued

|  |  | Examples | | Comparative Examples | | | |
| --- | --- | --- | --- | --- | --- | --- | --- |
|  |  | 11 | 12 | 12 | 13 | 14 | 15 |
| Formed Amount[1] | (g/g) | 2.0 | 2.0 | 2.0 | 2.0 | 2.0 | — |
| Composition Ratio[2] | (wt %) | 0.02 | 0.02 | 0.02 | 0.02 | 0.02 | — |
| Propylene Polym. Composition |  |  |  |  |  |  |  |
| Int. Viscosity η | (dl/g) | 1.97 | 1.92 | 1.89 | 1.89 | 1.89 | 1.68 |
| Melt Strength (MS) | (cN) | 4.9 | 2.0 | 1.0 | 0.8 | 0.8 | 7.2 |
| Crystal. Temp. (Tc) | (° C.) | 122.5 | 121.3 | 117.0 | 116.2 | 116.0 | 129.4 |
| Film Properties |  |  |  |  |  |  |  |
| Expandability |  | ○ | ○ | ○ | ○ | x | ○ |
| Neck-In Length |  | 38 | 59 | 110 | 150 | 150 | 150 |
| Outer Appearance |  | ○ | ○ | ○ | x (irreg.) | x (irreg.) | ○ |
| Productivity Rank |  | 7 | 6 | 5 | 3 | 1 | 5 |

Notes:
[1]Amount (in g) formed per gram of transition metal compound catalyst component
[2]Composition ratio in propylene polymer composition (in wt %)

EXAMPLE 13

A polypropylene composition was produced in the same manner as in Example 4. The intrinsic viscosity $\eta_T$ of the resulting polymer was 1.80 dl/g.

The ratio of ethylene polymer (A) generated by the preactivation in the polymer was 0.18 wt % and the intrinsic viscosity $\eta_P$ of the propylene polymer was 1.80 dl/g.

Successively, granulation was performed in an extrusion pelletizer under the same conditions as in Example 11 to obtain polymer pellets. When various physical properties of the pellets were measured, it was found that the melt flow rate was 6.0 g/10 min, the crystallization temperature was 122.0° C. and the melt strength (MS) was 2.5 cN.

Moreover, a film was produced from the resulting pellets with the T-die method under the same conditions as in Example 11 to obtain a propylene polymer film. The resulting film productivity had the rank "6". The results are shown in Table 8.

Comparative Example 16

A polymer was produced using the same conditions as in Example 13, except that a preactivation polymerization by ethylene has not been performed. A sample was prepared for the evaluation of Comparative Example 16.

The results of the analysis of the obtained polymer and the film productivity are shown in Table 8.

EXAMPLE 14
(1) Preparation of Transition Metal Compound Catalyst Component

A titanium-containing support type catalyst component was obtained under the same conditions as in Example 13.
(2) Preparation of Preactivated Catalyst A preactivated catalyst slurry was prepared under the same conditions as in Example 13, except that the conditions for preactivation polymerization with ethylene were changed in the following way: In addition to ethylene, 30 g propylene was fed at a reaction temperature of 0° C., and the reaction time was 45 min.

When the catalyst from another preactivation treatment performed under the same conditions was analyzed, it was found that per gram of the titanium-containing support type catalyst component 21.5 g polymer were present, the intrinsic viscosity $\eta_{T2}$ of the polymer measured in tetralin at 135° C. was 23.2 dl/g and per gram of the titanium-containing support type catalyst component 22 g ethylene-propylene random copolymer (A) with an intrinsic viscosity $\eta_A$ of 22.5 dl/g including 7.0 wt % propylene units (determined by $^{13}$C-NMR) were formed due to preactivation treatment.

When the polymer obtained from an addition polymerization after yet another preactivation treatment performed under the same conditions was analyzed, it was found that per gram of the titanium-containing support type catalyst component 25.3 g polymer were present, the intrinsic viscosity $\eta_{T3}$ of the polymer measured in tetralin at 135° C. was 19.9 dl/g, and per gram of the titanium-containing support type catalyst component 2.1 g polymer with an intrinsic viscosity $\eta_C$ of 2.2 dl/g were newly formed due to addition polymerization.

(3) Production of Propylene Polymer Composition and Film (Actual Polymerization of Propylene)

Gas phase polymerization was performed continuously for 150 h under the same conditions as in Example 13 paragraph (3), except that the preactivated catalyst slurry obtained according to the above paragraph (2) was used as the preactivated catalyst slurry, the ratio of hydrogen concentration and propylene concentration in the polymerization container was set to 0.012, and ethylene was fed continuously in addition to propylene into the polymerization container so as to maintain a ratio to the propylene concentration of 0.003 inside the polymerization container. Thus, a polymer having an intrinsic viscosity $\eta_T$ of 1.54 dl/g and containing 0.8 wt % ethylene units was obtained at a rate of 11.6 kg/h.

The polymer contained 0.12 wt % ethylene-propylene random copolymer (A) formed by preactivation treatment in the polymer, and the propylene-ethylene copolymer had an intrinsic viscosity $\eta_P$ of 1.54 dl/g.

Propylene polymer composition pellets were obtained by granulation with an extrusion machine in the same manner as in paragraph (3) of Example 11. When various physical properties of the pellets were measured, it was found that the melt flow rate was 15.4 g/10 min, the crystallization temperature was 121.2° C. and the melt strength (MS) was 1.4 cN. Moreover, a film was produced from the resulting pellets with the T-die method under the same conditions as in Example 11 to obtain a propylene polymer film. The resulting film productivity had the rank "6". The results are shown in Table 8.

Comparative Example 17

A propylene polymer composition was produced using the same conditions as in Example 14, except that a preactivation treatment with ethylene and propylene has not been performed. A sample was prepared for the evaluation of Comparative Example 17.

The results of the analysis of the obtained polymer and the film productivity are shown in Table 8.

Comparative Example 18

Omitting the prepolymerization and the addition polymerization with propylene in paragraph (2) of Example 11, only preactivation polymerization with ethylene was performed. 1 liter methanol was added to the obtained preactivated catalyst slurry and a catalyst deactivation reaction was performed for one hour at 70° C. After the reaction, ethylene polymer was filter-separated from the slurry and dried under reduced pressure to obtain 200 g ethylene polymer with an intrinsic viscosity $\eta_A$ of 32.5 dl/g.

20 kg of the propylene polymer obtained by main polymerization with propylene with omission of preactivation polymerization with ethylene and addition polymerization with propylene in paragraph (2) of Example 11 were mixed with 50 g ethylene polymer prepared as described above. This blend was mixed for 2 min using Henschel mixer of 100 liter volume with 20 g tetrakis[methylene-3-(3'-5'-di-t-butyl-4'-hydroxyphenol)propionate]methane and 20 g calcium stearate, in addition to 50 g silica and 20 g erucic acid amide having an average particle size of 1.7 μm. The blend was granulated 230° C. using an extrusion pelletizer with a screw diameter of 65 mm to obtain pellets, and a sample was prepared for the evaluation of Comparative Example 18.

The various physical properties of the pellets included an intrinsic viscosity $\eta_T$ of 1.97 dl/g, a melt flow rate of 3.5 g/10 min, a crystallization temperature of 116.2° C. and a melt strength (MS) of 1.0 cN.

Using the obtained pellets, a non-stretched film of 15 μm target thickness was produced at a retrieval rate of 200 m/min using a single layer T-die device with a 110 mm diameter screw, whose T-die has an opening length of 1 m and a lip opening width of 1.0 mm, at a temperature of the molten propylene polymer composition of 250° C. and a chillroll water temperature of 20° C. The chillroll temperature at the time of film production was 40° C. and the productivity of the obtained film had the rank "3". The results are shown in Table 8.

TABLE 8

| | | Example | | Comparative Example | | |
|---|---|---|---|---|---|---|
| | | 13 | 14 | 16 | 17 | 18[3] |
| Prel. Polymerization Propylene Polymer (B) | | | | | | |
| Int. Viscosity η | (dl/g) | 2.7 | 2.7 | 2.7 | 2.7 | — |
| Formed Amount[1] | (g/g) | 1.2 | 1.2 | 1.2 | 1.2 | — |
| Composition Ratio[2] | (wt %) | 0.01 | 0.01 | 0.01 | 0.01 | — |
| Preactivation Ethylene Polymer (A) | | | | | | |
| Int. Viscosity η | (dl/g) | 30.2 | 22.5 | — | — | 32.5 |
| Formed Amount[1] | (g/g) | 32.0 | 22.0 | — | — | — |
| Composition Ratio[2] | (wt %) | 0.18 | 0.12 | — | — | 0.25 |
| Addition Polymerization Propylene Polymer (C) | | | | | | |
| Int. Viscosity η | (dl/g) | 2.8 | 2.2 | 2.8 | 2.2 | — |
| Formed Amount[1] | (g/g) | 2.2 | 2.1 | 2.2 | 2.1 | — |
| Composition Ratio[2] | (wt %) | 0.01 | 0.01 | 0.01 | 0.01 | — |
| Propylene Polym. Composition | | | | | | |
| Int. Viscosity η | (dl/g) | 1.80 | 1.54 | 1.75 | 1.52 | 1.97 |
| Melt Strength (MS) | (cN) | 2.5 | 1.4 | 0.6 | 0.3 | 1.0 |
| Crystal. Temp. (Tc) | (° C.) | 122.0 | 121.2 | 116.1 | 115.2 | 116.2 |
| Film Properties | | | | | | |
| Expandability | | ○ | ○ | ○ | ○ | ○ |
| Neck-In Length | | 48 | 85 | 170 | 190 | 120 |
| Outer Appearance | | ○ | ○ | ○ | x (irr.)[4] | x FE[4] |
| Productivity Rank | | 6 | 6 | 5 | 3 | 3 |

Notes:
[1] Amount (in g) formed per gram of transition metal compound catalyst component
[2] Composition ratio in propylene polymer composition (in wt %)
[3] Simple mechanical mixture of ethylene polymer (A) and main polymerization propylene polymer
[4] Irr. = transparency irregularities, FE = fish-eye

EXAMPLES 15, 16 AND COMPARATIVE EXAMPLES 19, 20, 21

A polymer was prepared and a film produced under the same conditions as in Example 11, except for the modifications to the T-die method in paragraph (3) of Example 11 concerning the temperature of the molten propylene polymer composition and the water flow temperature in the chillroll as shown in Table 9.

The properties of the obtained film and the temperatures of the molten propylene polymer composition and the chill-roll are shown Table 9.

TABLE 9

|  |  | Example | | | Comparative Example | | |
| --- | --- | --- | --- | --- | --- | --- | --- |
|  |  | 11 | 15 | 16 | 19 | 20 | 21 |
| Propylene Polym. Composition | | | | | | | |
| Int. Viscosity η | (dl/g) | 1.97 | 1.97 | 1.97 | 1.97 | 1.97 | 1.97 |
| Melt Strength (MS) | (cN) | 4.9 | 4.9 | 4.9 | 4.9 | 4.9 | 4.9 |
| Crystal. Temp. (Tc) | (° C.) | 122.5 | 122.5 | 122.5 | 122.5 | 122.5 | 122.5 |
| T-Die Production Conditions | | | | | | | |
| Melt Temp. (PP-T1) | (° C.) | 250 | 300 | 200 | 330 | 200 | 175 |
| Water Temperature |  | 20 | 20 | 40 | 20 | 50 | 20 |
| Chillroll Temp. (CH-T2) | (° C.) | 40 | 45 | 55 | 48 | 65 | 33 |
| (PP-T1)-(PP-T1) | (° C.) | 210 | 255 | 145 | 282 | 135 | 142 |
| Film Properties | | | | | | | |
| Expandability |  | ○ | ○ | ○ | ○ | x | x |
| Neck-In Length |  | 38 | 60 | 35 | 80 | 40 | 35 |
| Outer Appearance |  | ○ | ○ | ○ | x (irr.) | x (wrinkl.) | x (rupt.) |
| Productivity Rank |  | 7 | 6 | 7 | 3 | 1 | 2 |

EXAMPLES 17, 18, 19, 20

(1) Preparation of a Polypropylene Composition Forming Layer [A]

A polypropylene composition was prepared in the same manner as in Example 1. The obtained polymer was a polypropylene composition containing 0.25 wt % polyethylene (A) corresponding to the component (a) due to the preactivation polymerization and the intrinsic viscosity $\eta_P$ of the polypropylene component (b) was 1.97 dl/g.

100 weight parts of the obtained polypropylene composition were mixed for 2 min using a Henschel mixer with 0.1 weight parts tetrakis[methylene-3-(3'-5'-di-t-butyl-4'-hydroxyphenol)propionate]methane and 0.1 weight parts calcium stearate, in addition to 0.25 weight parts silica and 0.10 weight parts erucic acid amide having an average particle size of 1.7 μm. The blend was granulated and pelletized at 230° C. using an extrusion pelletizer with a screw diameter of 65 mm. When the various physical properties of the pellets were measured, it was found that the melt flow rate was 3.5 g/10 min, the crystallization temperature was 122.5° C. and the melt strength (MS) was 4.9 cN.

(2) Preparation of a Polypropylene Composition (y) Forming Layer [A]

Production of Polypropylene Composition (Main (Co) Polymerization of Propylene)

After nitrogen gas has been filled into a corrosion-resistant polymerization container having a stirring device attached to it and a volume of 500 liter, 240 liter n-hexane, 780 millimol triethylaluminum (organic metal compound (AL2)) and 78 millimol di-isopropyldimethoxysilane (electron donor (E2)) were filled into the polymerization container at 20° C. Successively, 55 liter hydrogen were introduced into the polymerization container and the temperature was raised to 70° C. Then, at a polymerization temperature of 70° C., propylene was fed continuously for two hours into the polymerization container while the gas pressure inside the polymerization container was maintained at 0.79 MPa, so that the main polymerization of propylene was carried out.

After the polymerization time has passed, 1 liter methanol was introduced into the polymerization container and a catalyst deactivation reaction was executed for 15 min at 70° C. Successively, gas that has not reacted was exhausted, the solvent was separated and the polymer was dried, so that 40.5 kg polymer were obtained.

100 weight parts of the obtained polypropylene composition were mixed for 2 min using a Henschel mixer with 0.1 weight parts tetrakis[methylene-3-(3'-5'-di-t-butyl-4'-hydroxyphenol)propionate]methane and 0.1 weight parts calcium stearate, in addition to 0.25 weight parts silica and 0.10 weight parts erucic acid amide having an average particle size of 1.7 μm. The blend was granulated and pelletized at 230° C. using an extrusion pelletizer with a screw diameter of 65 mm. When the various physical properties of the pellets were measured, it was found that the melt flow rate was 6.5 g/10 min, the crystallization temperature was 115.5° C. and the melt strength (MS) was 0.8 cN.

(3) Preparation of a Polypropylene Layered Film

The resulting polypropylene composition pellets for forming layer [A] were inserted into an extrusion machine with 110 mm screw diameter and the polypropylene composition pellets for forming layer [3] were inserted into an extrusion machine with 90 mm screw diameter. Non-stretched two-layer films of 15 μm target thickness were produced at a retrieval rate of 200 m/min using a 2-kind 2-layer multimanifold multilayer T-die device, whose T-die had an opening length of 1 m and a lip opening width of 1.0 mm, at a temperature for the molten layers [A] and [B] of 250° C. and a chillroll flow water temperature of 20° C. The thickness ratio of layers [A] and [B] was varied in the range indicated in Table 10. The chillroll temperature at the time of film production was 40° C. and the productivity ranks of the resulting films are shown in Table 10.

TABLE 10

|  | Example | | | |
| --- | --- | --- | --- | --- |
|  | 17 | 18 | 19 | 20 |
| Polypropylene Composition Forming Layer [A] | | | | |
| Prel. Polymerization Polypropylene (β) | | | | |
| Int. Viscosity η (dl/g) | 2.8 | 2.8 | 2.8 | 2.8 |
| Formed Amount[1] (g/g) | 2.0 | 2.0 | 2.0 | 2.0 |
| Composition Ratio[2] (wt %) | 0.02 | 0.02 | 0.02 | 0.02 |

TABLE 10-continued

|  | Example | | | |
| --- | --- | --- | --- | --- |
|  | 17 | 18 | 19 | 20 |
| Preactivation Polyethylene (α) | | | | |
| Int. Viscosity η (dl/g) | 34.0 | 34.0 | 34.0 | 34.0 |
| Formed Amount[1] (g/g) | 22.0 | 22.0 | 22.0 | 22.0 |
| Composition Ratio[2] (wt %) | 0.25 | 0.25 | 0.25 | 0.25 |
| Addition Polym: Polypropylene | | | | |
| Int. Viscosity η (dl/g) | 2.8 | 2.8 | 2.8 | 2.8 |
| Formed Amount[1] (g/g) | 2.0 | 2.0 | 2.0 | 2.0 |
| Composition Ratio[2] (wt %) | 0.02 | 0.02 | 0.02 | 0.02 |
| Polypropylene Composition | | | | |
| Int. Viscosity η (dl/g) | 1.97 | 1.97 | 1.97 | 1.97 |
| Melt Strength (MS) (cN) | 4.9 | 4.9 | 4.9 | 4.9 |
| Cryst. Temp. (Tc) (° C.) | 122.5 | 122.5 | 122.5 | 122.5 |
| Polypropylene Composition Forming Layer [B] | | | | |
| MFR (g/10 min) | 6.5 | 6.5 | 6.5 | 6.5 |
| Melt Strength (MS) (cN) | 0.8 | 0.8 | 0.8 | 0.8 |
| Cryst. Temp. (Tc) (°) | 115.5 | 115.5 | 115.5 | 115.5 |
| Presumed Thickness Ratio of Film Layers [A]/[B] | 1/1 | 10/1 | 20/1 | 1/20 |
| Film Properties | | | | |
| Expandability | ◯ | ◯ | ◯ | ◯ |
| Neck-In Length | 68 | 49 | 38 | 95 |
| Outer Appearance | ◯ | ◯ | ◯ | ◯ |
| Productivity Rank | 6 | 6 | 7 | 6 |

Notes:
[1]Amount (in g) formed per gram of transition metal compound catalyst component
[2]Composition ratio in propylene polymer composition (in wt %)

EXAMPLE 21 AND COMPARATIVE XAMPLE 22

A polypropylene composition was produced using the same conditions as in Example 17, except that the conditions for preactivation polymerization with ethylene of the polypropylene composition forming the layer [A] were altered and the generated amount of polyethylene (α) was changed. The polypropylene composition was pelletized and samples were prepared for the evaluation of Example 21 and Comparative Example 24.

The properties of the resulting polypropylene composition and the productivity of a film produced from the pellets with the same processing conditions as in Example 17 and polypropylene composition forming the layer [B] are shown in Table 11.

Comparative Example 23

A polypropylene composition for forming the layer [A] was produced using the same conditions as in Example 17, except that a preactivation polymerization with ethylene of a titanium-containing support type catalyst component has not been performed. A sample for evaluation of the Comparative Example 26 was prepared using the resulting polypropylene composition. The properties of the resulting polypropylene composition and the productivity of a film produced under the same processing conditions as in Example 17 using the pellets are shown in Table 11.

Comparative Example 24

After nitrogen gas has been filled into a reaction vessel having tilted mixing blades, 10 kg of a propylene homopolymer powder with an intrinsic viscosity η of 1.67 dl/g and an average particle size of 150 μm, which has been obtained by slurry-polymerization of propylene in n-hexane using a catalyst combining a titanium-containing catalyst component comprising a titanium-trichloride composition with diethylaluminumchloride and diethyleneglycoldimethylether as a third component, were filled into the reactor vessel. Successively, the procedure of evacuating the reactor vessel and refilling it with nitrogen gas up to atmospheric pressure was repeated ten times. Then, 0.35 mol di-2-ethylhexylperoxydicarbonate (modifier) in a toluene solution of 70 wt % concentration were added and mixed under the nitrogen gas atmosphere at 25° C. while stirring. Then, the temperature in the reactor vessel was raised to 120° C. and reaction took place at this temperature for 30 min. After the reaction time had passed, the temperature inside the reactor vessel was raised to 135° C. and an after-treatment was performed at this temperature for 30 min. After the after-treatment, the reactor vessel was cooled down to room temperature and opened to retrieve the propylene polymer.

100 weight parts of the obtained propylene polymer were mixed for 2 min using a Henschel mixer with 0.1 weight parts tetrakis[methylene-3-(3'-5'-di-t-butyl-4'-hydroxyphenol)propionate]methane and 0.1 weight parts calcium stearate, in addition to 0.25 weight parts silica and 0.10 weight parts erucic acid amide having an average particle size of 1.7 μm. The blend was granulated at 230° C. using an extrusion pelletizer with a screw diameter of 65 mm to make pellets for forming layer [A] and a sample was prepared for the evaluation of Comparative Example 27. The productivity of a film produced under the same processing conditions as in Example 17 using the resulting pellets are shown in Table 11.

TABLE 11

|  | Ex. | Comparative Example | | |
| --- | --- | --- | --- | --- |
|  | 21 | 22 | 23 | 24 |
| Polypropylene Composition Forming Layer [A] | | | | |
| Prel. Polymerization Polypropylene (β) | | | | |
| Int. Viscosity η (dl/g) | 2.8 | 2.8 | 2.8 | — |
| Formed Amount[1] (g/g) | 2.0 | 2.0 | 2.0 | — |
| Composition Ratio[2] (wt %) | 0.02 | 0.02 | 0.02 | — |
| Preactivation Polyethylene (α) | | | | |
| Int. Viscosity η (dl/g) | 34.4 | 34.0 | — | — |
| Formed Amount[1] (g/g) | 4.5 | 0.005 | — | — |
| Composition Ratio[2] (wt %) | 0.05 | 0.0001 | — | — |
| Addition Polym. Polypropylene | | | | |
| Int. Viscosity η (dl/g) | 2.8 | 2.8 | 2.8 | — |
| Formed Amount[1] (g/g) | 2.0 | 2.0 | 2.0 | — |
| Composition Ratio[2] (wt %) | 0.02 | 0.02 | 0.02 | — |
| Polypropylene Composition | | | | |
| Int. Viscosity η (dl/g) | 1.92 | 1.89 | 1.89 | 1.68 |
| Melt Strength (MS) (cN) | 2.0 | 1.0 | 0.8 | 7.2 |
| Crystal. Temp. (Tc) (° C.) | 121.3 | 117.0 | 116.0 | 129.4 |
| Polypropylene Composition Forming Layer [B] | | | | |
| MFR (g/10 min) | 6.5 | 6.5 | 6.5 | 6.5 |
| Melt Strength (MS) (cN) | 0.8 | 0.8 | 0.8 | 0.8 |
| Cryst. Temp. (Tc) (° C.) | 115.5 | 115.5 | 115.5 | 115.5 |
| Presumed Thickness Ratio of Film Layers [A]/[B] | 1/1 | 1/1 | 1/1 | 1/1 |
| Film Properties | | | | |
| Expandability | ◯ | ◯ | X | ◯ |
| Neck-In Length | 88 | 110 | 150 | 105 |

TABLE 11-continued

|  | Ex. | Comparative Example | | |
|---|---|---|---|---|
|  | 21 | 22 | 23 | 24 |
| Outer Appearance | ○ | ○ | X (irr.) | ○ |
| Productivity Rank | 6 | 5 | 1 | 5 |

Notes:
(1)Amount (in g) formed per gram of transition metal compound catalyst component
(2)Composition ratio in polypropylene composition (in wt %)

EXAMPLE 22

(1) Preparation of Polypropylene Composition (x) Forming Layer [A]

A polymer composition was produced in the same manner as in Example 4. The intrinsic viscosity $\eta_P$ of the resulting polypropylene composition was 1.80 dl/g.

Then, granulation was performed in an extrusion pelletizer under the same conditions as in Example 17 to obtain polymer pellets. When the various physical properties of the pellets were measured, it was found that the melt flow rate was 6.0 g/10 min, the crystallization temperature was 122.0° C. and the melt strength (MS) was 2.5 cN.

Moreover, using the obtained pellets to form a layer [A] under the same conditions as in Example 18, a layered film was produced by the T-die multilayer coextrusion method to obtain a polypropylene layered film. The productivity rank was "6".

Comparative Example 25

A polymer was produced using the same conditions as in Example 22, except that a preactivation polymerization with ethylene has not been performed. A sample was prepared for the evaluation of Comparative Example 25.

The results of the analysis of the obtained polymer and the layered film productivity are shown in Table 12.

EXAMPLE 23

(1) Preparation of a Polypropylene Composition Forming Layer [A]

① Preparation of Transition Metal Compound Catalyst Component

A titanium-containing support type catalyst component was obtained under the same conditions as in Example 22.

② Preparation of Preactivated Catalyst

A preactivated catalyst slurry was obtained under the same conditions as in Example 22, except that the conditions for preactivation polymerization with ethylene were changed in the following way: In addition to ethylene, 30 g propylene was fed at a reaction temperature of 0° C., and the reaction time was 45 min.

When the catalyst from another preactivation treatment performed under the same conditions was analyzed, it was found that per gram of the titanium-containing support type catalyst component 21.5 g polymer were present, the intrinsic viscosity $\eta_{T2}$ of the polymer measured in tetralin at 135° C. was 23.2 dl/g and per gram of the titanium-containing support type catalyst component 22 g ethylene-propylene random copolymer (A) with an intrinsic viscosity $\eta_A$ of 22.5 dl/g including 7.0 wt % propylene units (determined by $^{13}$C-NMR) were formed due to preactivation treatment.

When the polymer obtained from an addition polymerization after yet another preactivation treatment performed under the same conditions was analyzed, it was found that per gram of the titanium-containing support type catalyst component 25.3 g polymer were present, the intrinsic viscosity $\eta_{T3}$ of the polymer measured in tetralin at 135° C. was 19.9 dl/g, and per gram of the titanium-containing support type catalyst component 2.1 g polymer with an intrinsic viscosity $\eta_C$ of 2.2 dl/g were newly formed due to addition polymerization.

③ Production of Polypropylene Composition and Film (Main (Co)Polymerization of Propylene)

Gas phase polymerization was performed continuously for 150 h under the same conditions as in Example 22 (3), except that the preactivated catalyst slurry obtained according to the above paragraph (2) was used as a preactivated catalyst slurry, the ratio of hydrogen concentration and propylene concentration in the polymerization container was set to 0.012, and ethylene was fed continuously in addition to propylene into the polymerization container so as to maintain a ratio to the propylene concentration of 0.003 inside the polymerization container. Thus, a polymer having an intrinsic viscosity $\eta_T$ of 1.54 dl/g and containing 0.8 wt % ethylene units was obtained at a rate of 11.6 kg/h.

The polymer contained 0.12 wt % ethylene-propylene random copolymer (A) formed by preactivation treatment in the polymer, and the propylene-ethylene copolymer had an intrinsic viscosity $\eta_P$ of 1.54 dl/g.

Polypropylene composition pellets were obtained by granulation with an extrusion machine in the same manner as in paragraph (3) of Example 17. When various physical properties of the pellets were measured, it was found that the melt flow rate was 15.4 g/10 min, the crystallization temperature was 121.2° C. and the melt strength (MS) was 1.4 cN. Moreover, a layered film was produced from the resulting pellets with multi-layer coextrusion method under the same conditions as in Example 18 to obtain a polypropylene layered film. The resulting film productivity had the rank "6". The results are shown in Table 12.

Comparative Example 26

(1) Preparation of a Polypropylene Composition Forming Layer [A]

A polymer was produced using the same conditions as in Example 23, except that a preactivation treatment with ethylene and propylene has not been performed. A sample was prepared for the evaluation of Comparative Example 26.

The results of the analysis of the obtained polymer and the layered film productivity are shown in Table 12.

Comparative Example 27

(1) Preparation of a Polypropylene Composition Forming Layer [A]

Omitting the prepolymerization and the addition polymerization with propylene in paragraph (2) of Example 17, only preactivation polymerization with ethylene was performed. 1 liter methanol was added to the obtained preactivated catalyst slurry and a catalyst deactivation reaction was performed for one hour at 70° C. After the reaction, polyethylene was filter-separated from the slurry and dried under reduced pressure to obtain 200 g polyethylene with an intrinsic viscosity $\eta_A$ of 32.5 dl/g.

20 kg of the polypropylene obtained by main polymerization with propylene with omission of preactivation polymerization with ethylene and addition polymerization with propylene in paragraph (2) of Example 17 were mixed with 50 g polyethylene prepared as described above. This blend was mixed for 2 min using Henschel mixer of 100 liter volume with 20 g tetrakis[methylene-3-(3'-5'-di-t-butyl-4'-hydroxyphenol)propionate]methane and 20 g calcium stearate, in addition to 50 g silica and 20 g erucic acid amide having an average particle size of 1.7 μm. The blend was granulated 230° C. using an extrusion pelletizer with a screw diameter of 65 mm to obtain pellets, and a sample was prepared for the evaluation of Comparative Example 27.

The various physical properties of the pellets included an intrinsic viscosity $\eta_T$ of 1.97 dl/g, a melt flow rate of 3.5 g/10 min, a crystallization temperature of 116.2° C. and a melt strength (MS) of 1.0 cN.

Using the obtained pellets, a layered film was produced with the multilayer coextrusion method under the same conditions as in Example 18 to obtain a polypropylene layered film. The productivity of the obtained film is shown in Table 12.

TABLE 12

|  |  | Example | | Comp. Example | | |
|---|---|---|---|---|---|---|
|  |  | 22 | 23 | 25 | 26 | 27[3] |
| Polypropylene Composition Forming Layer [A] Prel. Polymerization: Polypropylene (β) | | | | | | |
| Int. Viscosity η | (dl/g) | 2.7 | 2.7 | 2.7 | 2.7 | — |
| Formed Amount[1] | (g/g) | 1.2 | 1.2 | 1.2 | 1.2 | — |
| Composition Ratio[2] | (wt %) | 0.01 | 0.01 | 0.01 | 0.01 | — |
| Preactivation: Polyethylene (α) | | | | | | |
| Int. Viscosity η | (dl/g) | 30.2 | 22.5 | — | — | 32.5 |
| Formed Amount[1] | (g/g) | 32.0 | 22.0 | — | — | — |
| Composition Ratio[2] | (wt %) | 0.18 | 0.12 | — | — | 0.25 |
| Addition Polym: Polypropylene | | | | | | |
| Int. Viscosity η | (dl/g) | 2.8 | 2.2 | 2.8 | 2.2 | — |
| Formed Amount[1] | (g/g) | 2.2 | 2.1 | 2.2 | 2.1 | — |
| Composition Ratio[2] | (wt %) | 0.01 | 0.01 | 0.01 | 0.01 | — |
| Polypropylene Composition | | | | | | |
| Int. Viscosity η | (dl/g) | 1.80 | 1.54 | 1.75 | 1.52 | 1.97 |
| Melt Strength (MS) | (cN) | 2.5 | 1.4 | 0.6 | 0.3 | 1.0 |
| Crystal. Temp. (Tc) | (° C.) | 122.0 | 121.2 | 116.1 | 115.2 | 116.2 |
| Polypropylene Composition Forming Layer [B] | | | | | | |
| MFR | (g/10 min) | 6.5 | 6.5 | 6.5 | 6.5 | 6.5 |
| Melt Strength (MS) | (cN) | 0.8 | 0.8 | 0.8 | 0.8 | 0.8 |
| Cryst. Temp. (Tc) | (° C.) | 115.5 | 115.5 | 115.5 | 115.5 | 115.5 |
| Presumed Thickness Ratio of Film Layers [A]/[B] | | 10/1 | 10/1 | 10/1 | 10/1 | 10/1 |
| Film Properties | | | | | | |
| Expandability | | ◯ | ◯ | ◯ | ◯ | ◯ |
| Neck-In Length | | 68 | 95 | 170 | 190 | 120 |
| Outer Appearance | | ◯ | ◯ | ◯ | x irr.[4] | x FE[4] |
| Productivity Rank | | 6 | 6 | 5 | 3 | 3 |

Notes:
[1] Amount (in g) formed per gram of transition metal compound catalyst component
[2] Composition ratio in polypropylene composition (in wt %)
[3] Simple mechanical mixture of polyethylene (A) and main polymerization propylene polymer
[4] Irr. = transparency irregularities, FE = fish-eye

EXAMPLES 24, 25 AND 26

Using the same polypropylene resin for the formation of layer [A] as in Example 17, a polypropylene layered film was produced under the same layered film processing conditions as in the example using as a polypropylene resin for formation of layer [B]: an ethylene-propylene random copolymer containing 2.5 wt % ethylene and having a melt flow rate of 7.0 g/10 min (in Example 24), an ethylene-propylene random copolymer containing 3.2 wt % ethylene and 4.5 wt % propylene and having a melt flow rate of 5.5 g/10 min (in Example 25), or an ethylene-propylene block copolymer containing 10 wt % ethylene and having a melt flow rate of 9 (in Example 26).

The properties and film productivities of the obtained layered films are listed in Table 13.

TABLE 13

|  | Example | | | |
|---|---|---|---|---|
|  | 17 | 24 | 25 | 26 |
| Polypropylene Composition Forming Layer [B] | | | | |
| Ethylene Content | — | 2.5 | 3.2 | 10.0 |
| Butene Content | — | — | 4.5 | — |
| MFR (g/10 min) | 6.5 | 7.0 | 5.5 | 9.0 |
| Melt Strength (MS) (cN) | 0.8 | 0.7 | 0.9 | 0.6 |

TABLE 13-continued

|  | Example | | | |
|---|---|---|---|---|
|  | 17 | 24 | 25 | 26 |
| Cryst. Temp. (Tc) (° C.) | 115.5 | 110.5 | 105.5 | 114.5 |
| Presumed Thickness Ratio of Film Layers [A]/[B] | 1/1 | 1/1 | 1/1 | 1/1 |
| Film Properties | | | | |
| Expandability | ◯ | ◯ | ◯ | ◯ |
| Neck-In Length | 68 | 75 | 63 | 80 |

TABLE 13-continued

| | Example | | | |
|---|---|---|---|---|
| | 17 | 24 | 25 | 26 |
| Outer Appearance | ○ | ○ | ○ | ○ |
| Productivity Rank | 6 | 6 | 6 | 6 |

EXAMPLE 27

A polypropylene composition was produced in the same manner as in Example 1. The obtained polymer was a polypropylene resin containing 0.25 wt % polyethylene (A) corresponding to the component (a) due to the preactivation polymerization and the propylene-α-olefin copolymer component (b) had an intrinsic viscosity $\eta_P$ of 1.83 dl/g. Properties of the obtained polypropylene resin are listed in detail in Table 14.

Granulation of the Polypropylene Resin 100 weight parts of the obtained polypropylene resin were stirred and mixed for 1 min using a Henschel mixer (Trademark) with 0.1 weight parts 2,6-di-t-butyl-p-cresol as antioxidant and 0.1 weight parts calcium stearate. The resulting blend was melted, kneaded and extruded at a melt-kneading temperature of 230° C. using an extrusion machine with a screw diameter of 40 mm to obtain pellets. When various physical properties of the resulting pellets were measured, it was found that the melt flow rate was 3.7 g/10 min, the melt strength (MS) was 1.8 cN and the melting point was 149° C.

Production of a Biaxially Stretched Film

The above-mentioned pellets were melted and coextruded at a temperature of 250° C. to form a base layer of homopropylene (melt flow rate=1.8 g/10 min; melting point=163° C.) and a heat seal layer using a multilayer extrusion machine comprising an extrusion machine having a screw diameter of 65 mm, an extrusion machine having a screw diameter of 40 mm and 2-kind 2-layer T-die. A 1 mm thick not-yet-stretched layered sheet was obtained by cooling and hardening the-layers on a cooling roll at 20° C. with a retrieval rate of 3 m/min.

The resulting not-yet-stretched sheet was stretched at 160° C. to five-fold length in the machine direction and to eight-fold length in the cross direction using a batch-type expansion machine to obtain a biaxially stretched layered film of about 25 μm thickness. A predetermined sample was cut out from the resulting film to measure the film properties. The results of those measurements are shown in Table 15.

EXAMPLE 28

A polypropylene composition was produced in the same manner as in Example 4. The obtained polymer had an intrinsic viscosity of $\eta_T$ of 1.95 dl/g.

The obtained polymer contained 0.22 wt % polyethylene (A) formed due to preactivation treatment and the polypropylene-α-olefin copolymer component (b) had an intrinsic viscosity $\eta_P$ of 1.89 dl/g.

Then, granulation was performed in a pelletizer under the same conditions as in Example 27 to obtain pellets. When various physical properties of the resulting pellets were measured, it was found that the melt flow rate was 3.2 g/10 min, the melt strength (MS) was 1.9 cN and the melting point was 140° C.

Using the resulting polypropylene resin, an evaluation was performed in conformity with Example 27. The physical properties of the resulting polypropylene resin are shown in Table 16. Table 15 shows the results of measurements of the physical properties of the biaxially stretched film.

EXAMPLE 29

(1) Preparation of Transition Metal Compound Catalyst Component

A titanium-containing support type catalyst component was obtained under the same conditions as in Example 27.

(2) Preparation of Preactivated Catalyst

A preactivated catalyst slurry was obtained under the same conditions as in Example 27.

(3) Production of Polypropylene Composition (Main (Co) Polymerization of Propylene)

After nitrogen gas has been filled into a corrosion-resistant polymerization container having a stirring device attached to it and a volume of 500 liter, 240 liter n-hexane, 780 millimol triethylaluminum (organic metal compound (AL2)), 78 millimol di-isopropyldimethoxysilane (electron donor (E2)) and half of the preactivated catalyst slurry obtained as described above were filled into the polymerization container at 20° C. Successively, propylene, hydrogen, ethylene and butene-1 were added so as to attain concentration ratios with respect to propylene of hydrogen, ethylene and butene-1 of 0.08, 0.025 and 0.038 respectively. After raising the temperature to 60° C., propylene, hydrogen, ethylene and butene-1 were fed continuously for two hours into the polymerization container while the gas pressure inside the polymerization container was maintained at 0.79 MPa, and copolymerization of propylene-α-olefin in the polymerization container was carried out.

After the polymerization time has passed, 1 liter methanol was introduced into the polymerization container and a catalyst deactivation reaction was executed for 15 min at 60° C. Successively, gas that has not reacted was exhausted, the solvent was separated and the polymer was dried, so that 39.6 kg polymer having an intrinsic viscosity $\eta_T$ of 1.67 dl/g were obtained.

The obtained polymer was a polypropylene resin containing 0.25 wt % polyethylene (A) formed due to preactivation polymerization corresponding to component (a). The propylene-α-olefin copolymer component (b) had an intrinsic viscosity $\eta_P$ of 1.59 dl/g.

Then, granulation was performed in a pelletizer under the same conditions as in Example 27 to obtain pellets. When various physical properties of the resulting pellets were measured, it was found that the melt flow rate was 7.6 g/10 min, the melt strength (MS) was 1.3 cN and the melting point was 140° C.

Using the resulting polypropylene resin, an evaluation was performed in conformity with Example 27. The physical properties of the resulting polypropylene resin are shown in Table 14. Table 15 shows the results of measurements of the physical properties of the biaxially stretched film.

Comparative Example 28

After a titanium-containing support type catalyst component was obtained under the same conditions as in Example 28, a propylene-α-olefin copolymer was polymerized under the same conditions as in Example 27 paragraph (3), but without preactivation polymerization due to ethylene, to obtain a polypropylene resin. Using the resulting polypropylene resin, an evaluation was performed in conformity with Example 27. The physical properties of the obtained polypropylene resin are shown in Table 14. Table 15 shows the results of measurements of the physical properties of the biaxially stretched film.

Comparative Example 29

After a titanium-containing support type catalyst component was obtained under the same conditions as in Example 28, a propylene-α-olefin copolymer was polymerized under the same conditions as in Example 28 paragraph (3), but without preactivation polymerization due to ethylene, to obtain a polypropylene resin. Using the resulting polypropylene resin, an evaluation was performed in conformity with Example 27. The physical properties of the obtained polypropylene resin are shown in Table 14. Table 15 shows the results of measurements of the physical properties of the biaxially stretched film.

Comparative Example 30

After a titanium-containing support type catalyst component was obtained under the same conditions as in Example 28, a propylene-α-olefin copolymer was polymerized under the same conditions as in Example 29 paragraph (3), but without preactivation polymerization due to ethylene, to obtain a polypropylene resin. Using the resulting polypropylene resin, an evaluation was performed in conformity with Example 27. The physical properties of the obtained polypropylene resin are shown in Table 14. Table 15 shows the results of measurements of the physical properties of the biaxially stretched film.

As can be seen in Table 15, the Examples 27–29 have a wider temperature range for effective hot-tacking compared to the Comparative Examples 28–30 and provide biaxially stretched layered polypropylene films with excellent hot-tacking strength.

TABLE 14

|  |  | Example | | | Comparative Example | | |
|---|---|---|---|---|---|---|---|
|  |  | 27 | 28 | 29 | 28 | 29 | 30 |
| Prel. Polymerization Polypropylene (B) | | | | | | | |
| Int. Viscosity η | (dl/g) | 2.8 | 2.7 | 2.8 | 2.7 | 2.7 | 2.7 |
| Formed Amount[1] | (g/g) | 2.0 | 1.2 | 2.0 | 1.2 | 1.2 | 1.2 |
| Composition Ratio[2] | (wt %) | 0.02 | 0.01 | 0.02 | 0.01 | 0.01 | 0.01 |
| Preactivation Polyethylene (A) | | | | | | | |
| Int. Viscosity η | (dl/g) | 34.0 | 30.2 | 34.0 | — | — | — |
| Formed Amount[1] | (g/g) | 22.0 | 32.0 | 22.0 | — | — | — |
| Composition Ratio[2] | (wt %) | 0.25 | 0.22 | 0.25 | — | — | — |
| Addition Polymerization Polypropylene (C) | | | | | | | |
| Int. Viscosity η | (dl/g) | 2.8 | 2.8 | 2.8 | 2.8 | 2.8 | 2.8 |
| Formed Amount[1] | (g/g) | 2.0 | 2.2 | 2.0 | 2.2 | 2.2 | 2.2 |
| Composition Ratio[2] | (wt %) | 0.02 | 0.01 | 0.02 | 0.01 | 0.01 | 0.01 |
| Polypropylene (b) | | | | | | | |
| Ethylene | (wt %) | 2.7 | 4.6 | 2.4 | 2.5 | 4.9 | 2.4 |
| Butene-1 | (wt %) | 0 | 0 | 3.9 | 0 | 0 | 3.8 |
| Intrinsic Viscosity η | (dl/g) | 1.83 | 1.89 | 1.59 | 1.97 | 1.97 | 1.69 |
| Polypropylene Resin | | | | | | | |
| Ethylene | (wt %) | 2.7 | 4.6 | 2.4 | 2.5 | 4.9 | 2.4 |
| Butene-1 | (wt %) | 0 | 0 | 3.9 | 0 | 0 | 3.8 |
| Intrinsic Viscosity η | (dl/g) | 1.91 | 1.95 | 1.67 | 1.97 | 1.97 | 1.69 |
| Melt Strength | (cN) | 1.8 | 1.9 | 1.3 | 0.7 | 0.7 | 0.3 |
| Melting Point | (° C.) | 149 | 140 | 140 | 149 | 137 | 141 |
| Melt Flow Rate | (g/10 min) | 3.7 | 3.2 | 7.6 | 3.5 | 3.1 | 8.1 |

Notes:
[1]Amount (in g) formed per gram of transition metal compound catalyst component
[2]Composition ratio in polypropylene composition (in wt %)

TABLE 15

|  |  | Example | | | Comp. Example | | |
|---|---|---|---|---|---|---|---|
|  | Unit | 27 | 28 | 29 | 28 | 29 | 30 |
| Melt Flow Rate | g/10 min | 3.7 | 32. | 7.6 | 3.5 | 3.1 | 8.1 |
| Haze | % | 0.1 | 0.1 | 0.1 | 0.2 | 0.2 | 0.2 |
| Heat Seal Strength | | | | | | | |
| 125° C. | N/15 mm | — | 0.1 | 0.2 | — | 0.1 | 0.2 |
| 130° C. | N/15 mm | — | 0.5 | 1.0 | — | 1.2 | 0.8 |
| 135° C. | N/15 mm | 0.3 | 1.1 | 2.9 | 0.2 | 4.9 | 5.3 |
| 140° C. | N/15 mm | 0.9 | 4.8 | 5.1 | 0.8 | 4.8 | 5.0 |
| 145° C. | N/15 mm | 1.8 | 5.0 | 4.8 | 4.7 | 4.8 | 4.7 |
| 150° C. | N/15 mm | 5.0 | 4.7 | 4.8 | 5.2 | 4.6 | 4.7 |
| Hot-Tack Strength | | | | | | | |
| 125° C. | N/cm | — | — | — | — | — | — |
| 130° C. | N/cm | — | 0.52 | 0.65 | — | 0.52 | 0.44 |
| 135° C. | N/cm | — | 1.03 | 1.27 | — | 1.03 | 1.03 |
| 140° C. | N/cm | 0.83 | 1.43 | 1.43 | 0.44 | 1.03 | 1.03 |

TABLE 15-continued

|  | Unit | Example | | | Comp. Example | | |
|---|---|---|---|---|---|---|---|
|  |  | 27 | 28 | 29 | 28 | 29 | 30 |
| 145° C. | N/cm | 1.43 | 1.43 | 1.43 | 1.03 | 0.83 | 1.03 |
| 150° C. | N/cm | 1.43 | 1.43 | 1.43 | 1.03 | 0.83 | 0.83 |

EXAMPLE 30

A polypropylene composition was produced in the same manner as in Example 1. The obtained polymer was a polypropylene resin containing 0.25 wt % polyethylene (A) corresponding to the component (a) due to the preactivation polymerization and the polypropylene component (b) had an intrinsic viscosity $\eta_T$ of 1.89 dl/g.

Granulation of the Polypropylene Resin 100 weight parts of the obtained polypropylene resin were stirred and mixed for 1 min using a Henschel mixer (Trademark) with 0.1 weight parts 2,6-di-t-butyl-p-cresol as antioxidant and 0.1 weight parts calcium stearate. The resulting blend was melted, kneaded and extruded at a melt-kneading temperature of 230° C. using an extrusion machine with a screw diameter of 40 mm to obtain pellets. The measured physical properties of the resulting pellets are shown in Table 16. The melt flow rate was 3.5 g/10 min, the melt strength was 4.9 cN and the isotactic index was 96%.

Production of a Uniaxially Stretched Film

The obtained pellets were melted and extruded with a screw rotation frequency of 13 rpm at an extrusion temperature of 250° C. using an extrusion machine with a 65 mm diameter screw. Thus, a not-yet-stretched film of 175 µm thickness was obtained at 90° C. and a retrieval rate of 2.1 m/min by cooling and hardening with a cooling roll. At the time of film production, neck-in and vibrations were evaluated. The results are listed in Table 17. The resulting not-yet-stretched film was warmed with a roll that was preheated to 130° C. and a uniaxially stretched film of 25 µm thickness, which has been stretched seven-fold, was obtained with an expansion roll at a rate of 15 m/min. The width of the resulting unidirectionally stretched film was measured and the width contraction was calculated. Moreover, a predetermined sample was cut out and the film's physical properties were measured. The results are shown in Table 17.

Comparative Example 31

A polypropylene resin was produced under the same conditions as in Example 30, except that preactivation polymerization with ethylene of a titanium-containing support type catalyst component has not been performed. Using the resulting polypropylene resin, an evaluation was performed in conformity with Example 27. The physical properties of the resulting polypropylene resin are shown in Table 16. Table 17 shows the results of measurements of the physical properties of the uniaxially stretched film.

EXAMPLE 31

A polypropylene resin was produced under the same conditions as in Example 30, except that the conditions for preactivation polymerization by ethylene were changed and a different amount of polyethylene (A) was generated. Using the resulting polypropylene resin, an evaluation was performed in conformity with Example 30. The physical properties of the resulting polypropylene resin are shown in Table 16. Table 17 shows the results of measurements of the physical properties of the uniaxially stretched film.

Comparative Example 32

A polypropylene resin was produced under the same conditions as in Example 30, except that the conditions for preactivation polymerization by ethylene were changed and that a different amount of polyethylene (A) was generated. Using the resulting polypropylene resin, an evaluation was performed in conformity with Example 30. The physical properties of the resulting polypropylene resin are shown in Table 16. Table 17 shows the results of measurements of the physical properties of the uniaxially stretched film.

EXAMPLE 32

A polypropylene composition was prepared in the same manner as in Example 4. The resulting polymer had an intrinsic viscosity $\eta_T$ of 1.80 dl/g.

The resulting polymer contained 0.18 wt % polyethylene (A) formed due to the preactivation treatment and the polypropylene had an intrinsic viscosity $\eta_P$ of 1.75 dl/g.

Then, granulation was performed with a pelletizer under the same conditions as in Example 30 to obtain pellets. The measured physical properties of the resulting pellets revealed that the melt flow rate was 6.0 g/10 min, the melt strength was 2.5 cN and the isotactic index was 98%.

Using the resulting polypropylene resin, an evaluation was performed in conformity with Example 30. The physical properties of the resulting polypropylene resin are shown in Table 16. Table 17 shows the results of measurements of the physical properties of the uniaxially stretched film.

Comparative Example 33

A polypropylene resin was produced under the same conditions as in Example 32, except that preactivation polymerization with ethylene has not been performed. Using the resulting polypropylene resin, an evaluation was performed in conformity with Example 30. The physical properties of the resulting polypropylene resin are shown in Table 16. Table 17 shows the results of measurements of the physical properties of the uniaxially stretched film.

EXAMPLE 33

(1) Preparation of Transition Metal Compound Catalyst Component

A titanium-containing support type catalyst component was obtained under the same conditions as in Example 22.

(2) Preparation of Preactivated Catalyst

A preactivated catalyst slurry was obtained under the same conditions as in Example 32, except that the conditions for preactivation polymerization with ethylene were changed in the following way: In addition to ethylene, 30 g propylene was fed at a reaction temperature of 0° C., and the reaction time was 45 min.

When the catalyst from another preactivation treatment performed under the same conditions was analyzed, it was found that per gram of the titanium-containing support type catalyst component 23.2 g polymer were present, the intrinsic viscosity $\eta_{T2}$ of the polymer measured in tetralin at 135° C. was 21.5 dl/g and per gram of the titanium-containing support type catalyst component 22 g ethylene-propylene random copolymer (A) with an intrinsic viscosity $\eta_A$ of 22.5 dl/g including 0.7 wt % propylene units (determined by $^{13}$C-NMR) were formed due to preactivation treatment.

When the polymer obtained from an addition polymerization after yet another preactivation treatment performed under the same conditions was analyzed, it was found that per gram of the titanium-containing support type catalyst component 25.3 g polymer were present, the intrinsic viscosity $\eta_{T3}$ of the polymer measured in tetralin at 135° C. was 19.9 dl/g, and per gram of the titanium-containing support type catalyst component 2.1 g polymer with an intrinsic viscosity $\eta_C$ of 2.2 dl/g were newly formed due to addition polymerization.

(3) Production of Polypropylene Composition and Film (Main (Co)Polymerization of Propylene)

Gas phase polymerization was performed continuously for 150 h under the same conditions as in Example 32, except that the preactivated catalyst slurry obtained according to the above paragraph (2) was used as preactivated catalyst slurry, the ratio of hydrogen concentration to propylene concentration in the polymerization container was set to 0.012, and ethylene was fed continuously in addition to propylene into the polymerization container so as to maintain a ratio to the propylene concentration of 0.003 inside the polymerization container. Thus, a polypropylene resin having an intrinsic viscosity $\eta_T$ of 1.54 dl/g and containing 0.8 wt % ethylene units was obtained at a rate of 11.6 kg/h.

The polypropylene resin contained 0.12 wt % ethylene-propylene random copolymer (A) formed by preactivation treatment, and the propylenethylene copolymer had an intrinsic viscosity $\eta_P$ of 1.54 dl/g.

Then, granulation was performed with a pelletizer under the same conditions as in Example 30 to obtain pellets. The measured physical properties of the resulting pellets revealed a melt flow rate was 15.4 g/10 min, the melt strength was 1.4 cN and the isotactic index was 94%.

Using the resulting polypropylene resin, an evaluation was performed in conformity with Example 30. The physical properties of the resulting polypropylene resin are shown in Table 16. Table 17 shows the results of measurements of the physical properties of the uniaxially stretched film.

Comparative Example 34

A polypropylene resin was produced under the same conditions as in Example 33, except that preactivation treatment with ethylene and propylene has not been performed. Using the resulting polypropylene resin, an evaluation was performed in conformity with Example 27. The physical properties of the resulting polypropylene resin are shown in Table 16. Table 17 shows the results of measurements of the physical properties of the uniaxially stretched film.

TABLE 16

| | | Ex. 30 | Comp. Ex. 31 | Ex. 31 | Comp. Ex. 32 | Ex. 32 | Comp. Ex. 33 | Ex. 33 | Comp. Ex. 34 |
|---|---|---|---|---|---|---|---|---|---|
| Prel. Polymerization Polypropylene (B) | | | | | | | | | |
| Int. Viscosity $\eta$ | (dl/g) | 2.8 | 2.8 | 2.8 | 2.8 | 2.7 | 2.7 | 2.7 | 2.7 |
| Formed Amount[1] | (g/g) | 2.0 | 2.0 | 2.0 | 2.0 | 1.2 | 1.2 | 1.2 | 1.2 |
| Composition Ratio[2] | (wt %) | 0.02 | 0.02 | 0.02 | 0.02 | 0.01 | 0.01 | 0.01 | 0.01 |
| Preactivation Polyethylene (A) | | | | | | | | | |
| Int. Viscosity $\eta$ | (dl/g) | 34.0 | — | 34.4 | 34.0 | 30.2 | — | 22.5 | — |
| Formed Amount[1] | (g/g) | 22.0 | — | 4.5 | 0.005 | 32.0 | — | 22.0 | — |
| Composition Ratio[2] | (wt %) | 0.25 | — | 0.05 | 0.0001 | 0.18 | — | 0.12 | — |
| Addition Polymerization Polypropylene (C) | | | | | | | | | |
| Int. Viscosity $\eta$ | (dl/g) | 2.8 | 2.8 | 2.8 | 2.8 | 2.8 | 2.8 | 2.2 | 2.2 |
| Formed Amount[1] | (g/g) | 2.0 | 2.0 | 2.0 | 2.0 | 2.2 | 2.2 | 2.1 | 2.1 |
| Composition Ratio[2] | (wt %) | 0.02 | 0.02 | 0.02 | 0.02 | 0.01 | 0.01 | 0.01 | 0.01 |
| Polypropylene (b) | | | | | | | | | |
| Intrinsic Viscosity $\eta$ | (dl/g) | 1.89 | 1.89 | 1.90 | 1.89 | 1.75 | 1.75 | 1.52 | 1.52 |
| Polypropylene Resin | | | | | | | | | |
| Intrinsic Viscosity $\eta$ | (dl/g) | 1.97 | 1.89 | 1.92 | 1.89 | 1.80 | 1.75 | 1.54 | 1.52 |
| Melt Strength | (cN) | 4.9 | 0.8 | 2.0 | 1.0 | 2.5 | 0.6 | 1.4 | 0.3 |
| I.I.[3] | | 96 | 96 | 96 | 96 | 98 | 98 | 94 | 94 |
| Melt Flow Rate | (g/10 min) | 3.5 | 4.5 | 4.1 | 4.5 | 6.0 | 7.2 | 15.4 | 16.7 |

Notes:
[1] Amount (in g) formed per gram of transition metal compound catalyst component
[2] Composition ratio in polypropylene resin (in wt %)
[3] Isotactic Index

TABLE 17

| | Ex. 30 | Comp Ex. 31 | Ex. 31 | Comp. Ex. 32 | Ex. 32 | Comp. Ex. 33 | Ex. 33 | Comp. Ex. 34 |
|---|---|---|---|---|---|---|---|---|
| Neck-In (%) | 11 | 17 | 13 | 16 | 12 | 18 | 14 | 20 |
| Vibration (visual) | ○ | Δ | ○ | Δ | ○ | Δ | ○ | x |
| Width Contract. (%) | 11 | 15 | 12 | 15 | 12 | 17 | 14 | 20 |
| Physical Film Properties | | | | | | | | |
| Thickness Precision (%) | 8 | 13 | 9 | 13 | 9 | 15 | 10 | 18 |
| Haze (%) | 1.0 | 1.4 | 1.0 | 1.3 | 1.1 | 1.4 | 0.8 | 1.2 |
| Young's Modulus | | | | | | | | |
| MD (MPa) | 4520 | 4170 | 4470 | 4250 | 4930 | 4660 | 4100 | 3950 |
| TD (MPa) | 1575 | 1600 | 1550 | 1530 | 1700 | 1670 | 1420 | 1380 |
| Tens. Strength | | | | | | | | |
| MD (MPa) | 412 | 387 | 406 | 394 | 436 | 411 | 366 | 357 |
| TD (MPa) | 41 | 43 | 40 | 41 | 43 | 42 | 38 | 36 |
| Linear Thermal Exp. Coeff. 120° C. | | | | | | | | |
| MD (%) | 2.5 | 2.5 | 2.5 | 2.5 | 1.5 | 1.5 | 3.0 | 3.0 |
| TD (%) | -0.5 | -0.5 | -0.5 | -0.5 | -0.3 | -0.3 | -0.8 | -0.8 |

EXAMPLE 34

A polypropylene composition was produced in the same manner as in Example 1. The obtained polymer was a polypropylene resin containing 0.25 wt % polyethylene (A) corresponding to the component (a) due to the preactivation polymerization and the polypropylene component (b) had an intrinsic viscosity $\eta_T$ of 1.89 dl/g. The physical properties of the resulting polypropylene resin are listed in detail in Table 18.

Granulation of the Polypropylene Resin 100 weight parts of the obtained polypropylene resin were stirred and mixed for 1 min using a Henschel mixer (rademark) with 0.1 weight parts 2,6-di-t-butyl-p-cresol as antioxidant and 0.1 weight parts calcium stearate. The resulting blend was melted, kneaded and extruded at a melt-kneading temperature of 230° C. using an extrusion machine with a screw diameter of 40 mm to obtain pellets. When the physical properties of the resulting pellets were measured, it was found that the melt flow rate was 3.5 g/10 min, the melt strength was 4.9 cN and the isotactic index was 96%.

Production of a Biaxially Stretched Film

The obtained pellets were melted and extruded with a screw rotation frequency of 60 rpm at an extrusion temperature of 250° C. using an extrusion machine with a 65 mm diameter screw. Thus, a not-yet-stretched film of 1 mm thickness was obtained at 30° C. and a retrieval speed of 20 rpm by cooling and hardening with a cooling roll. Emission amount, neck-in and vibration at the time of sheet production were evaluated, the results are listed in Table 19. The resulting sheet was stretched at 162° C. to five-fold length in the machine direction and to eight-fold length in the cross direction using a batch-type expansion machine to obtain a biaxially stretched layered film of 25 μm thickness. A predetermined sample was cut out from the resulting film to measure the film properties. The results of those measurements are shown in Table 19.

Comparative Example 35

A polypropylene resin was produced under the same conditions as in Example 34, except that preactivation polymerization with ethylene of a titanium-containing support type catalyst component has not been performed. Using the resulting polypropylene resin, an evaluation was performed in conformity with Example 34. The physical properties of the resulting polypropylene resin are shown in Table 18. Table 19 shows the results of measurements of the physical properties of the biaxially stretched film.

EXAMPLE 35

A polypropylene resin was produced under the same conditions as in Example 34, except that the conditions for preactivation polymerization with ethylene were changed and the generated amount of polyethylene (A) was changed. Using the resulting polypropylene resin, an evaluation was performed in conformity with Example 34. The physical properties of the resulting polypropylene resin are shown in Table 18. Table 19 shows the results of measurements of the physical properties of the biaxially stretched film.

Comparative Example 36

A polypropylene resin was produced under the same conditions as in Example 34, except that the conditions for preactivation polymerization with ethylene were changed and the generated amount of polyethylene (A) was changed. Using the resulting polypropylene resin, an evaluation was performed in conformity with Example 34. The physical properties of the resulting polypropylene resin are shown in Table 18. Table 19 shows the results of measurements of the physical properties of the biaxially stretched film.

EXAMPLE 36

A polypropylene composition was prepared in the same manner as in Example 4. The resulting polymer had an intrinsic viscosity $\eta_T$ of 1.80 dl/g.

The polymer contained 0.18 wt % polyethylene (A) formed due to the preactivation treatment and the polypropylene had an intrinsic viscosity $\eta_P$ of 1.75 dl/g.

Then, granulation was performed with a pelletizer under the same conditions as in Example 34 to obtain pellets. The measured physical properties of the resulting pellets revealed that the melt flow rate was 6.0 g/10 min, the melt strength was 2.5 cN and the isotactic index was 98%.

Using the resulting polypropylene resin, an evaluation was performed in conformity with Example 34. The physical properties of the resulting polypropylene resin are shown in Table 18. Table 19 shows the results of measurements of the physical properties of the biaxially stretched film.

Comparative Example 37

A polypropylene resin was produced under the same conditions as in Example 36, except that preactivation polymerization with ethylene has not been performed. Using the resulting polypropylene resin, an evaluation was performed in conformity with Example 34. The physical properties of the resulting polypropylene resin are shown in Table 18. Table 19 shows the results of measurements of the physical properties of the uniaxially stretched film.

EXAMPLE 37

(1) Preparation of Transition Metal Compound Catalyst Component

A titanium-containing support type catalyst component was obtained under the same conditions as in Example 36.

(2) Preparation of Preactivated Catalyst

A preactivated catalyst slurry was obtained under the same conditions as in Example 36, except that the conditions for preactivation polymerization with ethylene were changed in the following way: In addition to ethylene, 30 g propylene was fed at a reaction temperature of 0° C., and the reaction time was 45 min.

When the catalyst from another preactivation treatment performed under the same conditions was analyzed, it was found that per gram of the titanium-containing support type catalyst component 23.2 g polymer were present, the intrinsic viscosity $\eta_{T2}$ of the polymer measured in tetralin at 135° C. was 21.5 dl/g and per gram of the titanium-containing support type catalyst component 22 g ethylene-propylene random copolymer (A) with an intrinsic viscosity $\eta_A$ of 22.5 dl/g including 0.7 wt % propylene units (determined by $^{13}$C-NMR) were formed due to preactivation treatment.

When the polymer obtained from an addition polymerization after yet another preactivation treatment performed under the same conditions was analyzed, it was found that per gram of the titanium-containing support type catalyst component 25.3 g polymer were present, the intrinsic viscosity $\eta_{T3}$ of the polymer measured in tetralin at 135° C. was 19.9 dl/g, and per gram of the titanium-containing support type catalyst component 2.1 g polymer with an intrinsic viscosity $\eta_C$ of 2.2 dl/g were newly formed due to addition polymerization.

(3) Production of Polypropylene Composition and Film (Main (Co)Polymerization of Propylene)

Gas phase polymerization was performed continuously for 150 h under the same conditions as in Example 36, except that, other than in Example 36 (3), the preactivated catalyst slurry obtained according to the above paragraph (2) was used as preactivated catalyst slurry, the ratio of hydrogen concentration to propylene concentration in the polymerization container was set to 0.012, and ethylene was fed continuously in addition to propylene into the polymerization container so as to maintain a ratio to the propylene concentration of 0.003 inside the polymerization container. Thus, a polypropylene resin having an intrinsic viscosity $\eta_T$ of 1.54 dl/g and containing 0.8 wt % ethylene units was obtained at a rate of 11.6 kg/h.

The polypropylene resin contained 0.12 wt % ethylene-propylene random copolymer (A) formed by preactivation treatment, and the propylene-ethylene copolymer had an intrinsic viscosity $\eta_P$ of 1.52 dl/g.

Then, granulation was performed with a pelletizer under the same conditions as in Example 34 to obtain pellets. The measured physical properties of the resulting pellets revealed that the melt flow rate was 15.4 g/10 min, the melt strength was 1.4 cN and the isotactic index was 94%.

Using the resulting polypropylene resin, an evaluation was performed in conformity with Example 34. The physical properties of the resulting polypropylene resin are shown in Table 18. Table 17 shows the results of measurements of the physical properties of the biaxially stretched film.

Comparative Example 38

A polypropylene resin was produced under the same conditions as in Example 37, except that preactivation treatment with ethylene and propylene has not been performed. Using the resulting polypropylene resin, an evaluation was performed in conformity with Example 34. The physical properties of the resulting polypropylene resin are shown in Table 18. Table 19 shows the results of measurements of the physical properties of the uniaxially stretched film.

TABLE 18

| | | Ex. 34 | Comp. Ex. 35 | Ex. 35 | Comp. Ex. 36 | Ex. 36 | Comp. Ex. 37 | Ex. 37 | Comp. Ex. 38 |
|---|---|---|---|---|---|---|---|---|---|
| Prel. Polymerization Polypropylene (B) | | | | | | | | | |
| Int. Viscosity $\eta$ | (dl/g) | 2.8 | 2.8 | 2.8 | 2.8 | 2.7 | 2.7 | 2.7 | 2.7 |
| Formed Amount[1] | (g/g) | 2.0 | 2.0 | 2.0 | 2.0 | 1.2 | 1.2 | 1.2 | 1.2 |
| Composition Ratio[2] | (wt %) | 0.02 | 0.02 | 0.02 | 0.02 | 0.01 | 0.01 | 0.01 | 0.01 |
| Preactivation Polyethylene (A) | | | | | | | | | |
| Int. Viscosity $\eta$ | (dl/g) | 34.0 | — | 34.4 | 34.0 | 30.2 | — | 22.5 | — |
| Formed Amount[1] | (g/g) | 22.0 | — | 4.5 | 0.005 | 32.0 | — | 22.0 | — |
| Composition Ratio[2] | (wt %) | 0.25 | — | 0.05 | 0.0001 | 0.18 | — | 0.12 | — |
| Addition Polymerization Polypropylene (C) | | | | | | | | | |
| Int. Viscosity. $\eta$ | (dl/g) | 2.8 | 2.8 | 2.8 | 2.8 | 2.8 | 2.8 | 2.2 | 2.2 |
| Formed Amount[1] | (g/g) | 2.0 | 2.0 | 2.0 | 2.0 | 2.2 | 2.2 | 2.1 | 2.1 |
| Composition Ratio[2] | (wt %) | 0.02 | 0.02 | 0.02 | 0.02 | 0.01 | 0.01 | 0.01 | 0.01 |
| Polypropylene (b) | | | | | | | | | |
| Intrinsic Viscosity $\eta$ Polypropylene Resin | (dl/g) | 1.89 | 1.89 | 1.90 | 1.89 | 1.75 | 1.75 | 1.52 | 1.52 |
| Intrinsic Viscosity $\eta$ | (dl/g) | 1.97 | 1.89 | 1.92 | 1.89 | 1.80 | 1.75 | 1.54 | 1.52 |
| Melt Strength | (cN) | 4.9 | 0.8 | 2.0 | 1.0 | 2.5 | 0.6 | 1.4 | 0.3 |

TABLE 18-continued

|  |  | Ex. 34 | Comp. Ex. 35 | Ex. 35 | Comp. Ex. 36 | Ex. 36 | Comp. Ex. 37 | Ex. 37 | Comp. Ex. 38 |
|---|---|---|---|---|---|---|---|---|---|
| I.I.[3] |  | 96 | 96 | 96 | 96 | 98 | 98 | 94 | 94 |
| Melt Flow Rate | (g/10 min) | 3.5 | 4.5 | 4.1 | 4.5 | 6.0 | 7.2 | 15.4 | 16.7 |

Notes:
[1] Amount (in g) formed per gram of transition metal compound catalyst component
[2] Composition ratio in polypropylene resin (in wt %)
[3] Isotactic Index

TABLE 19

|  |  | Ex. 34 | Comp Ex. 35 | Ex. 35 | Comp. Ex. 36 | Ex. 36 | Comp. Ex. 37 | Ex. 37 | Comp. Ex. 38 |
|---|---|---|---|---|---|---|---|---|---|
| Amount Emitted from the Extrusion Machine (kg/h) |  | 41 | 40 | 41 | 40 | 44 | 43 | 50 | 49 |
| Extr. Mach. Load (A) |  | 60 | 60 | 60 | 60 | 55 | 55 | 45 | 46 |
| Resin Press. (MPa) |  | 5.2 | 5.3 | 5.2 | 5.2 | 4.6 | 4.7 | 3.9 | 4.0 |
| Neck-In (%) |  | 10 | 15 | 12 | 14 | 11 | 16 | 13 | 18 |
| Vibration (visual) |  | ○ | Δ | ○ | Δ | ○ | Δ | ○ | x |
| Physical Film Properties |  |  |  |  |  |  |  |  |  |
| Thickness Precision (%) |  | 8 | 12 | 8 | 12 | 8 | 14 | 10 | 18 |
| Haze (%) |  | 0.1 | 0.2 | 0.1 | 0.2 | 0.1 | 0.2 | 0.1 | 0.3 |
| Young's Modulus |  |  |  |  |  |  |  |  |  |
| MD | (MPa) | 2200 | 2100 | 2180 | 2170 | 2450 | 2380 | 2000 | 1950 |
| TD | (MPa) | 3750 | 3590 | 3700 | 3670 | 4100 | 3980 | 3420 | 3320 |
| Tens. Strength |  |  |  |  |  |  |  |  |  |
| MD | (MPa) | 140 | 136 | 138 | 137 | 155 | 148 | 129 | 122 |
| TD | (MPa) | 290 | 283 | 287 | 282 | 302 | 290 | 275 | 270 |

EXAMPLE 38

A polypropylene composition was prepared in the same manner as in Example 1. The resulting polymer had an intrinsic viscosity $\eta_T$ of 1.80 dl/g.

The resulting polymer contained 0.18 wt % polyethylene (A) formed due to the preactivation treatment and the polypropylene had an intrinsic viscosity $\eta_P$ of 1.75 dl/g. The physical properties of the obtained polypropylene composition are listed in detail in Table 20.

Granulation of the Polypropylene Resin 100 weight parts of the obtained polypropylene resin were stirred and mixed for 1 min using a Henschel mixer Mrademark) with 0.1 weight parts 2,6-di-t-butyl-presol as antioxidant and 0.1 weight parts calcium stearate. The resulting blend was melted, kneaded and extruded at a melt-kneading temperature of 230° C. using an extrusion machine with a screw diameter of 40 mm to obtain pellets. When the physical properties of the resulting pellets were measured, it was found that the melt flow rate was 6.0 g/10 min, the melt strength was 2.5 cN and the isotactic index was 98%.

Production of a Biaxially Stretched Film

Using the resulting pellets, a not-yet-stretched film was produced at an extrusion temperature of 250° C. The resulting not-yet-stretched film was stretched at 143° C. to 4.5-fold length in the extrusion direction and at 165° C. to eight-fold length in the cross direction to obtain a biaxially stretched film. Using this biaxially stretched film, the fusion seal strength and the physical film properties of a cut out predetermined sample were measured. The results are listed in Table 21.

Comparative Example 39

A polypropylene resin was produced under the same conditions as in Example 38, except that preactivation polymerization with ethylene has not been performed. Using the resulting polypropylene resin, an evaluation was performed in conformity with Example 38. The physical properties of the resulting polypropylene resin are shown in Table 20. Table 21 shows the results of measurements of the physical properties of the biaxially stretched film.

EXAMPLES 39–41

A polypropylene resin was produced under the same conditions as in Example 38, except that the conditions for preactivation polymerization with ethylene were changed to change the generated amount of polyethylene (A) and the (main polymerization) conditions for the production of polypropylene were changed to alter the isotactic index. Using the resulting polypropylene resin, an evaluation was performed in conformity with Example 38. The physical properties of the resulting polypropylene resin are shown in Table 20. Table 21 shows the results of measurements of the physical properties of the biaxially stretched film.

Comparative Example 40

A polypropylene resin was produced under the same conditions as in Example 39, except that preactivation polymerization with ethylene has not been performed. Using the resulting polypropylene resin, an evaluation was performed in conformity with Example 38. The physical properties of the resulting polypropylene resin are shown in Table 20. Table 21 shows the results of measurements of the physical properties of the biaxially stretched film.

Comparative Example 40

A polypropylene resin was produced under the same conditions as in Example 38, except that the conditions for preactivation polymerization with ethylene were changed to change the generated amount of polyethylene (A) and the (main polymerization) conditions for the production of polypropylene were changed to alter the isotactic index. Using the resulting polypropylene resin, an evaluation was performed in conformity with Example 38. The physical properties of the resulting polypropylene resin are shown in Table 20. Table 21 shows the results of measurements of the physical properties of the biaxially stretched film.

TABLE 20-continued

|  | Example | | | | Comparative Example | | |
|---|---|---|---|---|---|---|---|
|  | 38 | 39 | 40 | 41 | 39 | 40 | 41 |
| Melt Strength (cN) | 2.5 | 8.5 | 3.0 | 4.1 | 0.6 | 1.6 | 2.1 |
| I.I.(3) | 98 | 96 | 96 | 94 | 98 | 96 | 96 |
| Melt Flow Rate (g/10 min) | 6.0 | 1.5 | 1.8 | 7.8 | 7.2 | 1.8 | 1.3 |

Notes:
(1)Amount (in g) formed per gram of transition metal compound catalyst component
(2)Composition ratio in polypropylene resin (in wt %)
(3)Isotactic Index

TABLE 21

|  | Unit | Example | | | | Comp. Example | | |
|---|---|---|---|---|---|---|---|---|
|  |  | 38 | 39 | 40 | 41 | 39 | 40 | 41 |
| Melt Flow Rate | g/10 min | 6.0 | 1.5 | 1.8 | 7.8 | 7.2 | 1.8 | 1.3 |
| Fusion Seal Properties |  |  |  |  |  |  |  |  |
| Av. Seal Strength | N/15 mm | 34 | 36 | 34 | 32 | 25 | 29 | 30 |
| Max. Seal Strength | N/15 mm | 38 | 40 | 37 | 36 | 31 | 34 | 35 |
| Min. Seal Strength | N/15 mm | 28 | 30 | 29 | 27 | 14 | 16 | 18 |
| Visible Whiskers | — | ◯ | ◯ | ◯ | ◯ | X | ◯ | ◯ |
| Young's Modulus | MPa | 2350 | 2140 | 2100 | 2000 | 2270 | 2100 | 2120 |
| Haze | % | 0.1 | 0.1 | 0.1 | 0.1 | 0.2 | 0.2 | 0.2 |

Notes:
(1) Young's Modulus of the Biaxially Stretched Film in Extrusion Direction

TABLE 20

|  | Example | | | | Comparative Example | | |
|---|---|---|---|---|---|---|---|
|  | 38 | 39 | 40 | 41 | 39 | 40 | 41 |
| Prel. Polymerization Polypropylene (B) |  |  |  |  |  |  |  |
| Int. Viscosity η (dl/g) | 2.7 | 2.8 | 2.7 | 2.8 | 2.7 | 2.7 | 2.8 |
| Formed Amount(1) (g/g) | 1.2 | 2.0 | 1.5 | 2.0 | 1.2 | 1.2 | 2.0 |
| Composition Ratio(2) (wt %) | 0.01 | 0.01 | 0.01 | 0.01 | 0.01 | 0.01 | 0.01 |
| Preactivation Polyethylene (A) |  |  |  |  |  |  |  |
| Int. Viscosity η (dl/g) | 30.2 | 33.2 | 31.3 | 33.2 | — | — | 30.8 |
| Formed Amount(1) (g/g) | 32.0 | 45.8 | 16.8 | 45.8 | — | — | 0.018 |
| Composition Ratio(2) (wt %) | 0.18 | 0.28 | 0.09 | 0.26 | — | — | 0.0001 |
| Addition Polymerization Polypropylene (C) |  |  |  |  |  |  |  |
| Int. Viscosity η (dl/g) | 2.8 | 2.8 | 2.7 | 2.8 | 2.8 | 2.8 | 2.5 |
| Formed Amount(1) (g/g) | 2.2 | 1.8 | 2.0 | 1.8 | 2.2 | 2.2 | 1.8 |
| Composition Ratio(2) (wt %) | 0.01 | 0.01 | 0.01 | 0.01 | 0.01 | 0.01 | 0.01 |
| Polypropylene (b) |  |  |  |  |  |  |  |
| Intrinsic Viscosity η (dl/g) | 1.75 | 2.18 | 2.17 | 1.64 | 1.75 | 2.18 | 2.33 |
| Polypropylene Resin |  |  |  |  |  |  |  |
| Intrinsic Viscosity η (dl/g) | 1.80 | 2.27 | 2.20 | 1.72 | 1.75 | 2.18 | 2.33 |

Below, definitions of some technical terms used in the following Examples 42–47 and the Comparative Examples 42–43 and explanations concerning measurement methods are given.

(1) Extrudability 100 weight parts of the composition or resin to be evaluated are mixed with 0.1 weight parts tetrakis [methylene-3-(3'-5'-di-t-butyl-4'-hydroxyphenol) propionate]methane and 0.1 weight parts calcium stearate. Then, the obtained composition was melt-kneaded at 230° C. using an extrusion pelletizer with a screw diameter of 65 mm and granulated to obtain a pellet-shaped composition.

Using a molding machine comprising an extrusion machine of 65 mm diameter and a T-die, the resulting composition was fed into the raw material feed opening of the extrusion machine, and the values for screw rotation frequency and load current (I) were set so that the emission amount from the T-die at a resin temperature of 230° C. was 60 kg/h. These settings were measured.

(2) Moldability

A 0.4 mm thick sheet was used as a sample sheet. This sample sheet was attached to a frame with an aperture of 300×300 mm and then maintained horizontally for a fixed period of time in a heating oven, which was kept at 180° C.

When a sheet of polypropylene or a polypropylene composition was evaluated in this manner, usually the following phenomena could be observed.

First of all a central portion of the sheet droops due to the heat. Then, a portion of the droop starts to recover and this state of recovery continues for a certain time. Finally, it starts to droop again, and another recovery cannot be observed.

The amount of the first droop as explained above is called "droop amount" (mm).

The time that the state of recovery of a portion of the droop continues as described above is called "holding time" (sec).

A "recovery rate" (%) was determined according to the following equation:

Eq. 1:
$$\frac{\text{(recovery amount of a portion of the droop (mm))}}{\text{(droop amount in the beginning)}} \times 100$$

When the droop amount is small, the recovery rate is big, and the longer the holding time the better is the vacuum moldability.

EXAMPLE 42

A polypropylene composition was produced in the same manner as in Example 1. The resulting polymer had an intrinsic viscosity $\eta_r$ of 1.97 dl/g.

The obtained polymer was a polypropylene composition containing 0.25 wt % polyethylene (A) corresponding to the component (a) due to the preactivation polymerization and the polypropylene component (b) had an intrinsic viscosity $\eta_P$ of 1.97 dl/g.

The melt strength (MS) of the obtained polypropylene composition was 4.9 cN and the melt flow rate was 3.5 g/10 min.

100 weight parts of this polypropylene composition were mixed with 0.1 weight parts 2,6-di-t-butyl-presol and 0.1 weight parts calcium stearate and then extruded using an extrusion pelletizer with a cylinder temperature set to 230° C. and a screw diameter of 40 mm to obtain a pellet-shaped composition.

Using this composition, a sheet of 0.4 mm sheet thickness was produced at a resin temperature of 230° C., a cooling roll temperature of 60° C. and a retrieval rate of 10 m/min using a T-die sheet molding machine with 65 mm screw diameter. The extrudability and the sheet's moldability at this time are shown in Table 22.

EXAMPLE 43

A polypropylene composition was produced under the same conditions as in Example 42. 100 weight parts of this polypropylene composition were mixed with 0.1 weight parts 2,6-di-t-butyl-p-cresol and 0.1 weight parts calcium stearate and then extruded using an extrusion pelletizer with a cylinder temperature set to 230° C. and a screw diameter of 40 mm to obtain a pellet-shaped composition.

Using this composition, a sheet of 0.4 mm sheet thickness was produced at a resin temperature of 295° C., a cooling roll temperature of 20° C. and a retrieval rate of 50 m/min using a T-die sheet molding machine with 65 mm screw diameter. The extrudability and the resulting sheet's moldability at this time are shown in Table 22.

EXAMPLE 44

A polypropylene composition was produced under the same conditions as in Example 42. 100 weight parts of this polypropylene composition were mixed with 0.1 weight parts 2,6-di-t-butyl-p-cresol and 0.1 weight parts calcium stearate and then extruded using an extrusion pelletizer with a cylinder temperature set to 230° C. and a screw diameter of 40 mm to obtain a pellet-shaped composition.

Using this composition, a sheet of 0.4 mm sheet thickness was produced at a resin temperature of 180° C., a cooling roll temperature of 60° C. and a retrieval rate of 0.1 m/min using a T-die sheet molding machine with 65 mm screw diameter. The extrudability and the resulting sheet's moldability at this time are shown in Table 22.

EXAMPLE 45

A polypropylene composition was produced under the same conditions as in Example 42. 100 weight parts of this polypropylene composition were mixed with 0.1 weight parts 2,6-di-t-butyl-presol and 0.1 weight parts calcium stearate and then extruded using an extrusion pelletizer with a cylinder temperature set to 230° C. and a screw diameter of 40 mm to obtain a pellet-shaped composition.

Using this composition, a sheet of 0.4 mm sheet thickness was produced at a resin temperature of 230° C., a cooling roll temperature of 5° C. and a retrieval rate of 10 m/min using a T-die sheet molding machine with 65 mm screw diameter. The extrudability and the resulting sheet's moldability at this time are shown in Table 22.

EXAMPLE 46

A polypropylene composition was produced under the same conditions as in Example 42. 100 weight parts of this polypropylene composition were mixed with 0.1 weight parts 2,6-di-t-butyl-p-cresol and 0.1 weight parts calcium stearate and then extruded using an extrusion pelletizer with a cylinder temperature set to 230° C. and a screw diameter of 40 mm to obtain a pellet-shaped composition.

Using this composition, a sheet of 0.4 mm sheet thickness was produced at a resin temperature of 230° C., a cooling roll temperature of 80° C. and a retrieval rate of 10 m/min using a T-die sheet molding machine with 65 mm screw diameter. The extrudability and the resulting sheet's moldability at this time are shown in Table 22.

Comparative Example 42

100 weight parts of a polypropylene homopolymer having an intrinsic viscosity $\eta$ of 1.97 dl/g measured in 135° C. tetralin and a melt strength of 0.9 cN were mixed with 0.1 weight parts 2,6-di-t-butyl-p-cresol and 0.1 weight parts calcium stearate and then extruded using an extrusion pelletizer with a cylinder temperature set to 230° C. and a screw diameter of 40 mm to obtain a pellet-shaped composition.

Using this composition, a sheet of 0.4 mm sheet thickness was produced at a resin temperature of 230° C., a cooling roll temperature of 60° C. and a retrieval rate of 10 m/min using a T-die sheet molding machine with 65 mm screw diameter. The extrudability and the resulting sheet's moldability at this time are shown in Table 22.

Comparative Example 42

A polypropylene composition was obtained under the same conditions as in Example 42, except that the conditions for preactivation polymerization with ethylene were changed insofar that the amount of polyethylene (A) generated per gram of transition metal compound catalyst component was changed from 22.0 g/g to 0.005 g/g. 100 weight parts of this polypropylene composition were mixed with 0.1 weight parts 2,6-di-t-butyl-p-cresol and 0.1 weight parts calcium stearate and then extruded using an extrusion pelletizer with a cylinder temperature set to 230° C. and a screw diameter of 40 mm to obtain a pellet-shaped composition.

Using this composition, a sheet of 0.4 mm sheet thickness was produced at a resin temperature of 230° C., a cooling roll temperature of 60° C. and a retrieval rate of 10 m/min using a T-die sheet molding machine with 65 mm screw diameter. The extrudability and the resulting sheet's moldability at this time are shown in Table 22.

EXAMPLE 47

A polypropylene composition was produced in a similar manner as in Example 4. The resulting polymer had an intrinsic viscosity $\eta_T$ of 1.80 dl/g. The polymer contained 0.18 weight parts polyethylene (A) formed due to preactivation treatment and the intrinsic viscosity $\eta_P$ of the polypropylene component (b) was 1.80 dl/g.

The obtained polypropylene composition had a melt strength (MS) of 2.5 cN.

100 weight parts of this polypropylene composition were mixed with 0.1 weight parts 2,6-di-t-butyl-p-cresol and 0.1 weight parts calcium stearate and then extruded using an extrusion pelletizer with a cylinder temperature set to 230° C. and a screw diameter of 40 mm to obtain a pellet-shaped composition.

Using this composition, a sheet of 0.4 mm sheet thickness was produced at a resin temperature of 230° C., a cooling roll temperature of 60° C. and a retrieval rate of 10 m/min using a T-die sheet molding machine with 65 mm screw diameter. The extrudability and the resulting sheet's moldability at this time are shown in Table 22.

Below, definitions of some technical terms used in the following Examples 48–57 and Comparative Examples 44–54 and explanations concerning measurement methods are given:

(1) Intrinsic Viscosity η

Value of the intrinsic viscosity in dl/g measured with an Ostwald viscometer (product of Mitsui Toatsu Chemicals, Inc.) in tetralin at 135° C.

(2) Melt Strength (MS)

Value in cN measured with a Melt Tension Tester-2 (product of TOYO SEIKI SEISAKUSHO).

(3) Crystallization Temperature (Tc)

After raising the temperature of polypropylene composition from room temperature to 230° C. at a rate of 30° C./min and holding this temperature for 10 min, the temperature was lowered to −20° C. at −20° C./min and kept for 10 min, again raised to 230° C. at 20° C./min and kept for 10 min, then lowered to 150° C. at −80/min, and further lowered from 150° C. at −5° C./min, while measuring the temperature (in °C.) at the biggest peak of absorption heat at crystallization time with a DSC7 type differential scan calorimeter (product of Perkin Elmer).

(4) Expandability

The thickness of the layered resin film, which has been produced by melt-coating, is measured using a Dial Gauge Trademark). Thickness measurements are performed at

TABLE 22

| | Example | | | | | | Comp. Ex. | |
|---|---|---|---|---|---|---|---|---|
| | 42 | 43 | 44 | 45 | 46 | 47 | 42 | 43 |
| Prel. Polymerization Polypropylene (B) | | | | | | | | |
| Int. Viscosity η (dl/g) | 2.8 | 2.8 | 2.8 | 2.8 | 2.8 | 2.7 | | 2.8 |
| Formed Amount[1] (g/g) | 2.0 | 2.0 | 2.0 | 2.0 | 2.0 | 1.2 | | 2.0 |
| Composition Ratio[2] (wt %) | 0.02 | 0.02 | 0.02 | 0.02 | 0.02 | 0.01 | | 0.02 |
| Preactivation Polyethylene (A) | | | | | | | | |
| Int. Viscosity η (dl/g) | 34.0 | 34.0 | 34.0 | 34.0 | 34.0 | 30.2 | | 2.8 |
| Formed Amount[1] (g/g) | 22.0 | 22.0 | 22.0 | 22.0 | 22.0 | 32.0 | | 0.005 |
| Composition Ratio[2] (wt %) | 0.25 | 0.25 | 0.25 | 0.25 | 0.25 | 0.18 | | 1E-4 |
| Addition Polymerization Polypropylene (C) | | | | | | | | |
| Int. Viscosity η (dl/g) | 2.8 | 2.8 | 2.8 | 2.8 | 2.8 | 2.8 | | 2.8 |
| Formed Amount[1] (g/g) | 2.0 | 2.0 | 2.0 | 2.0 | 2.0 | 2.2 | | |
| Composition Ratio[2] (wt %) | 0.02 | 0.02 | 0.02 | 0.02 | 0.02 | 0.01 | | 0.02 |
| Polypropylene Resin | | | | | | | | |
| Intrinsic Viscosity η (dl/g) | 1.97 | 1.97 | 1.97 | 1.97 | 1.97 | 1.80 | 1.97 | 1.89 |
| Melt Strength (cN) | 4.9 | 4.9 | 4.9 | 4.9 | 4.9 | 2.5 | 0.9 | 1.0 |
| Crystall. Temp. (Tc) (° C.) | 122.5 | 122.5 | 122.5 | 122.5 | 122.5 | 122.0 | 120.3 | 117.0 |
| Melt Flow Rate (g/10 min) | 35 | 3.5 | 3.5 | 3.5 | 3.5 | 6.0 | 3.5 | 4.5 |
| Sheet Prod. Conditions | | | | | | | | |
| Resin Temperature (° C.) | 230 | 295 | 180 | 230 | 230 | 230 | 230 | 230 |
| Cooling Roll Temp. (° C.) | 60 | 20 | 60 | 5 | 80 | 60 | 60 | 60 |
| Retrieval Velocity (m/min) | 10 | 50 | 0.1 | 10 | 10 | 10 | 10 | 10 |
| Extrudability | | | | | | | | |
| Screw Frequency (rpm) | 60 | 60 | 60 | 60 | 60 | 50 | 82 | 80 |
| Load Current (I) | 110 | 110 | 110 | 110 | 110 | 90 | 165 | 160 |
| Moldability | | | | | | | | |
| Droop Amount (mm) | 20 | 20 | 20 | 20 | 22 | 22 | 28 | 30 |
| Recovery Rate (mm) | 100 | 100 | 100 | 100 | 100 | 100 | 70 | 80 |
| Holding Time (sec) | 50 | 45 | 55 | 55 | 50 | 45 | 8 | 15 |

Notes:
[1]Amount (in g) formed per gram of transition metal compound catalyst component
[2]Composition ratio in polypropylene resin (in wt %)

intervals of 10 cm in the cross direction and at intervals of 1 m over a length of 50 m in the machine direction. The standard deviations for cross and machine direction are calculated and the quality is judged by evaluating into which of the following ranges the standard deviations fall. The expandability is better the smaller the standard deviations are.

Expandability Criteria

○: The standard deviations for the cross direction and the machine direction are both under 5%.

X: One of the two standard deviations for the cross direction and the machine direction is at least 5%.

(5) Neck-in Length

Difference (in mm) between the length of the T-die opening for melt-coating and the width (in the cross direction) of the obtainedsurface coating layered resin film, measured with a metal ruler. The smaller the neck-in length, the smaller is the neck-in and the wider is the product width of a surface coating layered article having a homogenous thickness. In order to discriminate the effect of the polypropylene composition, the lip opening of the T-die was set to standardized conditions (1.0 mm).

(6) Productivity

A quality ranking was performed according to the following outer appearance criteria, which include, in addition to the expandability and neck-in length measurements, transparency variations of the produced film (variations of the haze value (ASTM D 1003) of at least 2%).

Adhesion Force Criteria (in g/15 mm)

○: at least 200 g/15 mm

Δ: at 100 g/15 mm and less than 200 g/15 mm x: less than 100 g/15 mm

A good adhesion force is at least 200 g/15 mm, a product with an adhesion force under 100 g/15 mm is useless.

| Productivity Rank | Expandability | Neck-in Length (mm) | Adhesion Force |
|---|---|---|---|
| 10 | ○ | Under 40 | ○ |
| 9 | ○ | At least 40 and under 100 | ○ |
| 8 | ○ | Under 40 | Δ |
| 7 | ○ | At least 40 and under 100 | Δ |
| 6 | ○ | At least 100 | ○ |
| 5 | ○ | At least 100 | Δ |
| 4 | ○ | Under 40 | X |
| 3 | ○ | At least 40 | X |
| 2 | X | Under 40 | X, Δ, ○ |
| 1 | X | At least 40 | X, Δ, ○ |

A high productivity has at least rank 7, preferably rank 9.

EXAMPLE 48

A polypropylene composition was produced in the same manner as in Example 1. The resulting polymer had an intrinsic viscosity $\eta_r$ of 1.49 dl/g. The obtained polymer was a polypropylene composition containing 0.25 wt % polyethylene (B) corresponding to the component (b) due to the preactivation polymerization and the polypropylene component (a) had an intrinsic viscosity $\eta_P$ of 1.49 dl/g.

Production of a Polyolefin Resin Composition and a Surface Coated Layered Article 100 weight parts of the resulting polypropylene composition were mixed for 2 min using a Henschel mixer with 0.05 weight parts tetrakis [methylene-3-3'-5'-di-t-butyl-4-hydroxyphenol)propionate]methane, 0.1 weight parts calcium stearate and 5 weight parts non-crystalline ethylene-propylene copolymer (containing 20 wt % propylene) having an ER-MFR of 8.0 g/10 min. The blend was granulated and pelletized at 230° C. using an extrusion pelletizer with a screw diameter of 65 mm. When various physical properties of the pellets were measured, it was found that the melt flow rate was 19.5 g/10 min, the crystallization temperature was 122.5° C. and the melt strength (MS) was 2.1 cN.

Using a single layer melt extrusion machine device (T-die method: pressure adhesion laminator with metal and silicone rubber roll) with a screw diameter of 90 mm, a T-die opening length of 1 m and a lip opening width of 0.8 mm, the obtained pellets were coated on 75 g/m² kraft paper (of 90 mm width) under the conditions of 280° C. melt temperature and 20° C. water flow temperature in the chillrolls with a target resin coating thickness of 15 μm and at a retrieval rate of 150 m/min and 20 kg/cm linear pressure between the metal and the silicone rubber roll. The resulting coated layered article had a productivity rank of 10.

Example 49 and Comparative Example 44

A polypropylene composition was produced under the same conditions as in Example 48, except that the conditions for preactivation polymerization with ethylene were changed to alter the generated amount of polyethylene. The same combination as in Example 48 was mixed and pelletized to prepare the polyolefin composition of Example 49 and Comparative Example 44.

The physical properties of the resulting polypropylene composition and the productivity of a surface coated layered article made under the same processing conditions as in Example 48 using the resulting polyolefin composition are shown in Table 23.

Comparative Example 45

A polypropylene composition was produced using the same conditions as in Example 48, except that instead of the preactivation polymerization with ethylene in paragraph (2) of Example 48, a total of 220 g propylene is fed in three portions to the reaction container: 80 g at the beginning of the preactivation polymerization, 80 g about 30 min after the begin and 60 g about one hour after the beginning of the preactivation polymerization. The polypropylene composition was pelletized and samples for the evaluation of Comparative Example 45 were prepared.

The properties of the obtained propylene polymer composition and the productivity of a surface coated layered article produced using the polyolefin composition pellets under the same processing conditions as in Example 48 are shown in Table 23.

Comparative Example46

A polypropylene composition was prepared using the same conditions as in Example 48, except that the preactivation polymerization with ethylene of a titanium-containing support type catalyst component was not performed. A sample for the evaluation of Comparative Example 46 was produced from the resulting polypropylene composition. The properties of the obtained propylene polymer composition and the productivity of a surface coated layered article produced using the polyolefin composition pellets under the same processing conditions as in Example 48 are shown in Table 23.

Comparative Example 47

After nitrogen gas has been filled into a reaction vessel having an agitator with tilted mixing blades, 10 kg of a propylene homopolymer powder with an intrinsic viscosity η of 1.67 dl/g and an average particle size of 150 μm, which has been obtained by slurry-polymerization of propylene in n-hexane using a catalyst combining a titanium-containing catalyst component comprising a titanium-trichloride composition with diethylaluminumchloride and diethyleneglycoldimethylether as a third component, were filled into the reactor vessel. Successively, the procedure of evacuating the reactor vessel and refilling it with nitrogen gas up to atmospheric pressure was repeated ten times. Then, 0.35 mol di-2-ethylhexylperoxydicarbonate (modifier) in a toluene solution of 70 wt % concentration was added and mixed under the nitrogen gas atmosphere at 25° C. while stirring. Then, the temperature in the reactor vessel was raised to 120° C. and reaction took place at this temperature for 30 min. After the reaction time had passed, the temperature inside the reactor vessel was raised to 135° C. and an after-treatment was performed at this temperature for 30 min. After the after-treatment, the reactor vessel was cooled down to room temperature and opened to retrieve the polypropylene.

100 weight parts of the obtained propylene polymer were mixed for 2 min using a Henschel mixer with 0.05 weight parts tetrakis [methylene-3-(3'-5'-di-t-butyl-4'-hydroxyphenol)propionate]methane and 0.1 weight parts calcium stearate, in addition to the same compounds as in Example 48. The blend was granulated and pelletized at 230° C. using an extrusion pelletizer with a screw diameter of 65 mm and samples for the evaluation of Comparative Example 47 were prepared. Using the obtained pellets, a surface coated layered article of 15 μm target coating thickness was produced at a retrieval rate of 150 m/min using a single layer melt-extrusion device with a 90 mm diameter screw, whose T-die had an opening length of 1 m and a lip opening width of 0.8 mm, at a melt temperature of 280° C. and a chillroll water flow temperature of 20° C. The productivity of the surface coated layered article had the rank "6".

TABLE 23

| | Example | | Comparative Example | | | |
|---|---|---|---|---|---|---|
| | 48 | 49 | 44 | 45 | 46 | 47 |
| Polypropylene Obtained by Prepolymerization | | | | | | |
| Int. Viscosity η (dl/g) | 2.8 | 2.8 | 2.8 | 2.8 | 2.8 | — |
| Formed Amount$^{(1)}$ (g/g) | 2.0 | 2.0 | 2.0 | 2.0 | 2.0 | — |
| Composition Ratio$^{(2)}$ (wt %) | 0.02 | 0.02 | 0.02 | 0.02 | 0.02 | — |
| Polyethylene Obtained by Preactivation | | | | | | |
| Int. Viscosity η (dl/g) | 34.0 | 34.4 | 34.0 | 2.8 | — | — |
| Formed Amount$^{(1)}$ (g/g) | 22.0 | 4.5 | 0.005 | 22.0 | — | — |
| Composition Ratio$^{(2)}$ (wt %) | 0.25 | 0.05 | 0.0001 | 0.25 | — | — |
| Polypropylene Obtained by Addition Polymerization | | | | | | |
| Int. Viscosity η (dl/g) | 2.8 | 2.8 | 2.8 | 2.8 | 2.8 | — |
| Formed Amount$^{(1)}$ (g/g) | 2.0 | 2.0 | 2.0 | 2.0 | 2.0 | — |
| Composition Ratio$^{(2)}$ (wt %) | 0.02 | 0.02 | 0.02 | 0.02 | 0.02 | — |
| Polypropylene Composition | | | | | | |
| Int. Viscosity η (dl/g) | 1.49 | 1.48 | 1.47 | 1.45 | 1.45 | 1.46 |
| Melt Strength (MS) (cN) | 2.1 | 1.5 | 0.30 | 0.30 | 0.35 | 4.3 |
| Crystal. Temp. (Tc) (° C.) | 122.5 | 121.3 | 117.0 | 116.2 | 116.0 | 129.4 |
| PP-MFR (g/10 min) | 19.5 | 20.0 | 22.0 | 23.0 | 22.5 | 22.0 |
| Blend. Quantity (wt parts) | 100.0 | 100.0 | 100.0 | 100.0 | 100.0 | 100.0 |
| Non-Cryst. or Low-Cryst. ethylene-α-olefin copolymer | | | | | | |
| ER-MFR (g/10 min) | 8.0 | 8.0 | 8.0 | 8.0 | 8.0 | 8.0 |
| Blend. Quantity (wt parts) | 5.0 | 5.0 | 5.0 | 5.0 | 5.0 | 5.0 |
| Polyolefin Resin Composition Properties of Coated Layered Article: | | | | | | |
| Expandability | ○ | ○ | ○ | ○ | X | ○ |
| Neck-In Length | 38 | 59 | 110 | 150 | 150 | 105 |
| Adhesion Force | ○ | ○ | ○ | ○ | ○ | ○ |
| Productivity Rank | 10 | 9 | 6 | 6 | 1 | 6 |

Notes:
$^{(1)}$Amount (in g) formed per gram of transition metal compound catalyst component
$^{(2)}$Composition ratio (wt %) in polypropylene composition

EXAMPLE 50

A polypropylene composition was produced in the same manner as in Example 1. The resulting polymer had an intrinsic viscosity $\eta_T$ of 1.35 dl/g. The polymer contained 0.18 wt % polyethylene formed due to the preactivation and the polypropylene had an intrinsic viscosity $\eta_P$ of 1.35 dl/g.

Production of a Polyolefin Composition and a Surface Coated Layered Article

Subsequently, granulation was performed in an extrusion pelletizer with the same compound and conditions as in Example 48 to obtain polyolefin pellets. When the physical properties of these pellets were measured and evaluated, it was found that the melt flow rate was 36.0 g/10 min, the crystallization temperature was 122.0° C. and the melt strength (MS) was 1.4 cN.

As in Example 48, using the obtained pellets, a surface coated layered article of 15 μm target coating thickness was produced at a retrieval rate of 150 m/min using a single layer melt-extrusion device with a 90 mm diameter screw, whose T-die had an opening length of 1 m and a lip opening width of 0.8 mm, at a melt temperature of 280° C. and a chillroll water flow temperature of 20° C. The productivity of the surface coated layered article had the rank "9".

Comparative Example 48

A polymer was produced under the same conditions as in Example 50, except that preactivation polymerization with ethylene has not been performed. A sample was prepared for the evaluation of Comparative Example 48.

The results of the analysis of the physical properties of the resulting polymer and the productivity of the surface coated layered article are shown in Table 24.

EXAMPLE 51

(1) Preparation of Transition Metal Compound Catalyst Component

A titanium-containing support type catalyst component was obtained under the same conditions as in Example 50.

(2) Preparation of Preactivated Catalyst

A preactivated catalyst slurry was obtained under the same conditions as in Example 50, except that the conditions for preactivation polymerization with ethylene were changed in the following way: In addition to ethylene, 30 g propylene was fed at a reaction temperature of 0° C., and the reaction time was set to 45 min.

When the catalyst from another preactivation treatment performed under the same conditions was analyzed, it was found that per gram of the titanium-containing support type catalyst component 21.5 g polymer were present, the intrinsic viscosity $\eta_{T2}$ of the polymer measured in tetralin at 135° C. was 23.2 dl/g and per gram of the titanium-containing support type catalyst component 22 g ethylene-propylene random copolymer with an intrinsic viscosity of 22.5 dl/g including 70 wt % propylene units (determined by $^{13}C$-NMR) were formed due to preactivation treatment.

When the polymer obtained from an addition polymerization after yet another preactivation treatment performed under the same conditions was analyzed, it was found that per gram of the titanium-containing support type catalyst component 25.3 g polymer were present, the intrinsic viscosity $\eta_{T3}$ of the polymer measured in tetralin at 135° C. was 19.9 dl/g, and per gram of the titanium-containing support type catalyst component 2.1 g polymer with an intrinsic viscosity $\eta_C$ of 2.2 dl/g were newly formed due to addition polymerization.

(3) Production of Polypropylene Composition (Main Polymerization of Propylene)

Gas phase polymerization was performed continuously for 150 h under the same conditions as in Example 50, except that, other than in Example 50 (3), the preactivated catalyst slurry obtained according to the above paragraph (2) was used as preactivated catalyst slurry, the ratio of hydrogen concentration to propylene concentration in the polymerization container was set to 0.012, and ethylene was fed continuously in addition to propylene into the polymerization container so as to maintain a ratio to the propylene concentration of 0.003 inside the polymerization container. Thus, a polymer having an intrinsic viscosity $\eta_T$ of 1.54 dl/g and containing 0.8 wt % ethylene units was obtained at a rate of 11.6 kg/h.

The polymer contained 0.12 wt % ethylene-propylene random copolymer formed by preactivation treatment, and the propyleneethylene copolymer had an intrinsic viscosity $\eta_P$ of 1.16 dl/g.

(4) Preparation of Polyolefin Composition and Surface Coating Layered Article

Using the same compound and conditions as in Example 48, granulation was performed with an extrusion machine to obtain pellets of a polyolefin composition. When the physical properties of these pellets were evaluated, it was found that the melt flow rate was 89.0 g/10 min, the crystallization temperature was 121.2° C. and the melt strength 1.0 cN. Moreover, a surface coated layered article of 15 μm target coating thickness was produced from the pellets under the same conditions as in Example 48 paragraph (4) at a retrieval rate of 150 m/10 min using a single layer melt-extrusion device at a melt temperature of 280° C. and a chillroll water flow temperature of 20° C. The productivity of the surface coated layered article had the rank "9".

Comparative Example 49

A polymer was produced under the same conditions as in Example 51, except that preactivation treatment with ethylene and propylene has not been performed. A sample was prepared for evaluation of Comparative Example 49.

The results of the analysis of the resulting polymer and the productivity of the surface coating layered article are shown in Table 24.

Comparative Example 50

Omitting the prepolymerization and the addition polymerization with propylene in paragraph (2) of Example 48, only preactivation polymerization with ethylene was performed. 1 liter methanol was added to the obtained preactivated catalyst slurry and a catalyst deactivation reaction was performed for one hour at 70° C. After the reaction, ethylene polymer was filter-separated from the slurry and dried under reduced pressure to obtain 200 g ethylene polymer with an intrinsic viscosity $\eta_A$ of 32.5 dl/g.

20 kg of the propylene polymer obtained by main polymerization with propylene with omission of preactivation polymerization with ethylene and addition polymerization with propylene in paragraph (2) of Example 48 were mixed with 50 g ethylene polymer prepared as described above. This blend was mixed for 2 min using a Henschel mixer with 10 g tetrakis [methylene-3-(3'-5'-di-t-butyl-4'-hydroxyphenol)propionate]methane, 20 g calcium stearate, and 1.0 kg non-crystalline ethylene-propylene copolymer (containing 20 wt % propylene) with an ER-MFR of 8.0 g/10 min. The blend was granulated at 230° C. using an extrusion pelletizer with a screw diameter of 65 mm, and a sample was prepared for the evaluation of Comparative Example 50. When the various physical properties of the pellets were measured and evaluated, it was found that the intrinsic viscosity $\eta_T$ was 1.48 dl/g, the melt flow rate was 20.9 g/10 min, the crystallization temperature was 116.2° C. and the melt strength (MS) was 0.2 cN.

A surface coated layered article of 15 μm target coating thickness was produced from the resulting pellets under the same conditions as in Example 48 paragraph (4) at a retrieval rate of 150 m/min using a single layer melt-extrusion device at a melt temperature of 280° C. and a chillroll water flow temperature of 20° C. The productivity of the resulting surface coated layered article had the rank "1".

TABLE 24

|  | Example | | Comparative Example | | |
| --- | --- | --- | --- | --- | --- |
|  | 50 | 51 | 48 | 49 | 50[3] |
| Polypropylene Obtained by Prepolymerization | | | | | |
| Int. Viscosity η (dl/g) | 2.7 | 2.7 | 2.7 | 2.7 | — |
| Formed Amount[1] (g/g) | 1.2 | 1.2 | 1.2 | 1.2 | — |
| Composition Ratio[2] (wt %) | 0.01 | 0.01 | 0.01 | 0.01 | — |
| Polyethylene Obtained by Preactivation | | | | | |
| Int. Viscosity η (dl/g) | 30.2 | 22.5 | — | — | 32.5 |
| Formed Amount[1] (g/g) | 82.0 | 22.0 | — | — | — |
| Composition Ratio[2] (wt %) | 0.18 | 0.12 | — | — | 0.25 |
| Polypropylene Obtained by Addition Polymerization | | | | | |
| Int. Viscosity η (dl/g) | 2.8 | 2.2 | 2.8 | 2.2 | — |
| Formed Amount[1] (g/g) | 2.2 | 2.1 | 2.2 | 2.1 | — |
| Composition Ratio[2] (wt %) | 0.01 | 0.01 | 0.01 | 0.01 | — |
| Polypropylene Composition | | | | | |
| Int. viscosity η (dl/g) | 1.35 | 1.16 | 1.31 | 1.14 | 1.48 |
| Melt Strength (MS) (cN) | 1.4 | 1.0 | 0.1 | 0.1 | 0.2 |
| Crystal. Temp. (Tc) (° C.) | 122.0 | 121.2 | 116.1 | 115.2 | 116.2 |
| PP-MFR (g/10 min) | 36.0 | 89.0 | 43.0 | 99.0 | 20.9 |
| Blend. Quantity (wt parts) | 100.0 | 100.0 | 100.0 | 100.0 | 100.0 |
| Non-Cryst. or Low-Cryst. Ethylene-α-olefin copolymer | | | | | |
| ER-MFR (g/10 min) | 8.0 | 8.0 | 8.0 | 8.0 | 8.0 |

TABLE 24-continued

|  | Example | | Comparative Example | | |
| --- | --- | --- | --- | --- | --- |
|  | 50 | 51 | 48 | 49 | 50[3] |
| Blend. Quantity (wt parts) | 5.0 | 5.0 | 5.0 | 5.0 | 5.0 |
| Polyolefin Resin Composition Properties of Coated Layered Article: | | | | | |
| Expandability | ○ | ○ | ○ | ○ | X |
| Neck-In Length | 48 | 85 | 170 | 190 | 120 |
| Adhesion Force | ○ | ○ | ○ | ○ | ○ |
| Productivity Rank | 9 | 9 | 6 | 6 | 1 |

Notes:
[1]Amount (in g) formed per gram of transition metal compound catalyst component
[2]Composition ratio (wt %) in polypropylene composition
[3]Simple mechanical mixture of polyethylene and main polymerization polypropylene

EXAMPLES 52, 53, 54, 55, 56, 57 AND COMPARATIVE EXAMPLES 51, 52, 53, 54

A surface coated layered article was produced under the same conditions as in Example 48, except that the blending quantities and the blending components for the propylene composition and the noncrystalline or low-crystalline ethylene-α-olefin copolymer are altered to the conditions shown in Table 25. The physical properties of the resulting polypropylene composition and the polyolefin composition and the productivity of the surface coating layered article are shown in Tables 25 and 26.

TABLE 25

|  | Example | | | | | |
| --- | --- | --- | --- | --- | --- | --- |
|  | 52 | 53 | 54 | 55 | 56 | 57 |
| Polypropylene Composition | | | | | | |
| Int. Viscosity η (dl/g) | 1.83 | 1.15 | 1.49 | 1.49 | 1.49 | 1.49 |
| Melt Strength (MS) (cN) | 4.0 | 0.9 | 2.1 | 2.1 | 2.1 | 2.1 |
| Crystal. Temp. (Tc) (° C.) | 121.5 | 123.5 | 122.5 | 122.5 | 122.5 | 122.5 |
| PP-MFR (g/10 min) | 6.0 | 93.4 | 19.5 | 19.5 | 19.5 | 19.5 |
| Blend. Quantity (wt %) | 95.0 | 95.0 | 95.0 | 95.0 | 98.0 | 90.0 |
| Non-Cryst. or Low-Cryst. Ethylene-α-olefin copolymer | | | | | | |
| ER-MFR (g/10 min) | 8.0 | 8.0 | 2.0 | 45.0 | 8.0 | 8.0 |
| Blend. Quantity (wt %) | 5.0 | 5.0 | 5.0 | 5.0 | 2.0 | 10.0 |
| Polyolefin Resin Composition Properties of Coated Layered Article: | | | | | | |
| Expandability | ○ | ○ | ○ | ○ | ○ | ○ |
| Neck-In Length | 30 | 95 | 36 | 90 | 40 | 83 |
| Adhesion Force | ○ | ○ | Δ | ○ | Δ | ○ |
| Productivity Rank | 10 | 9 | 8 | 9 | 7 | 9 |

TABLE 26

| | Comparative Example | | | |
|---|---|---|---|---|
| | 51 | 52 | 53 | 54 |
| Polypropylene Composition | | | | |
| Int. Viscosity η (dl/g) | 1.49 | 1.49 | 1.49 | 1.49 |
| Melt Strength (MS) (cN) | 2.1 | 2.1 | 2.1 | 2.1 |
| Crystal. Temp. (Tc) (° C.) | 122.5 | 122.5 | 122.5 | 122.5 |
| PP-MFR (g/10 min) | 19.5 | 19.5 | 19.5 | 19.5 |
| Blend. Quantity (wt %) | 95.0 | 95.0 | 99.5 | 85.0 |
| Non-Cryst. or Low-Cryst. Ethylene-α-olefin copolymer | | | | |
| ER-MFR (g/10 min) | 0.8 | 55.0 | 8.0 | 8.0 |
| Blend. Quantity (wt parts) | 5.0 | 5.0 | 0.5 | 15.0 |
| Polyolefin Resin Composition Properties of Coated Layered Article: | | | | |
| Expandability | X | ○ | ○ | X |
| Neck-In Length | 35 | 120 | 40 | 110 |
| Adhesion Force | Δ | ○ | X | ○ |
| Productivity Rank | 2 | 6 | 3 | 1 |

Below, definitions of some technical terms used in the following Examples 58–67 and Comparative Examples 55–67 and explanations concerning evaluation methods are given:

(1) Melting Point (Abbr.: Tm)

A 10 mg sample was heated in a nitrogen atmosphere from room temperature (23° C.) at a warming rate of 20° C./min. A measurement was performed using a differential scan calorimeter (acronymized: DSC) and the melting point is expressed in terms of the temperature (in °C.) at the peak of the heat absorption curve, accompanying dissolution of the crystal.

(2) Density

Measurements were performed (in g/cm$^3$) with method D (Density Gradient Tube Method) according to the experimental conditions in JIS K7112 (1980).

(3) Specific Gravity

Measurements were performed with method A (Water Displacement Method) according to the experimental conditions in JIS K7112 (1980).

(4) MFR-①

Measurements (in g/10 min) were performed with Experimental Condition 14 (230° C.; 21.18N) of JIS K7210.

(5) MFR-②

Measurements (in g/10 min) were performed with Experimental Condition 4 (190° C.; 21.18N) of JIS K7210.

(6) Moldability (of Large, Rectangular, Hollow Plastic Article)

The draw-down during the formation of a hollow plastic article of 1200 mm (length)×250 mm (width)×30 mm (height) with a body wall thickness of 2.5 mm produced by extrusion from a parison with uniform wall thickness at 200° C. molding temperature was evaluated:

E: Molding is possible without problems;
V: Slight draw-down can be seen but poses no problem for the finished product;
G: Molding is possible but draw-down occurs and causes variations in the wall thickness of the plastic article;
N: Draw-down is too heavy to allow molding.

(7) High Speed Moldability (of Small, Hollow Plastic Article (Elliptical Bottle))

It was determined whether it was possible to mold a hollow plastic article of 600 cc capacity, 200 mm (height)× 80 mm (long axis)×60 mm (short axis) with a body wall thickness of 0.8 mm by extrusion from a parison with uniform wall thickness at 200° C. molding temperature while adjusting the core-die spacing:

G: The resin pressure is low, the extrusion machine motor load is small and the thickness deviation due to drawdown is small;
N: The resin pressure and the extrusion machine load are small, but draw-down occurs and the wall thickness of the plastic article varies even when the die-core spacing is adjusted. Or, the resin pressure is high and the extrusion machine load is big. Or, the resin pressure and the extrusion machine load are small, but the resin parison draws down heavily and breaks.

(8) Molecular Weight Distribution (Abbr. Mw/Mn)

According to gel permeation chromatography method. Device: GPC-150 (product of WATERS). Used Column: PSK gel GMH-HT (Trademark; Product by Tosoh Corp.). Conditions: solvent=ortho-dichlorobenzene; sample concentration=0.5 mg/ml; measurement temperature=135° C.

(9) Mooney Viscosity (ML$_{1+4}$(100° C.))

According to JIS K6300.

(10) Stiffness

In accordance with an experimental method as in JIS K7203, the bend elastic constant was measured, and categorized as follows. This was taken as an indicator of the hollow plastic article's stiffness.

E: At least 1800 MPa;
V: At least 1200 MPa but less than 1800 MPa;
G: At least 500 MPa but less than 1200 MPa;
N: Less than 500 MPa.

(11) Outer Appearance

The plastic article was illuminated by a neon light from a certain distance, and the outer appearance was determined by visual observation:

G: The metal mold surface has been well transcribed, the surface luster is homogenous and there are no particular problems;
N: The metal mold has been poorly transcribed and the surface luster of the plastic article is inhomogenous.

(12) Glossiness

Measured (in %) according to the experimental conditions in JIS K7105 (60° specular reflection angle).

(13) Shock Resistance

A hollow plastic article with 600 cc capacity, measuring 200×80×60 mm and having a body wall thickness of 0.8 mm was filled with water and then sealed. After maintaining it for one day at the conditions described below, a drop down test was performed and evaluation was performed as follows:

E: Dropped from a height of 100 cm at 5° C., the hollow plastic article does not break.
V: Dropped from a height of 50 cm at 5° C., the hollow plastic article does not break.
G: Dropped from a height of 50 cm at 23° C., the hollow plastic article does not break.
N: Dropped from a height of 50 cm at 23° C., the hollow plastic article breaks.

EXAMPLE 58

A polypropylene composition was produced in the same manner as in Example 1. The resulting polymer was cooled and cut to obtain a pellet-shaped composition. The details of the composition are listed in the following Table 27:

TABLE 27

|  | PP-1 | PP-3 |
|---|---|---|
| Prel. Polymerization Polypropylene (B) | | |
| Int. Viscosity η (dl/g) | 2.8 | — |
| Formed Amount[(1)] (g/g) | 2.0 | — |
| Composition Ratio[(2)] (wt %) | 0.02 | — |
| Preactivation Polyethylene (A) | | |
| Int. Viscosity η (dl/g) | 34.0 | — |
| Formed Amount[(1)] (g/g) | 22.0 | — |
| Composition Ratio[(2)] (wt %) | 0.25 | — |
| Addition Polymerization Polypropylene (C) | | |
| Int. Viscosity η (dl/g) | 2.8 | — |
| Formed Amount[(1)] (g/g) | 2.0 | — |
| Composition Ratio[(2)] (wt %) | 0.02 | — |
| Polypropylene Composition | | |
| Intrinsic Viscosity η (dl/g) | 1.97 | 1.87 |
| Melt Strength (MS) (cN) | 4.9 | 0.8 |
| Crystall. Temp. (Tc) (° C.) | 122.5 | 116 |
| Melt Flow Rate (g/10 min) | 3.5 | 4.5 |

Notes:
[(1)]Amount (in g) formed per gram of transition metal compound catalyst component
[(2)]Composition ratio in polypropylene resin This composition was fed into a direct blow molding extrusion machine (IPB-30; product and trademark by Ishikawajima-Harima Heavy Industries Co., Ltd.). A molten parison was extruded at an extrusion temperature of 210° C., and a finished product measuring 1200×250×30 mm, 1.7 kg weight and 2.5 mm average wall thickness of the body portion was obtained using a metal mold for blow molding at a metal mold temperature of 50° C.

Moldability and stiffness of the above pellet-shaped composition and outer appearance of the hollow plastic article are listed in Table 29 below.

EXAMPLE 59–66

As can be seen from Table 29, PP-1, PE-1,2,3,4, EPR and EVA were uniformly mixed using a Henschel mixer with 0.05 weight parts tetrakis [methylene(3,5-di-t-butyl-4-hydroxy-hydrocinnamate)]methane as anti-oxidant. After melt kneading with an extrusion machine, a strand was extruded at an extrusion temperature of 230° C., then cooled and cut to obtain a pellet-shaped composition. This composition was fed into a direct blow molding extrusion machine (IPB30; product and trademark by Ishikawajima-Harima Heavy Industries Co., Ltd.). A molten parison was extruded at an extrusion temperature of 210° C., and a finished product measuring 1200×250×30 mm, 1.7 kg weight and 2.5 mm average wall thickness of the body portion was obtained using a metal mold for blow molding at a metal mold temperature of 50° C.

Moldability and stiffness of the above pellet-shaped composition and outer appearance of the hollow plastic article are listed in Table 29 below.

PE-1,2,3,4, EPR and EVA are abbreviations for the following:

PE-1
Low-density polyethylene with a MFR-② of 0.32 g/10 min, a melting point (Tm) of 112° C. and a density of 0.921 g/cm$^3$.

PE-2
Straight chain low-density polyethylene with a MFR-② of 0.8 g/10 min, a melting point (Tm) of 123° C. and a density of 0.920 g/cm$^3$.

PE-3
Ultra-low-density polyethylene with a MFR-② of 1.0 g/10 min, a melting point (Tm) of 114° C. and a density of 0.900 g/cm$^3$.

PE-4
High-density polyethylene with 1.1 wt % butene-1 contents, an MFR-② of 0.03 g/10 min, a melting point (Tm) of 131° C. and a density of 0.949 g/cm$^3$.

EPR
Ethylene-propylene copolymer rubber with 22% propylene contents, 0.870 g/cm$^3$ density, a Mooney viscosity ML1+4 (100° C.) of 53, and a MFR-② of 0.7 g/10 min.

EVA
Ethylene vinyl acetate copolymer with a MFR-② of 0.6 g/10 min, melting point (Tm) of 95° C. and a density of 0.940 g/cm$^3$.

EXAMPLE 67

(1) Preparation of Titanium-Containing Solid Catalyst Component

A titanium-containing support type catalyst component (titanium-containing solid catalyst component) was obtained under the same conditions as in Example 58.

(2) Preparation of Preactivated Catalyst

After nitrogen gas has been filled into a corrosion-resistant reaction vessel having tilted mixing blades and a volume of 5 liter, 2.8 liter n-hexane, 4 millimol triethylaluminum (organic metal compound (AL1)) and 9.0 g of the titanium-containing support type catalyst component (5.26 millimol in terms of titanium atoms) prepared as described in the previous paragraph were added to the reaction vessel. Then, a gaseous mix of ethylene-propylene containing 5 vol % propylene was fed continuously to the reaction vessel, so as to maintain a pressure of 0.59 MPa inside the reaction vessel, and thus preactivation treatment was performed. After the reaction time has passed, the ethylene-propylene gaseous mix which has not yet reacted was released from the reaction vessel and the gaseous contents of the reaction vessel was filled once with nitrogen to obtain the preactivated catalyst slurry for manufacture of a polypropylene composition.

After a separate preactivation treatment of a titanium-containing solid catalyst component under the same conditions as stated above, the ethylene-propylene copolymer obtained by catalyst deactivation and catalyst removal treatment of the obtained catalyst slurry was analyzed and it was found that per gram of the titanium-containing solid catalyst component 25 g ethylene-propylene copolymer having an intrinsic viscosity η of 30.0 dl/g measured in tetralin at 135° C. and including 0.8 wt % propylene units (determined by $^{13}$C-NMR) were supported.

(3) Production of Polypropylene Composition (Main Polymerization of Propylene)

After nitrogen gas has been filled into a corrosion-resistant polymerization container having a stirring device attached to it and a volume of 500 liter, 240 liter n-hexane, 780 millimol triethylaluminum (organic metal compound (AL2)), 78 millimol di-isopropyldimethoxysilane (electron donor (E2)) and half of the preactivated catalyst slurry obtained as described above were filled into the polymerization container at 20° C. Successively, 55 liter hydrogen were introduced into the polymerization container and the temperature was raised to 70° C. Then, at a polymerization temperature of 70° C., propylene was fed continuously for two hours into the polymerization container while the gas pressure inside the polymerization container was maintained at 0.79 MPa, so that the main polymerization of propylene was carried out.

After the polymerization time has passed, 1 liter methanol was introduced into the polymerization container and a catalyst deactivation reaction was executed for 15 min at 70° C. Successively, gas that has not reacted was exhausted, the solvent was separated and the polymer b was dried, so that 32.5 kg polymer with an intrinsic viscosity $\eta_r$ of 1.99 dl/g were obtained. The abbreviated name for the resulting polypropylene composition is "PP-2".

100 weight parts of PP-2 were homogeneously mixed using a Henschel mixer with 0.05 weight parts tetrakis [methylene-(3,5-di-t-butyl-4-hydroxy-hydrocinnamate)] methane as antioxidant. Using an extrusion machine, the blend was melt-kneaded and a strand was extruded at an extrusion temperature of 230° C., cooled and cut to obtain a pellet-shaped composition. The details of the composition are listed in the following Table 28.

TABLE 28

|  | PP-2 |
|---|---|
| Preactivation Polyethylene (A) | |
| Int. Viscosity $\eta$ (dl/g) | 30.0 |
| Formed Amount[1] (g/g) | 25.0 |
| Composition Ratio[2] (wt %) | 0.35 |
| Main Polymerization Polypropylene Int. Viscosity (dl/g) | 1.89 |
| Polypropylene Composition | |
| Intrinsic Viscosity $\eta$ (dl/g) | 1.97 |
| Melt Strength (MS) (cN) | 4.9 |
| Crystall. Temp. (Tc) (° C.) | 122.5 |
| Melt Flow Rate (g/10 min) | 3.5 |

Notes:
[1]Amount formed per gram of transition metal compound catalyst component
[2]Composition ratio in polypropylene resin This composition was fed into a direct blow molding extrusion machine (IPB-30; product and trademark by Ishikawajima-Harima Heavy Industries Co., Ltd.). A molten parison was extruded at an extrusion temperature of 200° C., and a finished product measuring 1200×250×30 mm, 1.7 kg weight and 2.5 mm average wall thickness of the body portion was obtained using a metal mold for blow molding at a metal mold temperature of 50° C. Moldability and stiffness of the above pellet-shaped composition and outer appearance of the hollow plastic article are listed in Table 29 below.

Comparative Example 55

As in Example 58, propylene polymerization was performed under the same conditions as in Example 58 (3) in the presence of the titanium-containing solid catalyst obtained in (1) but omitting the preactivation treatment (2). The abbreviated name for the resulting polypropylene composition is "PP-3".

100 weight parts of PP-3 were homogeneously mixed using a Henschel mixer with 0.05 weight parts tetrakis [methylene-(3,5-di-t-butyl-4-hydroxy-hydrocinnamate)] methane as antioxidant. Using an extrusion machine, the blend was melt-kneaded and a strand was extruded at an extrusion temperature of 230° C., cooled and cut to obtain a pellet-shaped composition. The details of the composition are listed in the following Table 29.

This composition was fed into a direct blow molding extrusion machine (IPB-30; product and trademark by Ishikawajima-Harima Heavy Industries Co., Ltd.). A molten parison was extruded at an extrusion temperature of 200° C., and a finished product measuring 1200×250×30 mm, 1.7 kg weight and 2.5 mm average wall thickness of the body portion was obtained using a metal mold for blow molding at a metal mold temperature of 50° C. Moldability and stiffness of the above pellet-shaped composition and outer appearance of the hollow plastic article are listed in Table 29 below.

Comparative Examples 56–63

As can be seen from Table 29, PP-3, PE-1,2,3,4, EPR and EPA were uniformly mixed using a Henschel mixer with 0.05 weight parts tetrakis [methylene-(3,5-di-t-butyl-4-hydroxy-hydrocinnamate)]methane as anti-oxidant. After melt kneading with an extrusion machine, a strand was extruded at an extrusion temperature of 230° C., then cooled and cut to obtain a pellet-shaped composition. This composition was fed into a direct blow molding extrusion machine (IPB-30; product and trademark by Ishikawajima-Harima Heavy Industries Co., Ltd.). A molten parison was extruded at an extrusion temperature of 200° C., and a finished product measuring 1200×250×30 mm, 1.7 kg weight and 2.5 mm average wall thickness of the body portion was obtained using a metal mold for blow molding at a metal mold temperature of 50° C.

Moldability and stiffness of the above pellet-shaped composition and outer appearance of the hollow plastic article are listed in Table 29 below.

TABLE 29

|  | PP-1 | PP-2 | PP-3 | PE-1 | PE-2 | PE-3 | PE-4 | EPR | EVA | High Speed Moldability | Stiffness | Outer Appearance | Shock Resistance | Glossiness |
|---|---|---|---|---|---|---|---|---|---|---|---|---|---|---|
| Ex. 58 | 100 | | | | | | | | | G | V | G | G | 35 |
| Ex. 59 | 90 | | | 10 | | | | | | G | V | G | V | 38 |
| Ex. 60 | 90 | | | | 10 | | | | | G | V | G | V | 36 |
| Ex. 61 | 90 | | | | | 10 | | | | G | G | G | V | 36 |
| Ex. 62 | 90 | | | | | | 10 | | | G | V | G | V | 34 |
| Ex. 63 | 90 | | | | | | | 10 | | G | G | G | V | 33 |
| Ex. 64 | 90 | | | | | | | | 10 | G | G | G | V | 35 |
| Ex. 65 | 85 | | | | 10 | | | 5 | | G | V | G | E | 37 |
| Ex. 66 | 85 | | | | | | 10 | 5 | | G | V | G | E | 36 |
| Ex. 67 | | 100 | | | | | | | | G | V | G | G | 35 |
| Comp. Ex. 55 | | | 100 | | | | | | | N | V | G | G | 33 |
| Comp. Ex. 56 | | | 90 | 10 | | | | | | N | V | G | V | 36 |
| Comp. Ex. 57 | | | 90 | | 10 | | | | | N | V | G | V | 34 |
| Comp. Ex. 58 | | | 90 | | | 10 | | | | N | G | G | V | 34 |
| Comp. Ex. 59 | | | 90 | | | | 10 | | | N | V | G | V | 33 |

TABLE 29-continued

|  | PP-1 | PP-2 | PP-3 | PE-1 | PE-2 | PE-3 | PE-4 | EPR | EVA | High Speed Moldability | Stiffness | Outer Appearance | Shock Resistance | Glossiness |
|---|---|---|---|---|---|---|---|---|---|---|---|---|---|---|
| Comp. Ex. 60 |  |  | 90 |  |  |  |  | 10 |  | N | G | G | V | 31 |
| Comp. Ex. 61 |  |  | 90 |  |  |  |  |  | 10 | N | G | G | V | 33 |
| Comp. Ex. 62 |  |  | 85 | 10 |  |  |  | 5 |  | N | V | G | E | 35 |
| Comp. Ex. 63 |  |  | 85 |  |  |  | 10 | 5 |  | N | V | G | E | 34 |

Below, definitions of some technical terms used in the following Examples 68–80 and Comparative Examples 64–72 and explanations concerning evaluation methods are given:

(1) Melting Point (Abbr.: Tm)

A 10 mg sample was heated in a nitrogen atmosphere from room temperature (23° C.) at a warming rate of 20° C./min. A measurement was performed using a differential scan calorimeter (acronymized: DSC) and the melting point is expressed in terms of the temperature (in °C.) at the peak of the heat absorption curve, accompanying dissolution of the crystal.

(2) Density

Measurements were performed (in g/cm$^3$) with method D (Density Gradient Tube Method) according to the experimental conditions in JIS K7112 (1980).

(3) Specific Gravity

Measurements were performed with method A (Water Displacement Method) according to the experimental conditions in JIS K7112 (1980).

(4) MFR-①

Measurements (in g/10 min) were performed with Experimental Condition 14 (230° C.; 21.18N) of JIS K7210.

(5) MFR-②

Measurements (in g/10 min) were performed with Experimental Condition 4 (190° C.; 21.18N) of JIS K7210.

(6) Moldability (of Large, Rectangular, Hollow Plastic Article)

The draw-down during the formation of a hollow plastic article of 1200 mm (length)×250 mm (width)×30 mm (height) with a body wall thickness of 2.5 mm produced by extrusion from a parison with uniform wall thickness at 200° C. molding temperature was evaluated:

E: Molding is possible without problems;

V: Slight draw-down can be seen but poses no problem for the finished product;

G: Molding is possible but draw-down occurs and causes variations in the wall thickness of the plastic article;

N: Draw-down is too heavy to allow molding.

(7) High Speed Moldability (of Small, Hollow Plastic Article)

It was determined whether it was possible to mold an elliptical, hollow plastic article of 600 cc capacity, 200 mm (height)×80 mm (long axis)×60 mm (short axis) with a body wall thickness of 0.8 mm by extrusion from a parison with uniform wall thickness at 200° C. molding temperature while adjusting the core-die spacing:

G: The resin pressure is low, the extrusion machine motor load is small and the thickness deviation due to draw-down is small;

N: The resin pressure and the extrusion machine load are small, but draw-down occurs and the wall thickness of the plastic article varies even when the die-core spacing is adjusted. Or, the resin pressure is high and the extrusion machine load is big. Or, the resin pressure and the extrusion machine load are small, but the resin parison draws down heavily and breaks.

(8) Molecular Weight Distribution (Abbr. Mw/Mn)

According to gel permeation chromatography method. Device: GPC-150 (product of WATERS). Used Column: PSK gel GMH-HT (Trademark; Product by Tosoh Corp.). Conditions: solvent=ortho-dichlorobenzene; sample concentration=0.5 mg/ml; measurement temperature=135° C.

(9) Mooney Viscosity (ML$_{1+4}$(100° C.))

According to JIS K6300.

(10) Stiffness

In accordance with an experimental method as in JIS K7203, the bend elastic constant was measured, and categorized as follows. This was taken as an indicator of the hollow plastic article's stiffness.

E: At least 1800 MPa;

V: At least 1200 MPa but less than 1800 MPa;

G: At least 500 MPa but less than 1200 MPa;

N: Less than 500 MPa.

(11) Outer Appearance

The plastic article was illuminated by a neon light from a certain distance, and the outer appearance was determined by visual observation:

G: The metal mold surface has been well transcribed, the surface luster is homogenous and there are no particular problems;

N: The metal mold has been poorly transcribed and the surface luster of the plastic article is inhomogenous.

(12) Glossiness

Measured (in %) according to the experimental conditions in JIS K7105 (60° specular reflection angle).

(13) Shock Resistance: A hollow plastic article with 600 cc capacity, measuring 200×80×60 mm and having a body wall thickness of 0.8 mm was filled with water and then sealed. After maintaining it for one day at the conditions described below, a drop down test was performed and evaluation was performed as follows:

E: Dropped from a height of 100 cm at 5° C., the hollow plastic article does not break.

V: Dropped from a height of 50 cm at 5° C., the hollow plastic article does not break.

G: Dropped from a height of 50 cm at 23° C., the hollow plastic article does not break.

N: Dropped from a height of 50 cm at 23° C., the hollow plastic article breaks.

In the examples, the olefin polymer composition used as an inner layer in the comparative examples is abbreviated as follows.

PP-1

Composition PP-1 has been produced with the same method as in Example 1. The resulting polymer had an intrinsic viscosity $\eta_r$ of 1.97 dl/g. The resulting polymer was a polypropylene composition containing 0.25 wt % polyethylene (A) corresponding to the component (a) due to the preactivation polymerization and the polypropylene component (b) had an intrinsic viscosity $\eta_P$ of 1.97 dl/g.

Furthermore, the resulting polypropylene composition had a melt strength (MS) of 4.9 cN. This resulting polypropylene composition is called "PP-1".

100 weight parts of PP-1 were homogeneously mixed using a Henschel mixer with 0.05 weight parts tetrakis [methylene-(3,5-di-t-butyl-4-hydroxy-hydrocinnamate)] methane as antioxidant. Using an extrusion machine, the blend was melt-kneaded and a strand was extruded at an extrusion temperature of 230° C., cooled and cut to obtain a pellet-shaped composition. The details of the composition are listed in the following Table 30.

TABLE 30

|  | PP-1 | PP-3 |
|---|---|---|
| Prel. Polymerization Polypropylene (B) | | |
| Int. Viscosity η (dl/g) | 2.8 | — |
| Formed Amount[1] (g/g) | 2.0 | — |
| Composition Ratio[2] (wt %) | 0.02 | — |
| Preactivation Polyethylene (A) | | |
| Int. Viscosity η (dl/g) | 34.0 | — |
| Formed Amount[1] (g/g) | 22.0 | — |
| Composition Ratio[2] (wt %) | 0.25 | — |
| Addition Polymerization Polypropylene (C) | | |
| Int. Viscosity η (dl/g) | 2.8 | — |
| Formed Amount[1] (g/g) | 2.0 | — |
| Composition Ratio[2] (wt %) | 0.02 | — |
| Polypropylene Composition | | |
| Intrinsic Viscosity η (dl/g) | 1.97 | 1.87 |
| Melt Strength (MS) (cN) | 4.9 | 0.8 |
| Crystall. Temp. (Tc) (° C.) | 122.5 | 116 |
| Melt Flow Rate (g/10 min) | 3.5 | 4.5 |

Notes:
[1]Amount (in g) formed per gram of transition metal compound catalyst component
[2]Composition ratio in polypropylene resin (1) Preparation of Titanium-Containing Solid Catalyst Component A titanium-containing support type catalyst component (titanium-containing solid catalyst component) was obtained under the same conditions as for PP-1.

(2) Preparation of Preactivated Catalyst

After nitrogen gas has been filled into a corrosion-resistant reaction vessel having tilted mixing blades and a volume of 5 liter, 2.8 liter n-hexane, 4 millimol triethylaluminum (organic metal compound (AL1)) and 9.0 g of the titanium-containing support type catalyst component (5.26 millimol in terms of titanium atoms) prepared as described in the previous paragraph were added to the reaction vessel. Then, a gaseous mix of ethylene-propylene containing 5 vol % propylene was fed continuously to the reaction vessel, so as to maintain a pressure of 0.59 MPa inside the reaction vessel, and thus preactivation treatment was performed. After the reaction time has passed, the ethylene-propylene gaseous mix which has not yet reacted was released from the reaction vessel and the gaseous contents of the reaction vessel was filled once with nitrogen to obtain the preactivated catalyst slurry for manufacture of a polypropylene composition.

After a separate preactivation treatment of a titanium-containing solid catalyst component under the same conditions as stated above, the ethylene-propylene copolymer obtained by catalyst deactivation and catalyst removal treatment of the obtained catalyst slurry was analyzed and it was found that per gram of the titanium-containing solid catalyst component 25 g ethylene-propylene copolymer having an intrinsic viscosity η of 30.0 dl/g measured in tetralin at 135° C. and including 0.8 wt % propylene units (determined by $^{13}$C-NMR) were supported.

(3) Production of Polypropylene Composition (Main Polymerization of Propylene)

After nitrogen gas has been filled into a corrosion-resistant polymerization container having a stirring device attached to it and a volume of 500 liter, 240 liter n-hexane, 780 millimol triethylaluminum (organic metal compound (AL2)), 78 millimol di-isopropyldimethoxysilane (electron donor (E2)) and half of the preactivated catalyst slurry obtained as described above were filled into the polymerization container at 20° C. Successively, 55 liter hydrogen were introduced into the polymerization container and the temperature was raised to 70° C. Then, at a polymerization temperature of 70° C., propylene was fed continuously for two hours into the polymerization container while the gas pressure inside the polymerization container was maintained at 0.79 MPa, so that the main polymerization of propylene was carried out.

After the polymerization time has passed, 1 liter methanol was introduced into the polymerization container and a catalyst deactivation reaction was executed for 15 min at 70° C. Successively, gas that has not reacted was exhausted, the solvent was separated and the polymer b was dried, so that 32.5 kg polymer with an intrinsic viscosity $\eta_r$ of 1.99 dl/g were obtained. The abbreviated name for the resulting polypropylene composition is "PP-2".

100 weight parts of PP-2 were homogeneously mixed using a Henschel mixer with 0.05 weight parts tetrakis [methylene(3,5-di-t-butyl-4-hydroxy-hydrocinnamate)] methane as antioxidant. Using an extrusion machine, the blend was melt-kneaded and a strand was extruded at an extrusion temperature of 230° C., cooled and cut to obtain a pellet-shaped composition. The details of the composition are listed in the following Table 31.

TABLE 31

|  | PP-2 |
|---|---|
| Preactivation Polyethylene (A) | |
| Int. Viscosity η (dl/g) | 30.0 |
| Formed Amount[1] (g/g) | 25.0 |
| Composition Ratio[2] (wt %) | 0.35 |
| Main Polymerization Polypropylene | |
| Int. Viscosity (dl/g) | 1.89 |
| Polypropylene Composition | |
| Intrinsic Viscosity η (dl/g) | 1.97 |
| Melt Strength (MS) (cN) | 4.9 |
| Crystall. Temp. (Tc) (° C.) | 122.5 |
| Melt Flow Rate (g/10 min) | 3.5 |

Notes:
[1]Amount formed per gram of transition metal compound catalyst component
[2]Composition ratio in polypropylene resin

PP-3

As in PP-1, propylene polymerization was performed under the same conditions as described under PP-1 (3) in the presence of the titanium-containing solid catalyst obtained in (1) but omitting the preactivation treatment (2) to produce a polypropylene composition. The abbreviated name for the resulting polypropylene composition is "PP-3".

100 weight parts of PP-3 were homogeneously mixed using a Henschel mixer with 0.05 weight parts tetrakis

[methylene(3,5-di-t-butyl-4-hydroxy-hydrocinnamate)] methane as antioxidant. Using an extrusion machine, the blend was melt-kneaded and a strand was extruded at an extrusion temperature of 230° C., cooled and cut to obtain a pellet-shaped composition. The details of the composition are listed in the following Table 32.

This composition was fed into a direct blow molding extrusion machine (IPB-30; product and trademark by Ishikawajima-Harima Heavy Industries Co., Ltd.). A molten parison was extruded at an extrusion temperature of 200° C., and a finished product measuring 1200×250×30 mm, 1.7 kg weight and 2.5 mm average wall thickness of the body portion was obtained using a metal mold for blow molding at a metal mold temperature of 50° C.

Abbreviations for inorganic fillers used in the examples and comparative examples are explained in the following:

F-1

A talc with 44,000 $cm^2/g$ relative surface area, 1.6 $\mu m$ average particle size and 0.5 wt % components with a particle size of at least 10 $\mu m$, which comprises 33.1 wt % MgO component, 62.5 wt % $SiO_2$, 0.3 wt % $Fe_2O_3$, and 0.15 wt % CaO.

F-2

Potassium titanate whiskers with 0.2 $\mu m$ average fiber diameter and 25 $\mu m$ average fiber length.

Abbreviations for polymers mixed with the olefin polymer composition are explained in the following:

PE-1

Low-density polyethylene with a MFR-② of 0.32 g/10 min, a melting point (Tm) of 112° C. and a density of 0.921 $g/cm^3$.

PE-4

High-density polyethylene with 1.1 wt % butene-1 contents, an MFR-② of 0.03 g/10 min, a melting point (Tm) of 131° C. and a density of 0.949 $g/cm^3$.

EPR

Ethylene-propylene copolymer rubber with 22% propylene contents, 0.870 $g/cm^3$ density, a Mooney viscosity $ML_{1+4}$ (100° C.) of 53, and an MFR-② of 0.7 g/10 min.

EVA

Ethylene vinyl acetate copolymer with an MFR-② of 0.6 g/10 min, melting point (Tm) of 95° C. and a density of 0.940 $g/cm^3$.

EXAMPLES 68–80, COMPARATIVE EXAMPLES 64–72

As can be seen from Table 32, PP-1, PP-2, PP-3, F-1, F-2, PE-1,2,3,4, EPR and EVA were uniformly mixed using a Henschel mixer with 0.05 weight parts tetrakis [methylene-3-(3'-5'-di-t-butyl-4'-hydroxyphenol)propionate]methane as anti-oxidant. After melt kneading with an extrusion machine, a strand was extruded at an extrusion temperature of 230° C., then cooled and cut to obtain a pellet-shaped composition. This composition was fed into a direct blow molding extrusion machine (IPB-30; product and trademark by Ishikawajima-Harima Heavy Industries Co., Ltd.). A molten parison was extruded at an extrusion temperature of 200° C., and a finished product measuring 1200×250×30 mm, 1.7 kg weight and 2.5 mm average wall thickness of the body portion was obtained using a metal mold for blow molding at a metal mold temperature of 50° C.

Moldability and stiffness of the above pellet-shaped composition and outer appearance of the hollow plastic article are listed in Table 32 below.

TABLE 32

|  | PP-1 | PP-2 | PP-3 | F-1 | F-2 | PE-1 | PE-2 | PE-3 | PE-4 | EPR | EVA | High Speed Moldability | Stiffness | Outer Appearance | Shock Resistance | Glossiness |
|---|---|---|---|---|---|---|---|---|---|---|---|---|---|---|---|---|
| Ex. 68 | 80 |  |  | 10 |  |  |  |  |  |  |  | G | E | G | G | 28 |
| Ex. 69 | 80 |  |  | 10 |  | 10 |  |  |  |  |  | G | E | G | G | 28 |
| Ex. 70 | 80 |  |  | 10 |  |  | 10 |  |  |  |  | G | E | G | G | 27 |
| Ex. 71 | 80 |  |  | 10 |  |  |  | 10 |  |  |  | G | V | G | G | 28 |
| Ex. 72 | 80 |  |  | 10 |  |  |  |  | 10 |  |  | G | E | G | G | 26 |
| Ex. 73 | 80 |  |  | 10 |  |  |  |  |  | 10 |  | G | V | G | G | 28 |
| Ex. 74 | 80 |  |  | 10 |  |  |  |  |  |  | 10 | G | V | G | G | 28 |
| Ex. 75 | 75 |  |  | 10 |  |  | 10 |  |  | 5 |  | G | E | G | V | 27 |
| Ex. 76 | 75 |  |  | 10 |  |  |  |  | 10 | 5 |  | G | E | G | V | 27 |
| Ex. 77 | 90 |  |  |  | 10 |  |  |  |  |  |  | G | E | G | G | 29 |
| Ex. 78 | 90 |  |  | 5 | 5 |  |  |  |  |  |  | G | E | G | G | 29 |
| Ex. 79 | 85 |  |  | 5 | 5 |  |  |  |  | 5 |  | G | E | G | G | 29 |
| Ex. 80 |  | 90 |  | 10 |  |  |  |  |  |  |  | G | E | G | G | 28 |
| Comp. Ex. 64 |  |  | 90 | 10 |  |  |  |  |  |  |  | N | E | G | G | 28 |
| Comp. Ex. 65 |  |  | 80 | 10 |  | 10 |  |  |  |  |  | N | E | G | G | 28 |
| Comp. Ex. 66 |  |  | 80 | 10 |  |  | 10 |  |  |  |  | N | E | G | G | 27 |
| Comp. Ex. 67 |  |  | 80 | 10 |  |  |  | 10 |  |  |  | N | V | G | G | 28 |
| Comp. Ex. 68 |  |  | 80 | 10 |  |  |  |  | 10 |  |  | N | E | G | G | 26 |
| Comp. Ex. 69 |  |  | 80 | 10 |  |  |  |  |  | 10 |  | N | V | G | G | 28 |
| Comp. Ex. 70 |  |  | 80 | 10 |  |  |  |  |  |  | 10 | N | V | G | G | 28 |
| Comp. Ex. 71 |  |  | 75 | 10 |  |  | 10 |  |  | 5 |  | N | E | G | V | 27 |
| Comp. Ex. 72 |  |  | 75 | 10 |  |  |  |  | 10 | 5 |  | N | E | G | V | 27 |

PE-2

Straight chain low-density polyethylene with an MFR-② of 0.8 g/10 min, a melting point (Tm) of 123° C. and a density of 0.920 $g/cm^3$.

PE-3

Ultra-low-density polyethylene with an MFR-② of 1.0 g/10 min, a melting point (Tm) of 114° C. and a density of 0.900 $g/cm^3$.

Below, definitions of some technical terms used in the following Examples 81–103 and Comparative Examples 73–81 and explanations concerning evaluation methods are given:

(1) Melting Point (Abbr.: Tm)

A 10 mg sample was heated in a nitrogen atmosphere from room temperature (23° C.) at a warming rate of 20° C./min. A measurement was performed using a differential scan calorimeter (acronymized: DSC) and the melting point is expressed in terms of the temperature (in °C.) at the peak of the heat absorption curve, accompanying dissolution of the crystal.

(2) Density

Measurements were performed (in g/cm³) with method D (Density Gradient Tube Method) according to the experimental conditions in JIS K7112 (1980).

(3) Specific Gravity

Measurements were performed with method A (Water Displacement Method) according to the experimental conditions in JIS K7112 (1980).

(4) MFR-①

Measurements (in g/10 min) were performed with Experimental Condition 14 (230° C.; 21.18N) of JIS K7210.

(5) MFR-②

Measurements (in g/10 min) were performed with Experimental Condition 4 (190° C.; 21.18N) of JIS K7210.

(6) Moldability (of Large, Rectangular, Hollow Plastic Article)

The draw-down during the formation of a hollow plastic article of 1200 mm (length)×250 mm (width)×30 mm (height) with a body wall thickness of 2.5 mm produced by extrusion from a parison with uniform wall thickness at 200° C. molding temperature was evaluated:

E: Molding is possible without problems;

V: Slight draw-down can be seen but poses no problem for the finished product;

G: Molding is possible but draw-down occurs and causes variations in the wall thickness of the plastic article;

N: Draw-down is too heavy to allow molding.

(7) High Speed Moldability (of Small Hollow Plastic Article)

It was determined whether it was possible to mold an elliptical, hollow plastic article of 600 cc capacity, 200 mm (height)×80 mm (long axis)×60 mm (short axis) with a body wall thickness of 0.8 mm by extrusion from a parison with uniform wall thickness at 200° C. molding temperature while adjusting the core-die spacing:

G: The resin pressure is low, the extrusion machine motor load is small and the thickness deviation due to draw-down is small;

N: The resin pressure and the extrusion machine load are small, but draw-down occurs and the wall thickness of the plastic article varies even when the die-core spacing is adjusted. Or, the resin pressure is high and the extrusion machine load is big. Or, the resin pressure and the extrusion machine load are small, but the resin parison draws down heavily and breaks.

(8) Molecular Weight Distribution (Abbr. Mw/Mn)

According to gel permeation chromatography method. Device: GPC-150 (product of WATERS). Used Column: PSK gel GMH-HT (Trademark; Product by Tosoh Corp.). Conditions: solvent=ortho-dichlorobenzene; sample concentration=0.5 mg/ml; measurement temperature=135° C.

(9) Mooney Viscosity ($ML_{1+4}(100°\ C.)$)

According to JIS K6300.

(10) Stiffness

In accordance with an experimental method as in JIS K7203, the bend elastic constant was measured, and categorized as follows. This was taken as an indicator of the hollow plastic article's stiffness.

E: At least 1800 MPa;

V. At least 1200 MPa but less than 1800 MPa;

G: At least 500 MPa but less than 1200 MPa;

N: Less than 500 MPa.

(11) Outer Appearance

The plastic article was illuminated by a neon light from a certain distance, and the outer appearance was determined by visual observation:

G: The metal mold surface has been well transcribed, the surface luster is homogenous and there are no particular problems;

N: The metal mold has been poorly transcribed and the surface luster of the plastic article is inhomogenous.

(12) Glossiness

Measured (in %) according to the experimental conditions in JIS K7105 (60° specular reflection angle).

(13) Shock Resistance

A hollow plastic article with 600 cc capacity, measuring 200×80×60 mm and having a body wall thickness of 0.8 mm was filled with water and then sealed. After maintaining it for one day under the conditions described below, a drop down test was performed and evaluation was performed as follows:

E: Dropped from a height of 100 cm at 5° C., the hollow plastic article does not break.

V: Dropped from a height of 50 cm at 5° C., the hollow plastic article does not break.

G: Dropped from a height of 50 cm at 23° C., the hollow plastic article does not break.

N: Dropped from a height of 50 cm at 23° C., the hollow plastic article breaks.

In the examples, the polypropylene composition used as an inner layer in the comparative examples is abbreviated as follows.

S-1

A pellet-shaped polyolefin composition obtained by uniformly mixing with a Henschel mixer: 100 weight parts of an ethylene-propylene copolymer containing 3.1 wt % ethylene and having a MFR-① of 2.2 g/10 min and a melting point of 141° C., 0.3 weight parts dibenzylidenesorbitol, 0.05 weight parts tetrakis [methylene-(3,5-di-t-butyl-4-hydroxycinnamate)]methane as antioxidant, 0.05 weight parts tris(2,4-di-t-butylphenyl)phosphite and 0.05 weight parts calcium stearate as neutralizer, and successively melt-kneading the blend with an extrusion machine at 230° C.

S-2

A pellet-shaped polyolefin composition obtained by uniformly mixing with a Henschel mixer: 100 weight parts of an ethylene-propylene copolymer containing 2.4 wt % ethylene and having a MFR-① of 8.2 g/10 min and a melting point of 154° C., 10 weight parts of a straight chain low-density polyethylene with a MFR-② of 2 g/10 min, a density of 0.920 g/cm³ and a melting point of 125° C., 0.1 weight parts aluminumhydroxy-2,2'-methylene-bis(4,6-di-t-buthylphenol)phosphate, 0.1 weight parts lithium stearate, 0.05 weight parts tetrakis [methylene-(3,5-di-t-butyl-4-hydroxycinnamate)]methane as antioxidant, 0.05 weight parts tris(2,4-di-t-butylphenyl)phosphite and 0.05 weight parts calcium stearate as neutralizer, and successively melt-kneading the blend with an extrusion machine at 230° C.

In the examples, the olefin polymer composition used as an inner layer in the comparative examples is abbreviated as follows.

PP-1

Composition PP-1 has been produced with the same method as in Example 1. The resulting polymer had an intrinsic viscosity $\eta_r$ of 1.97 dl/g. The resulting polymer was a polypropylene composition containing 0.25 wt % polyethylene (A) corresponding to the component (a) due to the preactivation polymerization and the polypropylene component (b) had an intrinsic viscosity $\eta_P$ of 1.97 dl/g. Furthermore, the resulting polypropylene composition had a melt strength (MS) of 4.9 cN. This resulting polypropylene composition is called "PP-1".

100 weight parts of PP-1 were homogeneously mixed using a Henschel mixer with 0.05 weight parts tetrakis [methylene-(3,5-di-t-butyl-4-hydroxy-hydrocinnamate)] methane as antioxidant. Using an extrusion machine, the blend was melt-kneaded and a strand was extruded at an extrusion temperature of 230° C., cooled and cut to obtain a pellet-shaped composition. The details of the composition are listed in the following Table 33.

TABLE 33

|  | PP-1 | PP-3 |
|---|---|---|
| Prel. Polymerization Polypropylene (B) |  |  |
| Int. Viscosity η (dl/g) | 2.8 | — |
| Formed Amount[1] (g/g) | 2.0 | — |
| Composition Ratio[2] (wt %) | 0.02 | — |
| Preactivation Polyethylene (A) |  |  |
| Int. Viscosity η (dl/g) | 34.0 | — |
| Formed Amount[1] (g/g) | 22.0 | — |
| Composition Ratio[2] (wt %) | 0.25 | — |
| Addition Polymerization Polypropylene (C) |  |  |
| Int. Viscosity η (dl/g) | 2.8 | — |
| Formed Amount[1] (g/g) | 2.0 | — |
| Composition Ratio[2] (wt %) | 0.02 | — |
| Polypropylene Composition |  |  |
| Intrinsic Viscosity η (dl/g) | 1.97 | 1.87 |
| Melt Strength (MS) (cN) | 4.9 | 0.8 |
| Crystall. Temp. (Tc) (° C.) | 122.5 | 116 |
| Melt Flow Rate (g/10 min) | 3.5 | 4.5 |

Notes:
[1]Amount (in g) formed per gram of transition metal compound catalyst component
[2]Composition ratio in polypropylene resin (1) Preparation of Titanium-Containing Solid Catalyst Component A titanium-containing support type catalyst component (titanium-containing solid catalyst component) was obtained under the same conditions as for PP-1.

(2) Preparation of Preactivated Catalyst

After nitrogen gas has been filled into a corrosion-resistant reaction vessel having tilted mixing blades and a volume of 5 liter, 2.8 liter n-hexane, 4 millimol triethylaluminum (organic metal compound (AL1)) and 9.0 g of the titanium-containing support type catalyst component (5.26 millimol in terms of titanium atoms) prepared as described in the previous paragraph were added to the reaction vessel. Then, a gaseous mix of ethylene-propylene containing 5 vol % propylene was fed continuously to the reaction vessel, so as to maintain a pressure of 0.59 MPa inside the reaction vessel, and thus preactivation treatment was performed. After the reaction time has passed, the ethylene-propylene gaseous mix which has not yet reacted was released from the reaction vessel and the gaseous contents of the reaction vessel was filled once with nitrogen to obtain the preactivated catalyst slurry for manufacture of a polypropylene composition.

After a separate preactivation treatment of a titanium-containing solid catalyst component under the same conditions as stated above, the ethylene-propylene copolymer obtained by catalyst deactivation and catalyst removal treatment of the obtained catalyst slurry was analyzed and it was found that per gram of the titanium-containing solid catalyst component 25 g ethylene-propylene copolymer having an intrinsic viscosity η of 30.0 dl/g measured in tetralin at 135° C. and including 0.8 wt % propylene units (determined by $^{13}$C-NMR) were supported.

(3) Production of Polypropylene Composition (Main Polymerization of Propylene)

After nitrogen gas has been filled into a corrosion-resistant polymerization container having a stirring device attached to it and a volume of 500 liter, 240 liter n-hexane, 780 millimol triethylaluminum (organic metal compound (AL2)), 78 millimol di-isopropyldimethoxysilane (electron donor (E2)) and half of the preactivated catalyst slurry obtained as described above were filled into the polymerization container at 20° C. Successively, 55 liter hydrogen were introduced into the polymerization container and the temperature was raised to 70° C. Then, at a polymerization temperature of 70° C., propylene was fed continuously for two hours into the polymerization container while the gas pressure inside the polymerization container was maintained at 0.79 MPa, so that the main polymerization of propylene was carried out.

After the polymerization time has passed, 1 liter methanol was introduced into the polymerization container and a catalyst deactivation reaction was executed for 15 min at 70° C. Successively, gas that has not reacted was exhausted, the solvent was separated and the polymer b was dried, so that 32.5 kg polymer with an intrinsic viscosity $\eta_r$ of 1.99 dl/g were obtained. The abbreviated name for the resulting polypropylene composition is "PP-2".

100 weight parts of PP-2 were homogeneously mixed using a Henschel mixer with 0.05 weight parts tetrakis [methylene(3,5-di-t-butyl-4-hydroxy-hydrocinnamate)] methane as antioxidant. Using an extrusion machine, the blend was melt-kneaded and a strand was extruded at an extrusion temperature of 230° C., cooled and cut to obtain a pellet-shaped composition. The details of the composition are listed in the following Table 34.

TABLE 34

|  | PP-2 |
|---|---|
| Preactivation Polyethylene (A) |  |
| Int. Viscosity η (dl/g) | 30.0 |
| Formed Amount[1] (g/g) | 25.0 |
| Composition Ratio[2] (wt %) | 0.35 |
| Main Polymerization Polypropylene Int. Viscosity (dl/g) | 1.89 |
| Polypropylene Composition |  |
| Intrinsic Viscosity η (dl/g) | 1.97 |
| Melt Strength (MS) (cN) | 4.9 |
| Crystall. Temp. (Tc) (° C.) | 122.5 |
| Melt Flow Rate (g/10 min) | 3.5 |

Notes:
[1]Amount formed per gram of transition metal compound catalyst component
[2]Composition ratio in polypropylene resin As in PP-1, propylene polymerization was performed under the same conditions as described under PP-1 (3) in the presence of the titanium-containing solid catalyst obtained in (1) but omitting the preactivation treatment (2) to produce a polypropylene composition. The abbreviated name for the resulting polypropylene composition is "PP-3".

100 weight parts of PP-3 were homogeneously mixed using a Henschel mixer with 0.05 weight parts tetrakis [methylene (3,5-t-butyl-4-hydroxy-hydrocinnamate)] methane as antioxidant. Using an extrusion machine, the blend was melt-kneaded and a strand was extruded at an extrusion temperature of 230° C., cooled and cut to obtain a pellet-shaped composition. The details of the composition are listed in the following Tables 35 and 36.

Abbreviations for the substances mixed into the olefin polymer composition used as an inner layer are explained below. PE-1,2,3,4 and EPR as listed in Tables 35–36 are abbreviations for the following substances.

PE-1

Low-density polyethylene with a MFR-$\hat{2}$ of 0.32 g/10 min, a melting point (Tm) of 112° C. and a density of 0.921 g/cm$^3$.

PE-2

Straight chain low-density polyethylene with an MFR-$\hat{2}$ of 0.8 g/10 min, a melting point (Tm) of 123° C. and a density of 0.920 g/cm$^3$.

PE-3

Ultra-low-density polyethylene with an MFR-$\hat{2}$ of 1.0 g/10 min, a melting point (Tm) of 114° C. and a density of 0.900 g/cm$^3$.

PE-4

High-density polyethylene with 1.1 wt % butene-1 contents, an MFR-$\hat{2}$ of 0.03 g/10 min, a melting point (Tm) of 131° C. and a density of 0.949 g/cm$^3$.

EPR

Ethylene-propylene copolymer rubber with 22% propylene contents, 0.870 g/cm$^3$ density, a Mooney viscosity $ML_{1+4}$ (100° C.) of 53, and an MFR$\hat{2}$ of 0.7 g/10 min.

EVA

Ethylene vinyl acetate copolymer with an MFR$\hat{2}$ of 0.6 g/10 min, a melting point (Tm) of 95° C. and a density of 0.940 g/cm$^3$.

F-1

A talc with 44,000 cm$^2$/g relative surface area, 1.6 μm average particle size and 0.5 wt % components with a particle size of at least 10 μm, which comprises 33.1 wt % MgO, 62.5 wt % SiO$_2$, 0.3 wt % Fe$_2$O$_3$, and 0.15 wt % CaO.

F-2

Potassium titanate whiskers with 0.2 μm average fiber diameter and 25 μm average fiber length.

EXAMPLES 81–103, COMPARATIVE EXAMPLES 73–81

As an olefin polymer composition for an inner layer, PP-1, PP-2, PP-3, PE-1, 2, 3, 4, EPR, F-1 and F-2 were added to 0.05 weight parts tetrakis [methylene-(3.5-di-t-butyl-4-hydroxyhydroxycinnamate)]methane and 0.05 weight parts tris(2.4-di-t-butylphenyl)phosphite as antioxidants and 0.05 weight parts calcium stearate as neutralizer, as is illustrated in Table 35, and uniformly mixed with a Henschel mixer. Then, using an extrusion machine, the blend was melt-kneaded at a temperature of 230° C. to obtain a pellet-shaped olefin polymer composition.

This olefin polymer composition was added to an extrusion machine for the inner layer, whereas S-1 or S-2 were added to an extrusion machine for the surface layer, as is illustrated in Table 35, and a two-layered molten parison was extruded at 200° C. A multilayered hollow plastic article measuring 200×120×60 mm and having 600 cc capacity and 0.8 mm average wall thickness of the body portion (0.2 mm surface layer, 0.6 mm inner layer) was obtained from this parison using a metal mold for blow molding at a metal mold temperature of 30° C.

TABLE 35

| | Comp. Ratio of Inner Layer Composition (in weight parts) | | | | | | | | | | Comp. Of Surface Layer | High Speed Mold-ability | Outer Appear-ance | Shock | Resis-tance | Glossi-ness |
|---|---|---|---|---|---|---|---|---|---|---|---|---|---|---|---|---|
| | PP-1 | PP-2 | PP-3 | F-1 | F-2 | PE-1 | PE-2 | PE-3 | PE-4 | EPR | EVA | | | | | | |
| Ex. 81 | 100 | | | | | | | | | | | S-1 | G | V | G | G | 71 |
| Ex. 82 | 90 | | 10 | | | | | | | | | S-1 | G | E | G | V | 68 |
| Ex. 83 | 90 | | | 10 | | | | | | | | S-1 | G | E | G | V | 68 |
| Ex. 84 | 90 | | | | 10 | | | | | | | S-1 | G | V | G | V | 71 |
| Ex. 85 | 90 | | | | | 10 | | | | | | S-1 | G | V | G | V | 71 |
| Ex. 86 | 90 | | | | | | 10 | | | | | S-1 | G | G | G | V | 71 |
| Ex. 87 | 90 | | | | | | | 10 | | | | S-1 | G | V | G | V | 71 |
| Ex. 88 | 90 | | | | | | | | 10 | | | S-1 | G | G | G | V | 71 |
| Ex. 89 | 90 | | | | | | | | | 10 | | S-1 | G | G | G | V | 71 |
| Ex. 90 | 100 | | | | | | | | | | | S-2 | G | V | G | G | 73 |
| Ex. 91 | 90 | | 10 | | | | | | | | | S-2 | G | E | G | V | 68 |
| Ex. 92 | 90 | | | 10 | | | | | | | | S-2 | G | E | G | V | 68 |
| Ex. 93 | 90 | | | | 10 | | | | | | | S-2 | G | V | G | V | 73 |
| Ex. 94 | 90 | | | | | 10 | | | | | | S-2 | G | V | G | V | 73 |
| Ex. 95 | 90 | | | | | | 10 | | | | | S-2 | G | G | G | V | 73 |
| Ex. 96 | 90 | | | | | | | 10 | | | | S-2 | G | V | G | V | 73 |
| Ex. 97 | 90 | | | | | | | | 10 | | | S-2 | G | G | G | V | 73 |
| Ex. 98 | 90 | | | | | | | | | 10 | | S-2 | G | G | G | V | 73 |

TABLE 36

| | Comp. Ratio of Inner Layer Composition (in weight parts) | | | | | | | | | | Comp. Of Surface Layer | High Speed Mold-ability | Outer Appear-ance | Shock | Resis-tance | Glossi-ness |
|---|---|---|---|---|---|---|---|---|---|---|---|---|---|---|---|---|
| | PP-1 | PP-2 | PP-3 | F-1 | F-2 | PE-1 | PE-2 | PE-3 | PE-4 | EPR | EVA | | | | | | |
| Ex. 99 | 85 | | | | | | 10 | | | 5 | | S-1 | G | V | G | E | 71 |
| Ex. 100 | 85 | | | | | | | | 10 | 5 | | S-1 | G | V | G | E | 71 |
| Ex. 101 | 85 | | 10 | | | | | | | 5 | | S-1 | G | E | G | G | 68 |
| Ex. 102 | 85 | | | | 10 | | | | | 5 | | S-1 | G | E | G | V | 68 |
| Ex. 103 | | 100 | | | | | | | | | | S-1 | G | V | G | V | 71 |
| Comp. Ex. 73 | | | 100 | | | | | | | | | S-1 | N | V | G | V | 71 |
| Comp. Ex. 74 | | | 90 | 10 | | | | | | | | S-1 | N | E | G | V | 68 |
| Comp. Ex. 75 | | | 90 | | 10 | | | | | | | S-1 | N | E | G | V | 68 |
| Comp. Ex. 76 | | | 90 | | | 10 | | | | | | S-1 | N | V | G | V | 71 |
| Comp. Ex. 77 | | | 90 | | | | 10 | | | | | S-1 | N | V | G | V | 71 |
| Comp. Ex. 78 | | | 90 | | | | | 10 | | | | S-1 | N | G | G | V | 71 |
| Comp. Ex. 79 | | | 90 | | | | | | 10 | | | S-1 | N | V | G | V | 71 |
| Comp. Ex. 80 | | | 90 | | | | | | | 10 | | S-1 | N | G | G | V | 71 |
| Comp. Ex. 81 | | | 90 | | | | | | | | 10 | S-1 | N | G | G | V | 71 |

Below, definitions of some technical terms used in the following Examples 104–108 and Comparative Examples 82–86 and explanations concerning evaluation methods are given:
(1) Intrinsic Viscosity ($\eta$)
   Measured (in dl/g) with the method already discussed.
(2) Melt Strength (MS)
   Measured (in cN) with the method already discussed.
(3) Crystallization Temperature (Tc)
   After raising the temperature of polypropylene composition from room temperature to 230° C. at a rate of 30° C./min and holding this temperature for 10 min, the temperature was lowered to −20° C. at −20° C./min and kept for 10 min, again raised to 230° C. at 20° C./min and kept for 10 min, then lowered to 150° C. at −80° C./min, and further lowered from 150° C. at −5° C./min, and the crystallization temperature (Tc) is indicated by the biggest peak at the crystallization temperature using a DSC7 type differential scan calorimeter (product of Perkin Elmer).
(4) Bend Elastic Constant
   In accordance with JIS K7203 (unit: MPa).
(6) HDT
   In accordance with JIS K7207 (unit: °C.).
(7) Haze
   In accordance with ASTM D1003 (unit: %) at 2 mm thickness.
(8) MFR (Melt Flow Rate)
   Flowability (in g/10 min) of the molten resin according to condition 14 of JIS K7210 Table 7.
Method for Producing an Injection Molded Plastic Article: 100 weight parts polypropylene composition were mixed with 0.1 weight parts 2,6-di-butyl-para-cresol, 0.05 weight parts tetrakis [methylene-3-(3'-5'-di-t-butyl-4'-hydroxyphenol)propionate]methane and 0.1 weight parts calcium stearate. The blend was melt kneaded and granulated at 230° C. using an extrusion pelletizer with a screw diameter of 40 mm to obtain a pellet-shaped polypropylene composition.
A JIS-shaped test piece was obtained from the resulting pellets using an injection molding machine at 250° C. melt temperature and 50° C. metal die temperature and kept under controlled conditions of 23° C. and 50% humidity for 72 hours.

EXAMPLE 104

A polymer was obtained with the method of Example 1. The resulting polymer had an intrinsic viscosity $\eta_T$ of 1.97 dl/g. The resulting polymer was a polypropylene composition containing 0.25 wt % polyethylene (A) corresponding to the component (a) due to the preactivation polymerization and the polypropylene component (b) had an intrinsic viscosity $\eta_P$ of 1.89 dl/g. Furthermore, 100 weight parts of the resulting polypropylene composition were mixed with 0.1 weight parts 2,6-di-butyl-para-cresol, 0.05 weight parts tetrakis [methylene-3-(3'-5'-di-t-butyl-4'-hydroxyphenol) propionate]methane and 0.1 weight parts calcium stearate. The blend was granulated at 230° C. using an extrusion pelletizer with a screw diameter of 40 mm and pelletized. The MFR of the pellets was 3.5 and the melt strength (MS) was 4.9 cN.

After pelletization of the polypropylene composition, a JIS injection molding sample piece was made with an injection molding machine at 250° C. melt temperature and 50° C. metal die temperature and kept in a room under controlled conditions of 23° C. and 50% humidity for 72 hours. Subsequently, physical properties as listed in Table 37 could be measured. Compared to the Comparative Example 82, which is a polypropylene with the same MFR, an injection molded plastic article with good heat resistance and stiffness having excellent transparency could be obtained.

Comparative Example 82

A polypropylene composition was prepared under the same conditions as in Example 104 but omitting preactivation polymerization with ethylene. The polypropylene composition was pelletized and a sample for Comparative Example 82 was prepared. The physical properties of the resulting polypropylene composition and the physical properties of an injection molded plastic article obtained from these pellets by processing under the same conditions as used in Example 104 are listed in Table 39. Compared with Example 104, the heat resistance and the stiffness are low and therefore not desirable.

EXAMPLE 105

A sample for Example 105 was prepared under the same conditions as in Example 104 (3) using the prepared preactivated catalyst slurry prepared in Example 104, except that the polymerization time in 104 (3) was changed to one hour. The physical properties of the resulting polypropylene composition and the physical properties of an injection molded plastic article obtained from these pellets by processing under the same conditions as in Example 104 are listed in Table 37. Compared to the Comparative Example 82, which is a polypropylene with the same MFR, an injection molded plastic article with good heat resistance and stiffness having excellent transparency could be obtained.

EXAMPLE 106 AND 107

Samples for Examples 106 and 107 were prepared under the same conditions as in Example 105 (3) using the preactivated catalyst slurry prepared in Example 104, except that the hydrogen amount was changed to 13 liter in Example 106 and to 100 liter in Example 107. The physical properties of the resulting polypropylene composition and the physical properties of an injection molded plastic article obtained from these pellets by processing under the same conditions as used in Example 104 are listed in Table 37. Compared to the Comparative Examples 84 and 85, which are polypropylenes with the same MFR, an injection molded plastic article with good heat resistance and stiffness having excellent transparency could be obtained.

Comparative Example 84

Samples for Comparative Examples 84 and 85 were prepared under the same conditions as in Example 105 (3), except that preactivation polymerization with ethylene in Example 104 has been omitted and the hydrogen amount of Example 105 (3) was changed to 13 liter in Comparative Example 84 and to 100 liter in Comparative Example 85. The physical properties of the resulting polypropylene composition and the physical properties of an injection molded plastic article obtained from these pellets by processing under the same conditions as used in Example 104 are listed in Table 39. Compared with Examples 106 and 107, the heat resistance and the stiffness are low and therefore not desirable.

EXAMPLE 108

(1) Preparation of Transition Metal Compound Catalyst Component

A polymer was obtained in the same manner as in Example 4. The resulting polymer had an intrinsic viscosity $\eta_T$ of 1.93 dl/g. In the resulting polymer, 0.26 wt % polyethylene (A) were generated due to the preactivation treatment and the polypropylene component (b) had an intrinsic viscosity $\eta_p$ of 1.75 dl/g.

Then, granulation was performed with an extrusion pelletizer under the same conditions as in Example 104 to obtain polymer pellets. These pellets had a MFR of 4 and a melt strength (MS) of 3.5 cN. After pelletization of polypropylene composition (C), a JIS injection molding sample piece was made with an injection molding machine at 250° C. melt temperature and 50° C. metal die temperature and kept for 72 hours in a room under controlled conditions of 23° C. and 50% humidity. Subsequently, physical properties as listed in Table 38 could be measured. Compared to the Comparative Example 86, which is a polypropylene with the same MFR, an injection molded plastic article with good heat resistance and stiffness having excellent transparency could be obtained.

Comparative Example 86

A polypropylene composition was prepared under the same conditions as in Example 108 but omitting preactivation polymerization with ethylene. The polypropylene composition was pelletized and a sample for Comparative Example 86 was prepared. The physical properties of the resulting polypropylene composition and the physical properties of an injection molded plastic article obtained from these pellets by processing under the same conditions as used in Example 104 are listed in Table 40. Compared with Example 108, the heat resistance and the stiffness are low and therefore not desirable.

TABLE 37

|  | Ex. 104 | Ex. 105 | Ex. 106 | Ex. 107 |
|---|---|---|---|---|
| Prepolym. Polypropylene | | | | |
| Int. Viscosity η (dl/g) | 2.8 | 2.8 | 2.8 | 2.8 |
| Formed Amount[1] (g/g) | 2.0 | 2.0 | 2.0 | 2.0 |
| Composition Ratio[2] (wt %) | 0.02 | 0.02 | 0.02 | 0.02 |
| Preact. Polyethylene (A) | | | | |
| Int. Viscosity η (dl/g) | 34.0 | 34.0 | 34.0 | 34.0 |
| Formed Amount[1] (g/g) | 22.0 | 22.0 | 22.0 | 22.0 |
| Composition Ratio[2] (wt %) | 0.25 | 0.46 | 0.46 | 0.46 |
| Add. Polymer. Polypropylene | | | | |
| Int. Viscosity η (dl/g) | 2.8 | 2.8 | 2.8 | 2.8 |
| Formed Amount[1] (g/g) | 2.0 | 2.0 | 2.0 | 2.0 |
| Composition Ratio[2] (wt %) | 0.02 | 0.02 | 0.02 | 0.02 |
| Polypropylene Composition | | | | |
| Int. Viscosity η (dl/g) | 1.97 | 1.97 | 2.77 | 1.69 |
| Melt Strength (cN) | 4.9 | 6.0 | 11.0 | 3.6 |
| MFR (230° C.) (g/10 min) | 3.5 | 3.5 | 0.60 | 9.0 |
| Properties of Injection Molding Plastic Article: | | | | |
| HDT (° C.) | 124 | 130 | 125 | 130 |
| Bend Elastic Const. (MPa) | 1580 | 1600 | 1580 | 1650 |
| Haze (%) | 70 | 58 | 52 | 68 |

Notes:
[1]Amount (in g) formed per gram of transition metal compound catalyst component
[2]Composition ratio (wt %) in polypropylene composition

TABLE 38

|  | Ex. 108 |
|---|---|
| Prepolym. Polypropylene | |
| Int. Viscosity η (dl/g) | 2.7 |
| Formed Amount[1] (g/g) | 1.2 |
| Composition Ratio[2] (wt %) | 0.01 |
| Preact. Polyethylene (A) | |
| Int. Viscosity η (dl/g) | 30.2 |
| Formed Amount[1] (g/g) | 32.0 |
| Composition Ratio[2] (wt %) | 0.26 |
| Add. Polymer. Polypropylene | |
| Int. Viscosity η (dl/g) | 2.8 |

TABLE 38-continued

|  | Ex. 108 |
| --- | --- |
| Formed Amount[1] (g/g) | 2.2 |
| Composition Ratio[2] (wt %) | 0.01 |
| Polypropylene Composition (C) | |
| Int. Viscosity η (dl/g) | 1.93 |
| Melt Strength (cN) | 3.5 |
| MFR (230° C.) (g/10 min) | 4.0 |
| Properties of Injection Molded Plastic Article: | |
| HDT (° C.) | 126 |
| Bend Elastic Const. (MPa) | 1570 |
| Haze (%) | 66 |

Notes:
[1]Amount (in g) formed per gram of transition metal compound catalyst component
[2]Composition ratio (wt %) in polypropylene composition

TABLE 39

|  | Comp. Ex. 82 | Comp. Ex. 83 | Comp. Ex. 84 | Comp. Ex. 85 |
| --- | --- | --- | --- | --- |
| Prepolym. Polypropylene | | | | |
| Int. Viscosity η (dl/g) | 2.8 | 2.8 | 2.8 | 2.8 |
| Formed Amount[1] (g/g) | 2.0 | 2.0 | 2.0 | 2.0 |
| Composition Ratio[2] (wt %) | 0.02 | 0.02 | 0.02 | 0.02 |
| Preact. Polyethylene (A) | | | | |
| Int. Viscosity η (dl/g) | — | 34.0 | — | — |
| Formed Amount[1] (g/g) | — | 0.005 | — | — |
| Composition Ratio[2] (wt %) | — | 0.0001 | — | — |
| Add. Polymer. Polypropylene | | | | |
| Int. Viscosity η (dl/g) | 2.8 | 2.8 | 2.8 | 2.8 |
| Formed Amount[1] (g/g) | 2.0 | 2.0 | 2.0 | 2.0 |
| Composition Ratio[2] (wt %) | 0.02 | 0.02 | 0.02 | 0.02 |
| Polypropylene Composition (C) | | | | |
| Int. Viscosity η (dl/g) | 1.97 | 2.00 | 2.77 | 1.69 |
| Melt Strength (cN) | 0.9 | 1.1 | 4.6 | 0.5 |
| MFR (230° C.) (g/10 min) | 3.5 | 3.5 | 0.6 | 9.0 |
| Properties of Injection Molded Plastic Article: | | | | |
| HDT (° C.) | 115 | 115 | 112 | 114 |
| Bend Elastic Const. (MPa) | 1330 | 1340 | 1460 | 1500 |
| Haze (%) | 75 | 75 | 60 | 75 |

Notes:
[1]Amount (in g) formed per gram of transition metal compound catalyst component
[2]Composition ratio (wt %) in polypropylene composition

TABLE 40

|  | Comp. Ex. 108 |
| --- | --- |
| Prepolym. Polypropylene | |
| Int. Viscosity η (dl/g) | 2.7 |
| Formed Amount[1] (g/g) | 1.2 |
| Composition Ratio[2] (wt %) | 0.01 |
| Preact. Polyethylene (A) | |
| Int. Viscosity η (dl/g) | — |
| Formed Amount[1] (g/g) | — |
| Composition Ratio[2] (wt %) | — |
| Add. Polymer. Polypropylene | |
| Int. Viscosity η (dl/g) | 2.8 |
| Formed Amount[1] (g/g) | 2.2 |
| Composition Ratio[2] (wt %) | 0.01 |
| Polypropylene Composition (C) | |
| Int. Viscosity η (dl/g) | 1.93 |
| Melt Strength (cN) | 0.7 |
| MFR (230° C.) (g/10 min) | 4.0 |
| Properties of Injection Molded Plastic Article: | |
| HDT (° C.) | 115 |
| Bend Elastic Const. (MPa) | 1440 |
| Haze (%) | 75 |

Notes:
[1]Amount (in g) formed per gram of transition metal compound catalyst component
[2]Composition ratio (wt %) in polypropylene composition Below, evaluation methods as applied in the following Examples 109–110 and Comparative Example 87 are explained:

Intrinsic Viscosity η

Value of the intrinsic viscosity (in dl/g) measured with an Ostwald viscometer (product of Mitsui Toatsu Chemicals, Inc.) in tetralin at 135° C.

Melt Strength (MS)

Value (in cN) measured with a Melt Tension Tester-2 (product of TOYO SEIKI SEISAKUSHO).

MFR Flowability (in g/10 min) of the molten resin according to condition 14 of JIS K7210 Table 7.

Melting Point

A 10 mg sample is heated in a nitrogen atmosphere from 20° C. to 230° C. at a rate of 20° C./min. The temperature is kept at 230° C. for 10 min and then lowered to −20° C. at 5° C./min. After holding the temperature at −20° C. for 10 min, the temperature is again raised at a rate of 20° C./min and the temperature at the peak of the heat absorption curve is determined with a DSC7 type differential scan calorimeter (product of Perkin Elmer).

Nonwoven Fabric Tensile Strength

Using a miniature card machine, a web with about 20 g/m² relative weight is made from sample short fibers and at a velocity of 6 m/min and a linear pressure of 20 kg/cm passed between metal rolls (upper roll: emboss-type roll with a ratio of concave portions to surface area of 25%; lower roll: flat roll) of 165 mm diameter and heated to 130° C., to be transformed into a nonwoven fabric. A sample piece is produced by cutting in the machine direction (also abbreviated "MD" below) and a width of 5 cm in the cross direction (also abbreviated "CD" below). Using a tension tester, the tensile strength (in kg/5 cm) is measured with a gripping interval of 100 mm and under a tractive velocity of 100 mm/min.

Heat Sealability

A sample piece of 5 cm width is cut from the nonwoven fabric used for the measurement of the nonwoven fabric tensile strength as described above. The end of this piece is laid onto a sample piece of nonwoven fabric of propylene fiber (2 d/f) with 20 g/m² relative weight and 5cm width so as to overlap for 1 cm. A composite material is made by heat sealing under a pressure of 3 kg/cm² for 3 sec at 150° C. Using a tension tester, the exfoliation strength (in kg/5 cm) is measured with a gripping interval of 100 mm and under a tractive velocity of 100 mm/min.

Web Thermal Contraction Ratio

Using a miniature card machine, a web with about 200 g/m² relative weight is made from sample short fiber. The contraction ratio (in %) in MD for a web that has been heat treated for 5 min in a circulating hot air drying machine at 145° C. is indicated.

The propylene that was used in the Examples and the Comparative Examples was prepared as follows:

PP1

A polymer was obtained in the same manner as in Example 1. The resulting polymer had an intrinsic viscosity $\eta_T$ of 1.67 dl/g.

In the resulting polymer, 0.25 wt % polyethylene (A) was generated due to preactivation polymerization and the polypropylene-α-olefin copolymer (b) had an intrinsic viscosity $\eta_p$ of 1.59 dl/g.

Granulation of the Polypropylene Resin 100 weight parts of the resulting polypropylene resin were stirred and mixed for 1 min using a Henschel mixer with 0.1 weight parts 2,6di-butyl-p-cresol and 0.1 weight parts calcium stearate. The resulting blend was melt kneaded and extruded at 230° C. melt kneading temperature using an extrusion molding machine with a screw diameter of 40 mm to obtain pellets. When the physical properties of the resulting pellets were measured, it was found that the MFR of the pellets was 7.6 g/10 min, the melt strength was 1.3 cN and the melting point was 140° C. The physical properties of the resulting polypropylene resin are listed in detail in Tables 41-1 and 41-2.

PP2

(585) After a titanium-containing support type catalyst component has been obtained under the same conditions as for PP1, a propylene-α-olefin copolymer was polymerized under the same conditions as in PP1 (3) and a polypropylene resin was obtained. Using the resulting polypropylene resin, an evaluation was performed in accordance with PP1. The physical properties of the resulting polypropylene resin are shown in Table 41-1.

EXAMPLE 109

Using PP1 as a sheath component and a crystalline polypropylene (homopolymer) with an MFR of 8 g/10 min and a melting point of 163° C. as a core component, a concentric sheath-core composite fiber with 4.2 d/f single yarn denier was obtained by spinning with a compound ratio of 40/60 (sheath component/core component), a spinning temperature of 310° C. and a retrieval rate of 900 m/min on a multi-component fiber spinning machine having a nozzle of 0.6 mm diameter. Then, this not-yet-stretched yarn was expanded at an expansion ratio of 2.6 and an expansion temperature of 95° C., mechanically crimped and dried at 80° C. After that, it was cut to 38 mm to obtain a composite fiber staple. The properties are shown in Table 41-2.

EXAMPLE 110

A composite fiber staple was obtained under the same conditions as in 109, except that the compound ratio was altered to 60/40. The properties are shown in Table 41-2.

Comparative Example 87

A composite fiber staple was obtained under the same conditions as in 109, except that PP2 was used as the sheath. The properties are shown in Table 41-2.

TABLE 41-1

| | Unit | PP1 | PP2 |
|---|---|---|---|
| Prepolymerization Polypropylene (B) | | | |
| Int. Viscosity η | dl/g | 2.8 | 2.7 |
| Formed Amount[1] | g/g | 2.0 | 1.2 |
| Composition Ratio[2] | wt % | 0.02 | 0.01 |
| Preactivation Polyethylene (A) | | | |
| Int. Viscosity η | dl/g | 34.0 | — |
| Formed Amount[1] | g/g | 22.0 | — |
| Composition Ratio[2] | wt % | 0.25 | — |
| Addition Polymerization Polypropylene (C) | | | |
| Int. Viscosity η | dl/g | 2.8 | 2.8 |
| Formed Amount[1] | g/g | 2.0 | 2.2 |
| Composition Ratio[2] | wt % | 0.02 | 0.01 |
| Polypropylene (b) | | | |
| Ethylene | wt % | 2.4 | 2.4 |
| Butene-1 | wt % | 3.9 | 3.8 |
| Int. Viscosity η | dl/g | 1.59 | 1.69 |
| Polypropylene Resin | | | |
| Ethylene | wt % | 2.4 | 2.4 |
| Butene-1 | wt % | 3.9 | 3.8 |
| Int. Viscosity η | dl/g | 1.67 | 1.69 |
| Melt Strength (MS) | cN | 1.3 | 0.3 |
| Melting Point | ° C. | 140 | 141 |
| MFR | g/10 min | 7.6 | 8.1 |

Notes:
[1]Amount (in g) formed per gram of transition metal compound catalyst component
[2]Composition ratio (wt %) in polypropylene composition

TABLE 41-2

| | Raw Resin | | Fiber | | | Nonwoven Fabric | | |
|---|---|---|---|---|---|---|---|---|
| | | | | Expanded | Web | Tensile Strength | | Heat |
| | Sheath Component | Core Component | Comp. Ratio Sheath/Core | Fiber Denier in d/f | Contraction Ratio in % | MD kg/5 cm | CD kg/5 cm | Sealability kg/5 cm |
| Ex. 109 | PP1 | Cryst. PP | 40/60 | 2.0 | 4.5 | 9.5 | 3.0 | 3.5 |
| Ex. 110 | PP1 | Cryst. PP | 60/40 | 2.0 | 9.5 | 10.5 | 3.7 | 4.0 |
| Comp. Ex. 87 | PP2 | Cryst. PP | 40/60 | 2.0 | 4.3 | 4.0 | 1.1 | 1.9 |

Below, some technical terms and evaluation methods as applied in the following Examples 111–116 and Comparative Example 88–91 are explained:

Relative Viscosity

A sample of 0.5 g is dissolved in a 100 ml compound solution of phenol and ethane tetrachloride of equal weight ratio. The relative viscosity is then measured by a usual method at 20° C.

Average Fiber Diameter

An average fiber diameter (in μm) is determined by photographing a sample through an electron microscope.

Web Strength

A 15 cm by 5 cm sample piece is obtained by cutting the resulting nonwoven web in the machine direction and in the cross direction. Using a tension tester, the breaking strength (in kg/5 cm) is measured with a gripping interval of 100 mm and under a tractive velocity of 100 mm/min. The web strength is define by the following formula:

$$\text{web strength} = \sqrt{(\text{breaking str. in machine direction}) \times (\text{breaking str. in cross direction})}$$

The propylene that was used in the Examples and the Comparative Examples was prepared as follows:

PP1

A polymer was obtained in the same manner as in Example 1. The resulting polymer had an intrinsic viscosity $\eta_T$ of 1.28 dl/g. In the resulting polymer, 0.18 wt % polyethylene (A) was generated due to preactivation treatment and the polypropylene copolymer (b) had an intrinsic viscosity $\eta_P$ of 1.23 dl/g.

100 weight parts of the resulting polypropylene composition were mixed with 0.1 weight parts 2,6-di-butyl-p-cresol and 0.1 weight parts calcium stearate. This blend was granulated at 230° C. using an extrusion pelletizer with a screw diameter of 40 mm to obtain PP1. The melt strength (MS) of PP1 was 1.7 cN.

PP2

A polypropylene composition was produced and granulated under the same conditions as for PP1, except that in the main polymerization of polypropylene, the ratio of hydrogen concentration to propylene concentration in the polymerization container was set to 0.06. The melt strength (MS) of PP2 was 1.4 cN.

PP3

A polypropylene composition was produced and granulated under the same conditions as for PP1, except that the preactivation polymerization with ethylene has not been performed. The melt strength (MS) of PP3 was 0.1 cN.

PP4

A polypropylene composition was produced and granulated under the same conditions as for PP2, except that the preactivation polymerization with ethylene has not been performed. The melt strength (MS) of PP4 was 0.1 cN.

EXAMPLE 111

Using PP1 described above, a nonwoven web was produced with the melt blowing method. That is to say, PP1 was melted and spun out from a die at 340° C. spinning temperature and 0.2 g single bore discharge per minute. This polymer flow was drawn and refined by high temperature and high pressure air flow at a temperature of 360° C. and 1.5 kg/cm² pressure, and then collected and accumulated on a metal mesh conveyor to obtain a nonwoven web of 30 g/m² relative weight. The results are shown in Table 43. Table 43 illustrates clearly that this nonwoven web has excellent web strength.

EXAMPLE 112

Example 112 was prepared under the same conditions as Example 111, except that the die was exchanged for a die for sheath-core multi-component fiber spinning, PP1 was used for the core and PP3 was used for the sheath at a compound ratio (core/sheath) of 80/20. The results are shown in Table 43. Table 43 illustrates clearly that this nonwoven web has excellent web strength.

EXAMPLE 113

Example 113 was prepared under the same conditions as Example 112, except that polyethylene terephthalate with 1.22 relative viscosity was used as the sheath-side resin, and the compound ratio (core/sheath) was set to 80/20. The results are shown in Table 43. Table 43 illustrates clearly that this nonwoven web has excellent web strength.

Comparative Example 88

Comparative Example 88 was prepared under the same conditions as Example 111, except that PP3 was used instead of PP1. The results are shown in Table 43. Table 43 illustrates clearly that this nonwoven web has a low web strength.

Comparative Example 89

Comparative Example 89 was prepared under the same conditions as Example 112, except that the compound ratio (core/sheath) was set to 40/60. The results are shown in Table 43. Table 43 illustrates clearly that this nonwoven web has a low web strength.

EXAMPLE 114

Using PP2, spinning was performed at 340° C. spinning temperature and 0.2 g single bore discharge per minute. This polymer flow was drawn and refined by high temperature and high pressure air flow at a temperature of 360° C. and 1.3 kg/cm² pressure, and then collected and accumulated on a metal mesh conveyor to obtain a nonwoven web of 30 g/m² relative weight. The results are shown in Table 43. Table 43 illustrates clearly that this nonwoven web has excellent web strength.

EXAMPLE 115

Example 115 was prepared under the same conditions as Example 114, except that the die was replaced with a die for parallel multi-component fiber spinning, and PP2 and high density polyethylene (HDPE) with 41 g/10 min MI, 0.959 g/cm³ density were used with a compound ratio (PP2/HDPE) of 70/30. The results are shown in Table 43. Table 43 illustrates clearly that this nonwoven web has excellent web strength.

EXAMPLE 116

Example 116 was prepared under the same conditions as Example 114, except that the die was replaced with a die for commingled yarn spinning, and PP2 and PP4 were used with a compound ratio (PP2/PP4) of 80/20. The results are shown in Table 43. Table 43 illustrates clearly that this nonwoven web has excellent web strength.

Comparative Example 90

Comparative Example 90 was prepared under the same conditions as Example 115, except that PP4 was used instead of PP2. The results are shown in Table 43. Table 43 illustrates clearly that this nonwoven web has a low web strength.

Comparative Example 91

Comparative Example 90 was prepared under the same conditions as Example 114, except that the pressure of the high temperature high pressure air flow was set to 0.6 kg/cm². The results are shown in Table 43. Table 43 illustrates clearly that this nonwoven web has a low web strength.

TABLE 42

|  | PP1 | PP2 | PP3 | PP4 |
| --- | --- | --- | --- | --- |
| Prel. Polymerization Polypropylene (B) | | | | |
| Int. Viscosity η (dl/g) | 2.7 | 2.7 | 2.7 | 2.7 |
| Formed Amount[1] (g/g) | 1.2 | 1.2 | 1.2 | 1.2 |
| Composition Ratio[2] (wt %) | 0.01 | 0.01 | 0.01 | 0.01 |
| Preactivation Polyethylene (A) | | | | |
| Int. Viscosity η (dl/g) | 30.2 | 30.2 | — | — |
| Formed Amount[1] (g/g) | 32.0 | 32.0 | — | — |
| Composition Ratio[2] (wt %) | 0.18 | 0.18 | — | — |
| Addition Polymerization Polypropylene (C) | | | | |
| Int. Viscosity η (dl/g) | 2.8 | 2.8 | 2.8 | 2.8 |
| Formed Amount[1] (g/g) | 2.2 | 2.2 | 2.2 | 2.2 |
| Composition Ratio[2] (wt %) | 0.01 | 0.01 | 0.01 | 0.01 |
| Main (Co) Polymerization Polypropylene (b) | | | | |
| Int. Viscosity η (dl/g) | 1.23 | 1.14 | 1.27 | 1.19 |
| Polypropylene Resin | | | | |
| Intrinsic Viscosity η (dl/g) | 1.28 | 1.19 | 1.27 | 1.19 |
| Melt Strength (MS) (cN) | 1.7 | 1.4 | 0.1 | 0.1 |
| Melt Flow Rate (g/10 min) | 47 | 73 | 50 | 71 |

Notes:
[1] Amount formed per gram of transition metal compound catalyst component
[2] Composition ratio in polypropylene resin

TABLE 43

|  | Die Type | First Component | Second Component | Ratio of First Component (wt %) | Average Fiber Diameter (μm) | Web Strength (kg/5 cm) |
| --- | --- | --- | --- | --- | --- | --- |
| Ex. 111 | Single Component Spinning Type | PP1 | — | 100 | 4.0 | 5.8 |
| Ex. 112 | Core-Sheath Multi-comp. Fiber Spinning Type | PP1 (core) | PP3 (sheath) | 80 | 3.8 | 5.2 |
| Ex. 113 | Core-Sheath Multi-comp. Fiber Spinning Type | PP1 (core) | PET (sheath) | 70 | 3.8 | 5.0 |
| Ex. 114 | Single Component Spinning Type | PP2 | — | 100 | 4.8 | 4.1 |
| Ex. 115 | Parallel Multi-comp. Fiber Spinning Type | PP2 | HDPE | 70 | 5.0 | 3.8 |
| Ex. 116 | Commingled Yarn Spinning Type | PP2 | PP4 | 80 | 4.9 | 3.9 |
| Comp. Ex. 88 | Single Component Spinning Type | PP3 | — | 100 | 3.9 | 1.2 |
| Comp. Ex. 89 | Single Component Spinning Type | PP1 (core) | PP3 (sheath) | 40 | 3.8 | 2.6 |
| Comp. Ex. 90 | Parallel Multi-comp. Fiber Spinning Type | PP4 | HDPE | 70 | 5.0 | 1.1 |
| Comp. Ex. 91 | Single Component Spinning Type | PP2 | — | 100 | 15.2 | 1.8 |

HDPE
high density polyethylene with 41 g/10 min MI, 0.959 g/cm³ density

PET
Polyethylene Terephthalate with 1.22 relative viscosity

Below, some definitions for technical terms and evaluation methods as applied in the following Examples 117–126 and Comparative Example 92–102 are explained:

Formability

Using a cylindrical die of 150 mm diameter, a continuous tube-shaped plastic of 0.5 mm thickness is molded in a cooling molding process with a vacuum forming metal die of 500 mm length and a water bath of 2 m length at a retrieval rate of 0.5 m/min. The thickness in the machine flow direction and the thickness in the circumferential direction are measured in intervals of 100 mm in the machine flow direction and intervals of 50 mm in the circumferential direction over a total length of 10 m using a Micro Gauge (Trademark). The standard deviations for cross and machine direction are calculated and the quality is judged by evaluating both standard deviations according to the following criteria. The formability is better the smaller the standard deviations are.

Formability Criteria

◯: The standard deviations for the cross direction and the flow direction are both under 5%.

Δ: One of the two standard deviations for the cross direction and the flow direction is at least 5%.

x: A tube-shaped product cannot be molded, or a cylindrical shape cannot be formed.

Productivity

The thickness of the cylinder was made constant by changing the molding speed among the conditions described for formability and the forming speed with which a tube-shaped plastic article can be molded so that the thickness standard deviations for both directions are below 5% was measured. The productivity was ranked due to the forming speed according to the following criteria:

| Forming Speed and Productivity Criteria | |
|---|---|
| Productivity-Good | 3 At least 2.0 m/min |
| | 2 At least 0.5 m/min and less than 2.0 m/min |
| Productivity-Bad | 1 Less than 0.5 m/min |

A good productivity is at least 2 m/min, at less than 0.5 m/min the product has no commercial value.

Whitening

A 500 g iron ball is dropped onto the continuous tube-shaped plastic in a right angle to its flow direction. The height at which the whitening phenomenon occurs is measured and the product is ranked for whitening:

| Whitening | Good: | Whitening occurs at a height of at least 1 m |
| | Bad: | Whitening occurs at a height of less than 1 m |

EXAMPLE 117

A polymer was obtained with the method of Example 1. The resulting polymer had an intrinsic viscosity $\eta_r$ of 3.09 dl/g. The resulting polymer was a polypropylene composition containing 0.25 wt % polyethylene (A) corresponding to the component (a) due to the preactivation polymerization and the polypropylene component (b) had an intrinsic viscosity $\eta_P$ of 3.09 dl/g.

Preparation of Polyolefin Composition and Continuous Tube-shaped Plastic 100 weight parts of the resulting polypropylene composition were mixed for 2 min using a Henschel Mixer with 0.05 weight parts tetrakis [methylene-3-3'-5'-di-t-butyl-4'-hydroxyphenol)propionate]methane, 0.1 weight parts calcium stearate and 5 weight parts hydrogenated styrene elastomer (20 wt % styrene concentration) with 3.0/10 min SR-MFR (230° C.; 21.18 N). The blend was granulated at 230° C. using an extrusion pelletizer with a screw diameter of 65 mm and pellets were obtained. When the physical properties of the pellets were evaluated, it was found that the MFR of the pellets was 0.5 g/10 min, the crystallization temperature was 122.5° C. and the melt strength (MS) was 10.1 cN.

Using a single layer melt extrusion device with 90 mm screw diameter, 150 mm cylindrical die diameter and 0.8 mm lip opening width, a continuous tube-shaped plastic with a target thickness of 0.5 mm was produced at 250° C. melt temperature and 0.5 m/min forming speed, using a vacuum metal die of 500 mm length and a water bath (20° C. water temperature) of 2 m length. The formability of the plastic had the "◯". Moreover, taking the same thickness as a reference and accelerating the discharge amount and forming speed, a continuous tube-shaped plastic was molded and a forming speed, a which standard deviations of the thickness in the flow direction and circumferential direction are less than 5%. Even the fastest forming speed due to a machine specification of 5 m/min, the forming speed rank was "◯" and the productivity rank was "3". Furthermore, when a 500 g iron ball was dropped onto the resulting plastic and the whitening was measured, it resulted even at 2 m no whitening could be observed, and thus whitening behavior was also good.

EXAMPLE 118 AND COMPARATIVE EXAMPLE 92

A polypropylene composition was produced under the same conditions as in Example 117, except that the conditions for preactivation polymerization with ethylene were changed to alter the formed amount of polyetylene (A). This polypropylene composition was mixed with the same compounds as in Example 117, pellitized, and polyolefin compositions of Example 118 and Comparative Example 92 were prepared.

The physical properties of the resulting polypropylene composition and the formability and productivity of a continuous under the same processing conditions as in Example 117 are shown in Table 44.

Comparative Example 93

A polypropylene composition was produced by a treatment using the same conditions as in Example 117, except that instead of preactivation with ethylene in Example 117 (2), a total of 220 g propylene is fed in three portions to the reaction container: 80 g at the beginning of the preactivation polymerization, 80 g about 30 min after the begin and 60 g one hour after the beginning of the preactivation polymerization. The polypropylene composition was pelletized and a sample was prepared for the evaluation of Comparative Example 93.

The physical properties of the resulting polypropylene composition and the formability and productivity of a continuous tube-shaped plastic made from the resulting polyolefin composition under the same processing conditions as in Example 117 are shown in Table 44.

Comparative Example 94

A polypropylene composition was produced by a treatment using the same conditions as in Example 117, except that preactivation with ethylene of a titanium-containing support type catalyst component has not been preformed. From the resulting polypropylene composition, a sample was prepared for the evaluation of Comparative Example 93. The physical properties of the resulting polypropylene composition and the formability and productivity of a continuous tube-shaped plastic made from pellets under the same processing conditions as in Example 117 are shown in Table 44.

Comparative Example 95

After nitrogen gas has been filled into a reaction vessel having a agitator with tilted blades, 10 kg of a propylene homopolymer powder with an intrinsic viscosity η of 1.67 dl/g and an average particle size of 150 μm, which has been obtained by slurry-polymerization of propylene in n-hexane using a catalyst combing a titanium-containing catalyst component comprising a titanium-trichloride composition with diethyaluminumchloride and diethyleneglycoldimethylether as a third component, were filled into the reactor vessel. Successively, the procedure of evacuating the reactor vessel and refilling it with nitrogen gas up to atmospheric pressure was repeated ten times. Then, 0.35 mol di-2-ethylhexylperoxydicarbonate (modifier) in a toluene solution of 70 wt % concentration were added and mixed under the nitrogen gas atmosphere at 25° C. while stirring. Then, the temperature in the reactor vessel was raised to 120° C. and reaction took place at this temperature for 30 min. After the reaction time had passed, the temperature inside the reactor vessel was raised to 135° C. and an after-treatment was performed at this temperature for 30 min. After the after-treatment, the reactor vessel was cooled down to room temperature and opened to retrieve the polypropylene.

100 weight parts of the resulting propylene polymer were mixed for 2 min using a Henschel mixer with 0.05 weight parts tetrakis [methylene-3-(3'-5'-di-t-butyl-4'-hydroxyphenol)propionate]methane and 0.1 weight parts calcium stearate, in addition to the same compounds as in Example 117. The blend was granulated and pelletized at 230° C. using an extrusion pelletizer with a screw diameter of 65 mm and samples for the evaluation of Comparative Example 95 were prepared.

Using the obtained pellets, a continuous tube-shaped plastic was produced with the same method as in Example 117, and its formability and productivity were measured. The formability of this continuous plastic was "Δ" and its productivity rank was "1".

TABLE 44

| | Ex. 117 | Ex. 118 | Comp. Ex. 92 | Comp. Ex. 93 | Comp. Ex. 94 | Comp. Ex. 95 |
|---|---|---|---|---|---|---|
| Prel. Polymerization Polypropylene (B) | | | | | | |
| Int. viscosity η (dl/g) | 2.8 | 2.8 | 2.8 | 2.8 | 2.8 | — |
| Formed Amount[1] (g/g) | 2.0 | 2.0 | 2.0 | 2.0 | 2.0 | — |
| Composition Ratio[2] (wt %) | 0.02 | 0.02 | 0.02 | 0.02 | 0.02 | — |
| Preactivation Polyethylene (A) | | | | | | |
| Int. Viscosity η (dl/g) | 34.0 | 34.4 | 34.0 | 2.8 | — | — |
| Formed Amount[1] (g/g) | 22.0 | 4.5 | 0.005 | 22.0 | — | — |
| Composition Ratio[2] (wt %) | 0.25 | 0.05 | 0.0001 | 0.25 | — | — |
| Addition Polymerization Polypropylene (C) | | | | | | |
| Int. Viscosity η (dl/g) | 2.8 | 2.8 | 2.8 | 2.8 | 2.8 | — |
| Formed Amount[1] (g/g) | 2.0 | 2.0 | 2.0 | 2.0 | 2.0 | — |
| Composition Ratio[2] (wt %) | 0.02 | 0.02 | 0.02 | 0.02 | 0.02 | — |
| Polypropylene Composition | | | | | | |
| Intrinsic Viscosity η (dl/g) | 3.09 | 3.08 | 3.07 | 2.95 | 3.05 | 3.06 |
| Melt Strength (MS) (cN) | 10.1 | 8.5 | 6.0 | 5.8 | 5.1 | 4.8 |
| Cryst. Temp. (Tc) (° C.) | 122.5 | 121.3 | 117.0 | 116.2 | 116.0 | 129.4 |
| PP-MFR (g/10 min) | 0.5 | 0.5 | 0.5 | 0.6 | 0.5 | 0.5 |
| Blending Quantity (wt parts) | 100.0 | 100.0 | 100.0 | 100.0 | 100.0 | 100.0 |
| Hydrogenat. Styrene Elastomer | | | | | | |
| SR-MFR (g/10 min) | 3.0 | 3.0 | 3.0 | 3.0 | 3.0 | 3.0 |
| Blending Quantity (wt parts) | 5.0 | 5.0 | 5.0 | 5.0 | 5.0 | 5.0 |
| Molding Properties of Polypropylene Composition Continuous Tube-shaped Plastic | | | | | | |
| Formability | ◯ | ◯ | Δ | X | X | X |
| Productivity | 3 | 3 | 1 | 1 | 1 | 1 |
| Whitening | good | good | good | good | good | good |

Notes:
[1]Amount (in g) formed per gram of transition metal compound catalyst component
[2]Composition ratio in polypropylene composition (in wt %)

EXAMPLE 119

A polymer was obtained in the same manner as in Example 4. The resulting polymer had an intrinsic viscosity $\eta_T$ of 3.05 dl/g.

The polymer contained 0.18 wt % polyethylene (A) formed due to preactivation and the polypropylene had an intrinsic viscosity $\eta_P$ of 3.05 dl/g.

Preparation of Polyolefin Composition and Continuous Tube-shaped Plastic

After that, using the same compounds and conditions as in Example 117, granulation was carried out and polyolefin pellets were obtained. When the physical properties of these pellets were evaluated and measured, it was found that the MFR was 0.5 g/10 min, the crystallization temperature was 122.0° C. and the melt strength (MS) was 9.8 cN.

As in Example 117, using a single layer melt extrusion device with 90 mm screw diameter, 150 mm cylindrical die diameter and 0.8 mm lip opening width, a continuous tube-shaped plastic with a target thickness of 0.5 mm was produced at 250° C. melt temperature and 0.5 m/min forming speed, using a vacuum metal die of 500 mm length and a water bath (20°C. water temperature) of 2 m length. The formability of the resulting plastic had the rank "○". Moreover, taking the same thickness as a reference and accelerating the discharge amount and the forming speed, a continuous tube-shaped plastic was molded and a forming speed was measured, for which standard deviations of the thickness in the flow direction and circumferential direction are less than 5%. At a forming speed of 4.5 m/min, the forming speed rank was "○" and the productivity rank was "3". Furthermore, when a 500 g iron ball was dropped onto the resulting plastic and the whitening was measured, it resulted that even at 2 m no whitening could be observed, so whitening behavior was also good.

Comparative Example 96

A polymer was produced under the same conditions as in Example 119, except that preactivation polymerization with ethylene has not been performed. A sample was prepared for the evaluation of Comparative Example 96.

EXAMPLE 120

(1) Preparation of Transition Metal Compound Catalyst Component

A titanium-containing support type catalyst component was obtained under the same conditions as in Example 119.

(2) Preparation of Preactivated Catalyst

A preactivated catalyst slurry was obtained under the same conditions as in Example 119, except that the conditions for preactivation polymerization with ethylene were changed insofar that the reaction temperature was set to 0° C., 30 g propylene were fed in addition to ethylene and the reaction time was set to 45 minutes.

When the catalyst from another preactivation treatment performed under the same conditions was analyzed, it was found that per gram of the titanium-containing support type catalyst component 21.5 g polymer were present, the intrinsic viscosity $\eta_{T2}$ of the polymer measured in tetralin at 135° C. was 23.2 dl/g and per gram of the titanium-containing support type catalyst component 22 g ethylene-propylene random copolymer with an intrinsic viscosity $\eta_A$ of 22.5 dl/g including 7.0 wt % propylene units (determined by $^{13}C$-NMR) were formed due to preactivation treatment.

When the polymer obtained from an addition polymerization after yet another preactivation treatment performed under the same conditions was analyzed, it was found that per gram of the titanium-containing support type catalyst component 25.3 g polymer were present, the intrinsic viscosity $\eta_{T3}$ of the polymer measured in tetralin at 135° C. was 19.9 dl/g, and per gram of the titanium-containing support type catalyst component 2.1 g polymer with an intrinsic viscosity $\eta_C$ of 2.2 dl/g were newly formed due to addition polymerization.

(3) Production of Polypropylene Composition (Main (Co) Polymerization of Propylene)

Gas phase polymerization was performed continuously for 150 h under the same conditions as in Example 119, except that, other than in Example 119 (3), the preactivated catalyst slurry obtained according to the above paragraph (2) was used as preactivated catalyst slurry, the ratio of hydrogen concentration to propylene concentration in the polymerization container was set to 0.012, and ethylene was fed continuously in addition to propylene into the polymerization container so as to maintain a ratio to the propylene concentration of 0.003 inside the polymerization container. Thus, a polymer having an intrinsic viscosity $\eta_T$ of 1.54 dl/g and containing 0.8 wt % ethylene units was obtained at a rate of 11.6 kg/h.

The polymer contained 0.12 wt % ethylene-propylene random copolymer (A) formed by preactivation treatment, and the propylene-ethylene copolymer had an intrinsic viscosity $\eta_P$ of 2.96 dl/g.

(4) Preparation of Polyolefin Composition and Continuous Tube-shaped Plastic

Using the same compounds and conditions as in Example 117 (4), granulation was carried out with an extrusion machine and pellets of a polyolefin composition were obtained. When the physical properties of these pellets were evaluated and measured, it was found that the MFR was 0.6 g/10 min, the crystallization temperature was 121.2° C. and the melt strength (MS) was 9.3 cN. Under the same conditions as in Example 117, a continuous tube-shaped plastic with a thickness of 0.5 mm was produced from the resulting pellets and the thickness and possible forming speed in the flow direction and in the circumferential direction were measured to determine formability and productivity rank. The continuous tube-shaped plastic had a productivity of "3".

Comparative Example 97

A polymer was produced under the same conditions as in Example 120, except that preactivation treatment with ethylene and propylene has not been performed. An evaluation sample for Comparative Example 97 was prepared. The resulting polymer was analyzed and the results of this analysis and formability, productivity and whitening rank of the continuous tube-shaped plastic are shown in Table 45.

Comparative Example 98

Omitting addition polymerization and prepolymerization with propylene in Example 117 (2), only preactivation polymerization with ethylene was performed. 1 liter methanol was added to the obtained preactivated catalyst slurry and a catalyst deactivation reaction was performed for one hour at 70° C. After the reaction, ethylene polymer was filter-separated from the slurry and dried under reduced pressure to obtain 200 g ethylene polymer with an intrinsic viscosity $\eta_A$ of 32.5 dl/g.

20 kg of the polypropylene obtained by main polymerization of propylene with omission of preactivation polymerization with ethylene and addition polymerization with propylene in paragraph (2) of Example 117 were mixed with 50 g polyethylene prepared as described above. This blend was mixed for 2 min using Henschel mixer with 10 g tetrakis [methylene-3-(3'-5'-di-t-butyl-4'-hydroxyphenol)propionate]methane, 20 g calcium stearate, and 1.0 kg hydrogenated styrene elastomer (20 wt % styrene concentration) with an SR-MFR (230° C.; 21.18 N) of 3.0 g/10 min. The blend was granulated at 230° C. using an extrusion pelletizer with a screw diameter of 65 mm, and a sample was prepared for the evaluation of Comparative Example 98. When the various physical properties of the pellets were measured and evaluated, it was found that the intrinsic viscosity $\eta_T$ was 2.98 dl/g, the melt flow rate was 0.6 g/10 min, the crystallization temperature was 116.2° C. and the melt strength (MS) was 5.2 cN. A continuous tube-shaped plastic was produced from the resulting pellets under the same conditions as in Example 117 (4). The polymer was analyzed and the results of this analysis and formability, productivity and whitening rank of the continuous tube-shaped plastic are shown in Table 45.

TABLE 45

| | Ex. 119 | Ex. 120 | Comp. Ex. 96 | Comp. Ex. 97 | Comp. Ex. 98[3] |
|---|---|---|---|---|---|
| Prel. Polymerization Polypropylene (B) | | | | | |
| Int. Viscosity η (dl/g) | 2.7 | 2.7 | 2.7 | 2.7 | — |
| Formed Amount[1] (g/g) | 1.2 | 1.2 | 1.2 | 1.2 | — |
| Composition Ratio[2] (wt %) | 0.01 | 0.01 | 0.01 | 0.01 | — |
| Preactivation Polyethylene (A) | | | | | |
| Int. Viscosity η (dl/g) | 30.2 | 22.5 | — | — | 32.5 |
| Formed Amount[1] (g/g) | 32.0 | 22.0 | — | — | — |
| Composition Ratio[2] (wt %) | 0.18 | 0.12 | — | — | 0.25 |
| Addition Polymerization Polypropylene (C) | | | | | |
| Int. Viscosity η (dl/g) | 2.8 | 2.2 | 2.8 | 2.2 | — |
| Formed Amount[1] (g/g) | 2.2 | 2.1 | 2.2 | 2.1 | — |
| Composition Ratio[2] (wt %) | 0.01 | 0.01 | 0.01 | 0.01 | — |
| Polypropylene Composition | | | | | |
| Intrinsic Viscosity η (dl/g) | 3.05 | 2.96 | 3.01 | 2.94 | 2.98 |
| Melt Strength (MS) (cN) | 9.8 | 9.3 | 5.7 | 5.0 | 5.2 |
| Cryst. Temp. (Tc) (° C.) | 122.0 | 121.2 | 116.1 | 115.2 | 116.2 |
| PP-MFR (g/10 min) | 0.5 | 0.6 | 0.5 | 0.6 | 0.6 |
| Blending Quantity (wt parts) | 100.0 | 100.0 | 100.0 | 100.0 | 100.0 |
| Hydrogenat. Styrene Elastomer | | | | | |
| SR-MFR (g/10 min) | 3.0 | 3.0 | 3.0 | 3.0 | 3.0 |
| Blending Quantity (wt parts) | 5.0 | 5.0 | 5.0 | 5.0 | 5.0 |
| Molding Properties of Polypropylene Composition Continuous Tube-shaped Plastic | | | | | |
| Formability | ◯ | ◯ | X | X | X |
| Productivity | 3 | 3 | 1 | 1 | 1 |
| Whitening | good | good | good | good | good |

Notes:
[1]Amount (in g) formed per gram of transition metal compound catalyst component
[2]Composition ratio in polypropylene composition (in wt %)
[3]Simple mechanical mixture of polyethylene (A) and main polymerization polypropylene

EXAMPLES 121–126 and COMPARATIVE EXAMPLES 99–102

A polyolefin composition (1) was produced under the same conditions as in Example 117, except that the blending quantity and substances for polypropylene composition (C) and hydrogenated styrene elastomer (D) were altered to the conditions shown in Table 46. A continuous tube-shaped plastic was manufactured under the same conditions as in Example 117. The properties of the resulting polypropylene composition and polyolefin composition and the productivity and whitening of the continuous tube-shaped plastic are shown in Table 46.

TABLE 46

| | Ex. 121 | Ex. 122 | Ex. 123 | Ex. 124 | Ex. 125 | Ex. 126 |
|---|---|---|---|---|---|---|
| Polypropylene Composition | | | | | | |
| Intrinsic Viscosity η (dl/g) | 2.8 | 1.95 | 2.8 | 2.8 | 2.8 | 2.8 |
| Melt Strength (MS) (cN) | 7.1 | 4.1 | 7.1 | 7.1 | 7.1 | 7.1 |
| Cryst. Temp. (Tc) (° C.) | 121.5 | 123.5 | 122.5 | 122.5 | 122.5 | 122.5 |
| PP-MFR (g/10 min) | 2.0 | 9.5 | 2.0 | 2.5 | 2.0 | 2.3 |
| Blending Quantity (wt %) | 95.0 | 95.0 | 95.0 | 95.0 | 98.0 | 90.0 |
| Hydrogenat. Styrene Elastomer | | | | | | |
| SR-MFR (g/10 min) | 5.0 | 5.0 | 0.8 | 9.0 | 5.0 | 5.0 |
| Blending Quantity (wt %) | 5.0 | 5.0 | 5.0 | 5.0 | 2.0 | 10.0 |
| Molding Properties of Polypropylene Composition Continuous Tube-shaped Plastic | | | | | | |
| Formability | ◯ | ◯ | ◯ | ◯ | ◯ | ◯ |
| Productivity | 3 | 3 | 3 | 3 | 3 | 3 |
| Whitening | good | good | good | good | good | good |

| | Comp. Ex. 99 | Comp. Ex. 100 | Comp. Ex. 101 | Comp. Ex. 102 |
|---|---|---|---|---|
| Polypropylene Composition | | | | |
| Intrinsic Viscosity η (dl/g) | 2.8 | 2.8 | 2.8 | 2.8 |
| Melt Strength (MS) (cN) | 7.1 | 7.1 | 7.1 | 7.1 |
| Cryst. Temp. (Tc) (° C.) | 122.5 | 122.5 | 122.5 | 122.5 |
| PP-MFR (g/10 min) | 2.0 | 2.0 | 2.0 | 2.5 |
| Blending Quantity (wt %) | 95.0 | 95.0 | 99.95 | 85.0 |
| Hydrogenat. Styrene Elastomer | | | | |
| SR-MFR (g/10 min) | 0.08 | 15.0 | 5.0 | 5.0 |
| Blending Quantity (wt %) | 5.0 | 5.0 | 0.05 | 15.0 |
| Molding Properties of Polypropylene Composition Continuous Tube-shaped Plastic | | | | |
| Formability | ◯ | ◯ | Δ | Δ |
| Productivity | 2 | 3 | 2 | 1 |
| Whitening | good | bad | bad | good |

Below, some definitions for technical terms and evaluation methods as applied in the following Examples 127–130 and Comparative Example 103–109 are explained:

Formability

Using a cylindrical die of 150 mm diameter, a continuous tube-shaped plastic of 0.5 mm thickness is molded in a cooling molding process a vacuum forming metal die of 500 mm length and a water bath of 2 m length at a retrieval rate of 0.5 m/min. The thickness in the machine flow direction and the thickness in the circumferential direction are measured in intervals of 100 mm in the machine flow direction and intervals of 50 mm in the circumferential direction over a total length of 10 m using a Micro Gauge (Trademark). The standard deviations for cross and machine direction are calculated and the quality is judged by evaluating both standard deviations according to the following criteria. The formability is better the smaller the standard deviations are.
Formability Criteria ◯: The standard deviations for the cross direction and the flow direction are both under 5%.

Δ: One of the two standard deviations for the cross direction and the flow direction is at least 5%.

x: A tube-shaped product cannot be molded, or a cylindrical shape cannot be formed.
Productivity The thickness of the cylinder was made constant by changing the molding speed among the conditions described for formability and the forming speed with which a tube-shaped plastic can be molded so that the thickness standard deviations for both directions are below 5% was measured. The productivity was ranked due to the forming speed according to the following criteria:

| Forming Speed and Productivity Criteria | |
|---|---|
| Productivity-Good | 3 At least 2.0 m/min |
| | 2 At least 0.5 m/min and less than 2.0 m/min |
| Productivity-Bad | 1 Less than 0.5 m/min |

A good productivity is at least 2 m/min, at less than 0.5 m/min the product has no commercial value.

EXAMPLE 127

A polymer was obtained with the method of Example 4. The resulting polymer had an intrinsic viscosity $\eta_r$ of 3.09 dl/g. The resulting polymer was a polypropylene composition containing 0.25 wt % polyethylene (A) corresponding to the component (a) due to the preactivation polymerization and the polypropylene component (b) had an intrinsic viscosity $\eta_P$ of 3.09 dl/g.
Preparation of Polyolefin Composition and Continuous Tube-shaped Plastic 100 weight parts of the resulting polypropylene composition were mixed for 2 min using a Henschel Mixer with 0.05 weight parts tetrakis [methylene-3-(3'-5'-di-t-butyl-4'-hydroxyphenol)propionate]methane and 0.1 weight parts calcium stearate. The blend was granulated at 230° C. using an extrusion pelletizer with a screw diameter of 65 mm and pellets were obtained. When the physical properties of the pellets were evaluated, it was found that the MFR of the pellets was 0.5 g/10 min, the crystallization temperature was 122.5° C. and the melt strength (MS) was 10.1 cN.

Using a single layer melt extrusion device with 90 mm screw diameter, 150 mm cylindrical die diameter and 0.8 mm lip opening width, a continuous tube-shaped plastic with a target thickness of 0.5 mm was produced at 250° C. melt temperature and 0.5 m/min forming speed, using a vacuum metal die of 500mm length and a water bath (20° C. water temperature) of 2 m length. The formability of the resulting plastic had the rank "◯". Moreover, taking the same thickness as a reference and accelerating the discharge amount and the forming speed, a continuous tube-shaped plastic was molded and a forming speed was measured, for which standard deviations of the thickness in the flow direction and circumferential direction are less than 5%. Even at the fastest forming speed due to machine specification of 5 m/min, the forming speed rank was "◯" and the productivity rank was "3". Furthermore, when a 500 g iron ball was dropped onto the resulting plastic and the whitening was measured, it resulted that even at 2 m no whitening could be observed, thus whitening behavior was also good.

EXAMPLE 128 and COMPARATIVE EXAMPLE 103

A polypropylene composition was produced under the same conditions as in Example 127, except that the conditions for preactivation polymerization with ethylene were changed to alter the formed amount of polyethylene (A). This polypropylene composition was mixed with the same compounds as in Example 127, pelletized, and polyolefin compositions of Example 128 and Comparative Example 103 were prepared.

The physical properties of the resulting polypropylene composition and the formability and productivity of a continuous tube-shaped plastic made from the resulting polyolefin composition under the same processing conditions as in Example 127 are shown in Table 47.

Comparative Example 104

A polypropylene composition was produced by a treatment using the same conditions as in Example 127, except that instead of preactivation polymerization with ethylene in Example 127 (2), a total of 220 g propylene is fed in three portions to the reaction container: 80 g at the beginning of the preactivation polymerization, 80 g about 30 min after the begin and 60 g one hour after the beginning of the preactivation polymerization. The polypropylene composition was pelletized and a sample was prepared for the evaluation of Comparative Example 104.

The physical properties of the resulting polypropylene composition and the formability and productivity of a continuous tube-shaped plastic made from the resulting polyolefin composition under the same processing conditions as in Example 127 are shown in Table 47.

Comparative Example 105

A polypropylene composition was produced by a treatment using the same conditions as in Example 127, except that preactivation polymerization with ethylene of a titanium-containing support type catalyst component has not been performed. From the resulting polypropylene composition, a sample was prepared for the evaluation of Comparative Example 105. The physical properties of the resulting polypropylene composition and the formability and productivity of a continuous tube-shaped plastic made from pellets under the same processing conditions as in Example 127 are shown in Table 47.

Comparative Example 106

After nitrogen gas has been filled into a reaction vessel having an agitator with tilted mixing blades, 10 kg of a propylene homopolymer powder with an intrinsic viscosity $\eta$ of 1.67 dl/g and an average particle size of 150 μm, which has been obtained by slurry-polymerization of propylene in n-hexane using a catalyst combining a titanium-containing catalyst component comprising a titanium-trichloride composition with diethylaluminumchloride and diethyleneglycoldimethylether as a third component, were filled into the reactor vessel. Successively, the procedure of evacuating the reactor vessel and refilling it with nitrogen gas up to atmospheric pressure was repeated ten times. Then, 0.35 mol di-2-ethylhexylperoxydicarbonate (modifier) in a toluene solution of 70 wt % concentration were added and mixed under the nitrogen gas atmosphere at 25° C. while stirring. Then, the temperature in the reactor vessel was raised to 120° C. and reaction took place at this temperature for 30 min. After the reaction time had passed, the temperature inside the reactor vessel was raised to 135° C. and an after-treatment was performed at this temperature for 30 min. After the after-treatment, the reactor vessel was cooled down to room temperature and opened to retrieve the polypropylene.

100 weight parts of the resulting propylene polymer were mixed for 2 min using a Henschel mixer with 0.05 weight parts tetrakis [methylene-3-(3'-5'-di-t-butyl-4'-hydroxyphenol)propionate]methane and 0.1 weight parts calcium stearate, in addition to the same compounds as in Example 127. The blend was granulated and pelletized at 230° C. using an extrusion pelletizer with a screw diameter of 65 mm and samples were prepared for the evaluation of Comparative Example 4.

Using the obtained pellets, a continuous tube-shaped plastic was produced with the same method as in Example 127, and its formability and productivity were measured. The formability of this continuous plastic was "x" and its productivity rank was "1".

$\eta_T$ of 3.05 dl/g. The resulting polymer was a polypropylene composition containing 0.18 wt % polyethylene (A) corresponding to component (a) formed due to preactivation polymerization. The polypropylene (b) had an intrinsic viscosity $\eta_P$ of 3.05 dl/g.

Preparation of Polypropylene Composition and Continuous Tube-shaped Plastic

After that, using the same compounds and conditions as in Example 127, granulation was carried out and polypropylene pellets were obtained. When the physical properties of these pellets were evaluated and measured, it was found that the MFR was 0.5 g/10 min, the crystallization temperature was 122.0° C. and the melt strength (MS) was 9.8 N.

As in Example 127, using a single layer melt extrusion device with 90 mm screw diameter, 150 mm cylindrical die diameter and 0.8 mm lip opening width, a continuous tube-shaped plastic with a target thickness of 0.5 mm was produced at 250° C. melt temperature and 0.5 m/min forming speed, using a vacuum metal die of 500 mm length and a water bath (20° C. water temperature) of 2 m length. The formability of the resulting plastic had the rank "○". Moreover, taking the same thickness as a reference and accelerating the discharge amount and the forming speed, a continuous tube-shaped plastic was molded and a forming speed was measured, for which standard deviations of the thickness in the flow direction and circumferential direction are less than 5%. At a forming speed of 4.5 m/min, the forming speed rank was "○" and the productivity rank was "3".

TABLE 47

|  | Ex. 127 | Ex. 128 | Comp. Ex. 103 | Comp. Ex. 104 | Comp. Ex. 105 | Comp. Ex. 106 |
|---|---|---|---|---|---|---|
| Prel. Polymerization Polypropylene (B) | | | | | | |
| Int. Viscosity η (dl/g) | 2.8 | 2.8 | 2.8 | 2.8 | 2.8 | — |
| Formed Amount[1] (g/g) | 2.0 | 2.0 | 2.0 | 2.0 | 2.0 | — |
| Composition Ratio[2] (wt %) | 0.02 | 0.02 | 0.02 | 0.02 | 0.02 | — |
| Preactivation Polyethylene (A) | | | | | | |
| Int. Viscosity η (dl/g) | 34.0 | 34.4 | 34.0 | 2.8 | — | — |
| Formed Amount[1] (g/g) | 22.0 | 4.5 | 0.005 | 22.0 | — | — |
| Composition Ratio[2] (wt %) | 0.25 | 0.05 | 0.0001 | 0.25 | — | — |
| Addition Polymerization Polypropylene (C) | | | | | | |
| Int. Viscosity η (dl/g) | 2.8 | 2.8 | 2.8 | 2.8 | 2.8 | — |
| Formed Amount[1] (g/g) | 2.0 | 2.0 | 2.0 | 2.0 | 2.0 | — |
| Composition Ratio[2] (wt %) | 0.02 | 0.02 | 0.02 | 0.02 | 0.02 | — |
| Polypropylene Composition | | | | | | |
| Intrinsic Viscosity η (dl/g) | 3.09 | 3.08 | 3.07 | 2.95 | 3.05 | 3.06 |
| Melt Strength (MS) (cN) | 10.1 | 8.5 | 6.0 | 5.8 | 5.1 | 4.8 |
| Cryst. Temp. (Tc) (° C.) | 122.0 | 121.3 | 117.0 | 116.2 | 116.0 | 129.4 |
| PP-MFR (g/10 min) | 0.5 | 0.5 | 0.5 | 0.6 | 0.5 | 0.5 |
| Molding Properties of Polypropylene Composition Continuous Tube-shaped Plastic | | | | | | |
| Formability | ○ | ○ | Δ | X | X | X |
| Productivity | 3 | 3 | 1 | 1 | 1 | 1 |

Notes:
[1]Amount (in g) formed per gram of transition metal compound catalyst component
[2]Composition ratio in polypropylene composition (in wt %)

EXAMPLE 129

A polymer was obtained in the same manner as in Example 4. The resulting polymer had an intrinsic viscosity Comparative Example 107

A polymer was produced under the same conditions as in Example 129, except that preactivation polymerization with ethylene has not been performed. A sample was prepared for the evaluation of Comparative Example 107.

The resulting polymer was analyzed and the results of this analysis and formability, productivity and whitening rank of the continuous tube-shaped plastic are shown in Table 48.

EXAMPLE 130

(1) Preparation of Transition Metal Compound Catalyst Component

A titanium-containing support type catalyst component was obtained under the same conditions as in Example 129.

(2) Preparation of Preactivated Catalyst

A preactivated catalyst slurry was obtained under the same conditions as in Example 129, except that the conditions for preactivation polymerization with ethylene were changed insofar that the reaction temperature was set to 0° C., 30 g propylene were fed in addition to ethylene and the reaction time was set to 45 minutes.

When the catalyst from another preactivation treatment performed under the same conditions was analyzed, it was found that per gram of the titanium-containing support type catalyst component 21.5 g polymer were present, the intrinsic viscosity $\eta_{T2}$ of the polymer measured in tetralin at 135° C. was 23.2 dl/g and per gram of the titanium-containing support type catalyst component 22 g ethylene-propylene random copolymer with an intrinsic viscosity $\eta_A$ of 22.5 dl/g including 7.0 wt % propylene units (determined by $^{13}$C-NMR) were formed due to preactivation treatment.

When the polymer obtained from an addition polymerization after yet another preactivation treatment performed under the same conditions was analyzed, it was found that per gram of the titanium-containing support type catalyst component 25.3 g polymer were present, the intrinsic viscosity $\eta_{T3}$ of the polymer measured in tetralin at 135° C. was 19.9 dl/g, and per gram of the titanium-containing support type catalyst component 2.1 g polymer with an intrinsic viscosity $\eta_C$ of 2.2 dl/g were newly formed due to addition polymerization.

(3) Production of Polypropylene Composition (Main (Co) Polymerization of Propylene)

Gas phase polymerization was performed continuously for 150 h under the same conditions as in Example 129, except that, other than in Example 129 (3), the preactivated catalyst slurry obtained according to the above paragraph (2) was used as preactivated catalyst slurry, the ratio of hydrogen concentration to propylene concentration in the polymerization container was set to 0.012, and ethylene was fed continuously in addition to propylene into the polymerization container so as to maintain a ratio to the propylene concentration of 0.003 inside the polymerization container. Thus, a polymer having an intrinsic viscosity $\eta_T$ of 1.54 dl/g and containing 0.8 wt % ethylene units was obtained at a rate of 11.6 kg/h.

The polymer contained 0.12 wt % ethylene-propylene random copolymer (A) formed by preactivation treatment, and the propylene-ethylene copolymer had an intrinsic viscosity $\eta_P$ of 2.96 dl/g.

(4) Preparation of Polypropylene Composition and Continuous Tube-shaped Plastic

Using the same compounds and conditions as in Example 127 (4), granulation was carried out with an extrusion machine and pellets of a polyolefin composition were obtained. When the physical properties of these pellets were evaluated and measured, it was found that the MFR was 0.6 g/10 min, the crystallization temperature was 121.2° C. and the melt strength (MS) was 9.3 cN. Under the same conditions as in Example 127, a continuous tube-shaped plastic with a thickness of 0.5 mm was produced from the resulting pellets and the thickness and possible forming speed in the flow direction and in the circumferential direction were measured to determine formability and productivity rank. The continuous tube-shaped plastic had a productivity of "3".

Comparative Example 108

A polymer was produced under the same conditions as in Example 130, except that preactivation treatment with ethylene and propylene has not been performed. An evaluation sample for Comparative Example 108 was prepared. The resulting polymer was analyzed and the results of this analysis and formability, productivity and whitening rank of the continuous tube-shaped plastic are shown in Table 48.

Comparative Example 109

Omitting addition polymerization and prepolymerization with propylene in Example 127 (2), only preactivation polymerization with ethylene was performed. 1 liter methanol was added to the obtained preactivated catalyst slurry and a catalyst deactivation reaction was performed for one hour at 70° C. After the reaction, ethylene polymer was filter-separated from the slurry and dried under reduced pressure to obtain 200 g ethylene polymer with an intrinsic viscosity $\eta_A$ of 32.5 dl/g.

20 kg of the polypropylene obtained by main polymerization of propylene with omission of preactivation polymerization with ethylene and addition polymerization with propylene in paragraph (2) of Example 127 were mixed with 50 g polyethylene prepared as described above. This blend was mixed for 2 min using Henschel mixer with 10 g tetrakis [methylene-3-(3'-5'-di-t-butyl-4'-hydroxyphenol) propionate]methane, 20 g calcium stearate, and 1.0 kg hydrogenated styrene elastomer (20 wt % styrene concentration) with an SR-MFR (230° C.; 21.18 N) of 3.0 g/10 min. The blend was granulated at 230° C. using an extrusion pelletizer with a screw diameter of 65 mm, and a sample was prepared for the evaluation of Comparative Example 109. When the various physical properties of the pellets were measured and evaluated, it was found that the intrinsic viscosity $\eta_T$ was 2.98 dl/g, the melt flow rate was 0.6 g/10 min, the crystallization temperature was 116.2° C. and the melt strength (MS) was 5.2 cN. A continuous tube-shaped plastic was produced from the resulting pellets under the same conditions as in Example 127 (4). The polymer was analyzed and the results of this analysis and formability, productivity and whitening rank of the continuous tube-shaped plastic are shown in Table 48.

TABLE 48

|  | Ex. 129 | Ex. 130 | Comp. Ex. 107 | Comp. Ex. 108 | Comp. Ex. 109 |
| --- | --- | --- | --- | --- | --- |
| Prel. Polymerization Polypropylene (B) | | | | | |
| Int. Viscosity η (dl/g) | 2.7 | 2.7 | 2.7 | 2.7 | — |
| Formed Amount$^{(1)}$ (g/g) | 1.2 | 1.2 | 1.2 | 1.2 | — |
| Composition Ratio$^{(2)}$ (wt %) | 0.01 | 0.01 | 0.01 | 0.01 | — |
| Preactivation Polyethylene (A) | | | | | |
| Int. Viscosity η (dl/g) | 30.2 | 22.5 | — | — | 32.5 |
| Formed Amount$^{(1)}$ (g/g) | 32.0 | 22.0 | — | — | — |
| Composition Ratio$^{(2)}$ (wt %) | 0.18 | 0.12 | — | — | 0.25 |

TABLE 48-continued

|  | Ex. 129 | Ex. 130 | Comp. Ex. 107 | Comp. Ex. 108 | Comp. Ex. 109 |
|---|---|---|---|---|---|
| Addition Polymerization Polypropylene (C) |  |  |  |  |  |
| Int. Viscosity η (dl/g) | 2.8 | 2.2 | 2.8 | 2.2 | — |
| Formed Amount[(1)] (g/g) | 2.2 | 2.1 | 2.2 | 2.1 | — |
| Composition Ratio[(2)] (wt %) | 0.01 | 0.01 | 0.01 | 0.01 | — |
| Polypropylene Composition |  |  |  |  |  |
| Intrinsic Viscosity η (dl/g) | 3.05 | 2.96 | 3.01 | 2.94 | 2.98 |
| Melt Strength (MS) (cN) | 9.8 | 9.3 | 5.7 | 5.0 | 5.2 |
| Cryst. Temp. (Tc) (° C.) | 122.0 | 121.2 | 116.1 | 115.2 | 116.2 |
| PP-MFR (g/10 min) | 0.5 | 0.6 | 0.5 | 0.6 | 0.6 |
| Molding Properties of Polypropylene Composition Continuous Tube-shaped Plastic |  |  |  |  |  |
| Formability | ◯ | ◯ | X | X | X |
| Productivity | 3 | 3 | 1 | 1 | 1 |
| Whitening | Good | Good | Good | Good | Good |

Notes:
[(1)]Amount (in g) formed per gram of transition metal compound catalyst component
[(2)]Composition ratio in polypropylene composition (in wt %)

What is claimed is:

1. A plastic molded product of a polypropylene composition (X) comprising:
   (a) 0.01–5.0 weight parts of a high molecular weight polyethylene having an intrinsic viscosity $\eta_E$ in the range of 15–100 dl/g measured in tetralin at 135° C.; and
   (b) 100 weight parts of a propylene (co)polymer which consists of a propylene homopolymer or a propylene-olefin copolymer containing not less than 50 wt % propylene and has an intrinsic viscosity $\eta_P$ in the range of 0.2–10 dl/g measured in tetralin at 135° C.

2. The plastic molded product according to claim 1, wherein the high molecular weight polyethylene exists as finely dispersed particles having a number-average particle size of 1–5000 nm.

3. The plastic molded product according to claim 1, wherein the number-average particle size of the high molecular weight polyethylene is 10–500 nm.

4. The plastic molded product according to claim 1, wherein the intrinsic viscosity $\eta_P$ of the polypropylene composition (x) measured in tetralin at 135° C. is 0.2–10 dl/g.

5. The plastic molded product according to claim 1, which satisfies the equation $$\log(G'(\omega=10^0))-\log(G'(\omega=10^{-2}))<2,$$

wherein $G'(\omega=10^0)$ is the storage elastic modulus at a frequency of $\omega=10^0$, and $G'(\omega=10^{-2})$ is the storage elastic modulus at a frequency of $\omega=10^{-2}$ of the molten polypropylene composition (x) at 230° C.

6. The plastic molded product according to claim 1, which satisfies the equation $$\log(N_1)>-\log(MFR)+5,$$

wherein $N_1$ is a first normal stress difference at a shear rate of $4\times10^{-1}(\sec^{-1})$ of the polypropylene composition (x) at 190° C., 230° C. and 250° C. and MFR is a melt flow rate.

7. The plastic molded product according to claim 1, which satisfies the equation $$(N_1(190°\text{ C.})-N_1(250°\text{ C.}))/N_1(190°\text{ C.})<0.6,$$

wherein $N_1(190°\text{ C.})$ and $N_1(250°\text{ C.})$ are first normal stress differences at a shear rate of $4\times10^{-1}(\sec^{-1})$ of the polypropylene composition (x) at 190° C. and 250° C. respectively.

8. The plastic molded product according to claim 1, which satisfies the equation $$(MS(190°\text{ C.})-MS(250°\text{ C.}))/MS(190°\text{ C.})<3.1,$$

wherein $MS(190°\text{ C.})$ and $MS(250°\text{ C.})$ are the melt strengths at a shear rate of $3\times10^{-1}(\sec^{-1})$ of the polypropylene composition (x) at 190° C. and 250° C. respectively.

9. The plastic molded product according to claim 1, which satisfies the equation $$(G(t=10)-G(t=300))/G(t=10)<1,$$

wherein $G(t=10)$ is a relaxation elastic modulus with $t=10$ sec and $G(t=300)$ is a relaxation elastic modulus with $t=300$ sec of the molten polypropylene composition (x) at 230° C. under 500% strain.

10. The plastic molded product according to claim 1, wherein the elongational viscosity when the polypropylene composition (x) is melted and stretched increases in a region where deformation is large, indicating strain hardenability of the polypropylene composition (x).

11. The plastic molded product according to claim 1, wherein the olefin (co)polymer particles are added before or during the polymerization of the propylene (co)polymer.

12. The plastic molded product according to claim 1, satisfying the following equation $$\log(MS)>4.24\times\log(\eta_T)-1.20,$$

wherein MS is the melt strength of the polypropylene composition (x) at 230° C. and $\eta_T$ is the intrinsic viscosity measured in tetralin at 135° C.

13. The plastic molded product according to claim 1, satisfying the following equation $$\log(MS)>4.24\times\log(\eta_T)-1.05,$$

wherein MS is the melt strength of the polypropylene composition (x) at 230° C. and $\eta_T$ is the intrinsic viscosity measured in tetralin at 135° C.

14. The plastic molded product according to claim 1, satisfying the following equation $$4.24\times\log(\eta_T)+0.24>\log(MS)>4.24\times\log(\eta_T)-1.10,$$

wherein MS is the melt strength of the polypropylene composition (x) at 230° C. and $\eta_T$ is the intrinsic viscosity measured in tetralin at 135° C.

15. The plastic molded product according to claim 1, wherein 0.001–2 weight parts of at least one stabilizer selected from the group consisting of a phenol antioxidant and a phosphorous antioxidant are added to 100 weight parts of the polypropylene composition (x).

16. The plastic molded product according to claim 1, wherein the plastic molded product is at least one plastic selected from the group consisting of a resin foam, a film, a sheet, a laminate covering a substrate surface, a hollow plastic, an injection molded plastic, a fiber, a nonwoven web and a tube-shaped continuous plastic.

17. The plastic molded product according to claim 1, wherein the plastic molded product is a resin foam, and the resin foam is at least one selected from the group consisting of a container and a sheet.

18. The plastic molded product according to claim 17, wherein the foam sheet is laminated on a metal plate.

19. The plastic molded product according to claim 17, wherein the expansion ratio of the foam is in the range of 1.1–5.0.

20. The plastic molded product according to claim 1, wherein the plastic molded product is a film or a sheet molded by a T-die method satisfying the equation $$280 \geq (PP\text{-}T1) - (CH\text{-}T2) \geq 120,$$

wherein (PP-T1) is a temperature of at least 180° C. but less than 350° C. of the molten propylene composition (x) for melding and (CH-T2) is a surface temperature less than 80° C. of a chillroll of a molding machine.

21. The plastic molded product according to claim 1, wherein the plastic molded product is a film or a sheet having at least one of the basic lamination structures selected from the group consisting of [A]/[B],[A]/[B]/[A], and [B]/[A]/[B], wherein the polypropylene composition (x) of claim 1 is used for layer [A], and at least one polypropylene composition (y) selected from the group consisting of crystalline propylene homopolymer and crystalline propylene-olefin copolymer containing not less than 50 wt % propylene units is used for layer [B].

22. The plastic molded product according to claim 21, wherein the ratio of the total thicknesses of layer [A] and layer [X] is at least in the range [A]:[B]=20:1–1:20.

23. The plastic molded product, wherein the plastic molded product is a film or a sheet, wherein the polypropylene composition film according to claim 1 is laminated onto at least one surface of a polypropylene biaxially stretched film.

24. The plastic molded product according to claim 1, comprising
{A} 99–90 wt % of the polypropylene composition (X) according to claim 1, having a melt flow rate of 5–100 g/10 min at 230° C. and 21.18 N comprising
the propylene (co)polymer (b), which is a propylene polymer or a propylene-olefin copolymer containing not less than 50 wt % propylene units and having an intrinsic viscosity $\eta_P$ of 0.2 dl/g–10 dl/g measured in tetralin at 135° C., and
0.01–5 weight parts (for 100 weight parts of propylene (co)polymer (b)) of olefin (co)polymer (a) with an intrinsic viscosity $\eta_E$ of 15 dl/g measured in tetralin at 135° C., and
{B} 1–10 wt % of crystalline or low crystalline ethylene α-olefin copolymer having a melt flow rate of 1–50 g/10 min at 230° C. and 21.18 N.

25. The plastic molded product according to claim 1, wherein the plastic molded product is a coated plastic.

26. The plastic molded product according to claim 1, wherein the plastic molded product is a hollow plastic article using polypropylene compositions having a melt flow rate of 0.1–20 g/10 min at 230° C. and 21.18 N.

27. The plastic molded product according to claim 1, further comprising 5–30 wt % of at least one substance selected from the group consisting of
(Y1) an ethylene homopolymer with a density of 0.914–0.930 g/cm³ and a melting point (Tm) of 100–118° C.,
(Y2) an ethylene-olefin copolymer with a density of 0.920–0.935 g/cm³ and a melting point (Tm) of 115–127° C.,
(Y3) an ethylene-olefin copolymer with a density of 0.880–0.920 g/cm³ and a melting point (Tm) of 110–115° C.,
(Y4) a crystalline ethylene polymer with a density of 0.935–0.968 g/cm³ and a melting point (Tm) of 125–136° C.,
(Y5) an ethylene-olefin copolymer rubber,
(Y6) an ethylene-olefin nonconjugated diene copolymer rubber
(Y7) an ethylene-vinyl acetate copolymer with a density of 0.92–0.95 g/cm³ and a melting point (Tm) of 90–110° C., and
(Y8) an inorganic filler, which is added to 95–70 wt % of the polypropylene composition (x) according to claim 1.

28. The plastic molded product according to claim 27, wherein the inorganic filler is at least one of the substances selected from the group consisting of talc, calcium carbonate, potassium titanate whiskers, mica and glass fiber.

29. The plastic molded product according to claim 1, wherein the plastic molded product is a multilayer hollow plastic article comprising
an inner layer comprising the polypropylene composition (X) according to claim 1 having a melt flow rate (230° C.; 21.18 N) of 0.1–20 g/10 min and consisting of 0.01–5 weight parts of said component (a) and 100 weight parts of said component (b); and
a surface layer comprising a polypropylene composition (W) consisting of 100 weight parts polypropylene with a crystalline melting point of 135° C.–165° C. and 0.05–1 weight parts nucleating agent.

30. The plastic molded product according to claim 29, wherein the polypropylene composition (x) according to claim 1 accounts for 95–70 wt % of the inner layer and further comprising 5–30 wt % of at least one substance selected from the group consisting of
(Y1) an ethylene homopolymer with a density of 0.914–0.930 g/cm³ and a melting point C(m) of 100–118° C.,
(Y2) an ethylene-olefin copolymer with a density of 0.920–0.935 g/cm³ and a melting point (Tm) of 115–127° C.,
(Y3) an ethylene-olefin copolymer with a density of 0.880–0.920 g/cm³ and a melting point (Tm) of 110–115° C.,
(Y4) a crystalline ethylene polymer with a density of 0.935–0.968 g/cm³ and a melting point (Tm) of 125–136° C.,
(Y5) an ethylene-olefin copolymer rubber,
(Y6) an ethylene-olefin nonconjugated diene copolymer rubber
(Y7) an ethylene-vinyl acetate copolymer with a density of 0.92–0.95 g/cm³ and a melting point (Tm) of 90–110° C., and
(Y8) an inorganic filler.

31. The plastic molded product according to claim 1, wherein the plastic molded product is a fiber having
the plastic molded product according to claim 1 as one fiber component; and
at least one thermoplastic resin selected from the group consisting of a thermoplastic polyolefin resin and a thermoplastic polyester resin as another component; the fiber is formed as a regular fiber of one of the above components, a conjugated fiber of both components or a mixed fiber of both components, the polypropylene composition (x) accounts for 100–50 wt %, and the average fiber diameter is 0.1–10 μm.

32. A plastic molded product that is a conjugated fiber, wherein the plastic polypropylene composition (x) according to claim 1 is used as a sheath component and a crystalline polypropylene is used as a core component, and the conjugation ratio (sheath component/core component) is in the range 20/80–60/40 (wt %).

33. The plastic molded product according to claim 31, wherein the fiber is formed into a nonwoven fabric web.

34. The plastic molded product according to claim 1, wherein a fiber constituting a nonwoven fabric web is made only of the polypropylene composition (x) according to claim 31.

35. The plastic molded product according to claim 1, wherein a fiber constituting a nonwoven fabric web is a conjugated fiber comprising the polypropylene composition (x) according to claim 1 and at least one thermoplastic resin selected from the group consisting of polyolefin thermoplastic resin and polyester thermoplastic resin, and the polypropylene composition (x) accounts for not less than 50 wt %.

36. The plastic molded product according to claim 1, wherein a fiber constituting a nonwoven fabric web is a mixed fiber comprising the polypropylene composition (x) according to claim 1 and a regular fiber or a conjugated fiber of at least one thermoplastic resin selected from the group consisting of polyolefin thermoplastic resin and polyester thermoplastic resin, and the polypropylene composition (x) accounts for not less than 50 wt %.

37. The plastic molded product according to claim 1, further comprising 0.10–10 wt % hydrogenated styrene elastomer for 99.9–90 wt % of the polypropylene composition (x) according to claim 1.

38. The plastic molded product according to claim 37, wherein the hydrogenated styrene elastomer has a melt flow rate (SR-MFR) (230° C.; 21.18 N) of 0.5 g/10 min–10 g/min.

39. The plastic molded product according to claim 37, wherein the hydrogenated styrene elastomer has a styrene concentration of not more than 30 wt %.

40. The plastic molded product according to claim 37, wherein the hydrogenated styrene elastomer is a hydrogenated ethylene-butene styrene elastomer.

41. The plastic molded product according to claim 37, wherein the plastic molded product is a continuous tube-shaped plastic.

42. The plastic molded product according to claim 41, wherein the continuous tube-shaped plastic is obtained by melt extruding the polypropylene composition (x) into a metal mold in vacuum condition and molding it into a tube shape.

43. The plastic molded product according to claim 1, wherein the plastic molded product is a continuous tube-shaped plastic obtained by melt extruding the polypropylene composition (x) with a melt flow rate (PP-MFR) (230° C.; 21.18 N) of 0.1 g/10 min–10 g/10 min into a metal mold in vacuum condition and molding it into a tube shape.

* * * * *